United States Patent
Reik et al.

[11] Patent Number: 6,029,787
[45] Date of Patent: *Feb. 29, 2000

[54] SELF-ADJUSTING FRICTION CLUTCH

[75] Inventors: Wolfgang Reik, Bühl; Paul Maucher, Sasbach, both of Germany; Ed Maucher, Wooster, Ohio; Karl-Ludwig Kimmig, Bühl-Waldmatt, Germany; Rolf Meinhard, Bühl, Germany; Christopher Wittman, Bühl-Eisental, Germany

[73] Assignee: LuK Lamellen und Kupplungsbau GmbH, Buhl, Germany

[*] Notice: This patent is subject to a terminal disclaimer.

[21] Appl. No.: 08/250,760

[22] Filed: May 26, 1994

Related U.S. Application Data

[63] Continuation-in-part of application No. 07/982,184, Nov. 25, 1992, Pat. No. 5,409,091, application No. 08/026,588, Mar. 5, 1993, Pat. No. 5,634,541, application No. 07/982,178, Nov. 25, 1992, abandoned, application No. 08/211,020, Mar. 11, 1994, and application No. 08/171,662, Dec. 21, 1993, abandoned.

[30] Foreign Application Priority Data

May 26, 1993 [DE] Germany ............................ 43 17 586

[51] Int. Cl.[7] ................................... F16D 13/75
[52] U.S. Cl. ..................... 192/70.25; 192/111 A
[58] Field of Search ............... 192/70.25, 111 A, 192/89.23

[56] References Cited

U.S. PATENT DOCUMENTS

| | | | |
|---|---|---|---|
| 3,595,355 | 7/1971 | Maucher et al. | 192/89.23 X |
| 4,207,972 | 6/1980 | Zeidler | 192/111 A |
| 4,671,399 | 6/1987 | Ooga | 192/107 C |
| 4,949,829 | 8/1990 | Tojima et al. | 192/89.23 |
| 5,090,536 | 2/1992 | Asada | 192/70.25 |
| 5,174,426 | 12/1992 | Thirion de Briel et al. | 192/107 C |

FOREIGN PATENT DOCUMENTS

| | | | |
|---|---|---|---|
| 2606477 | 5/1988 | France | 192/111 A |
| 3323995 | 1/1985 | Germany | 192/111 A |
| 3420537 | 12/1985 | Germany | 192/111 A |
| 3-129129 | 6/1991 | Japan | 192/111 A |
| 2087489 | 5/1982 | United Kingdom | 192/107 C |

*Primary Examiner*—Richard M. Lorence
*Attorney, Agent, or Firm*—Darby & Darby

[57] ABSTRACT

A friction clutch wherein a pressure plate is axially movably but non-rotatably coupled to a cover and is biased by a diaphragm spring to urge the friction linings of a clutch disc against a flywheel which is driven by the engine of a motor vehicle. The diaphragm spring is tiltable relative to a seat which is carried by the cover, and a second spring is provided to bias a portion of the seat against the diaphragm spring. The latter can be moved axially of the flywheel to compensate for wear upon the friction linings, particularly when the flywheel is idle or is driven at a relatively low speed. The unit which compensates for wear upon the friction linings is installed between the diaphragm spring and the cover, and its purpose is to ensure that the bias of the diaphragm spring upon the pressure plate in the engaged condition of the friction clutch remains at least nearly constant regardless of the extent of wear upon the friction linings and upon certain other parts, including (1) the diaphragm spring, (2) the pressure plate, (3) springs which form part of the clutch disc to urge two sets of friction linings axially and away from each other against the flywheel and the pressure plate, respectively, (4) leaf springs which connect the pressure plate to the cover, and (5) one or more springs which are active during certain stages of disengagement of the clutch.

97 Claims, 55 Drawing Sheets

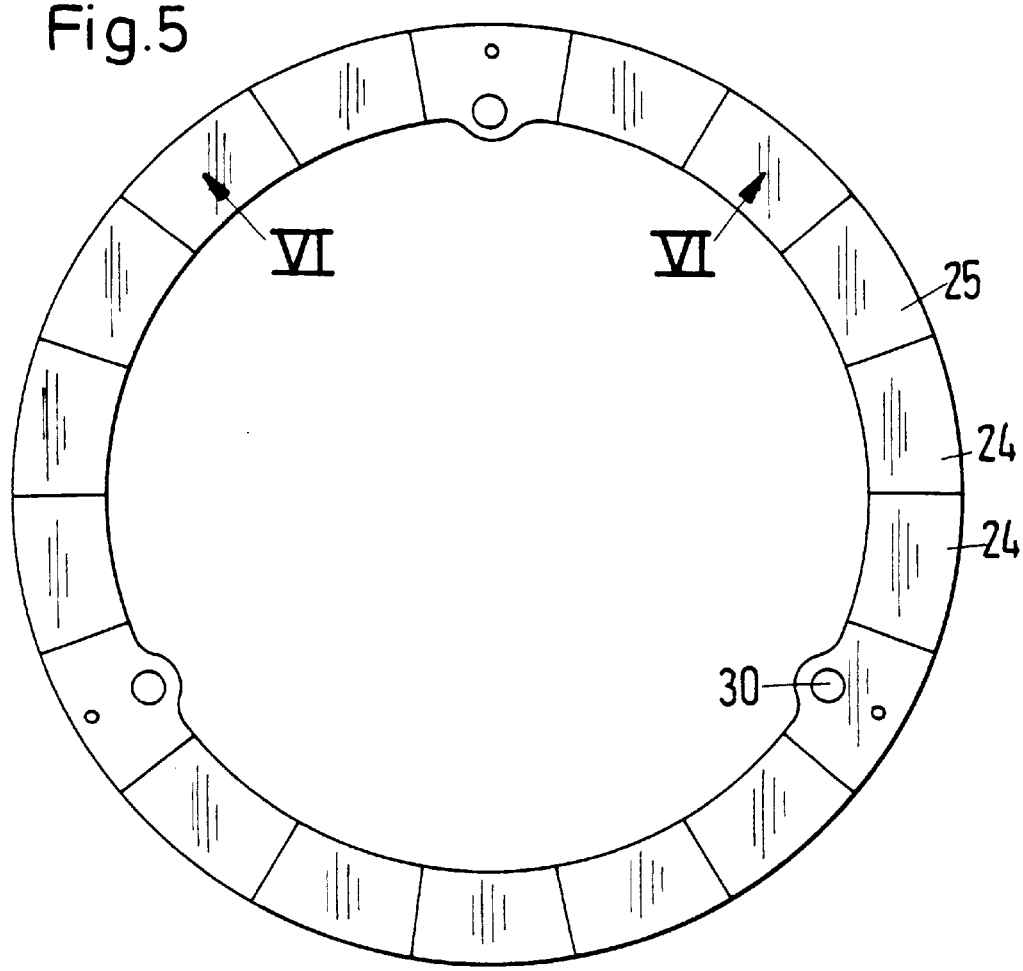

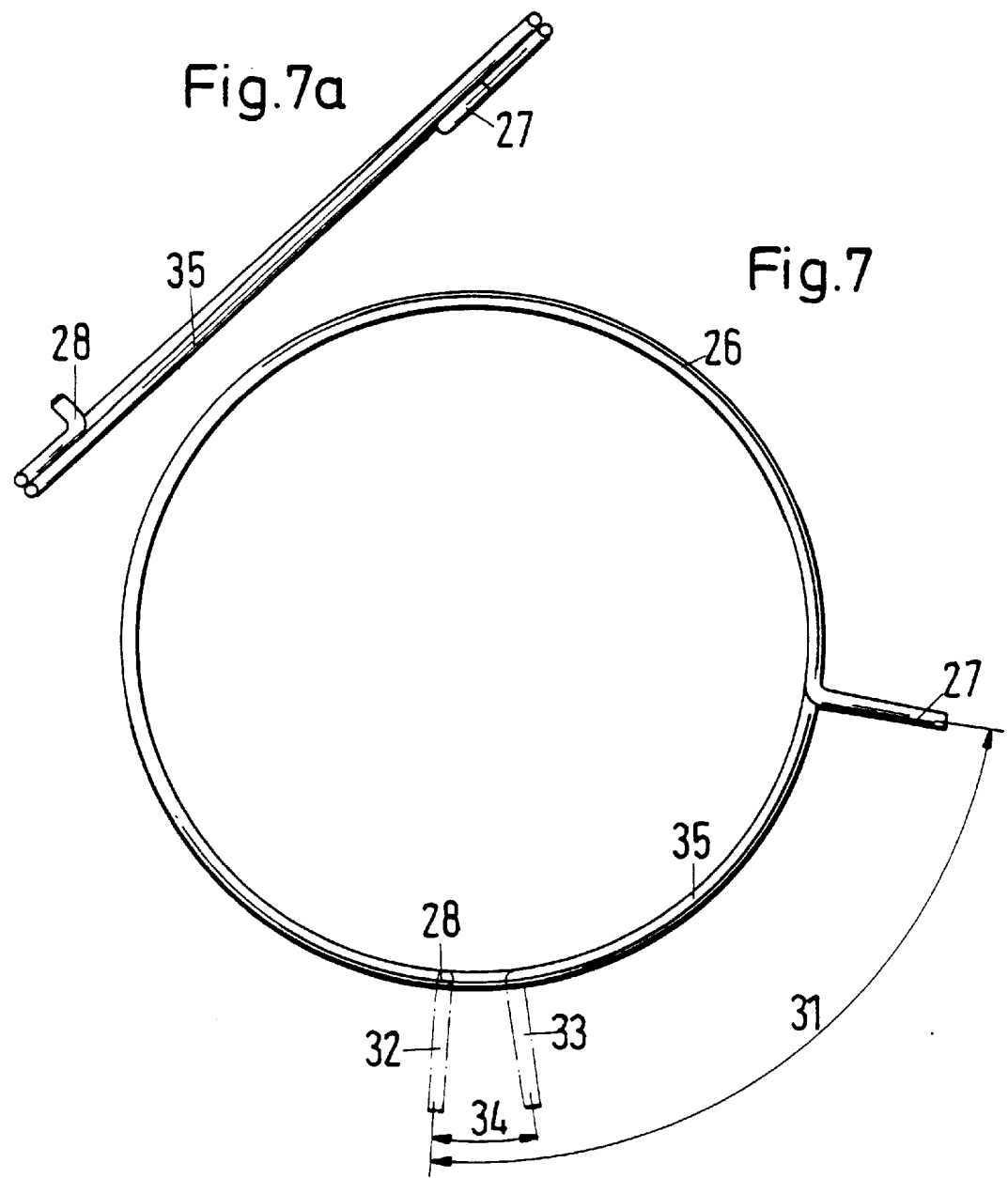

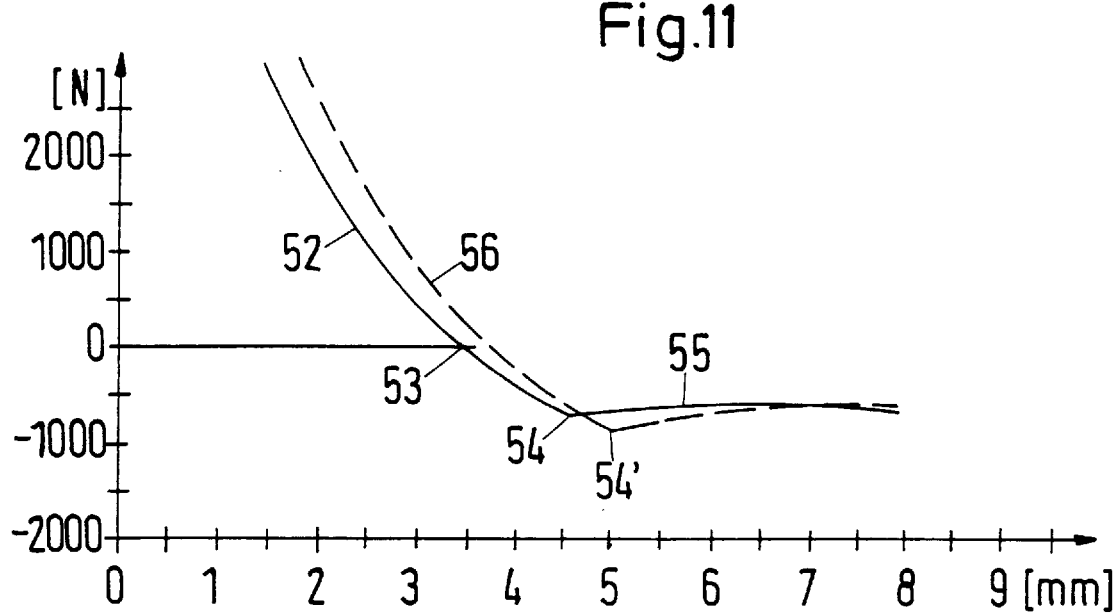
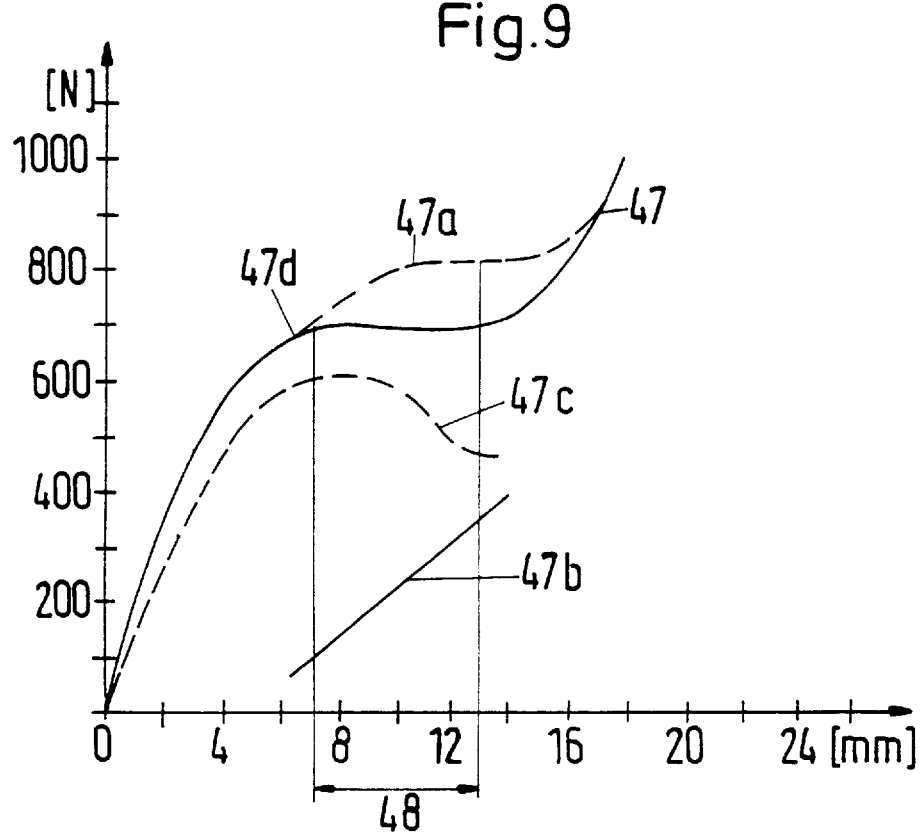

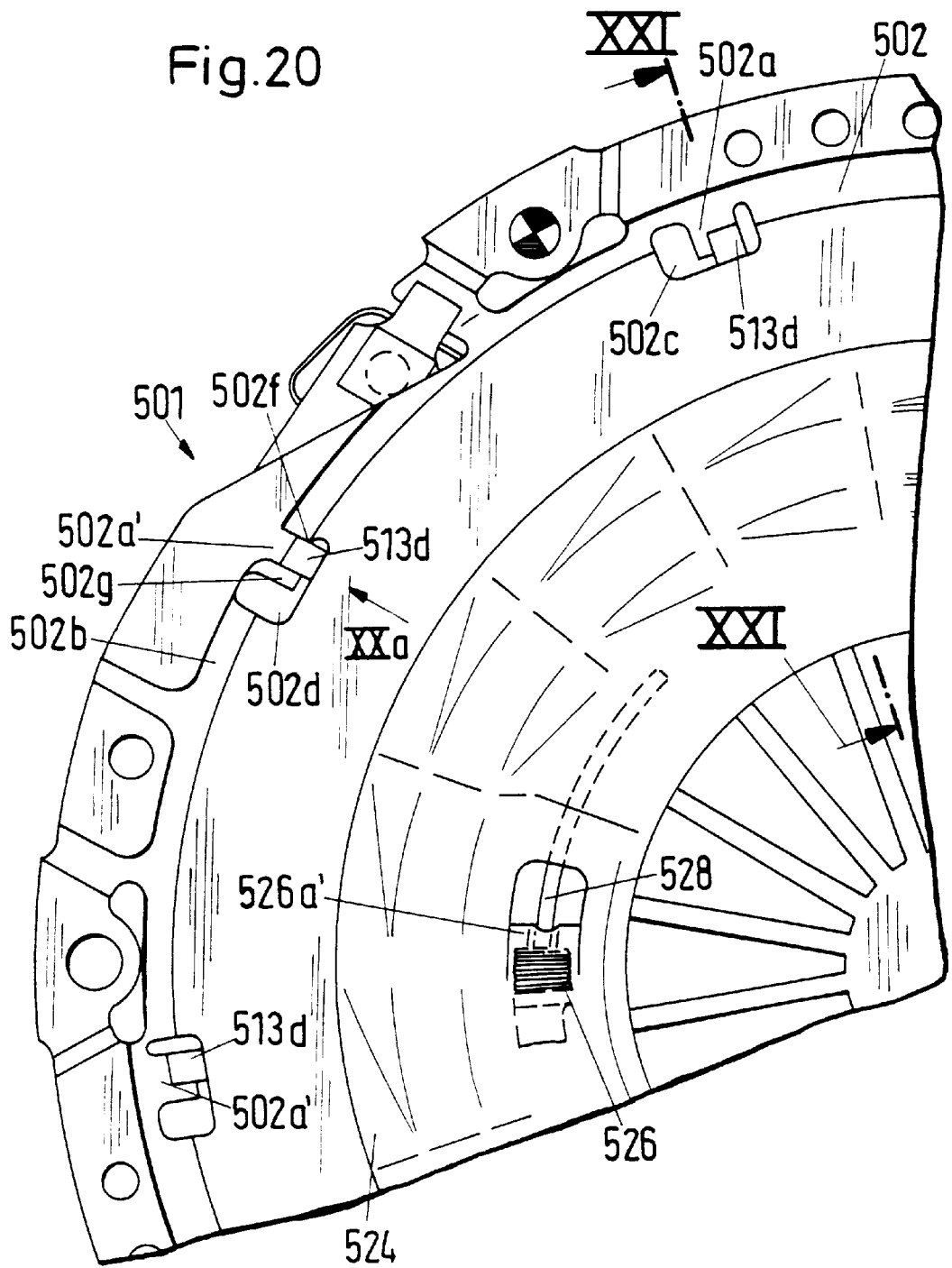

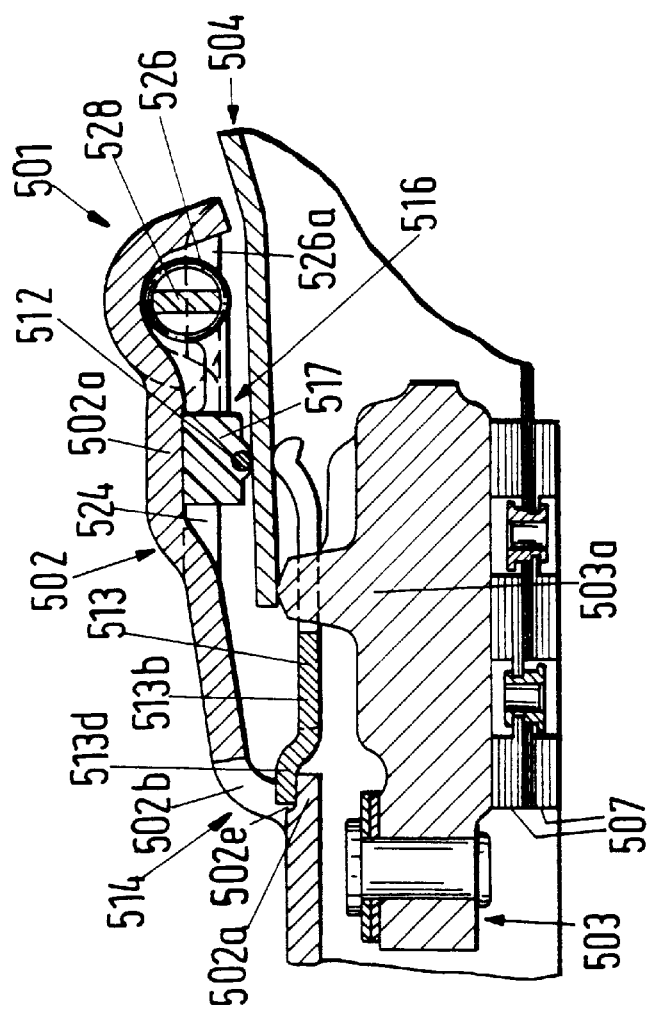

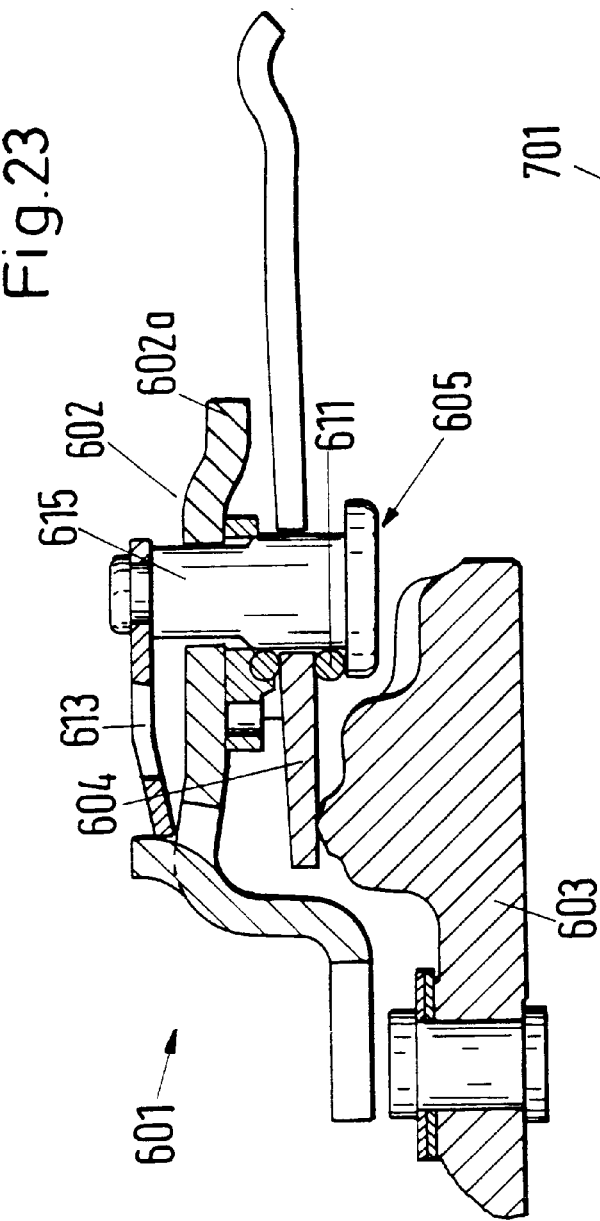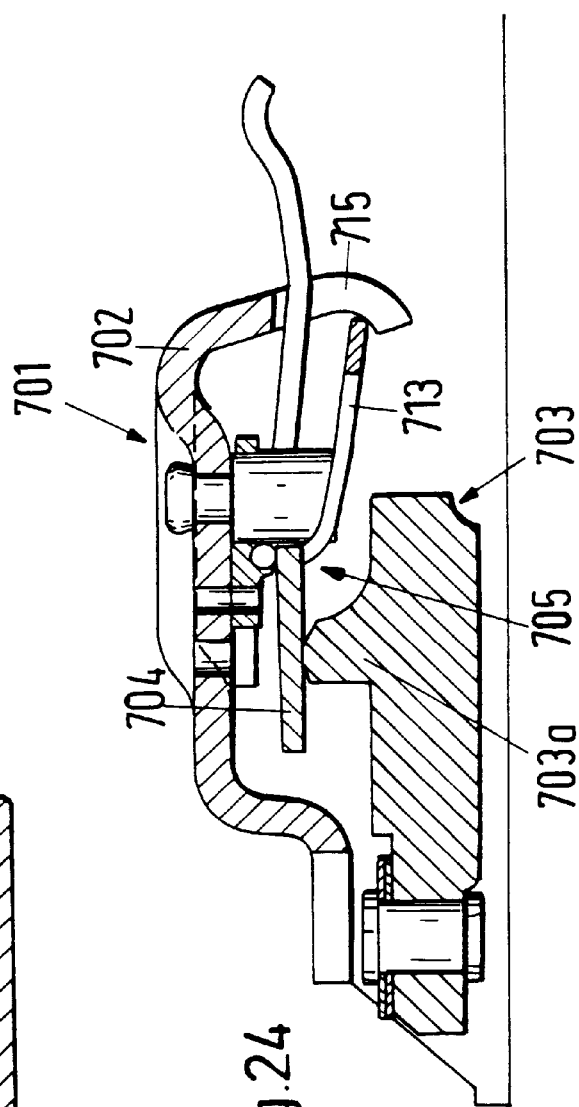

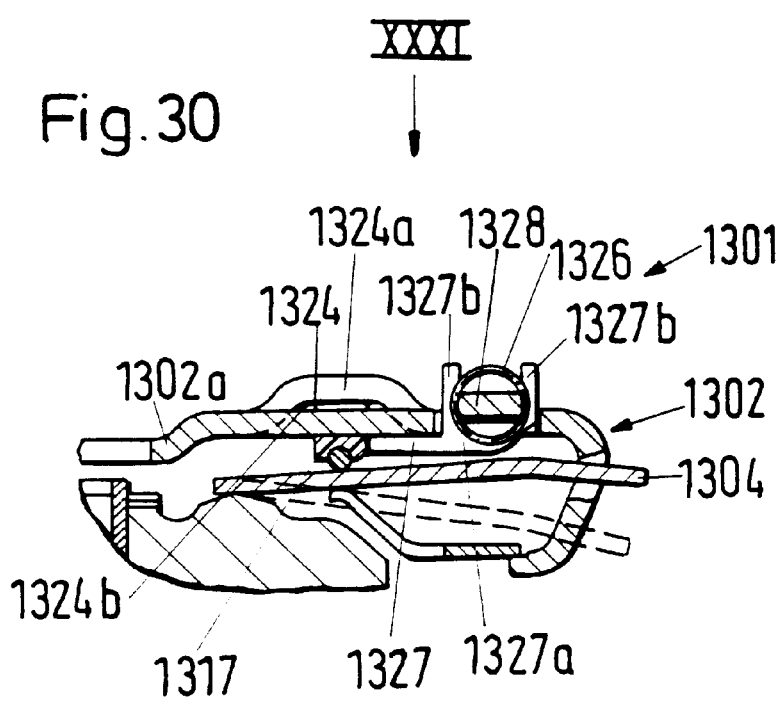
Fig. 30
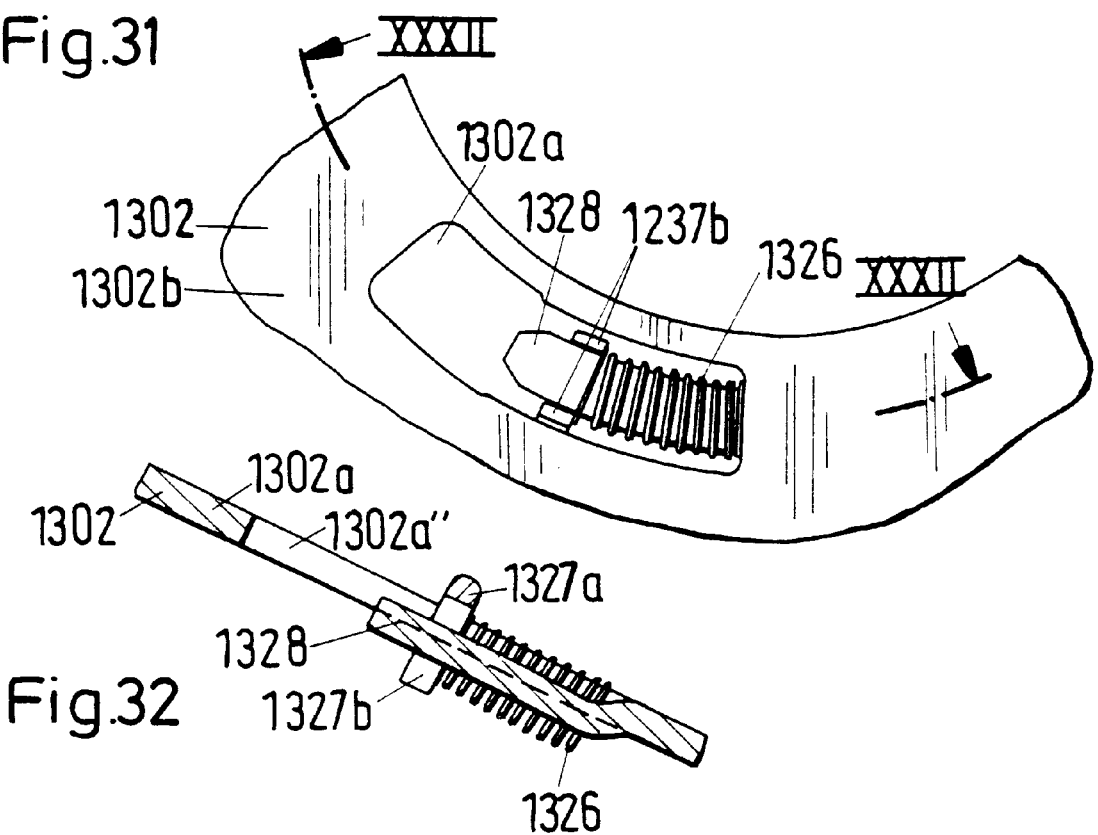
Fig. 31
Fig. 32

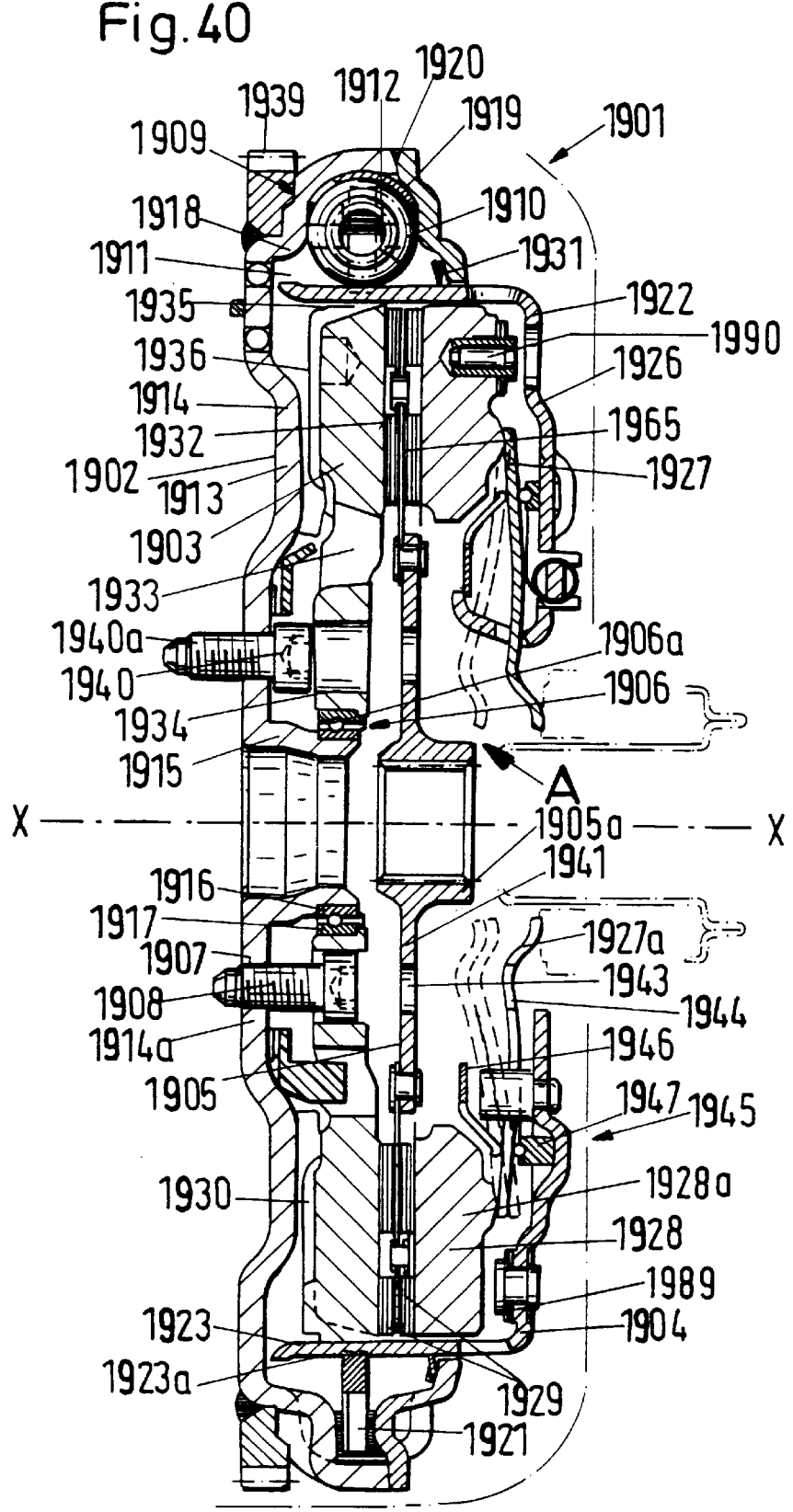

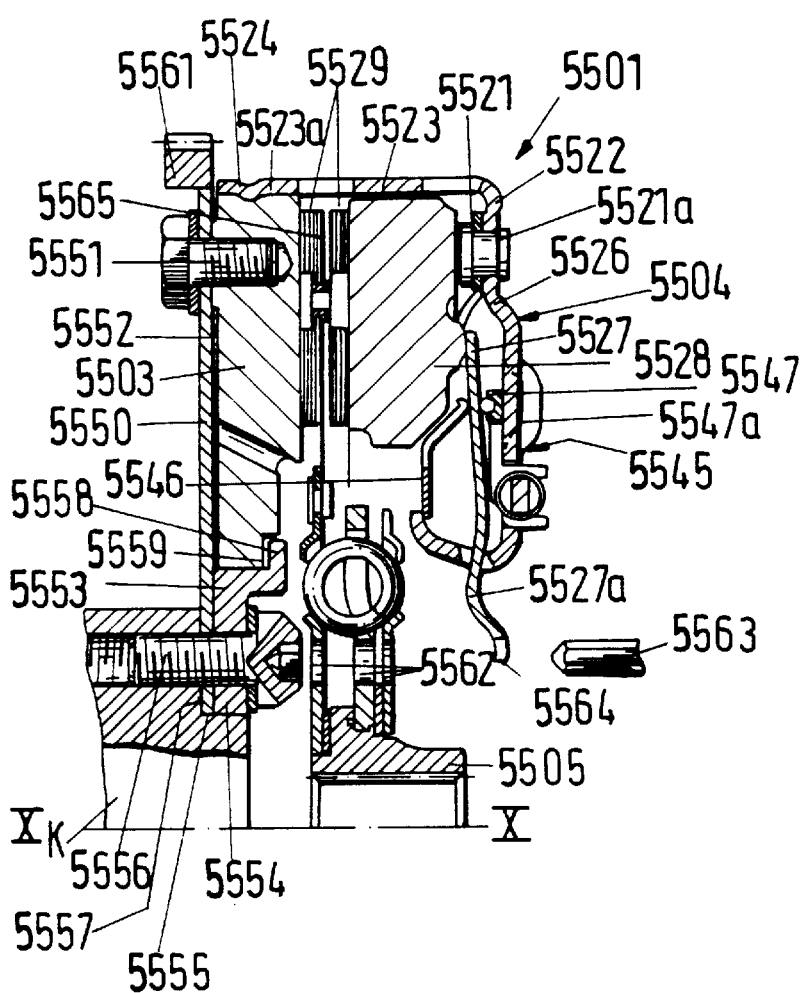
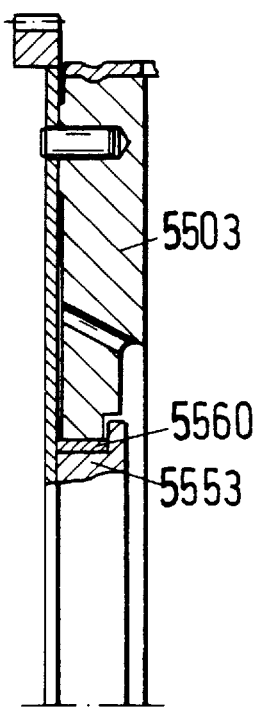
Fig.41
Fig.42

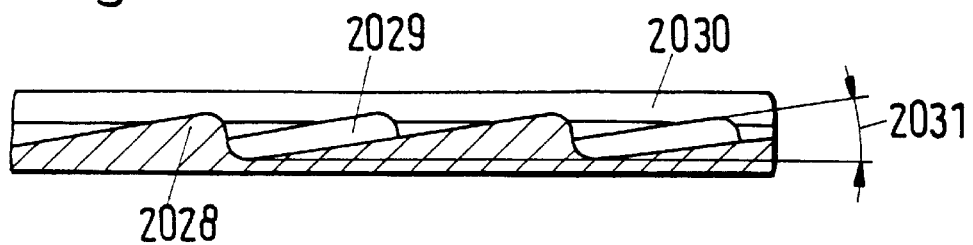
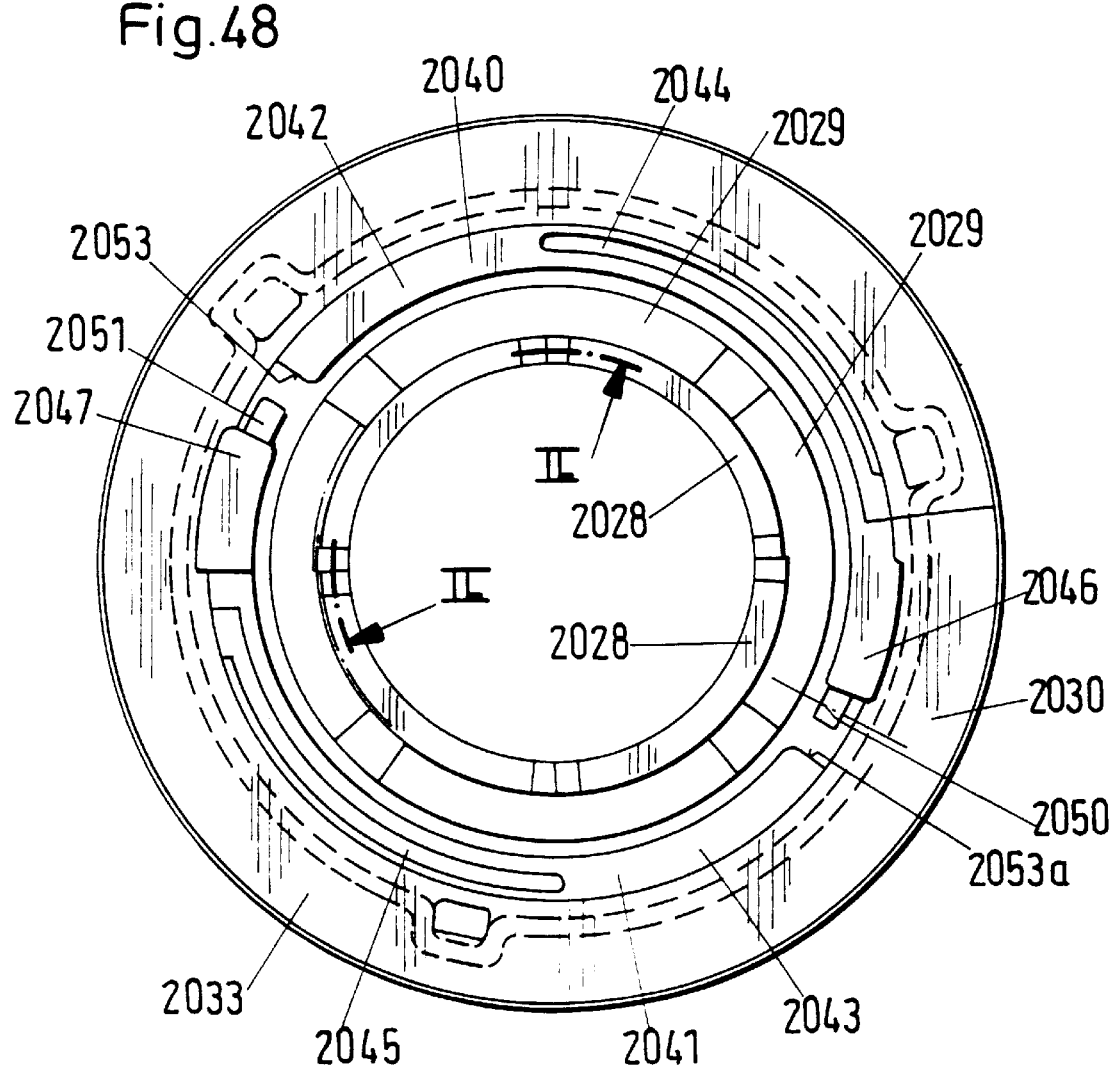

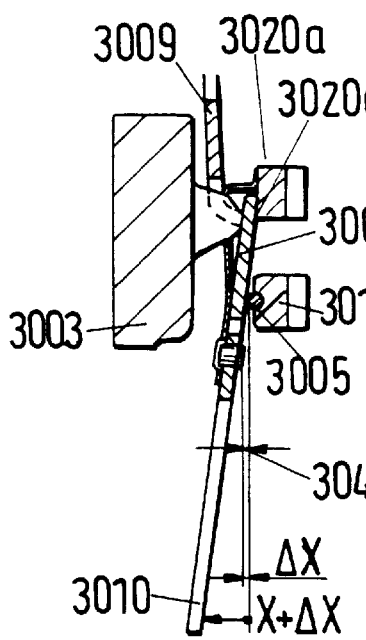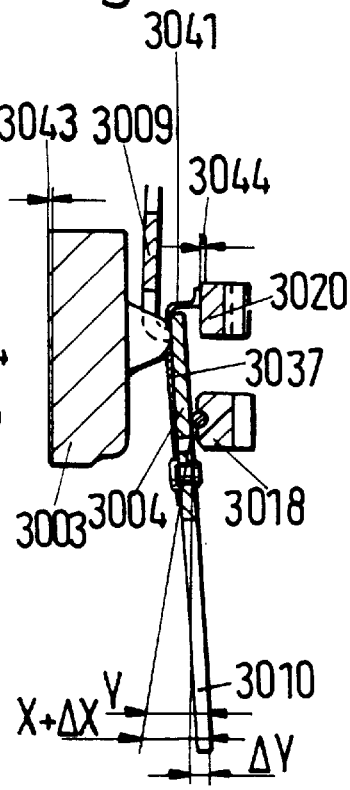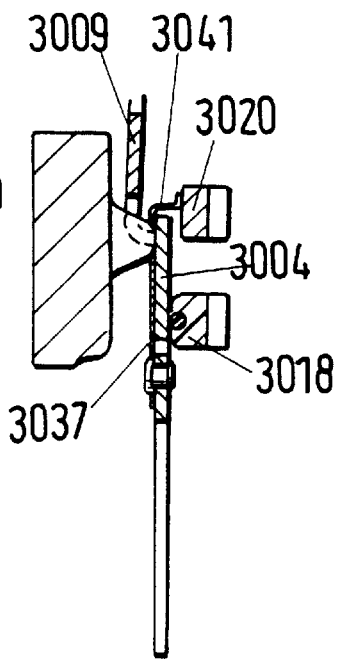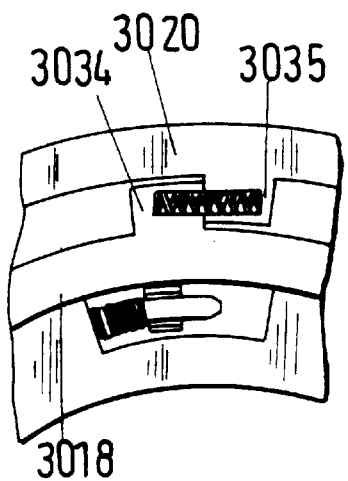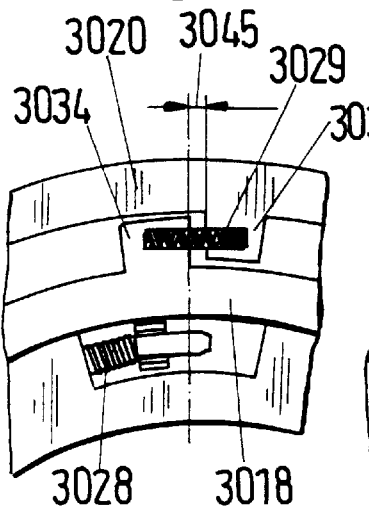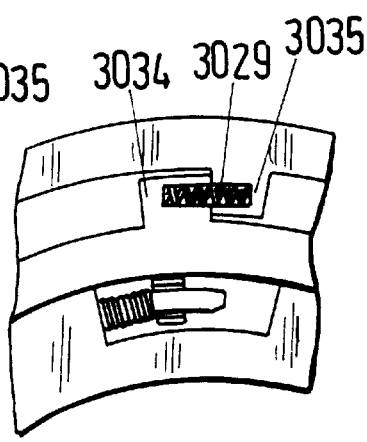

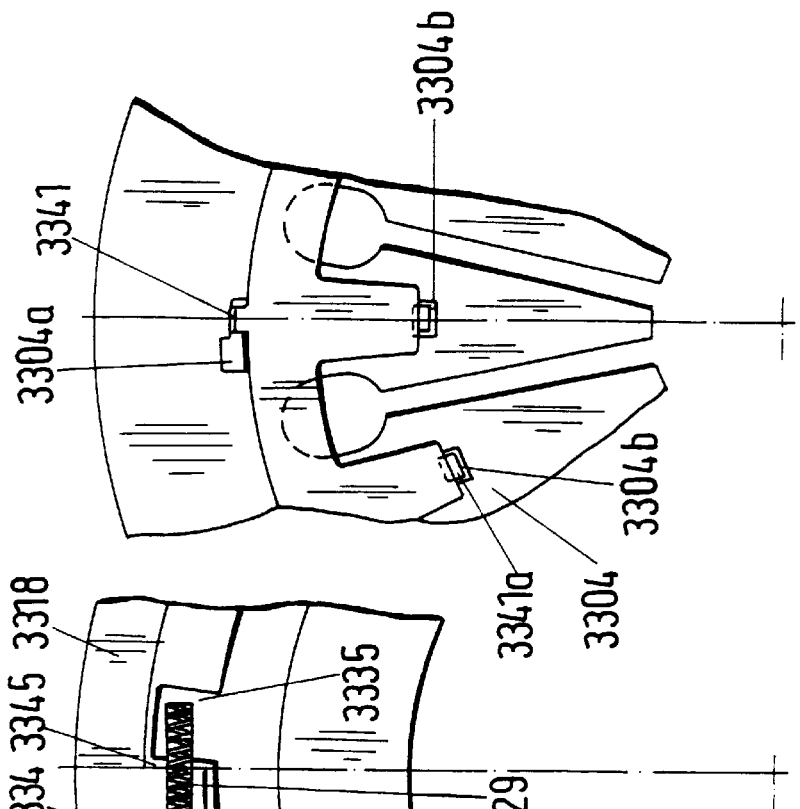
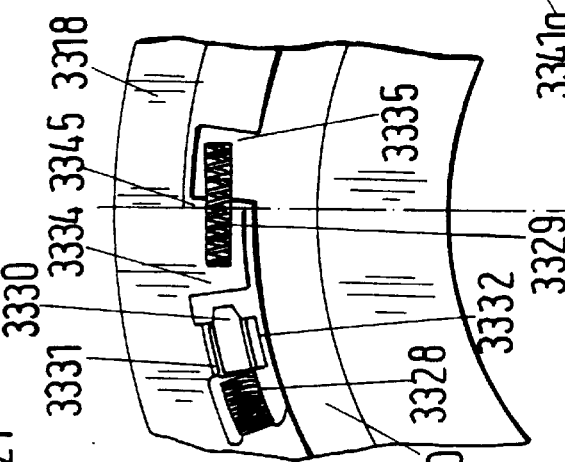
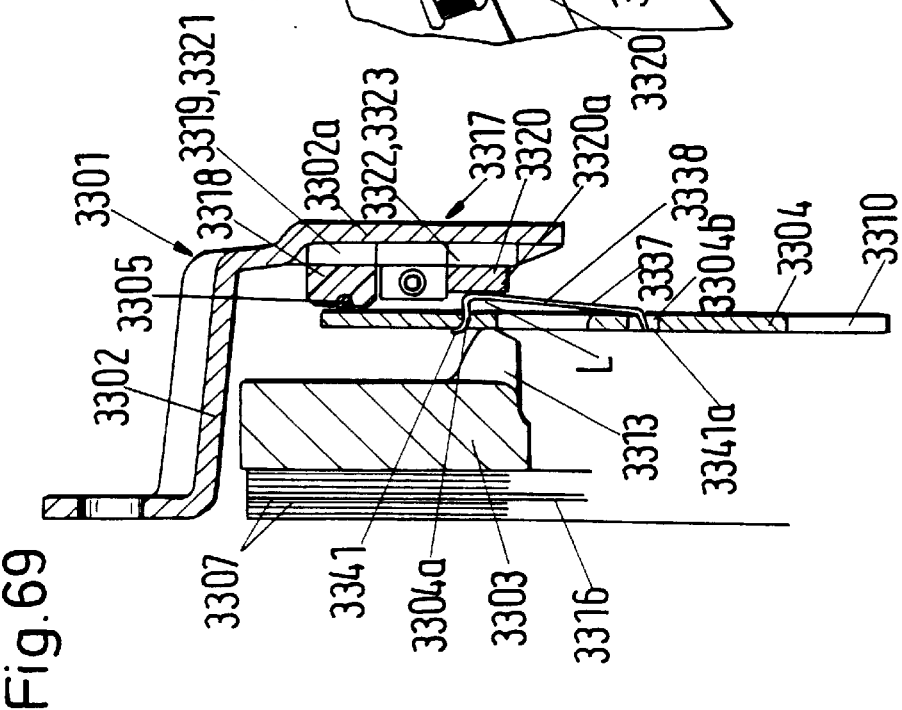

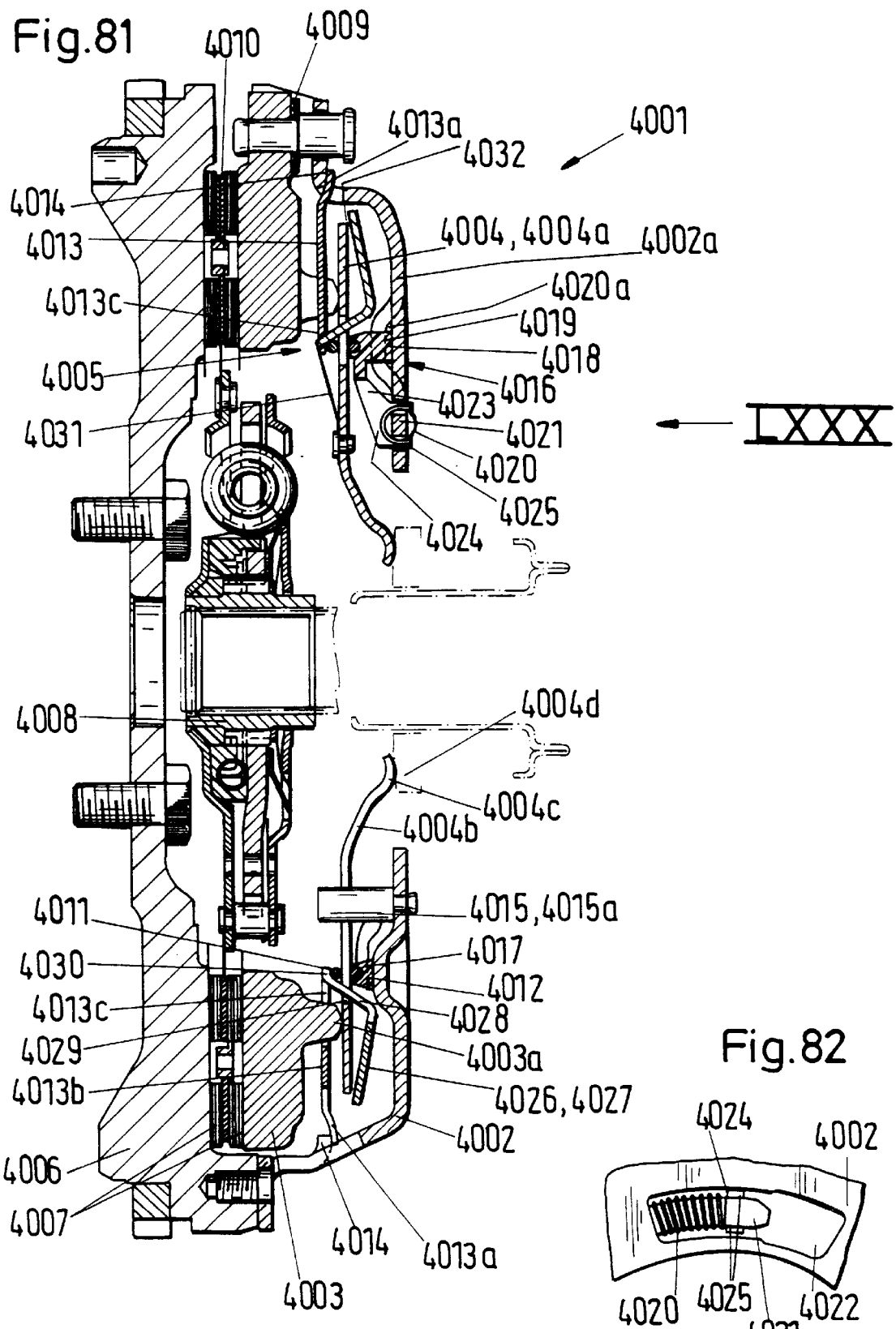
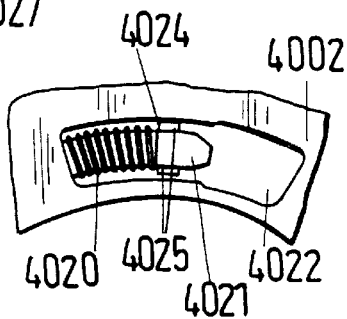

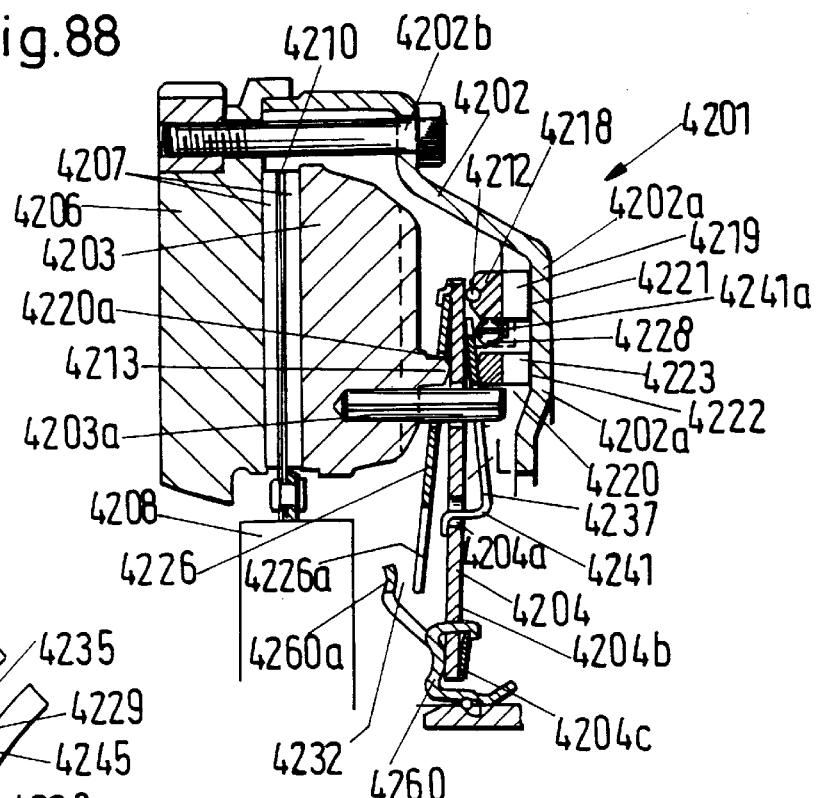
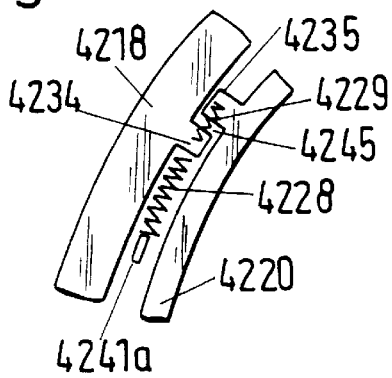
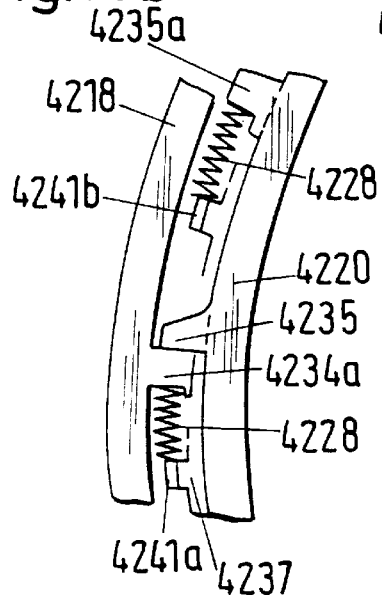
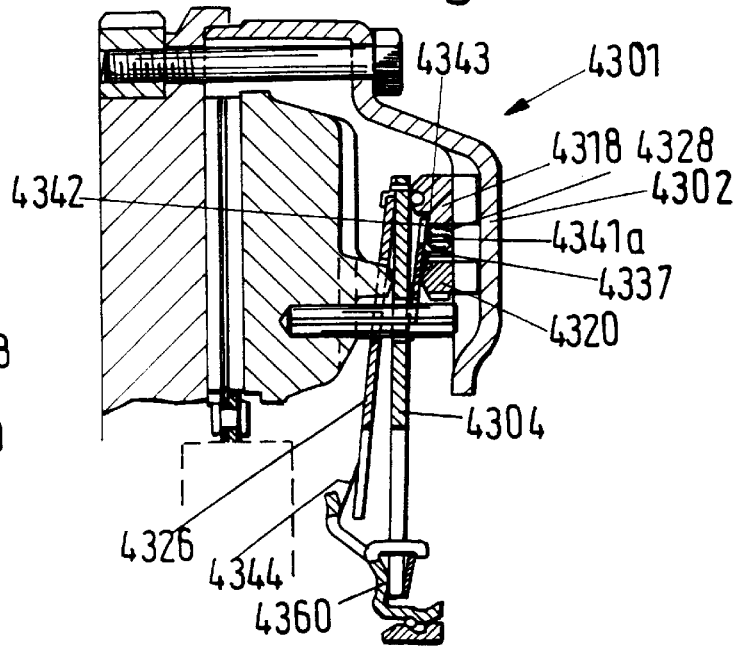

SELF-ADJUSTING FRICTION CLUTCH

CROSS-REFERENCE TO RELATED APPLICATIONS

This is a continuation-in-part of commonly owned patent application Ser. No. 07/982,184 filed Nov. 25, 1992 by Wolfgang Reik et al., now U.S. Pat. No. 5,409,091 granted Apr. 25, 1995; of commonly owned patent application Ser. No. 08/026,588 filed Mar. 5, 1993 by Paul Maucher, now U.S. Pat. No. 5,634,541 granted Jun. 3, 1997; of commonly owned patent application Ser. No. 07/982,178 filed Nov. 25, 1992 by Paul Maucher, now abandoned; of commonly owned patent application Ser. No. 08/211,020 filed Mar. 11, 1994 by Wolfgang Reik et al.; and of commonly owned patent application Ser. No. 08/171,662 filed Dec. 21, 1993, now abandoned.

BACKGROUND OF THE INVENTION

The invention relates to improvements in friction clutches, especially for use in motor vehicles. More particularly, the invention relates to improvements in friction clutches wherein a pressure plate is non-rotatably connected to a rotary housing so that it can perform limited axial movements relative to the housing, and wherein a clutch disc or clutch plate can be clamped between the pressure plate and a counterpressure plate (such as a flywheel) under the action of a diaphragm spring which bears against the pressure plate in the engaged condition of the friction clutch. The diaphragm spring is axially stressed between the pressure plate and the housing and is tiltable relative to a seat which is carried by the housing. The friction clutch further employs an adjusting unit which compensates for wear upon the friction linings of the clutch disc.

Automatic compensating devices which ensure that the pressure plate is acted upon by the diaphragm spring with a substantially constant force are disclosed, for example, in published German patent applications Serial Nos. 29 16 755 and 35 18 781. These compensating devices are adjustable in response to signals from a sensor and are disposed or operate between the pressure plate and the diaphragm spring. The pressure plate is coupled to the housing by tangentially extending leaf springs which must be designed to exert a relatively small force because such force opposes the bias of the diaphragm spring. Therefore, when the friction clutch is disengaged, the pressure plate (whose mass is rather substantial) is likely to perform axial reciprocatory movements which involve repeated stray movements into and out of contact with the diaphragm spring. This not only adversely influences the operation of the friction clutch, but can actually cause the friction clutch to become a safety risk because the compensating device is being adjusted in the disengaged condition of the friction clutch until the pressure plate comes into contact with the clutch disc, i.e., when it is no longer possible to disengage the friction clutch. Therefore, compensating devices which are disclosed in the aforediscussed published German patent applications failed to gain acceptance by the makers of friction clutches.

Presently known proposals to compensate for wear upon the friction linings of a friction clutch are further disclosed, for example, in German Pat. No. 29 20 932. According to that patent an axially movable adjusting device is installed between the diaphragm spring and the pressure plate. The actual axial adjustment is or can be effected by wedges which bear against the pressure plate and can move the adjusting device toward the diaphragm spring in response to angular displacement of the adjusting device relative to the pressure plate. It is also proposed in that patent to change the positions of the wedges for the purpose of moving the adjusting device relative to the pressure plate.

The means for ascertaining the extent of wear upon the friction linings in conventional friction clutches of the above-outlined character comprises a plurality of sensors which operate between the pressure plate and the counterpressure plate (normally a flywheel) or between the pressure plate and the cover. When the clutch is engaged, the sensors are displaced by a distance depending on the extent of wear upon the friction linings, and the extent of movement of the pressure plate away from the counterpressure plate in response to disengagement of the clutch is altered depending on the extent of adjustment of the sensors. The operation of conventional automatic wear compensating systems is based on the assumption that, when the friction clutch is new, the disengagement involves a movement of the pressure plate (away from the counterpressure plate) which exactly matches the extent of movement of the diaphragm spring. When the friction linings undergo a certain amount of wear, the pressure plate moves toward the counterpressure plate (flywheel) through a distance which is dependent on the extent of wear. Therefore, in the absence of any undertakings to the contrary, the diaphragm spring is then required to cover a greater distance from the cover toward the counterpressure plate in order to bias the pressure plate against the adjacent friction linings, i.e., to clamp the friction linings of the clutch disc between the pressure plate and the counterpressure plate. In other words, the distance which is covered by the diaphragm spring then exceeds the distance covered by the pressure plate. This results in appropriate axial displacement of the adjusting device in a direction toward the diaphragm spring.

A drawback of the conventional proposals is that the adjustment does not always correspond to the extent of wear upon the friction linings. The reason is that the extent of movement of the diaphragm spring in response to engagement or disengagement of the friction clutch fluctuates within a certain range, even if the extent of movement to disengage or engage the friction clutch is constant. The bearing or bearings which form part of the disengaging means and serve to displace the customary prongs of the diaphragm spring during disengagement of the friction clutch are particularly likely to perform movements which depart from the expected or prescribed movements within a rather wide range. Furthermore, when the clutch disengaging mechanism (e.g., a mechanical disengaging system) is adjusted, its actual adjustment is likely to depart from an optimal adjustment, for example, because the clearance between the disengaging system and the diaphragm spring is too small and/or because the initially selected stress between the disengaging system and the diaphragm spring is too pronounced. This results in the establishment of operating points which depart from the optimal operating point of the friction clutch.

If a friction clutch is equipped with an automatically adjustable disengaging system e.g., with a hydraulic system which employs a master cylinder and a slave cylinder, the aforediscussed means which is to compensate for wear upon the friction linings cannot be operated at all because the extent of movement to disengage the friction clutch is the same during the entire useful life of the clutch. Thus, no adjustment will take place as long as the movement of the diaphragm spring in the region of the adjusting device during disengagement of the friction clutch is less than or at most matches the extent of movement of the pressure plate. On the other hand, if the extent of movement of the diaphragm spring exceeds the extent of movement of the pressure plate, the adjusting device is actuated and carries out an adjustment during each disengagement of the friction clutch irrespective of the extent of wear (or any wear) upon the friction linings so that the friction clutch is totally misadjusted after a relatively small number of disengagements.

An additional problem which arises in conventional self-adjusting friction clutches (i.e., in clutches wherein the relative positions of the pressure plate and the diaphragm spring are to be automatically changed as the wear upon the friction linings progresses) is that the pressure plate is likely to become disengaged from the diaphragm spring in the axial direction of the clutch in response to characteristic resonant vibrations. This results in the activation of the adjusting device which induces a total misadjustment of the friction clutch and renders it useless for its intended purpose.

Friction clutches of the above-outlined character are further disclosed in published German patent application Serial No. 24 60 963, in German Pat. No. 24 41 141, in German Pat. No. 898 531 and in German Auslegeschrift No. 1 267 916.

A clutch assembly has a friction clutch comprising a pressure plate which is non-rotatably connectable with a counterpressure plate for limited axial movement with respect thereto, and at least one biasing spring provided to urge the pressure plate toward a clutch disc which can be clamped between the pressure plate and the counterpressure plate. There is further provided an adjusting device to compensate at least for the wear upon the friction linings of the clutch disc so as to effect a substantially unchanged application of force by the biasing spring to the pressure plate. The friction clutch further comprises actuating means for engaging and disengaging the clutch. The actuating means is operable by a disengaging member which is shiftable axially by a disengaging means, e.g., a disengaging fork which is pivotably mounted on a transmission case.

A clutch assembly which is constructed and which is operable in the aforedescribed manner is known, for example, from the published French patent application No. 2 582 363. The actuating means of such clutch assemblies can be acted upon by disengaging systems, or by disengaging means and a disengaging member in a manner as disclosed, for example, in U.S. Pat. No. 4,368,810, U.S. Pat. No. 4,326,617, the published German patent application No. 27 52 904 and the published German patent application No. 27 01 999.

Clutch assemblies or friction clutches utilizing an integrated adjusting device which compensates at least for the wear upon the friction linings of the clutch disc exhibit the drawback that, especially when employing so-called mechanical disengaging systems wherein the movements of the clutch pedal are transmitted to the actuating means of the friction clutch by way of a linkage and/or a Bowden wire with the interposition of at least one disengaging bearing, due to tolerances within the entire kinematic train, one cannot ensure that those portions of the disengaging member which act upon the actuating means invariably assume the same axial positions relative to those portions of the actuating means which are to be acted upon. This can result in relatively large departures of the disengaging path of the friction clutch or of the extent of actuating movement which is being imparted to the actuating means from an optimum departure or from an optimum extend of actuating movement. At the very least, an excessive a departure can adversely influence the operation of the adjusting device to such an extent that, under certain extreme circumstances, the adjusting device is no longer capable of carrying out its adjusting function. Furthermore, it can happen that, under certain circumstances when the actuating means covers an excessive distance resulting in undesired adjustment, the friction clutch is no longer capable of being properly disengaged or the initial stressing and the position of the biasing spring are altered to such extent that the force which is actually supplied by the biasing spring is not suffice to guarantee an acceptable transmission of torque.

Published German patent application Serial No. 40 92 383 discloses means for automatically adjusting the position of the pressure plate relative to the counterpressure plate in response to wear upon the friction linings of a clutch disc and (if necessary) in response to wear upon certain other parts, such as the friction surfaces of the two plates. The purpose of the automatic adjustment is to ensure that the bias or clamping action of the friction surfaces on the pressure plate and on the counterpressure plate upon the adjacent friction linings of the clutch disc remains unchanged irrespective of the extent of wear of the friction linings and the friction surfaces of the two plates. The German patent application proposes the utilization of a wear compensating system which employs two annular members and is designed in such a way that the annular members can move axially in response to wear of the friction linings. Such axial adjustment of the annular members determines the axial position of the location(s) of engagement between the diaphragm spring and the pressure plate and thus compensates for wear, at least of the friction linings. Thus, the position of the diaphragm spring should remain unchanged (namely the same as in a new friction clutch) regardless of the extent of wear upon the friction linings.

A drawback of the friction clutch which is disclosed in the published German patent application No. 40 92 383 is that the radial distance of the contact points on the diaphragm spring between the two annular members (one of which surrounds the other) is too small. Moreover, the friction clutch of the German patent application does not allow for accurate initial or subsequent adjustment of the pressure plate, partly due to matching tolerances (especially as concerns the thickness of the annular members in the axial direction of the pressure plate) and partly due to progressive wear of the diaphragm spring and its seat in the friction clutch. A pronounced increase of the distance between the inner and outer annular members is not possible because this would greatly reduce the extent of mobility of the pressure plate in response to the engagement or disengagement of the friction clutch, i.e., the distance of the pressure plate from the counterpressure plate in the engaged and disengaged conditions of the friction clutch would be too small. An undue reduction of such distance would affect the operability of the friction clutch, i.e., attempted disengagement of the friction clutch would not result in an interruption of transmission of torque between the pressure plate and the counterpressure plate on the one hand, and the friction linings of the clutch disc on the other hand.

An additional drawback of the friction clutch which is disclosed in the German patent application No. 40 92 383 is that the pressure plate (which is normally affixed to the housing of the friction clutch by leaf springs serving to permit axial movements, but to prevent rotation, of the pressure plate relative to the housing and relative to the counterpressure plate) is free to oscillate in the axial direction when the friction clutch is disengaged. This can result in undesirable adjustment of the annular members relative to the pressure plate in a direction toward the diaphragm spring while the pressure plate is in the process of moving axially and away from the diaphragm spring. Upon the next-following engagement of the friction clutch, the diaphragm spring is likely to assume an improper position (namely a position corresponding to a partially disengaged condition of the friction clutch) with the result that the bias of the diaphragm spring upon the pressure plate in the engaged condition of the friction clutch would depart from the bias during preceding engagement. This would prevent full disengagement of the friction clutch when the operator desires to interrupt the transmission of torque between the pressure plate and the counterpressure plate on the one hand, and the clutch disc (i.e., the friction linings) on the other hand.

Additional prior proposals to automatically compensate for wear upon certain parts, particularly upon the friction linings, of friction clutches are disclosed, for example, in published German patent applications Serial Nos. P42 39 291.8, P43 06 505.8, P42 39 289.6, P42 31 131.4, P42 43 567.6 and P43 17 587.2. The disclosures of all enumerated U.S. patents German patent applications are incorporated herein by reference.

The German patent applications which are enumerated in the preceding paragraph disclose automatically self-adjusting friction clutches which are constructed and assembled in such a way that the pressure plate is urged against the adjacent friction linings of the clutch disc with a pronounced force, but the disengaging force remains low. Moreover, the disengaging force should remain constant or nearly constant during the entire useful life of the clutch. Otherwise stated, the disengaging force should remain at least substantially constant prior to any wear upon the friction linings as well as while the friction linings undergo wear which is to be automatically compensated for until the wear upon the friction linings is too pronounced to warrant further compensation so that the friction clutch must be discarded. This is proposed to be accomplished by employing a clutch spring (such as a diaphragm spring) whose characteristic curve is very steep, i.e., which should be capable of abruptly or rapidly reducing its bias upon the pressure plate. During disengagement of the friction clutch, the disengaging force should fluctuate very little or not at all. This, in turn, fails to cause the distance-to-force progress of the characteristic curve of the clutch spring to be available at all times so as to ensure a predictable and complete disengagement of the friction clutch with at least some spare distances to be covered in order to compensate for eventual tolerances. The primary reason is believed to be that the characteristic curve of a clutch spring (diaphragm spring) having a steep characteristic curve during disengagement of the clutch includes a pronounced upwardly sloping portion which immediately follows the downwardly sloping portion. This can be seen in the enclosed FIG. 94 wherein the fluctuations of the force of a clutch spring are measured along the abscissa and the distance which is covered by the spring during dissipation of energy is measured along the ordinate. When the clutch employing a diaphragm spring having a characteristic curve of the type shown in FIG. 94 by a solid line is engaged, the distance which is covered by the spring is at least close to 1 mm. The distance is approximately 2 mm when the pressure plate of the clutch starts to move away from contact with the adjacent friction linings, and the characteristic curve exhibits a rather pronounced upward slope when the covered distance approximates or equals 3 mm. That point of the curve which is reached when the covered distance equals or approximates 3 mm corresponds to the required minimal distance to be covered during disengagement of the friction clutch. This does not take into consideration any of those tolerances which invariably develop during disengagement of the clutch, tolerances developing during assembly of the friction clutch, machining tolerances of component parts of the friction clutch, as well as losses of elasticity during the useful life of the clutch. Additional fluctuations of the distance to be covered by the clutch spring develop due to tolerances of the disengaging means so that the required minimum distance to be covered during disengagement of the clutch is normally at least 3.5 mm. As can be seen in FIG. 94, this distance is covered while the bias of the clutch spring is already on the increase, i.e., when the disengaging force is again quite pronounced. If the clutch employs a sensor of the type disclosed in the aforementioned German patent application Serial No. P 43 39 291.8, the adjusting ring of the wear compensating unit is likely to change its angular position and to thus compensate for non-existent wear or to compensate before the friction linings have undergone sufficient additional wear to warrant a renewed compensation.

An additional drawback of many heretofore known proposals to construct, assemble and operate friction clutches which are equipped with automatic wear compensating means is that the bearings, levers and/or other parts which are used to furnish the disengaging force must be designed to transmit large or extremely large disengaging forces. This, in turn, necessitates the provision of large, complex and expensive thrust bearings for the output element of the prime mover (e.g., the crankshaft or the camshaft of a combustion engine in a motor vehicle) in order to ensure that the bearings will withstand those stresses which develop as a result of the application of pronounced disengaging forces.

OBJECTS OF THE INVENTION

An object of the invention is to provide a friction clutch which constitutes an improvement over and a further development of friction clutches disclosed in the published German patent applications Serial Nos. 29 16 755 and 35 18 781.

Another object of the invention is to provide a friction clutch with a device or unit which can automatically compensate for wear upon the friction linings of the clutch disc and for wear upon one or more additional parts of the friction clutch in a novel and improved way.

A further object of the invention is to provide a friction clutch wherein undesirable axial oscillations of the pressure plate cannot adversely influence the adjusting action of the compensating device.

An additional object of the invention is to provide a friction clutch with a novel and improved automatic wear compensating device which can stand long periods of rough treatment, for example, when the friction clutch is used in a motor vehicle to transmit torque between a prime mover and a transmission.

Still another object of the invention is to provide a versatile friction clutch which can be put to use in all kinds of motor vehicles and whose reliability remains unchanged during its entire useful life.

A further object of the invention is to provide a simple and inexpensive friction clutch wherein the wear upon the friction linings of the clutch disc and upon certain other parts is compensated for in a novel and improved way, which is compact, and which can be installed in a power train in a simple and inexpensive way.

Another object of the invention is to provide a friction clutch which can be disengaged in response to the exertion of a relatively small force during its entire useful life.

An additional object of the invention is to provide a friction clutch which embodies the above-outlined features and whose useful life is longer than that of heretofore known friction clutches.

Still another object of the invention is to provide a motor vehicle which embodies the above-outlined friction clutch.

A further object of the invention is to provide a novel and improved combination of prime mover, friction clutch and transmission, particularly for use in motor vehicles.

Another object of the invention is to provide a friction clutch with an automatic wear compensating device whose effectiveness remains at least substantially unchanged during the entire useful life of the friction clutch.

An additional object of the invention is to provide a novel and improved method of compensating for wear upon the friction linings of the clutch disc and upon certain other parts in a friction clutch for use in motor vehicles or the like.

Still another object of the invention is to provide the friction clutch with novel and improved means for preventing unintentional compensation for wear upon the friction linings at a time when a compensation is undesirable or detrimental.

A further object of the invention is to provide the above-outlined friction clutch with novel and improved means for automatically changing the position of the pressure plate.

Another object of the invention is to provide a novel and improved diaphragm spring for use in the above-outlined friction clutch.

An additional object of the invention is to provide a novel and improved housing or cover for use in the above-outlined friction clutch.

Still another object of the invention is to provide a novel and improved combination of housing, diaphragm spring, seat for the diaphragm spring and automatic wear compensating device for use in the above-outlined friction clutch.

A further object of the invention is to provide the above-outlined friction clutch with novel and improved means for centering its components relative to the housing.

Another object of the invention is to provide a novel and improved method of preventing vibrations and/or other stray movements of certain parts of a friction clutch from adversely influencing the automatic adjustment to compensate for wear upon the clutch disc.

An additional object of the invention is to provide a friction clutch with a novel and improved system which automatically compensates for wear upon the pressure plates, upon the diaphragm spring, upon the cover or housing and/or upon the clutch disc or clutch plate.

Another object of the invention is to provide a friction clutch wherein the system which compensates for wear upon the friction linings of the clutch disc and, if necessary, for wear upon certain other parts, can be operated in a simple, reliable and highly accurate manner.

A further object of the invention is to provide a simple and compact compensating system which occupies little room in a friction clutch.

An additional object of the invention is to provide a compensating system which can be installed in existing friction clutches.

Still another object of the invention is to provide the compensating system with novel and improved means for preventing excessive adjustments which would result in overcompensation for wear upon the friction linings.

A further object of the invention is to provide a compensating system which comprises a relatively small number of simple parts and whose accuracy and reliability do not diminish during the entire useful life of the friction clutch.

An additional object of the invention is to prolong the useful lives of friction clutches, particularly of friction clutches for use in motor vehicles.

Another object of the invention is to provide a friction clutch whose mode of operation is less affected by wear upon its parts than in heretofore known friction clutches.

A further object of the invention is to provide a friction clutch which can be disengaged in response to the application of a relatively small force.

An additional object of the invention is to provide a friction clutch which is constructed and assembled in such a way that the magnitude of the disengaging force need not change, or changes negligibly, irrespective of the wear upon certain component parts of the friction clutch.

Still another object of the invention is to provide a simple, compact and inexpensive friction clutch which embodies the aforediscussed features.

A further object of the invention is to provide a novel and improved method of compensating for wear upon the clutch plate or clutch disc in a friction clutch of the above-outlined character.

Another object of the invention is to provide a novel and improved method of compensating for wear upon the clutch disc and/or certain other component parts of a friction clutch for use in motor vehicles and the like.

An additional object of the invention is to provide the above-outlined friction clutch with a novel and improved system which can automatically compensate for wear upon the friction linings forming part of the clutch disc.

Still another object of the invention is to provide a fiction clutch which exhibits the above-outlined advantages and which can be assembled at a reasonable cost in automatic machines.

A further object of the invention is to provide a novel and improved aggregate which employs the above-outlined friction clutch as well as one or more additional components, such as the part or parts which transmit torque to the input element and/or receive torque from the output element or elements of the friction clutch.

Another object of the invention is to provide a motor vehicle which embodies the above-outlined friction clutch.

An additional object of the invention is to provide a preassembled modular engageable and disengageable aggregate which embodies the above-outlined friction clutch.

Still another object of the invention is to provide a driving unit which can be used in a motor vehicle and embodies the above-outlined friction clutch.

Another object of the invention is to provide a novel and improved clutch plate or clutch disc for use in the above-outlined friction clutch.

An additional object of the invention is to provide a novel and improved method of installing a diaphragm spring in the housing or cover of the above-outlined friction clutch.

Still another object of the invention is to provide the above-outlined friction clutch with novel and improved means for tiltably mounting the diaphragm spring for the pressure plate in the housing of the friction clutch.

A further object of the invention is to provide a novel and improved connection between the input element of the above-outlined friction clutch and the output element of an internal combustion engine.

Another object of the invention is to provide novel and improved means for biasing the pressure plate in a friction clutch for use in motor vehicles.

An additional object of the invention is to provide a friction clutch whose operation is not affected by wear (even extensive wear) upon the friction linings, pressure plate and/or other parts which are subject to wear when the friction clutch is in use.

Still another object of the invention is to provide a preassembled friction clutch which can be utilized in existing motor vehicles and/or for other purposes as a superior substitute for existing friction clutches.

A further object of the invention is to provide the above-outlined friction clutch with novel and improved means for opposing the bias of the diaphragm spring for the pressure plate.

Another object of the invention is to provide a novel and improved combination of friction clutch and engine for use in a motor vehicle.

A further object of the invention is to provide a friction clutch with a simple and compact wear compensating system.

An additional object of the invention is to provide a self-adjusting friction clutch wherein all automatic adjustments are highly accurate during the initial stage as well as during advanced stages of wear upon the friction linings and/or upon other component parts of the friction clutch.

Still another object of the invention is to provide a wear compensating system which can be utilized with equal or similar advantage in push-type friction clutches and in pull-type friction clutches.

A further object of the invention is to provide a friction clutch with an automatic wear compensating system which is designed to prevent and to practically exclude untimely and/or inaccurate adjustments of one or more parts while compensating for wear upon the friction linings of the clutch disc.

Another object of the invention is provide a friction clutch with a compact and inexpensive wear compensating system which does not or need not contribute to space requirements and/or to the weight of the friction clutch.

An additional object of the invention is to provide a novel and improved method of rapidly and conveniently assembling the components of the aforementioned friction clutch and its wear compensating system.

Still another object of the invention is to provide a power train which embodies a friction clutch of the above-outlined character.

A further object of the invention is to provide a motor vehicle which embodies the aforediscussed friction clutch and its novel and improved wear compensating system.

Another object of the invention is to provide a novel and improved housing, and a novel and improved pressure plate for use in the above-outlined friction clutch.

Still another object of the invention is to provide novel and improved means for opposing the bias of the diaphragm spring in a friction clutch of the above-outlined character.

A further object of the invention is to provide a self-adjusting friction clutch which can be installed in motor vehicles or elsewhere as a superior substitute for heretofore known and used self-adjusting friction clutches.

Another object of the invention is to provide novel and improved method of monitoring the extent of wear upon the friction linings of a clutch disc and, if necessary, upon certain other parts of a friction clutch.

An additional object of the invention is to provide a novel and improved method of preventing untimely adjustments of a friction clutch to compensate for wear upon the friction linings of its clutch disc or clutch plate.

Still another object of the invention is to provide the above-outlined friction clutch with novel and improved means for compensating for undesirable axial shifting of the pressure plate relative to the counterpressure plate, and relative to the housing or cover.

A further object of the invention is to provide a wear compensating system which automatically responds to detectable wear upon the friction surfaces of the pressure plate and counterpressure plate and/or upon the friction linings of the clutch disc.

Another object of the invention is to provide a novel and improved method of taking advantage of the changes of conicity of the diaphragm spring in a self-adjusting friction clutch.

Another object of the invention is to provide a friction clutch wherein the compensation for wear upon the friction linings of the clutch disc and, if necessary, for wear upon certain other component parts of the clutch is carried out in such a way that the disengaging force remains at least substantially constant and relatively small during each and every stage of disengagement of the clutch and by taking into full consideration all such tolerances which would be, or which are, likely to entail a lengthening of the distance to be covered between full engagement and full disengagement of the clutch.

A further object of the invention is to provide a friction clutch which is constructed and assembled in such a way that, in spite of the incorporation of a wear compensating unit, the magnitude of the disengaging force does not undergo an undesirable and excessive increase during the entire disengagement of the clutch.

Another object of the invention is to construct the friction clutch of the type outlined in the two preceding paragraphs in such a way that it can be constructed and assembled at a reasonable cost and that it ensures accurate and automatic compensation for any and all noticeable wear upon the friction linings or upon the friction linings and additional components of the clutch.

An additional object of the invention is to provide a friction clutch which can satisfy the afore-enumerated requirements even though it is assembled of simple and lightweight components.

Still another object of the invention is to provide a friction clutch which can employ simple and lightweight components even though the disengaging means for the clutch need not employ complex and expensive hydraulic and/or pneumatic servomotors, mechanical actuators with over-the-dead-center movements between the foot pedal and the input element of the friction clutch and/or other devices which are to compensate for abrupt increases of the required force during the last stage or stages of disengagement of the clutch.

A further object of the invention is to provide a friction clutch which is constructed and assembled in such a way that one can avoid the application of large disengaging forces to the bearings or other parts which must be actuated to disengage the clutch with attendant pronounced losses of elasticity and excessive friction.

Another object of the invention is to provide a friction clutch or a torque transmitting apparatus embodying a friction clutch whose actuation does not necessitate the utilization of large, strong and expensive axial or thrust bearings for the output element of the prime mover (such as a combustion engine in a motor vehicle) which drives the housing, the pressure plate and other parts of the clutch in actual use.

SUMMARY AND ADDITIONAL OBJECTS OF THE INVENTION

One feature of the present invention resides in the provision of an engageable and disengageable friction clutch, particularly for motor vehicles. The improved friction clutch comprises a housing which is rotatable about a predetermined axis, a pressure plate, means (such as a set of leaf springs) for non-rotatably connecting the pressure plate to the housing with limited freedom of movement in the direction of the predetermined axis, a rotary counterpressure plate (such as a flywheel) which is adjacent the pressure plate, a torque transmitting clutch disc disposed between the two plates and having friction linings which are subject to wear in response to repeated engagement and disengagement of the friction clutch, and an axially stressed diaphragm spring which is disposed between the housing and the pressure plate to bias the pressure plate against the clutch disc so that the friction linings are clamped between the two plates in engaged condition of the friction clutch. The diaphragm spring is tiltable relative to a seat which is carried by the housing, and the friction clutch further comprises means for automatically compensating for wear at least upon the friction linings (or upon the friction linings and the adjacent portions of the two plates). The compensating means is effective between the housing and the diaphragm spring to shift the seat relative to the housing in the direction of the predetermined axis. The friction clutch also comprises means for operating the compensating means (such operating means can comprise, for example, one or more torsion springs or one or more coil springs) and means (such as a second spring resembling or constituting a diaphragm spring) for applying to the axially stressed diaphragm spring a supporting force in a direction toward the seat.

The axially stressed diaphragm spring can have a degressive characteristic curve within its operating range. Furthermore, it is often desirable or advantageous that the diaphragm spring be merely force-lockingly propped against the action of the supporting force.

The supporting force and the bias of the axially stressed diaphragm spring can be related to each other in such a way that—in a contemplated built-in condition of the diaphragm spring, in the absence of changes of conicity of the diaphragm spring due to wear, and within the disengagement range of the diaphragm spring—the supporting force is greater than the bias which is applied by the diaphragm spring and opposes the supporting force whereas, when the conicity of the diaphragm spring changes as a result of wear, the supporting force is smaller than the bias which is applied by the diaphragm spring to oppose the supporting force within portions of the path of disengagement of the diaphragm spring.

The means for applying the supporting force can include at least one energy storing device (such as a spring) which changes its shape as a result of wear-induced adjustment of the diaphragm spring and/or the seat.

The compensating means can be disposed between the diaphragm spring and the housing (as seen in the direction of the predetermined axis).

The compensating means can comprise sloping surfaces. In accordance with a presently preferred embodiment, the compensating means comprises ramps and the sloping surfaces are provided on the ramps.

As mentioned above, the means for applying the supporting force can comprise an element which resembles (or constitutes) a diaphragm spring. For example, the means for applying the supporting force can comprise a second diaphragm spring which engages the axially stressed diaphragm spring at a predetermined radial distance from the predetermined axis. The arrangement is preferably such that the axially stressed diaphragm spring is tiltable relative to the seat at or close to the predetermined radial distance from the predetermined axis.

The seat can comprise a first portion (e.g., a first wire ring) between the axially stressed diaphragm spring and the housing, and a second portion (e.g., a second wire ring) between the diaphragm spring and the means for applying the supporting force. The second portion of the seat can be disposed between the diaphragm spring and the pressure plate, and the means for applying the supporting force can include means for urging the second portion of the seat against the diaphragm spring. The second portion of the seat can be mounted for movement in the direction of the predetermined axis and the bias of the axially stressed diaphragm spring varies in response to such movement of the second portion of the seat. The bias of the axially stressed diaphragm spring can decrease in response to movement of the second portion of the seat toward the pressure plate. The second portion of the seat can be moved to a position in which the supporting force which is applied thereto is in a state of at least substantial equilibrium with the disengaging force which is applied thereto by the axially stressed diaphragm spring. The aforementioned urging means can comprise energy storing means which applies to the second portion of the seat a substantially constant force within the contemplated adjustment range.

The means for applying the supporting force can include energy storing means which acts as a sensor.

The seat can comprise a first portion which is disposed between the axially stressed diaphragm spring and the housing and is movable in the direction of the predetermined axis toward the pressure plate but is adapted to be arrested against movement in the direction of the predetermined axis away from the pressure plate. Such seat further comprises a second portion which is disposed between the axially stressed diaphragm spring and the pressure plate, and is biased toward the axially stressed diaphragm spring.

The means for operating the compensating means can comprise a spring. The compensating means can comprise a coherent annular adjusting member which is stressed by the axially stressed diaphragm spring in the direction of the predetermined axis in the engaged condition of the friction clutch.

The compensating means can comprise adjustable ramps which slope in the direction of the predetermined axis. The compensating means can further comprise the aforementioned annular adjusting member and the ramps can include a set of ramps which are provided on the adjusting member. At least a portion of the seat can be carried by the adjusting member of the compensating means. The ramps can further include a second set of ramps which cooperate with the (first) set of ramps on the adjusting member. The compensating means can also comprise an annulus between the housing and the adjusting member, and the ramps of the second set can be provided on the annulus. Alternatively, the ramps of the second set can be of one piece with the housing, i.e., the annulus can be dispensed with or a portion of the housing can be said to constitute a functional equivalent of such annulus.

The compensating means can be designed to act as a freewheel in the direction of disengagement of the friction clutch and to be self-locking in a direction counter to the direction of disengagement of the friction clutch.

As already mentioned above, the compensating means can comprise sets of cooperating ramps; the arrangement can be such that the ramps of at least one of such sets are inclined at an angle of 4–20 degrees (preferably at an angle of 5–12 degrees) with reference to a plane which is normal to the predetermined axis.

In accordance with a presently preferred embodiment, the compensating means comprises a first annular member (such as the aforementioned adjusting member) having a first set of ramps, and a second annular member (such as the aforementioned annulus) having a second set of ramps which engage the ramps of the first set and have a slope such that the two sets of ramps are in self-locking frictional engagement with each other. At least one of the two members is movable relative to the other member and is biased relative to the other member in the aforementioned direction to shift the seat relative to the housing.

It is also within the purview of the invention to employ compensating means which employ a plurality of discrete mobile adjusting members (e.g., a set of three or more washer-like or button-like adjusting members).

The compensating means can be designed in such a way that it comprises means for shifting the seat as a function of the rotational speed of the housing. For example, the compensating means can be ineffective when the housing is rotated at least at one of a plurality of different speeds. The arrangement may be such that the compensating means is ineffective when the speed of the housing exceeds a predetermined threshold value. The speeds can include an idling speed (e.g., if the counterpressure plate is driven by the engine of a motor vehicle) and speeds below the idling speed. The compensating means can be designed to be effective at and below the idling speed. It is possible to design the compensating means in such a way that it is effective only, or at least, when the rotational speed of the housing is at least close to zero.

If the compensating means comprises a first member which carries a first set of ramps and a second member having a second set of ramps which engage the ramps of the first set, one of the members is preferably movable relative to the housing in a predetermined direction and is biased in such predetermined direction (such as by the aforementioned compensating means). The one member can be biased in the circumferential direction of the rotary housing.

As mentioned above, the means for applying the supporting force can comprise a resilient sensor, and such sensor can include a portion which is remote from the predetermined axis and reacts against the housing. The housing can include portions which support the sensor.

The friction linings can include first and second sets of linings which are engageable by the pressure plate and by the counterpressure plate, respectively, and the clutch disc which includes such sets of friction linings can further include resilient means for biasing the two sets of friction linings away from each other in the direction of the predetermined axis. Alternatively, the clutch disc or the friction clutch can comprise a suitable substitute for the just-mentioned resilient means. The resilient means or its substitute is deformable, with a first force-to-displacement characteristic, in response to the bias of the axially stressed diaphragm spring upon the pressure plate with a second force-to-displacement characteristic which at least approximates the first characteristic.

The force which is required to actuate the axially stressed diaphragm spring, in the disengaged condition of the friction clutch, can be in the range of between minus 150 nm and plus 150 nm.

The axially stressed diaphragm spring can be designed to have a force-to-displacement characteristic with a transition from positive to negative upon disengagement of the clutch disc from the counterpressure plate.

Another feature of the invention resides in the provision of a friction clutch which comprises a pressure plate rotatable about a predetermined axis, a rotary counterpressure plate which is coaxial with the pressure plate, a diaphragm spring which serves to bias one of the two plates axially toward the other plate, and a clutch disc which is disposed between the two plates and has first and second sets of friction linings engageable by the pressure plate and by the counterpressure plate, respectively. The clutch disc further comprises resilient means for biasing the two sets of friction linings away from each other in the direction of the predetermined axis. The resilient means is deformable, with a first force-to-displacement characteristic, in response to the bias of the diaphragm spring upon the one plate with a second force-to-displacement characteristic which at least approximates the first characteristic.

Another feature of the present invention resides in the provision of an engageable and disengageable friction clutch, particularly for vehicles, which comprises: (1) a housing or cover rotatable about a predetermined axis; (2) a pressure plate; (3) means (such as an arrangement of leaf springs) for non-rotatably connecting the pressure plate to the housing with limited freedom of movement in the direction of the predetermined axis; (4) a rotary counterpressure plate (such as a flywheel) adjacent the pressure plate; (5) a torque transmitting clutch disc disposed between the two plates and having friction linings engageable by and disengageable from at least one of the plates, and being subject to wear as a result of repeated engagement with and disengagement from the at least one plate; (6) at least one actuating device and a resilient device disposed between the housing and the pressure plate to bias the pressure plate toward the counterpressure plate and to thereby clamp the friction linings between the plates and to rotate the clutch disc about the predetermined axis in response to rotation of the plates and housing; and (7) means for compensating for wear at least upon the friction linings. The compensating means is disposed between the pressure plate and one of the aforementioned devices and is movable in the direction of the predetermined axis to a position depending upon the extent of wear upon the friction linings. The friction clutch further comprises means for arresting the compensating means in the aforementioned position depending upon the extent of wear upon the friction linings. The arresting means is provided on the pressure plate.

The resilient device can comprise an axially stressed diaphragm spring, and the housing can comprise or carry a ring-shaped seat which tiltably mounts the diaphragm spring. The latter preferably includes an annular portion (which can be called the main portion of the diaphragm spring) engaging the seat, and prongs extending substantially radially inwardly of the annular portion and preferably forming part of the actuating device.

The arresting means can comprise at least one sensor having means for monitoring the extent of wear upon the friction linings, and such monitoring means can comprise a sensor element which is movable relative to the pressure plate into abutment with at least one axially fixed part of the friction clutch (the axially fixed parts include one of the two plates and the housing) to thereby limit the extent of movability of the pressure plate away from the counterpressure plate. The sensor element is preferably movable relative to the pressure plate in the direction of the predetermined axis, and the arresting means preferably further comprises means for automatically coupling the sensor element to an axially movable part of the clutch (the axially movable parts include the diaphragm spring and the pressure plate). The arrangement is, or can be, such that the sensor element comes to a halt upon abutment against the at least one axially fixed part (e.g., one of the plates) of the friction clutch. The at least one axially fixed part can constitute the housing or the counterpressure plate, and the at least one axially movable part can constitute the pressure plate. The sensor element can include a portion which cooperates with a portion of a locating element of the compensating means in response to disengagement of the friction clutch. Such locating element is movable in the direction of the predetermined axis, and the friction clutch preferably further comprises means for movably mounting the locating element on the pressure plate.

Stated in a different way, the compensating means of the improved friction clutch can comprise a locating element for the resilient device, and such compensating means preferably further comprises an equalizing unit which is disposed between the locating element and the pressure plate. The equalizing unit is self-locking in response to engagement of the friction clutch and includes means for automatically adjusting the locating element depending on the extent of wear upon the friction linings in response to disengagement of the friction clutch. The locating element is movable axially of, and away from, the pressure plate and the arresting means can include means for preventing movements of the locating element axially of, and toward, the pressure plate.

The compensating means can be characterized as including a freewheel which is operative during disengagement but is self-locking during engagement of the friction clutch.

In accordance with a presently preferred embodiment, the compensating means of the improved friction clutch can comprise a substantially ring-shaped locating element, and such compensating means further comprises ramps (forming part of the aforementioned equalizing means) which are installed between the locating element and the pressure plate. The ramps can include a first set of ramps which are adjacent the pressure plate and a complementary second set of ramps between the ramps of the first set and the locating element. Such compensating means (or more particularly the equalizing means of such compensating means) can further comprise means (e.g., in the form of coil springs) for biasing the ramps of one set against the ramps of the other set of ramps. The locating element can have a substantially U-shaped cross-sectional outline and can define a substantially annular space (e.g., in the form of an endless groove or channel) for the ramps. Such locating element can contain or can be made of a metallic sheet material, and the ramps can be distributed in the annular space in the circumferential direction of the locating element. The just described compensating means can further comprise means for preventing turning of at least one set of ramps relative to the locating element. Furthermore, the locating element can comprise means (e.g., in the form of ribs and grooves) for axially movably confining at least one set of ramps in the annular space.

The compensating means preferably further comprises wedges, for example, one for each ramp and each carrying the respective ramp. The wedges can be assembled in such a way that they include a first set non-rotatably and axially movably mounted on the locating element and engaging the pressure plate, and a second set between the wedges of the first set and the locating element. The wedges of the second set are movable in the annular space of the locating element relative to the locating element to thereby effect an axial movement of the wedges of the first set and of the locating element relative to each other. Such compensating means can further comprise means (such as pins, studs or other suitable projections and complementary holes, bores, windows or sockets) for preventing rotation of the locating element and the pressure plate relative to each other. Still further, the compensating means can comprise means for biasing each wedge of the second set against a discrete wedge of the first set. Such biasing means can comprise springs (e.g., coil springs) which react against the wedges of the first set and bear against the wedges of the second set. The wedges can be provided with suitable retainers for the respective springs; if the springs are coil springs, the retainers can include studs, plugs or other suitable means for guiding at least the end portions of the respective coil springs.

At least a portion of each wedge of one set is preferably disposed axially of the pressure plate between the locating element and one wedge of the other set.

At least some wedges can contain a heat-resistant and heat-insulating material. For example, at least some of the wedges can contain a heat-resistant material which is selected from the group consisting of thermoplastic and pressure setting (duroplastic) plastic materials.

The wedges of one set can consist of a material having a first coefficient of friction, and the wedges of the other set can consist of a material having a different second coefficient of friction.

The arresting means can include means for limiting the extent of axial movability of the pressure plate away from the counterpressure plate and toward the housing during disengagement of the clutch, and the resilient device (such as the aforementioned diaphragm spring) can include a portion (e.g., a circumferentially complete annular main portion) which bears upon the compensating means in engaged condition of the clutch and is movable axially of the pressure plate to a greater second extent (i.e., to an extent greater than that of the axial movability of the pressure plate away from the counterpressure plate and toward the housing) in response to disengagement of the clutch. The arrangement can be such that the resilient device biases the compensating means only in the engaged condition of the clutch.

The locating element of the compensating means can be designed and positioned to be biased by the resilient device in the engaged condition of the clutch, the wedges of one set can be non-rotatably mounted on the pressure plate, and the locating element and the wedges of the other set can be mounted for rotational movement relative to the pressure plate.

Another feature of the invention resides in the provision of an engageable and disengageable friction clutch, particularly for use in motor vehicles, which comprises a housing or cover rotatable about a predetermined axis (e.g., the axis of the output element of the combustion engine in a motor vehicle), a pressure plate, means (e.g., leaf springs) for non-rotatably connecting the pressure plate to the housing with limited freedom of movement in the direction of the predetermined axis, an axially stressed diaphragm spring between the housing and the pressure plate, an annular seat which tiltably mounts the diaphragm spring in the housing, a counterpressure plate (such as a flywheel) which is rotatable with the housing, and a clutch disc having friction linings between the two plates. The diaphragm spring serves to bias the pressure plate and to thus clamp the friction linings between the two plates in the engaged condition of the clutch, whereby at least the friction linings are subject to wear as a result of repeated engagement and disengagement of the clutch. The clutch further comprises means for compensating for wear at least upon the friction linings. The compensating means is disposed between the pressure plate and the diaphragm spring and includes at least one locating element which is movable in the direction of the predetermined axis and is biased by the spring. The clutch also comprises arresting means including means for limiting and for maintaining at least substantially constant the extent of axial movability of the pressure plate away from the counterpressure plate. The limiting means is disposed between the pressure plate and at least one axially fixed part of the clutch (such as the counterpressure plate or the housing) and includes means for limiting the axial movability of the locating element relative to the pressure plate at least during disengagement of the clutch.

A further feature of the invention resides in the provision of a novel and improved combination of component parts in an engageable and disengageable friction clutch for use in motor vehicles or the like. The combination comprises a pressure plate which is rotatable about and is movable in the direction of a predetermined axis, a diaphragm spring which reacts against an axially fixed part of the clutch to bias the pressure plate axially in engaged condition of the clutch, and arresting means including means for limiting the extent of movability of the pressure plate toward the diaphragm spring in response to disengagement of the clutch. The diaphragm spring includes a portion which at least indirectly bears upon the pressure plate in engaged condition of the clutch and is movable axially of the pressure plate to a greater second extent in response to disengagement of the clutch. The combination further comprises a wear compensating unit between the pressure plate and the diaphragm spring, and such unit is biased by the diaphragm spring only in engaged condition of the clutch.

An additional feature of the present invention resides in the provision of an engageable and disengageable torque transmitting friction clutch which can be utilized with advantage in vehicles, particularly motor vehicles. The improved friction clutch comprises a housing or cover which is rotatable about a predetermined axis, a pressure plate, means (e.g., a group of leaf springs) for non-rotatably connecting the pressure plate to the housing with limited freedom of movement in the direction of the predetermined axis, a rotary counterpressure plate (e.g., a flywheel which is driven by the output element of an engine in a motor vehicle) adjacent the pressure plate, a torque transmitting clutch disc between the two plates, and at least one resilient device reacting against the housing to bias the pressure plate toward the counterpressure plate in order to clamp the clutch disc against the counterpressure plate and to thus rotate the clutch disc about the predetermined axis. The clutch disc has friction linings which are engageable by and disengageable from at least one of the two plates and are subject to wear as a result of repeated engagement with and disengagement from the at least one plate. The friction clutch further comprises an adjusting unit including means for compensating for wear upon the friction linings to thereby maintain the bias of the at least one resilient device upon the pressure plate at a substantially constant value, means for engaging and disengaging the friction clutch including actuating means movable along a predetermined path to engage and disengage the friction clutch, and means for varying the torque transmitted by the friction clutch and/or by the clutch disc, including means for gradually reducing the transmitted torque at least during a portion of movement of the actuating means along the predetermined path to disengage the friction clutch.

The pressure plate comprises a portion which is engaged and biased by the at least one resilient device, and the disengagement of the friction clutch can involve axial movement of the pressure plate away from the counterpressure plate against the bias of the at least one resilient device. The friction clutch can further comprise means for gradually reducing the torque which is transmittable by the friction clutch at least during a portion of axial movement of the pressure plate.

The friction clutch can also comprise means for securing the housing to the counterpressure plate to thus establish a power train between the actuating means and the securing means. The torque varying means can be disposed in the power train.

The pressure plate has a friction surface which is engageable with the friction linings to establish a power train between the actuating means and the clutch disc, and the torque varying means can be disposed in such power train.

The friction linings can include a first and a second set of friction linings, and the torque varying means can be disposed axially between the two sets of friction linings.

The torque varying means can include means for axially yieldably locating at least one of the two plates and the friction linings relative to the others of the two plates and the friction linings, and the torque varying means can be acted upon by a variable force which decreases to a minimal value in response to disengagement of the friction clutch and gradually increases to a maximum value at least during a portion of movement of the actuating means along the predetermined path to engage the friction clutch.

The means for varying the torque which is transmittable by the friction clutch can include means for reducing the transmitted torque during approximately 40–70 percent of movement of the actuating means along the predetermined path in a direction to disengage the friction clutch and for gradually increasing the torque which is transmittable by the friction clutch during approximately 40–70 percent of movement of the actuating means along the predetermined path in a direction to engage the friction clutch.

The at least one resilient device (such as a diaphragm spring) can have a degressive force-to-displacement ratio at least during a portion of movement of the actuating means along the predetermined path in a direction to disengage the friction clutch.

As mentioned above, the at least one resilient device can comprise a diaphragm spring which bears against the pressure plate. The friction clutch preferably further comprises a seat which tiltably mounts the diaphragm spring in the housing. The diaphragm spring can comprise an annular portion and the actuating means can comprise prongs or tongues which extend from the annular portion of the diaphragm spring. Such prongs can be of one piece with the annular portion of the diaphragm spring. The seat can comprise two portions (e.g., in the form of wire rings) which are disposed at opposite sides of the diaphragm spring. The latter can have a substantially sinusoidal force-to-displacement characteristic curve including a maximum, a minimum, a degressive portion between the minimum and the maximum, an operating point at the degressive portion in the engaged condition of the friction clutch, and a ratio of forces from approximately 1:0.4 to 1:2.7 between the maximum and the minimum.

If the friction clutch is used in a motor vehicle, the means for engaging and disengaging the friction clutch can further comprise means for moving the actuating means and such moving means can include or constitute a pedal which is similar or analogous to the gas pedal of the motor vehicle.

Another feature of the invention resides in the provision of a motor vehicle having a gas pedal, an engageable and disengageable friction clutch, means for engaging and disengaging the friction clutch including actuating means movable along a predetermined path to disengage the clutch, and means for moving the actuating means including a second pedal which is similar or analogous to the gas pedal of the motor vehicle.

An additional feature of the invention resides in the provision of a preassembled engageable and disengageable clutch assembly or aggregate which comprises a housing, a pressure plate, a counterpressure plate which is rotatable about a predetermined axis, means for non-rotatably connecting the pressure plate to the counterpressure plate with limited freedom of movement in the direction of the predetermined axis, a torque transmitting clutch disc between the two plates, at least one resilient device which reacts against the housing to bias the pressure plate toward the counterpressure plate and to thereby clamp the clutch disc between the two plates, friction linings which form part of the clutch disc and are engageable by and disengageable from at least one of the two plates so that they are subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the clutch aggregate or assembly including actuating means movable along a predetermined path to disengage the clutch aggregate or assembly, and means for gradually reducing the torque which is transmitted by the clutch disc during a portion of the movement of the actuating means to disengage the clutch assembly or aggregate. The torque reducing means can include at least one resilient element which is in series with the at least one resilient device.

Still another feature of the invention resides in the provision of a clutch aggregate or assembly which comprises a twin-mass flywheel including a first rotary mass connectable to an output shaft of a combustion engine and a second mass rotatable relative to the first mass, an oscillation damper having means for opposing rotation of the two masses relative to each other, and a torque transmitting friction clutch including a counterpressure plate forming part of the second mass, a pressure plate, means for non-rotatably connecting the pressure plate to the counterpressure plate with limited freedom of axial movement, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the friction clutch including actuating means movable along a predetermined path to disengage the friction clutch, and means for gradually reducing the torque which can be transmitted by the friction clutch and/or by its clutch disc during a portion of the movement of the actuating means in a direction to disengage the friction clutch.

The friction clutch of the just-outlined clutch aggregate or assembly can further comprise a housing and means for securing the housing to the second mass so that the housing is separable from the second mass only in response to at least partial destruction or deformation of one of the two parts including the housing and the second mass.

The clutch disc of the aforementioned clutch aggregate or assembly can be provided with at least one substantially annular friction surface and the damper can be located radially outwardly of the friction surface.

A further feature of the invention resides in the provision of a clutch aggregate or assembly for use with a combustion engine, particularly in a motor vehicle. Such clutch aggregate or assembly comprises a torque transmitting friction clutch including a pressure plate, a counterpressure plate (such as a flywheel) which is rotatable about a predetermined axis, means for non-rotatably connecting the pressure plate to the counterpressure plate with limited freedom of axial movement, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value during the useful life of the friction clutch, means for engaging and disengaging the friction clutch including actuating means movable along a predetermined path to disengage the friction clutch, means for gradually reducing the torque which can be transmitted by the friction clutch and/or by the clutch disc during a portion of movement of the actuating means in a direction to disengage the friction clutch, and axially elastic means for coupling the friction clutch with an output shaft of the combustion engine. The coupling means has a stiffness or rigidity which is selected in such a way that any axial, turning, wobbling (tilting) and/or flexing vibrations which are induced by the output shaft of the engine and would normally be transmitted to the friction clutch are damped and/or otherwise suppressed by the coupling means to an extent which ensures proper operation of the friction clutch, and especially proper operation of the adjusting unit.

The stiffness of the coupling means can be selected in such a way that the force to be applied to the actuating means for disengagement of the friction clutch is taken up by the coupling means without appreciable axial shifting of the clutch aggregate or assembly.

The adjusting unit of the just-discussed aggregate or assembly can comprise resilient means in series with the at least one resilient device. Such aggregate or assembly can further comprise means for damping rotational and/or axial and/or radial vibrations of the counterpressure plate and such damping means is connectable between the output shaft of the engine and the counterpressure plate.

An additional feature of the invention resides in the provision of a driving unit, particularly for use in motor vehicles, which comprises an at least partially automatic (i.e., fully automatic or semiautomatic) transmission, an engine, and a torque transmitting friction clutch disposed between the engine and the transmission and being controlled at least in dependency on the operation of the transmission. The friction clutch of such driving unit comprises a pressure plate, a counterpressure plate (such as a flywheel) rotatable about a predetermined axis and connectable to the output shaft of the engine, means for nonrotatably connecting the pressure plate to the counterpressure plate with limited freedom of movement in the direction of the predetermined axis, a torque transmitting clutch disc between the two plates, at least one resilient device acting upon the pressure plate to bias the clutch disc against the counterpressure plate, friction linings forming part of the clutch disc and being engageable with and disengageable from at least one of the two plates and being subject to wear as a result of repeated engagement with and disengagement from the at least one plate, an adjusting unit including means for compensating at least for wear upon the friction linings to thereby maintain the bias of the at least one resilient device upon the pressure plate at a substantially constant value, means for engaging and disengaging the friction clutch including actuating means movable along a predetermined path to engage and disengage the friction clutch, and torque varying means including means for gradually reducing the torque which can be transmitted by the friction clutch and/or by the clutch disc during a portion of movement of the actuating means along the predetermined path in a direction to disengage the friction clutch.

The at least one resilient device (e.g., a diaphragm spring) can have a degressive force-to-displacement ratio, at least during a portion of movement of the actuating means along the predetermined path in a direction to disengage the friction clutch.

The means for varying the torque which can be transmitted by the friction clutch can include means for reducing the transmittable torque during approximately 40–70 percent of movement of the actuating means along the predetermined path in a direction to disengage the friction clutch and for gradually increasing the torque which can be transmitted by the friction clutch during approximately 40–70 percent of movement of the actuating means along the path in a direction to engage the friction clutch.

Certain of the above-enumerated objects are accomplished by the provision of a device which compensates for departures of the axial position of the actuating means from an optimum position or compensates for the departures of those portions of the actuating means relative to the disengaging member or disengaging means from an optimum position which are acted upon by the actuating means. Such a device can be utilized with particular advantage in clutch assemblies wherein, in accordance with a further development of the invention, the actuating means is shifted in the axial direction of the disengaging movement in dependency at least upon the extent of wear upon the friction linings because this ensures a practically tolerance-free transmission of force between the disengaging member or the disengaging means and the actuating means. In addition, this ensures that the actuating means can always be moved through the same distance. Thus, and for all practical purposes, there is no play between the disengaging member and/or the disengaging means on the one hand, and the actuating means on the other hand.

It can be of particular advantage if the compensating device is disposed or acts axially between the disengaging member and the actuating device. However, it is also possible to install the compensating device at other locations, e.g., so that it operates between the disengaging member and the disengaging means. In accordance with the present invention, it is advantageous to mount the actuator on an axial guide which is mounted on the transmission, e.g., a tubular guide which surrounds the input shaft of the transmission.

It can be advisable, particularly in clutch assemblies with a friction clutch which comprises a housing, e.g., a sheet metal cover, which can be connected to the counterpressure plate and comprises a bottom wall confronting the disengaging member, to install the compensating device or to cause the compensating device to act axially between the actuating means and the bottom wall. Furthermore, it can be of advantage if the biasing spring constitutes a diaphragm spring which operates axially between the clutch housing and the pressure plate and which comprises a resilient ring-shaped main portion and prongs which extend radially inwardly from the main portion and constitute the actuating means.

In order to ensure proper adjustment by the compensating device, it can be of particular advantage if the compensating device automatically or self-actingly ensures the necessary adjustment in the engaged condition of the clutch assembly or friction clutch and self-actingly or automatically blocks the adjustment during actuation of the friction clutch.

The compensating device can comprise a ring-shaped member which also axially abuts the actuating means in the engaged condition of the friction clutch. The ring-shaped member can compensate for the eventually changing distance between the actuating portions of the actuating means and the disengaging member. It can be of advantage for the operation of the compensating device if the latter comprises adjusting ramps or climbing ramps. Such ramps can be provided on the ring-shaped member.

The adjusting ramps can cooperate with cylindrical or substantially spherical rolling bodies in order to carry out the adjustment. However, it can be of particular advantage if the adjusting ramps cooperate with complementary ramps because, by properly selecting the slope angle of the ramps, one can achieve a self-locking action in response to axial stressing of the ramps. The complementary ramps can also be provided on a ring-shaped member.

Furthermore, and in order to achieve a more economical production of the friction clutch, it can be of advantage if at least one part of the compensating device is made of a plastic material. Such plastic parts can be produced by injection molding. Plastics which are particularly suitable are thermoplastic substances, such as for example polyamide.

It is of particular advantage if the members which include the adjusting ramps are movable in the axial direction in response to actuation of the clutch assembly or friction clutch. It can be of additional advantage if the component parts carrying the clamping ramps and the complementary ramps are rotatable relative to each other. One of these members can be mounted in such a way that it cannot rotate relative to the friction clutch, especially relative to the clutch housing.

In accordance with a further inventive concept, the compensating device can be designed in such a way that it operates or adjusts not unlike a freewheel—as seen in the direction of disengagement of the clutch assembly—but is self-locking in the direction counter to the direction of disengagement. To this end, the climbing ramps and/or the complementary ramps can be designed in such a way that they define in the axial direction a slope angle which is between 5° and 20°, preferably in the range of between 7° and 11°. It is of advantage if the compensating ramps are designed in such a way that there develops a self-locking action in response to frictional engagement. Thus, one should ensure that under all circumstances the adjusting ramps can self-lockingly engage each other so that it is not necessary to provide additional means in order to avoid an unintentional resetting. However, such means can be provided if necessary.

In order to ensure an optimal operation of the automatic compensating device, it can be of advantage if at least one of the climbing ramps and/or a member which carries the complementary ramps is spring biased in the direction of adjustment. The spring bias can be achieved in an advantageous manner in that the operation of the other springs, such as especially the biasing or diaphragm spring and the spring which acts upon the axially yieldable friction lining, is not affected in any appreciable manner or is not affected at all. A particularly satisfactory design can be achieved in that the members which are provided with the climbing ramps and the complementary ramps are acted upon or stressed in the direction of adjustment by at least one energy storing element, such as a coil spring, which is installed between these members. Due to such stressing, the members are urged in opposite directions, as considered in the axial direction, i.e., the energy storing elements and the adjusting ramps cause the members to move axially and away from each other. In this manner, the compensating device can be stressed without play axially between the actuating portions of the actuating means and the clutch cover and/or the disengaging member in the engaged condition of the clutch.

In accordance with a particularly advantageous further development of the invention, the coupling assembly can comprise an arrangement for limiting the disengaging movement, at least the disengaging movement of the actuating means. To this end, one can provide a stop which limits the extent of movability of the disengaging member and/or of the disengaging means in the disengaging direction. It is of advantage if the stop is provided on a member forming part of the compensating device and being designed to engage the clutch cover upon completion of a predetermined movement in the disengaging direction. However, it is also possible to provide a stop which includes portions forming part of the disengaging member and abutting an axially fixed part upon completion of a predetermined movement in the disengaging direction. Furthermore, it can be of advantage if the disengaging member also comprises an abutment which is effective in the direction of engagement and which can also constitute a stop. In accordance with an advantageous embodiment, the compensating device is designed in such a way that it props the actuating member in the engaged condition of the clutch assembly. An unchanged actuating movement for the clutch assembly can also be ensured in that a member which forms part of or constitutes the compensating device comprises movement limiting portions which are effective in the direction of disengagement as well as in the direction of engagement and cooperate with the stops. It is of advantage if such a member is constituted by that part of the compensating device which is acted upon by the disengaging member, and the movement limiting stops can be provided on the clutch housing or can form part of such housing. However, it is also possible to limit the extent of actuating movement of the clutch assembly by providing suitable abutments on that component part which guides the disengaging member in the axial direction. Such abutments preferably cooperate with a component part which is connected with the non-circulating bearing race of the disengaging member. Furthermore, the extent of disengaging movement in at least one axial direction can be limited also between the rotating bearing race and a component part, such as for example the clutch housing, which rotates with the bearing race.

In accordance with an additional further development of the invention, it can be of particular advantage—especially for minimizing the progress of the disengaging force or the maximum required disengaging force—by providing means which effects a gradual reduction of torque adapted to be transmitted by the clutch assembly or the clutch disc during disengagement and at least during a portion of the actuating movement of the actuating means. For example, such means for effecting a gradual reduction of torque can be constituted by the so-called friction lining springs which are provided between the friction linings of the clutch disc, which latter can be clamped between the pressure plate and the counterpressure plate.

A particularly advantageous embodiment of the novel friction clutch can be obtained in that the biasing spring, which is preferably constituted by a diaphragm spring, is tiltably supported by the housing between two seats—of which one confronts the pressure plate and is spring-biased toward the biasing diaphragm spring—in such a way that the maximum disengaging force which the biasing spring applies to the spring-biased seat during disengagement of the friction clutch is increased in response to wear upon the friction linings so that it exceeds the opposing force or supporting force acting upon the spring-biased seat. If the transmission of torque between the pressure plate and the clutch housing is effected by leaf spring elements and/or by a so-called spring arrangement between the friction linings, such as are known for example from the published German patent application No. 36 31 863, it is necessary to take into consideration those forces which such springs apply to the biasing spring in order to determine the force which acts upon the spring-biased seat because such forces are superimposed upon each other. In other words, when the friction linings have undergone a certain amount of wear, the temporarily developing increased disengaging force must exceed the resulting force, with reference to the tilting diameter of the diaphragm spring, of the aforementioned forces; this renders it possible to effect an adjustment. It can be of particular advantage if the spring-biased seat is movable in the axial direction. Furthermore, it can be of advantage if the characteristic curve of the biasing diaphragm spring is configurated in such a way that, starting with a structurally defined position of installation in the friction clutch and in response to a dissipation of energy which is determined by the extent of wear upon the friction linings, the force which is to be applied by the biasing diaphragm spring and hence the level of the progress of the disengaging force increases and that, when the deformation and stressing of the biasing diaphragm spring exceed the deformation and stressing upon installation, the maximum force which is to be applied during disengagement of the friction clutch decreases. Due to such mounting and design of the biasing diaphragm spring, one can ensure that, in response to wear upon the friction linings, there invariably develops again and again a state of equilibrium between the maximum disengaging force of the friction clutch and the opposing force which acts upon the spring-biased seat or the resultant opposing force acting upon the biasing diaphragm spring in the region of the tilting diameter of the biasing diaphragm spring.

It is of advantage if the clutch assembly or the friction clutch is constructed in such a way that the axially movable spring-biased seat is shifted jointly with the pressure plate within the permissible range of wear upon the parts of the friction clutch. The spring-biased seat can be shifted to a small extent in a direction toward the pressure plate—during the life span of the friction clutch—in response to gradual or small stepwise adjustment by the adjusting device. Such shifting of the spring-biased seat renders it possible to ensure that the diaphragm spring, which then bears upon the pressure plate, undergoes additional deformation so that the force which is being applied by the diaphragm spring decreases, in a manner as described hereinbefore, until the opposing force or the aforementioned resultant force acting upon the spring-biased seat is in a state of equilibrium with the disengaging force. Thus, the maximum disengaging force of the clutch or of the biasing diaphragm spring is reduced in response to shifting of the spring-biased seat.

It can be of particular advantage if the biasing diaphragm spring is installed in the friction clutch in such a way that its characteristic curve slopes downwardly at least during a portion of disengagement of the clutch, preferably during each and every stage of disengagement. The position of the freshly installed biasing spring can be such that, when the friction clutch is disengaged, the biasing spring reaches, at least substantially, the minimum or the lowermost point of its sinusoidal force-distance progress.

It is of advantage if the opposing force which acts upon the spring1 biased seat is furnished by an energy storing element which applies a substantially constant force, at least within the contemplated range of compensation. A suitably designed diaphragm spring which is installed in the friction clutch in a stressed condition is particularly suitable for the application of the opposing force to the spring-biased seat.

The invention is not limited only to the aforedescribed friction clutches but can be put to use generally in friction clutches or clutch assemblies employing an adjusting device which compensates for wear upon the friction linings of the clutch disc.

The invention further relates to a friction clutch, particularly for motor vehicles, having a pressure plate which is connected with a housing in such a way that it cannot rotate but can perform limited axial movements relative to the housing, a biasing diaphragm spring being mounted in axially stressed condition between the housing and the pressure plate so that it can be tilted relative to a seat arrangement which is carried by the housing and that it bears upon the pressure plate in a direction toward a clutch disc which can be clamped between the pressure plate and a counterpressure plate, such as a flywheel, and an adjusting device being provided to compensate for wear upon the friction linings of the clutch disc.

Automatic adjusting devices which are to effect a substantially unchanged biasing of the pressure plate by the biasing diaphragm spring are disclosed, for example, in published German patent applications Nos. 29 16 755 and 35 18 781. The adjusting devices, which are actuatable in dependency upon signals from at least one sensor, are installed or operate between the pressure plate and the biasing diaphragm spring. Due to coupling of the pressure plate with the housing by means of tangentially arranged leaf springs—the bias of the leaf springs must be relatively small because it opposes the bias of the diaphragm spring— the pressure plate, whose mass is considerable, is free to perform axial reciprocatory movements when the friction clutch is disengaged. In other words, the pressure plate can become disengaged from the diaphragm spring and this not only adversely affects the operation of the clutch but can also affect the safety of the clutch because the adjusting device compensates when the friction clutch is disengaged until the pressure plate reengages the clutch disc. Thus, the clutch cannot become disengaged. Therefore, such adjusting devices failed to gain acceptance and are not in actual use.

An object of the additional invention is to eliminate the aforementioned drawbacks and to provide adjusting devices of the aforediscussed type which can be put to actual use even under less than optimal circumstances, whose construction is simple and whose operation is always safe, and which have a compact design and can be produced at a reasonable cost. Furthermore, the required disengaging forces should be small and should remain small during the entire useful life of the friction clutch. Still further, the useful life of the improved friction clutch should be longer than that of heretofore known adjustable friction clutches.

In accordance with the invention, such objects are accomplished in a friction clutch having a pressure plate which is biased by a diaphragm spring and wherein the diaphragm spring reacts against a component such as a housing and is tiltable relative to a ring-shaped seat arrangement provided in the housing. The friction clutch further comprises an automatic adjusting device which operates between the cover and the diaphragm spring to move that seat of the seat arrangement which is nearer to the housing so that the seat is moved away from the housing by a distance depending upon the wear on friction linings. The adjusting device can be further transported by an advancing device and the biasing spring is acted upon by a supporting force in a direction toward the seat arrangement. Such a supporting force is preferably applied continuously so that the diaphragm spring is braced against the disengaging force only in a force-locking manner, namely by spring bias, rather than by form-lockingly coupled means. The diaphragm spring is installed with a degressive characteristic curve within its operating range in such a way that the supporting force and the bias of the diaphragm spring are related to each other so as to ensure that the supporting force, by taking into consideration the contemplated position of installation of the diaphragm spring without the wear-dependent change of conicity and within the range of movement of the diaphragm spring during disengagement, exceeds the magnitude of the force which is furnished by the diaphragm spring and acts counter to the supporting force. On the other hand, the supporting force is smaller than the force which is applied by the diaphragm spring counter to the supporting force when the conicity of the diaphragm spring changes in response to wear upon the friction linings. The supporting force can be applied by a single spring element or at least substantially by a single spring element or spring element system. The term "supporting force" is intended to embrace the sum of forces—to the extent that they are detectable—opposing the bias of the diaphragm spring. Thus, such term embraces for example also or only those forces which are supplied by the (torque-transmitting or disengaging) leaf springs, the bias of springs (in unstressed condition) which act upon the friction linings, or their "substitutes".

The energy storing element which furnishes at least the major part of the supporting force is preferably a spring, e.g., a diaphragm spring, whose configuration changes during adjustment. However, it is equally possible to employ the leaf springs as energy storing elements which supply the supporting force.

A diaphragm spring which applies the supporting force can bear directly upon the biasing diaphragm spring, e.g., at the radial level of the seat which is movable axially and confronts the cover.

It is particularly advantageous if the adjusting device is disposed axially between the diaphragm spring and the cover. In accordance with an especially advantageous proposal, the adjusting device can comprise sloping surfaces, such as ramps.

The invention ensures that the conicity or initial stressing of the diaphragm spring in the engaged condition of the friction clutch remains substantially unchanged during the entire useful life of the friction clutch and that the pressure plate and hence also the clutch disc is acted upon by a substantially constant force independent of the extent of wear upon the friction linings, upon the pressure plate or upon other elements such as the seat which confronts the cover or the pressure plate, upon the diaphragm spring or the friction surface of the flywheel. The novel proposal further ensures that the mass of the pressure plate is not augmented by the mass of the adjusting device. The mass of the pressure plate continues to remain within a range in which it is shielded from the effects of wear upon the plates and in which it is located at a greater distance from the source of friction heat.

A particularly advantageous embodiment of the novel friction clutch can be arrived at in that the biasing diaphragm spring is tiltably supported by the housing between two seats—one of which confronts the pressure plate and is spring-biased toward the biasing diaphragm spring—and in that the force which is furnished by the biasing diaphragm spring during disengagement of the friction clutch and acts upon the spring biased seat increases in response to wear upon the friction linings and then exceeds the opposing force or supporting force which is being applied to the spring-biased seat. The configuration of the characteristic curve of the biasing diaphragm spring is then such that, starting from a structurally defined position of installation of the biasing diaphragm spring in the friction clutch and taking into consideration that the biasing diaphragm spring dissipates energy in a particular direction in response to wear upon the friction linings, the force which is being applied by the biasing diaphragm spring, and hence the required disengaging force, increases during a first stage but decreases in the course of disengagement when the extent of deformation and stress on of the biasing diaphragm spring further depart from the extent of deformation of the biasing diaphragm spring in the position of installation. Such mounting and design of the biasing diaphragm spring ensure that a state of equilibrium between the force which the biasing diaphragm spring applies to the seat during disengagement of the friction clutch and the opposing force acting upon the spring-biased seat is achieved again and again because, if the supporting force is exceeded by the force which the biasing diaphragm spring applies to the seat, the biasing diaphragm spring shifts the sensor spring away from that seat, which faces toward the cover and the adjusting device can be rotated again in response to the application of force by the advancing device. This results in axial shifting of the seat until the force which is being applied by the sensor prevents further rotation and further axial displacement of the seat.

It is particularly advantageous if, as already mentioned above, the biasing diaphragm spring is installed in the friction clutch in such a way that it exhibits a downwardly sloping characteristic curve, at least during a certain portion of the disengagement range, preferably at least substantially within the entire disengagement range of the clutch. The initial position of the biasing diaphragm spring can be selected in such a way that, in the disengaged condition of the friction clutch, the progress of the distance-force curve of the biasing diaphragm spring reaches or moves beyond the minimum or lowermost value.

The opposing force which is being applied to the spring-biased seat can be generated by an energy storing element which applies a substantially constant force at least within the contemplated range of adjustment. A suitably configurated and prestressed diaphragm spring has been found to be particularly suitable for installation in the friction clutch to act upon the spring-biased seat.

The improved adjusting device can be utilized with particular advantage in friction clutches employing a biasing diaphragm spring which comprises radially outer portions bearing against the pressure plate and additional portions located radially inwardly of the radially outer portions and tiltable in the housing between two seats. In such friction clutches, the diaphragm spring can act not unlike a two-armed lever.

However, the invention is not limited to friction clutches with diaphragm springs which are of one piece with disengaging levers in the form of diaphragm spring prongs but can be embodied also in other types of clutches, e.g., clutches wherein the diaphragm spring is actuated by additional levers.

In order to ensure optimal adjustment to compensate for wear or an optimum biasing force for the friction clutch, it can be of particular advantage if the opposing seat at that side of the biasing diaphragm spring which faces away from the spring-biased seat is configurated in such a way that it can be automatically or spontaneously moved axially in a direction toward the pressure plate but can be automatically or spontaneously arrested by a device against movement in the opposite direction. The adjustment of the opposing seat, namely of the seat which confronts the cover, can be effected by employing an energy storing element which urges the opposing seat in a direction toward the pressure plate, i.e., which opposes the bias of the biasing diaphragm spring. Thus, the energy storing element automatically adjusts the position of the opposing seat to compensate for displacement of the spring-biased seat in response to wear upon the friction linings, and this ensures a clearance-free tiltable mounting of the biasing diaphragm spring.

The opposing seat can be moved axially by an adjusting device which is provided between the biasing diaphragm spring and the cover. The adjusting device can comprise a ring-shaped member, i.e., a coherent or one-piece member, which is biased by the biasing diaphragm spring axially, at least in the engaged condition of the friction clutch.

The tiltable seat assembly can be adjusted to compensate for wear upon the friction linings by rotating the ring-shaped member in the course of the clutch disengaging operation whenever it becomes necessary to compensate for wear. To this end, it is particularly advantageous to provide the ring-shaped member of such adjusting device with adjusting ramps which slope in the axial direction. Furthermore, it can be of advantage if the ring-shaped member carries the opposing support or seat, and such seat can constitute a wire ring. This wire ring can be received in a circumferentially extending groove of the ring-shaped member and can be form-lockingly connected thereto. The form-locking connection can constitute a connection which can hold the wire ring by snap action.

In order to carry out an adjustment, the adjusting ramps can cooperate with cylindrical or substantially spherical rolling elements. However, it can be of particular advantage if the adjusting or sloping ramps cooperate with corresponding complementary ramps because, by properly selecting the angle of slope of such ramps, one can achieve a self-locking action in response to axial stressing of the ramps. The opposing ramps can be carried by a ring-shaped member which can be disposed between the member which carries the sloping ramps and the cover. However, a particularly simple construction can be obtained by providing the opposing ramps in the housing. The latter can be accomplished in an especially simple manner if the housing is made of sheet metal because it is possible to stamp the opposing ramps into the housing. The stamped ramps can be provided in radially extending portions of the housing.

In order to ensure the making of the friction clutch at a reasonable cost, it can be of additional advantage if at least a portion of the adjusting device is made of plastic material. Such plastic parts can be made by injection molding. Thermoplastic substances, such as for example polyamide, can be utilized with particular advantage. The utilization of plastic materials is possible because the adjusting device is disposed at a location which is shielded from heat. Furthermore, the relatively low weight of the plastic material brings about a reduction of the mass moment of inertia.

In accordance with a further inventive proposal, the adjusting device can be designed in such a way that it acts not unlike a freewheel, as seen in the direction of disengagement of the friction clutch, but is self-locking in a direction counter to the direction of engagement. To this end, the sloping ramps and/or the opposing ramps can be designed in such a way that their angle of slope in the axial direction is between 4° and 20°, preferably in the range of between 5° and 12°. It is advantageous to design the sloping ramps and/or the opposing ramps in such a way that a self-locking action takes place as a result of frictional engagement. However, it is also possible to achieve or to assist a self-locking action by the establishment of a form-locking connection, for example, by utilizing a set of soft ramps and a set of profiled ramps or by employing two sets of profiled ramps. Such undertakings ensure that it is not necessary to provide additional means for the purpose of avoiding undesirable resetting.

A particularly advantageous and simple adjusting device can be arrived at if the advancing device which acts in the circumferential direction constitutes a spring which is installed in a stressed condition and yieldably bears at least upon a member which carries the sloping ramps and/or upon a member which carries the opposing ramps or opposing surfaces so that the biased member is resiliently urged in the direction of adjustment. It is advantageous to select the spring bias in such a way that it does not interfere, or does not appreciably interfere, with the operation of other springs, especially the actuating diaphragm spring and the spring which biases the axially yieldable seat.

It can be of advantage, for many applications, if the adjusting device comprises a plurality of shiftable adjusting elements, such as for example adjusting wedges or rolling elements which are movable in the radial and/or circumferential direction. Furthermore, it can be of advantage if the operation of the adjusting device is dependent on the RPM. For example, the centrifugal force which acts upon certain elements of the adjusting device can be relied upon to actuate and/or to lock the adjusting device under certain operating conditions of the combustion engine. It is particularly advantageous if the adjusting device can be blocked by means whose operation depends upon centrifugal force developing when a certain RPM is exceeded. For example, a blocking action can take place when the RPM at least approximates the idling RPM or when the RPM is below the idling RPM, so that a compensation for wear takes place only at a low number of revolutions per minute. This exhibits the advantage that one precludes unintentional adjustments such as could take place as a result of vibrations at a high RPM.

A particularly simple and reliable design of the adjusting device can be achieved by resiliently stressing those component parts which are movable relative to the housing and are provided with sloping ramps and/or opposing ramps. If the friction clutch comprises only one component which is movable relative to the housing and is provided with the corresponding ramps or surfaces, the spring bias is applied to such one component. It can be of particular advantage if the spring bias generates a force acting in the circumferential direction.

It can be of additional advantage, as concerns the construction and operation of the friction clutch, if the sensor spring—which can constitute a dished spring, such as a diaphragm spring—includes a radially inner portion which reacts against an axially fixed component, such as the housing, and radially inner portions acting upon the seat which faces away from the cover. Such seat can be of one piece with the sensor spring so that the sensor spring also constitutes the seat. In order to hold the sensor spring in a stressed condition, the housing can be provided with abutments or stops. Such abutments can include discrete supporting elements which are provided on the housing. However, it can be of advantage if the abutments are of one piece with the housing, e.g., the housing can be provided with stampings or cutouts or deformed portions which axially abut and thus support the sensor spring.

It can be of particular advantage for the operation of the friction clutch, especially to minimize the progress of the disengaging force or the maximum required disengaging force, if the clutch disc which can be clamped between the pressure plate and the counterpressure plate comprises friction linings and so-called friction lining springs between the friction linings. Such springs are disclosed, for example, in the published German patent application No. 36 31 863. If utilized, such friction lining springs can assist in actuation of the friction clutch, especially the disengaging operation. The reason is that, in the engaged condition of the friction clutch, the stressed friction lining springs exert upon the pressure plate a reaction force which opposes the bias of the biasing diaphragm spring and the actuating diaphragm spring upon such pressure plate. During disengagement of the friction clutch, i.e., while the pressure plate moves axially, the pressure plate is initially pushed back by the resiliently stressed friction lining springs simultaneously with a reduction of the bias of the biasing diaphragm spring upon the pressure plate due to the relatively steep downward slope of the characteristic curve of the biasing diaphragm spring during the initial stage of disengagement of the clutch. A reduction of the force which the biasing diaphragm spring applies to the pressure plate entails a reduction of the force which the friction lining springs exert upon the pressure plate. The actual force which is required to disengage the friction clutch equals the difference between the restoring force of the friction lining springs and the biasing force of the biasing diaphragm spring.

When the dissipation of energy by the friction lining springs is completed, namely when the pressure plate is disengaged from the friction linings, i.e., when the pressure plate releases the clutch disc, the required disengaging force is determined primarily by the biasing diaphragm spring. In accordance with a highly advantageous feature, the force-distance characteristic of the friction lining springs and the force-distance characteristic of the biasing diaphragm spring can be related to each other in such a way that, when the pressure plate releases the clutch disc, the force which is required to actuate the biasing diaphragm spring is small. Thus, by properly relating or even equalizing the characteristics of the friction lining springs and of the biasing diaphragm spring until the pressure plate actually releases the clutch disc, only a very small actuating force or, in extreme cases, no actuating force at all is required to act upon the biasing diaphragm spring in order to overcome the remaining power take-off. Furthermore, the characteristics of the biasing diaphragm spring can be selected in such a way that, when the clutch disc is released, the force with which the biasing diaphragm spring thereafter opposes the tilting movement or the force which is required to tilt the diaphragm spring is very small if compared with the biasing force which the biasing diaphragm spring applies in the engaged condition of the friction clutch. It is also possible to select the characteristics in such a way that, when the pressure plate releases the clutch disc, only a very small force, or practically no force at all, is required to actuate the biasing diaphragm spring in order to disengage the friction clutch. Such friction clutches can be designed in such a way that the actuating forces are in the range of between 0 N and 200 N.

In accordance with a further inventive proposal, the friction clutch can be designed in such a way that the axial force which is applied by the biasing diaphragm spring is in the zero range at least substantially simultaneously with the timing of release of the clutch disc by the pressure plate. As the disengaging operation continues, the force which is then applied by the biasing diaphragm spring can become a negative force, i.e., there takes place a reversal of the direction of application of force by the biasing diaphragm spring. This means that, when the friction clutch is fully disengaged, the clutch automatically remains in the disengaged condition and the engaging operation can be initiated only in response to the application of an external force.

The invention further relates to a friction clutch, especially for motor vehicles, with a pressure plate which is non-rotatably connected with a housing for limited axial movement, at least one biasing spring being installed and being adapted to be stressed between the housing and the pressure plate to bias the pressure plate in a direction to clamp a clutch disc between the pressure plate and a counterpressure plate, such as a flywheel.

Such clutches are disclosed, for example, in the published German patent application No. 24 60 963, in German patents Nos. 24 41 141 and 898 531, and in German Auslegeschrift No. 1 267 916.

An additional object of the present invention is to improve the operation and to prolong the useful life of such friction clutches. A more specific object of the invention is to reduce the magnitude of forces which are required to operate such friction clutches and to ensure that the progress of disengaging forces remains at least substantially unchanged during the entire useful life of the friction clutches. Furthermore, the novel friction clutches should be designed to ensure that they can be produced in a particularly simple and economical manner.

In accordance with the invention, this is accomplished by the provision of an adjusting device which automatically compensates for wear upon the friction linings of the clutch disc and which ensures that the biasing spring exerts upon the pressure plate a practically unchanged force. The friction clutch comprises actuating means for engaging and disengaging the clutch as well as a device which effects a gradual reduction of torque which can be transmitted by the friction clutch or by the clutch disc during disengagement of the friction clutch, at least during a portion of the actuating movement of the actuating means and/or of the distance covered by the pressure plate during disengagement of the clutch. Such a design can further ensure a gradual or progressive increase of torque which the friction clutch can transmit during engagement of the friction clutch and during the initial stage of clamping of the friction linings between the pressure plate and the counterpressure plate.

The novel design of the friction clutch ensures that the stressing of the biasing diaphragm spring when the friction clutch is engaged remains practically unchanged during the useful life of the clutch and this, in turn, ensures that the application of force to the pressure plate remains practically unchanged. Furthermore, the additional undertaking which effects a gradual reduction of torque being transmitted by the friction clutch in the course of disengagement ensures that one can achieve a reduction or minimizing of the progress of disengaging force or of the required maximum disengaging force. This is attributed to the fact that the undertaking assists the actuation, especially the disengagement, of the friction clutch. To this end, the undertaking can comprise axially yieldable resilient means which apply a reaction force to the actuating means and/or to the biasing spring and/or to the pressure plate and/or to the counterpressure plate. The reaction force opposes the force which the biasing spring applies to the pressure plate and is in series therewith.

It can be of particular advantage if the novel torque reducing device of the friction clutch is installed in such a way that it effects a gradual reduction of torque which can be transmitted by the friction clutch or by the clutch disc during a portion of the displacement of those parts of the pressure plate which are being acted upon by the biasing spring during disengagement of the friction clutch.

For many applications, the torque reducing device can be installed in the power flow between the tilting bearing for the actuating means or between the biasing spring and the fastening elements, such as threaded fasteners, which secure the housing to the counterpressure plate.

However, it may be desirable if the torque reducing device is installed in the power flow path between the means for pivotably mounting the actuating means or between the biasing spring and the friction surface of the pressure plate. Such an arrangement is proposed, for example, in the published German patent applications Nos. 37 42 354 and 1 450 201.

For additional applications, it may be particularly advantageous to install the device axially between the friction linings which are disposed back-to-back and form part of the clutch disc, namely to employ a device which constitutes the so-called "friction lining springs", e.g., which constitutes friction lining spring segments. Such devices are known, for example, from the published German patent application No. 36 31 863.

An additional possibility to achieve a progressive increase or reduction of torque is proposed in the published German patent application No. 2164 297. The flywheel which is disclosed in this patent application comprises two parts and the member which constitutes the counterpressure plate is axially movably supported relative to the member which is connected with the output shaft of the combustion engine.

It can be of particular advantage for the operation and construction of the novel friction clutch if the torque reducing device facilitates a resilient axial yieldability between the parts of the clutch, the device being installed and designed in such a way that, when the clutch is disengaged, the magnitude of the force acting upon the device is reduced to a minimum and the force acting upon the device gradually rises to a maximum value during the closing of the clutch, i.e., during engagement of the clutch, such rise of the force preferably taking place only during a portion of the engaging or closing movement of actuating means or the pressure plate. It can be of particular advantage if the device is designed in such a way that the gradual reduction or the gradual increase of torque which can be transmitted by the friction clutch takes place while the actuating means completes between about 40% and 70% of its actuating path and/or during between 40% and 70% of the maximum axial displacement of the pressure plate. The remaining portion of the corresponding path is necessary to ensure proper interruption of the power flow and to compensate for possibly existing deformations of parts of the clutch, such as particularly the clutch disc, the pressure plate and the counterpressure plate.

In order to minimize the forces which are necessary to actuate the novel friction clutch, it can be of particular advantage if the biasing spring exhibits a degressive force-distance progress, i.e., that the biasing spring exhibits a decreasing progress of force at least within a portion of its compression or deformation path. In this manner, one causes the spring force of the device to oppose the force of the biasing spring during the disengagement of the friction clutch so that the stressing or deformation of the biasing spring is assisted by the spring bias of the device during a portion of disengagement path and, at the same time, the magnitude of the force which is being applied by the biasing spring to the pressure plate or to the friction linings decreases due to the degressive or downwardly sloping force-distance progress of the characteristic curve of the biasing spring. The actual progress of the force which is required to disengage the friction clutch is the difference between the progress of force which is furnished by the device and the progress of the force which is furnished by the biasing spring, it being assumed that no additional superimposed spring actions are present. During disengagement of the pressure plate from the friction linings, i.e., during release of the clutch disc, the necessary remaining progress of the disengaging force, i.e., the required disengaging force, is established primarily by the biasing spring. The force-distance characteristic of the device and the force-distance characteristic of the biasing spring can be related to each other in such a way that the force which is required to actuate the biasing spring after the pressure plate releases the clutch disc is at a relatively low level. Thus, by selecting the spring characteristic or the force characteristic of the device in such a way that it approximates or actually matches the characteristic of the biasing spring, it is possible to ensure that a very small force or, in extreme cases, no force at all is necessary to actuate the biasing spring until the pressure plate releases the clutch disc.

A particularly suitable biasing spring is a diaphragm spring which, on the one hand, can be tilted in a tilting seat assembly carried by the housing and, on the other hand, bears upon the pressure plate. The diaphragm spring can comprise a ring-shaped body and prongs extending radially inwardly from the ring-shaped body and constituting the actuating means. However, it is also possible to employ actuating means constituted by levers, for example, levers which are pivotably mounted on the housing. Furthermore, it is also possible to apply the spring bias to the pressure plate by resorting to other types of springs, for example coil springs, which are mounted in the friction clutch in such a way that the axial force which such springs apply to the pressure plate in the engaged condition of the friction clutch assumes a maximum value and that the magnitude of such force decreases in the course of the disengaging operation. This can be achieved, for example, by mounting coil springs at an angle relative to the rotational axis of the friction clutch.

It can be of particular advantage if the diaphragm spring is tiltably mounted on the housing between two seats to form part of a so-called push-type clutch. In such clutches, the actuating means which disengage the friction clutch are normally acted upon in a direction toward the pressure plate. However, the invention is not limited to push-type clutches but also embraces pull-type clutches wherein the actuating means for disengaging the friction clutch is normally acted upon in a direction away from the pressure plate.

In a particularly advantageous manner, the novel friction clutch can comprise a diaphragm spring which is designed in such a way that it exhibits a sinusoidal force-distance progress and is installed in such a way that, when the friction clutch is engaged, its operating point is disposed in the degressive range of the characteristic curve which follows the first force maximum. It can be of additional considerable advantage if the diaphragm spring exhibits a force ratio of between 1:0.4 to 1:2.7 between the first force maximum and the following minimum.

Furthermore, it can be especially advantageous if the friction clutch is actuatable by a disengaging system which acts upon the actuating means, such as for example the tips of prongs of the diaphragm spring, and the disengaging system can comprise a clutch pedal which is constructed in a manner similar to that of a gas pedal and is installed in the interior of the motor vehicle. Such a design of the clutch pedal can be particularly advantageous because, due to the novel design, the magnitude of the required force or the progress of force which is required to disengage the friction clutch can be brought to a very low level so that a clutch pedal resembling a gas pedal renders it possible to more readily meter the magnitude of the actuating force.

Due to the novel design of a friction clutch and the attendant possibility to reduce the maximum forces to be applied by the biasing spring during the useful life of the friction clutch, it is possible to reduce the dimensions of the parts or to reduce the strength of the parts accordingly which results in a considerable reduction of the cost of making. By reducing the magnitude of the disengaging forces, one also achieves a reduction of friction and elasticity losses in the clutch and in the disengaging system, with attendant substantial improvement of the system including the friction clutch and the disengaging system. Thus, it is possible to design the clutch in an optimum manner with attendant substantial increase of the clutch comfort.

The novel design is suitable for use in friction clutches in general, and especially in those which are proposed, for example, in German patents Nos. 29 16 755 and 29 20 932, published German patent applications Nos. 35 18 781 and 40 92 382, published French patent applications Nos. 2 605 692, 2 606 477, 2 599 5 444 and 2 599 446, British patent No. 1 567 019, U.S. Pat. Nos. 4,924,991, 4,191,285 and 4,057,131 and in Japanese Utility Models Nos. 3-25026, 3-123, 2-124326, 1-163218, 51-126452, 3-19131 and 3-53628.

The utilization of a friction clutch with automatic or self-acting compensation at least for the wear upon the friction linings—which ensures an at least substantially constant clamping force during the useful life of the friction clutch—is of particular advantage in connection with clutch assemblies wherein the friction clutch, the clutch disc and the counterpressure plate, such as for example a flywheel, constitute an assembly unit or module. In order to reduce the cost, it is of advantage in connection with such an assembly unit if the clutch housing is attached to the counterpressure plate by way of a non-releasable connection, for example, by a welded joint or by a form-locking connection such as can be achieved, for example, as a result of plastic deformation. Owing to the provision of such a connection, it is possible to dispense with the customarily employed connecting means, such as screws. In such assembly units, it is practically impossible to exchange the clutch disc or the friction lining due to excessive wear without destruction of component parts, such as for example the clutch housing. By employing a clutch which is automatically adjusted to compensate for wear, the assembly unit can be designed in such a way that it ensures proper operation during the entire useful life of the vehicle. Thus it is now possible, due to the novel design, to dimension and design that portion of the clutch disc which is to wear away and that portion of the friction clutch or clutch assembly which is needed for satisfactory adjustment in such a way that the useful life of the clutch, and hence also the useful life of the mounting assembly, invariably at least matches the useful life of the vehicle.

In accordance with a further development of the invention, it can be of particular advantage if a friction clutch which is provided with a wear compensating unit is combined with a so-called twin-mass flywheel. The friction clutch can be mounted, with the interposition of a clutch disc, in such a way that one of the flywheel masses is to be connected with a transmission, and the other flywheel mass is connectable with the output shaft of a combustion engine. Twin-mass flywheels which can be employed in combination with the novel friction clutch are disclosed, for example, in published German patent applications Nos. 37 21 712, 37 21 711, 41 17 571, 41 17 582 and 41 17 579. The entire disclosures of the just-enumerated published German patent applications are incorporated by reference in the present application so that the features which are disclosed in the just-enumerated published German patent applications can be combined, in any desired manner, with the features which are disclosed in the present application. It is particularly advantageous if the clutch housing or clutch cover is connected with the corresponding flywheel in a manner such that the connection cannot be terminated without destruction of the connected parts. Several embodiments of such connections are disclosed in the published German patent application No. 41 17 579.

By utilizing a friction clutch having a unit which compensates at least for wear upon the friction linings, it is further possible to optimize the design of the friction clutch, especially of the energy storing element which furnishes the clamping force for the clutch disc. Thus, this energy storing element can be designed in such a way that, for all practical purposes, it merely supplies that clamping force for the clutch disc which is necessary for the transmission of a desired torque. The energy storing element can be constituted by at least one diaphragm spring or by a plurality of coil springs. Furthermore, the utilization of a self-adjusting friction clutch is of advantage in combination with twin-mass flywheels wherein the torsionally elastic damper which is disposed between the two flywheel masses is installed radially outwardly of the clutch disc or radially outwardly of the maximum diameter of the friction surface on the flywheel mass which is connectable to the transmission. In such twin-mass flywheels, the friction diameter of the clutch disc must be smaller than in conventional clutches so that the biasing force must be increased in accordance with the ratio of the median friction radii in order to be capable of transmitting a predetermined torque from the engine. If one were to utilize a conventional clutch, this would necessitate the application of a greater disengaging force. By utilizing a clutch embodying the wear compensating feature with a progressive reduction of the torque which can be transmitted by the clutch disc during disengagement of the clutch, it is now possible to achieve a reduction of the disengaging force to thus avoid an increase of the disengaging force or, by properly designing the friction clutch, to even achieve a reduction of the disengaging force as compared with a conventional clutch.

Thus, the novel design of the friction clutch can ensure that, in spite of a reduction of the diameters of the friction linings and in spite of the thus required larger biasing force, the disengaging force can remain small. Due to the small disengaging force, the roller bearing which permits the two flywheel masses to rotate relative to each other is subjected to less pronounced wear. Furthermore, compensation for wear renders it possible to prolong the useful life of the clutch so that it is no longer necessary to replace parts, particularly the clutch disc, during the useful life of the motor vehicle. Thus, the clutch cover can be fixedly connected to that flywheel mass which is to be connected with the transmission, for example, by riveting or welding. This is of particular advantage when only a limited space, or a limited outline of the transmission bell, is available so that it is not possible to connect the clutch cover with the flywheel at the side of the transmission in a conventional manner by resorting to screws.

If a clutch assembly consisting of a flywheel and a friction clutch with integrated adjusting means for the wear upon the friction linings is affixed to the output shaft of a combustion engine in a conventional manner, the output element of the combustion engine—particularly a crankshaft—transmits to the clutch assembly axial, rotational and wobbling vibrations. In order to ensure that the operation of the clutch unit or of the adjusting means is not adversely affected by such vibrations, and especially to ensure that such vibrations do not initiate an undesirable adjustment to compensate for wear, it is necessary to design the adjusting means by considering inertia forces of all parts which influence the adjusting means. In order to prevent such undesirable side effects which are caused primarily by the axial and wobbling vibrations, and to avoid a higher cost for the design of the adjusting means for compensation of the wear upon the friction linings in order to take into consideration such side effects, it is further proposed in accordance with an additional feature of the invention to practically separate or isolate the clutch unit and its adjusting means from the axial and flexing vibrations which are initiated by the output shaft of the combustion engine. This can be accomplished in that the clutch unit is connectable with the output shaft of the combustion engine by an axially elastic or resiliently yieldable member. The rigidity of this member is selected in such a way that the member reliably suppresses or damps axial and wobbling or flexing vibrations which the output shaft of the combustion engine transmits to the clutch unit at least to such an extent that one ensures a satisfactory operation of the friction clutch and particularly of its adjusting means. Such elastic members are disclosed, for example, in the published German patent application No. 0 385 752 and in the SAE Technical Paper 9 003 91. The disclosures of such publications are also intended to be incorporated herein by reference. By utilizing an elastic member, it is possible to prevent an undesired compensation for wear which is caused by axial vibrations of the pressure plate relative to the clutch cover—especially when the friction clutch is disengaged—induced by vibrations of the flywheel and/or by vibrations of the diaphragm spring. In the absence of an undertaking to at least substantially suppress the aforediscussed vibrations, especially of an axially yieldable disc, such vibrations if applied to a clutch assembly or clutch unit could cause a change of adjustment independently of the extent of wear upon the clutch disc so that the biasing force of the diaphragm spring would be adjusted toward the minimum force which, in turn, would prevent the clutch from continuing to transmit a desired torque.

In accordance with a further inventive concept, a friction clutch which is equipped with a self-acting or automatic compensation, and especially wherein an automatic compensation is effected in accordance with the present invention, can be utilized with particular advantage in a driving unit, especially for motor vehicles, which driving unit consists of an automatic or semiautomatic transmission and a friction clutch which is installed between the prime mover, such as a combustion engine, and the transmission and is actuatable in a controlled or regulated manner at least in dependency upon the actuation of the transmission. An automated or fully automatic actuation of a friction clutch is proposed, for example, in the published German patent application No. 40 11 850.9 to which reference may be had regarding the mode of operation and the necessary constituents.

The heretofore known driving units with automatic or semiautomatic transmissions and conventional friction clutches presented serious problems concerning the actuation of the clutch and the design of the actuators which are necessary for such actuation, such as for example cylinder-piston units and/or electric motors. Very strong or large actuators were necessary due to the relatively large disengaging forces which are required for the actuation of conventional clutches. This involves large space requirements, considerable weight and high cost. Moreover, the reaction time of such large actuators is relatively long due to their high mass inertia. Furthermore, if one employs adjusting cylinders, it is necessary to utilize a large volumetric flow of pressurized fluid which, in turn, renders it necessary to employ a relatively large fluid supplying pump in order to ensure the required actuation times for the corresponding friction clutch. In an effort to partially overcome the aforementioned drawbacks, it was proposed for example in the published German patent application No. 33 09 427 to reduce the actuating force for disengagement of the clutch by appropriate compensating springs which are intended to facilitate the utilization of smaller actuators. However, since the disengaging force for conventional clutches fluctuates within a wide range during the useful life of such clutches, namely the disengaging force is relatively small when the conventional clutch is new but increases during the life of the clutch in response to increasing wear upon the friction linings, a compensating spring can effect only a small reduction of the normally required disengaging force. If one takes into consideration all of the tolerances, it is still necessary to select actuators whose output exceeds that needed for a new conventional clutch in spite of the utilization of compensating springs. By utilizing the novel friction clutch having means for compensating for wear upon the friction linings in combination with a driving unit consisting of an engine and an automatic or semiautomatic transmission, it is possible to greatly reduce the disengaging force in comparison with that which is required for disengagement of conventional clutches, and such reduction can be effected directly in the clutch, so that the magnitude of such reduced disengaging force or the progress of the disengaging force remains practically unchanged during the entire useful life of the novel clutch. This brings about important advantages as concerns the design of the actuators because their actuating output can be correspondingly low with attendant corresponding reduction of the forces and/or pressures which are necessary in the entire disengaging system. Consequently, losses developing in the disengaging system as a result of friction or elasticity of the component parts are either eliminated or reduced to a minimum.

Still another feature of the present invention resides in the provision of an engageable and disengageable friction clutch, particularly for use in power trains between the engines and the wheels of motor vehicles. The improved friction clutch comprises a first component including a housing rotatable about a predetermined axis, a second component including a rotary pressure plate, a third component including means (such as a set of leaf springs) for non-rotatably connecting the pressure plate to the housing with limited freedom of movement in the direction of the predetermined axis, a fourth component including a rotary counterpressure plate which is adjacent the pressure plate and can be driven by a prime mover or the like, a fifth component including a torque transmitting clutch disc disposed between the two plates and having friction linings which are subject to wear as a result of repeated engagement with and disengagement from the friction surfaces of the two plates in response to repeated engagement and disengagement of the friction clutch, a sixth component including a normally frustoconical diaphragm spring which is disposed between the housing and the pressure plate to normally bias the pressure plate toward the clutch disc so that the friction linings are clamped between the two plates, a seventh component including means (e.g., a bearing or one or more levers) for engaging and disengaging the friction clutch, and means for automatically compensating for wear at least upon the friction plates and upon the diaphragm spring). The improved wear compensating means comprises two adjustable rings disposed at different radial distances from the predetermined axis and carried by one of the aforementioned components (e.g., by the housing or by the pressure plate) for displacement in the direction of the predetermined axis toward the diaphragm spring (e.g., toward that side of the diaphragm spring which confronts the pressure plate or toward that side of the diaphragm spring which confronts the housing), and means for adjusting the rings. The adjusting means can comprise a displacing device which is turnable (at least in part) about the predetermined axis and means for turning the displacing device (or a portion of the displacing device) about the predetermined axis.

The one component preferably constitutes one of the first and second components, i.e., the two rings can be carried by the housing or by the pressure plate of the improved friction clutch.

The aforementioned displacing device of the adjusting means forming part of the wear compensating means can comprise ramps, e.g., a set of ramps on one of the rings, a complementary second set of ramps on the pressure plate or on the housing, a third set of ramps on the other ring and a complementary fourth set of ramps on the pressure plate or the housing.

The arrangement is preferably such that at least one portion of a plurality of portions forming part of the diaphragm spring and located at different radial distances from the predetermined axis bears against one of the two rings in the engaged condition of the friction clutch to thereby prevent turning of at least a portion of the displacing device, particularly of the two rings and their (first and third) ramps relative to the pressure plate, the housing or the diaphragm spring and the complementary (second and fourth) ramps. The displacing device can include a first displacing unit for the one ring and a second displacing unit for the other ring. The wear compensating means can further comprise a wear detector which arrests the second displacing unit to prevent adjustment of the other ring but permits the second displacing unit to adjust the other ring in the engaged condition of the friction clutch after the friction linings have undergone at least some wear (i.e., an amount of wear which is detectable by and can be compensated for by the wear compensating means). The wear detector (e.g., a leaf spring or a resilient membrane) is operative to prevent adjustment of the other ring during disengagement of the friction clutch. Such wear compensating means can further comprise means (e.g., in the form of radially extending arms on the two rings) for blocking adjustment of the one ring prior to adjustment of the other ring and for permitting adjustment of the one ring upon completed adjustment of the other ring as a result of subsequent disengagement of the friction clutch.

The rings are rotatable (turnable) relative to each other about the axis of the pressure plate, and the means for turning can comprise coil springs and/or other suitable energy storing elements which bias the rings to turn about the axis of the pressure plate by urging the first and third ramps to move relative to the second and fourth ramps, respectively.

The conicity of the diaphragm spring is changed as a function of wear upon the friction linings of the clutch disc. The aforementioned wear detector of the improved wear compensating means prevents adjustment of the rings during disengagement of the friction clutch but permits adjustment of the rings in response to a change of conicity of the diaphragm spring as a result of wear upon the friction linings. The pressure plate is moved by the diaphragm spring through a distance which is commensurate with the extent of wear upon the friction linings.

The wear compensating means can operate between the housing and the diaphragm spring or between the pressure plate and the diaphragm spring. The entire wear compensating means or at least a portion thereof can be installed between the housing and the diaphragm spring or between the diaphragm spring and the pressure plate, as seen in the direction of the axis of rotation of the pressure plate, counterpressure plate, housing, clutch disc and diaphragm spring.

The rings are movable in the direction of the aforementioned axis in response to engagement and disengagement of the friction clutch if the one component (such component carries the rings) is the pressure plate, i.e., a component which is movable in the direction of its rotational axis toward and away from the counterpressure plate.

The rings do not share the axial movements of the pressure plate during engagement and disengagement of the friction clutch if they are mounted on a component other than the one including the pressure plate, such as the first component including the rotary housing or cover of the friction clutch.

The aforementioned wear detector of the wear compensating means can be designed to include means for preventing adjustment of at least one of the two rings during disengagement of the friction clutch, preferably for preventing adjustment of at least one of the rings with a variable force. The arrangement is preferably such that the variable force increases in response to progressing disengagement of the friction clutch.

As already mentioned above, the rings are preferably rotatable about the axis of the pressure plate, and the displacing device (such as the aforedescribed device including sets of ramps on the rings and sets of complementary ramps on the pressure plate or on the housing) includes means for moving the rings in the direction of the aforementioned axis in response to rotation of the rings by the turning means (e.g., turning means including coil springs at least one of which reacts against the one component and bears against one of the rings and at least one other of which reacts against the one ring and bears against the other ring). The wear detector (this wear detector prevents rotation of at least one of the rings in the engaged condition of the friction clutch) of the wear compensating means in such a friction clutch can comprise at least one section which is resilient in the direction of rotational axis of the pressure plate to bias the at least one ring and one of the components (such as the sixth component including the diaphragm spring) in the engaged condition of the friction clutch and in the absence of wear or after completion of the compensation for wear upon the friction linings—with a force which prevents rotation of the at least one ring under the action of the turning means. The at least one section of the wear detector permits the at least one ring to be rotated by the turning means and the corresponding unit of the displacing device in the engaged condition of the friction clutch. The at least one section of the wear detector is designed to at least reduce the aforementioned rotation preventing force depending on the change of conicity of the diaphragm spring in response to wear upon the friction linings. Otherwise stated, the at least one section of the wear detector is designed to at least reduce the aforementioned rotation preventing force depending on the extent of axial movement of the pressure plate in response to wear upon the friction linings. The turning means is further designed to overcome the inertia of the at least one ring to thus rotate the at least one ring about the aforementioned axis when such ring is free to turn in order to compensate for wear upon the friction linings.

The aforementioned at least one section of the wear detector can be made of a resilient material, e.g., sheet metal. For example, the at least one resilient section of the wear detector can include or constitute a leaf spring or a diaphragm spring, and such at least one resilient section is preferably installed in the friction clutch in a prestressed condition, i.e., so that it stores at least some energy.

The wear detector of the improved wear compensating means can be fastened to the diaphragm spring of the sixth component of the improved friction clutch by rivets and/or in another suitable way.

The wear detector can be constructed and mounted in such a way that it includes a first portion disposed at a first radial distance from the rotational axis of the pressure plate and affixed to the diaphragm spring, and a second portion disposed at a different second radial distance from the axis and bearing against one of the rings. Such wear detector can further comprise a third portion which bears against the diaphragm spring. The first portion of the just-outlined wear detector can be resilient, and the second portion of such wear detector can be spaced apart from the housing when the friction clutch is in the engaged condition, but is moved toward the housing by the pressure plate in response to disengagement of the friction clutch.

The wear detector (e.g., a composite wear detector) can be constructed, assembled and installed to prevent adjustment of at least one of the two rings during disengagement of the friction clutch. Such a wear detector can be provided on the at least one ring, and this ring can comprise a plurality of at least substantially coaxial annular sections which are biased (preferably by the wear detector) axially and away from each other. The at least one ring can include an undulate resilient washer or it can comprise two concentric rings with one or more springs between them to bias the concentric rings axially and away from each other to the extent determined by suitable stops, e.g, the heads of rivets or the like.

As already mentioned above, the means for turning the rings of the wear compensating means in order to account for wear upon the friction linings can include one or more springs, e.g., at least one first coil spring which reacts against the one component (carrying the rings) and bears against one of the two rings, and at least one second coil spring which reacts against the one ring and bears against the other ring in order to change the angular position of the other ring relative to the one ring. The springs which bias the two rings of the wear compensating means can be installed to operate in series. The at least one first spring can store more energy than the at least one second spring, i.e., the at least one (first) spring can turn the one ring (upon completed turning of the other ring) against the opposition of the at least one second spring.

The displacing device and the turning means of the improved wear compensating means can be designed to operate in such a way that one of the rings is rotated about the axis of the pressure plate in a predetermined direction ahead of the other ring. The aforementioned arms or other suitable abutments of blocking means on or at the rings ensure that rotation of the other ring is blocked prior to rotation of the one ring. The abutment of the other ring is preferably located behind the abutment of the one ring (as seen in the direction of rotation of the rings to compensate for wear upon the friction linings), and the abutment of the other ring engages the abutment on the one ring prior to rotation of the one ring ahead of the other ring. The extent of angular movement of the one ring is indicative of the extent of wear upon the friction linings, and the other ring is thereupon rotated until arrested by the abutment of the one ring to thus effect a requisite axial displacement of the pressure plate in a direction toward the counterpressure plate and to thereby effect a change of conicity of the diaphragm spring as well as to compensate for wear upon the friction linings.

The diaphragm spring of the sixth component can form part of the wear compensating means. For example, such diaphragm spring can serve as a means for preventing rotation of one of the two rings in the disengaged condition of the friction clutch. Thus, the diaphragm spring of the sixth component of the friction clutch can be used to prevent adjustment of the one ring in the disengaged condition of the friction clutch.

One of the two rings is or can be spaced apart from another of the seven components of the friction clutch (for example, from the diaphragm spring of the sixth component) in the engaged condition of the friction clutch by a distance which is at least reduced in the disengaged condition of the clutch. The one ring or the other component is movable in the direction of the rotational axis of the pressure plate relative to the other component or the one ring.

If the diaphragm spring of the sixth component of the improved friction clutch forms part of the wear compensating means, it can be designed to bias one of the two rings against the housing (provided that the two rings are installed between the housing and the diaphragm spring) in the disengaged condition of the friction clutch. Alteratively, the diaphragm spring can constitute one of two or more means for biasing the one ring against the housing, or the one ring can be biased against the housing by a part other than the diaphragm spring of the sixth component of the friction clutch.

The arrangement can be such that, if at least one of the two rings is installed between the pressure plate and the diaphragm spring, the at least one ring can be biased against the diaphragm spring in the disengaged condition of the friction clutch. It is even possible to mount at least one of the rings between the pressure plate and the diaphragm spring and to cause the at least one ring to bear against the housing in the disengaged condition of the friction clutch.

The construction of the improved friction clutch can be such that the diaphragm spring abuts one of the two rings at a first radial distance from the rotational axis of the pressure plate and that the diaphragm spring abuts one of the first, second, third, fourth and fifth components at a second radial distance from the axis. The difference between the radial distances of the two rings from each other can constitute at least 30 percent of the difference between the first and second radial distances. The design of the friction clutch can be such that the difference between the first and second radial distances at least approximates the difference between the radial distances of the two rings from the axis.

The wear detector of the wear compensating means can be designed and mounted to undergo deformation through a first distance in response to disengagement of the friction clutch, and the pressure plate is movable in response to disengagement of the friction clutch in the direction of its rotational axis through a second distance which at least approximates the first distance.

At least one of the rings can be provided on the housing and the wear detector can include a portion which is movable relative to the diaphragm spring through a distance $S \geq SD \times (L2:L1)$ wherein SD is the distance covered by the pressure plate for disengagement of the friction clutch, L1 is the difference of radial distances of the two rings from the rotational axis of the pressure plate, and L2 is the difference between the radial distance of one of the rings and the radial distance of a location of contact between the diaphragm spring and the pressure plate.

If the friction clutch is a pull-type friction clutch (i.e., if the means for disengaging it includes means for pulling a portion of the diaphragm spring to disengage the clutch) and the rings of the wear compensating means are disposed between the diaphragm spring and the housing, the diaphragm spring can constitute a one-armed lever privotable or tiltable relative to the ring which is more distant from the axis of the pressure plate, at least during a first stage of disengagement of the friction clutch.

Alternatively, a pull-type friction clutch which embodies the present invention can be constructed in such a way that the diaphragm spring constitutes a one-armed lever privotable or tiltable relative to the ring which is more distant from the axis of the pressure plate during disengagement of the friction clutch. The rings of the wear compensating means in such a friction clutch can be located between the pressure plate and the diaphragm spring.

If the friction clutch is a push-type friction clutch (i.e., if the means for engaging and disengaging includes a bearing or other means for pushing a portion of the diaphragm spring during disengagement of the clutch), the diaphragm spring can constitute a two-armed lever which is pivoted relative to the ring located radially inwardly of the other ring, at least during a certain stage of the disengagement of the friction clutch. The rings of the wear compensating means in such a push-type friction clutch are or can be located between the diaphragm spring and the pressure plate.

Alternatively, a push-type friction clutch which embodies the present invention can be constructed in such a way that the two rings of the wear compensating means are located between the housing and the diaphragm spring and the diaphragm spring constitutes or acts not unlike a two-armed lever which is pivoted relative to the radially outer ring of the two rings during a phase of disengagement of the friction clutch.

The complementary ramps of the displacing device in the wear compensating means can be of one piece with the housing; for example, they can be stamped into the end wall of the housing. The housing can be provided with one or more passages, particularly, between neighboring ramps of the second and/or fourth set of ramps, to permit the flow of cool atmospheric air or another coolant which withdraws heat from the pressure plate, from the diaphragm spring, from the sensor, from the wear detector and/or from the friction linings of the clutch disc.

Alteratively, the ramps which are complementary to the ramps on the two rings can be provided directly on the pressure plate. It is also possible to provide the pressure plate with a separately produced attachment, which is or which can be of one piece with the complementary ramps, to support the ramps of the two rings. Furthermore, the pressure plate and its attachment can define at least one recess which serves as a channel for the flow of a coolant, preferably at least in part radially of the pressure plate.

A seat for the diaphragm spring of the sixth component of the improved friction clutch can be provided on or installed in or on one of the two rings forming part of the wear compensating means.

If the friction clutch is a push-type clutch, at least a portion of the wear compensating means can be disposed between the diaphragm spring and the housing, and the clutch can further comprise a resilient sensor bearing against one side of the diaphragm spring, namely against that side which faces away from the aforementioned portion of the wear compensating means.

The sensor can be made of a resilient material and can define for the diaphragm spring a fulcrum to permit tilting of the diaphragm spring, at least during a first stage of disengagement of the friction clutch. The arrangement can be such that a radially outer portion of the diaphragm spring engages one of the two rings upon completion of the first stage of disengagement of the clutch, and the diaphragm spring thereupon pivots relative to the one ring during a second stage of disengagement of the friction clutch. The one ring is that ring which is disposed radially outwardly of the other ring, i.e., at a greater distance from the rotational axis of the pressure plate.

If the wear compensating means is disposed between the diaphragm spring and the pressure plate, the resilient sensor can be provided with means reacting against the housing or against the pressure plate and with means for bearing against the pressure plate or against the housing.

Another feature of the present invention resides in the provision of an engageable and disengageable friction clutch which can be utilized with advantage in motor vehicles and comprises an axially fixed component (such as a clutch housing or cover) which is rotatable about a predetermined axis, a pressure plate, means (e.g., a set of leaf springs) for non-rotatably connecting the pressure plate to the component with freedom of movement in the direction of the predetermined axis, a rotary counterpressure plate which is adjacent the pressure plate, a torque transmitting clutch disc which is disposed between the two plates and has friction linings which are subject to wear in response to repeated engagement and disengagement of the clutch, a diaphragm spring which is installed between the component and the pressure plate to normally bias the pressure plate toward the clutch disc so that the friction linings are clamped between the two plates, and means for automatically compensating for wear at least upon the friction linings. The compensating means is disposed between the diaphragm spring and the component.

A further feature of the invention resides in the provision of an engageable and disengageable friction clutch which can be utilized with advantage in the power trains of motor vehicles and comprises an axially fixed component (such as the housing or cover of the friction clutch) which is rotatable about a predetermined axis, a pressure plate, means (such as a set of leaf springs) for non-rotatably connecting the pressure plate to the component with freedom of movement in the direction of the predetermined axis, a rotary counterpressure plate which is adjacent the pressure plate, a torque transmitting clutch disc which is disposed between the two plates and has friction linings subject to wear in response to repeated engagement and disengagement of the clutch, a diaphragm spring which is disposed between the component and the pressure plate to normally (such as when the friction clutch is engaged) bias the pressure plate toward the clutch disc so that the friction linings are clamped between the two plates, and means for automatically compensating for wear at least upon the friction linings. The compensating means comprises concentric adjustable first and second rings which are respectively disposed at first and second radial distances from the predetermined axis and are displaceable in the direction of such axis toward the diaphragm spring, and means for adjusting the rings including first and second displacing units having portions turnable about the predetermined axis and means for turning such portions of the displacing units to thereby displace the respective rings in the direction of the predetermined axis toward the diaphragm spring. The latter includes a portion which is disposed at a first radial distance from the predetermined axis and bears upon one of the rings in the engaged condition of the clutch to thus prevent turning of the aforementioned portion of the respective displacing unit (for the one ring). The compensating means of such friction clutch further comprises a wear detector (e.g., a membrane or a diaphragm spring) having a portion which bears upon the other ring at a second radial distance from the predetermined axis to exert a first force sufficient to prevent turning of the aforementioned portion of the respective displacing unit (namely the displacing unit for the other ring) in the absence of wear upon the friction linings, a lesser second force (e.g., zero force) in response to detected wear in the engaged condition of the clutch to thus permit axial displacement of the other ring through a distance commensurate with the extent of initial wear or uncompensated wear upon the friction linings, and with a third force greater than the second force during disengagement of the clutch. Each of the two displacing units can further comprise at least one first ramp provided on the pressure plate or on the component for each of the two rings, and the aforementioned portions of the displacing units can comprise second ramps provided on the rings and abutting the respective first ramps.

An additional feature of the present invention resides in the provision of an engageable and disengageable friction clutch which can be utilized with particular advantage in power trains between the engines and the wheels of motor vehicles and comprises a housing which is rotatable about a predetermined axis, a pressure plate, means (such as a set of leaf springs) for non-rotatably attaching the pressure plate to the housing with limited freedom of movement in the direction of the predetermined axis, a rotary counterpressure plate which is adjacent and coaxial with the pressure plate, a torque transmitting clutch disc which is disposed between the two plates and has friction linings subject to wear in response to repeated engagement and disengagement of the clutch, a diaphragm spring which is installed between the housing and the pressure plate to normally bias the pressure plate toward the clutch disc so that the friction linings are clamped between the two plates, and means for automatically compensating for wear at least upon the friction linings. The compensating means comprises at least two of the following constituents or features:

(a) First and second rings which are disposed at different radial distances from the predetermined axis and are displaceable in the direction of such axis toward the diaphragm spring, and means for adjusting the rings including first and second displacing units (for example, sets of ramps) as well as means for turning portions of the displacing units to thereby displace the respective rings in the direction of the predetermined axis.

(b) The diaphragm spring includes a portion which is disposed at a given radial distance from the predetermined axis and bears upon one of the rings in the engaged condition of the clutch to thus prevent adjustment of the one ring.

(c) The compensating means comprises a wear detector having a portion bearing upon the other ring at a radial distance from the predetermined axis other than the given distance, to prevent adjustment of the other ring in the absence of wear upon the friction linings, to permit adjustment of the other ring in response to detection of sufficient wear upon the friction linings with attendant axial displacement of the other ring, and to prevent adjustment of the other ring during disengagement of the clutch.

(d) The compensating means comprises means (e.g., in the form of arms or other abutments on the rings) for blocking adjustment of the one ring except subsequent to adjustment of the other ring and to an extent which is commensurate with (e.g., identical to) adjustment of the other ring.

A further feature of the present invention resides in the provision of a repeatedly engageable and disengageable friction clutch which comprises a rotary counterpressure plate, a pressure plate which is coaxial with and rotatable with the counterpressure plate, and a clutch disc which is coaxial with and has friction linings disposed between the two plates. The pressure plate has a side which faces away from the friction linings of the clutch disc and the clutch further comprises a seat adjacent the aforementioned side of the pressure plate and a diaphragm spring which is tiltably mounted in or on the seat and bears against the pressure plate in the engaged condition of the clutch with a force to maintain the plates in frictional engagement with the friction linings. Such friction linings undergo wear as a result of repeated engagement and disengagement of the clutch, and the latter further comprises means for compensating for wear at least upon the friction linings. The pressure plate is movable axially of and away from the counterpressure plate to and beyond a position in which the pressure plate ceases to bear upon the friction linings during disengagement of the clutch, and the clutch further comprises resilient means serving to apply to the diaphragm spring a force during movement of the pressure plate beyond the aforementioned position so that the force of the resilient means at least substantially matches the force of the diaphragm spring.

The friction linings can include at least one first friction lining which is adjacent the pressure plate and at least one second friction lining which is adjacent the counterpressure plate. Such clutch disc can further comprise means (e.g., in the form of resilient segments) for biasing the first and second linings away from each other.

The resilient means can comprise a compensating spring which is integrated into the clutch. For example, the resilient means can comprise at least one diaphragm spring.

The diaphragm spring which bears upon the pressure plate in the engaged condition of the clutch to maintain the friction surfaces of the two plates in frictional engagement with the friction linings of the clutch disc in the engaged condition of the clutch can be selected in such a way that its characteristic distance-to-force curve denotes the magnitude of the bias during different stages of disengagement of the clutch, and the resilient means can include at least one second spring having a second distance-to-force characteristic curve. The two curves include portions which correspond to the bias of the respective springs during movement of the pressure plate beyond the aforementioned position, and such portions of the two curves preferably depart from each other.

The just mentioned portions of the two curves can indicate that the bias of the at least one second spring is counter to the bias of the diaphragm spring during movement of the pressure plate beyond the aforementioned position.

The compensating means can comprise means for moving the seat for the diaphragm spring toward the counterpressure plate through distances corresponding to the extent of wear upon the friction linings.

BRIEF DESCRIPTION OF THE DRAWINGS

The novel features which are considered as characteristic of the invention are set forth in particular in the appended claims. The improved friction clutch itself, however, both as to its construction and the mode of assembling and manipulating the same, together with additional features and advantages thereof, will be best understood upon perusal of the following detailed description of certain presently preferred specific embodiments with reference to the accompanying drawings, wherein:

FIG. 5 is a plan view of a second annular adjusting or wear compensating member which is utilized in the adjusting or wear compensating device or unit of the friction clutch shown in FIGS. 1 and 2;

FIG. 6 is a fragmentary sectional view substantially as seen in the direction of arrows from the line VI—VI in FIG. 5;

FIG. 7 is a plan view of a torsion spring which is utilized in the adjusting unit of the friction clutch shown in FIGS. 1 and 2;

FIG. 7a is an end elevational view of the torsion spring;

FIG. 9 is a diagram wherein the curves denote variations of certain characteristics of a resilient sensor in the friction clutch of FIGS. 1 and 2;

FIG. 11 is a diagram with curves denoting the reduction of forces acting upon the housing and upon the sensor of the friction clutch of FIGS. 1 and 2 during disengagement of the friction clutch;

FIG. 20 is a fragmentary elevational view as seen from the upper side of FIG. 21 and illustrates a fourth friction clutch;

FIG. 20a illustrates, in a partial sectional view, a detail as seen in the direction of arrow XXa in FIG. 20;

FIG. 21 is a sectional view substantially as seen in the direction of arrows from the line XXI—XXI in FIG. 20;

FIG. 22 is a fragmentary plan view of an annular adjusting or wear compensating member which can be utilized in the adjusting or wear compensating device or unit of the fourth friction clutch;

FIG. 23 is a fragmentary axial sectional view of a fifth friction clutch;

FIG. 24 is a fragmentary axial sectional view of a sixth friction clutch;

FIG. 30 is a fragmentary axial sectional view of an eleventh friction clutch;

FIG. 31 is a fragmentary plan view substantially as seen in the direction of arrow XXXI in FIG. 30;

FIG. 32 is a fragmentary sectional view substantially as seen in the direction of arrows from the line XXXII—XXXII in FIG. 31;

FIG. 40 is an axial sectional view of an aggregate embodying a friction clutch and a twin-mass flywheel which transmits torque from the output element of an engine in a motor vehicle to the housing of the friction clutch;

FIG. 41 is a fragmentary axial sectional view of a preassembled aggregate employing a friction clutch and further showing the manner of insulating the friction clutch from stray movements of the output element of the engine in a motor vehicle;

FIG. 42 is a fragmentary axial sectional view of a preassembled aggregate which constitutes a modification of the aggregate shown in FIG. 41;

FIG. 48 shows an opposing adjusting ring which is utilized in the clutch assembly of FIG. 43, the view being taken in the direction of arrow XLV in FIGS. 43 or 44;

FIG. 49 is a sectional view as seen from the line IL—IL in FIG. 48;

FIG. 64 is a view similar to that of FIG. 63 but with the diaphragm spring in a position subsequent to tilting beyond the position of FIG. 63;

FIG. 64a is a view similar to that of FIG. 62a or 63a and showing that the positions of the rings do not change in response to tilting of the diaphragm spring to the position of FIG. 62;

FIG. 65 is a view similar to that of FIG. 62 but showing the diaphragm spring in a position tilted back beyond the position of FIG. 62;

FIG. 65a is a view similar to that of FIG. 64a but showing one of the two rings in a different position subsequent to an angular adjustment to compensate for wear upon the friction linings of the clutch disc;

FIG. 66 is a view similar to that of FIG. 65 but showing the diaphragm spring in a position corresponding to the reengaged condition of the friction clutch upon completed adjustment of the pressure plate to compensate for wear upon the friction linings;

FIG. 66a is a view similar to that of FIG. 65a but further showing the other ring of the wear compensating unit in a different angular position in which the pressure plate is maintained in the axial position of FIG. 66;

FIG. 69 is a fragmentary axial sectional view of a pull-type friction clutch embodying still another wear compensating unit;

FIG. 70 is a fragmentary sectional view of the friction clutch of FIG. 69 in a view similar to that of FIG. 60;

FIG. 71 is a fragmentary elevational view of the diaphragm spring and of a wear detector in the friction clutch of FIGS. 69 and 70, substantially as seen from the left-hand side of FIG. 69;

FIG. 74 is a fragmentary elevational view of a diaphragm spring and of a wear detector which can be utilized in lieu of the wear detector in the wear compensating unit of the friction clutch shown in FIGS. 59 to 66a;

FIG. 76 is a diagram showing the characteristic curves of the diaphragm spring in the friction clutch of FIGS. 59 to 66a;

FIG. 77 is a diagram showing the characteristic curves of a resilient sensor in the wear compensating unit of the friction clutch shown in FIGS. 59 to 66a;

FIG. 81 is an axial sectional view of an additional friction clutch which embodies the invention;

FIG. 82 is a fragmentary elevational view as seen in the direction of arrow LXXXII in FIG. 81;

FIG. 88 is a fragmentary axial sectional view of a friction clutch constituting still another modification of the friction clutch of FIG. 81;

FIG. 88a illustrates a detail in the friction clutch of FIG. 88;

FIG. 88b illustrates the structure of FIG. 88a in different angular positions of two rotary components relative to each other;

FIG. 90 is a fragmentary axial sectional view of a friction clutch constituting a modification of the friction clutch shown in FIGS. 88, 88a and 88b;

DESCRIPTION OF PREFERRED EMBODIMENTS

Figure 1:
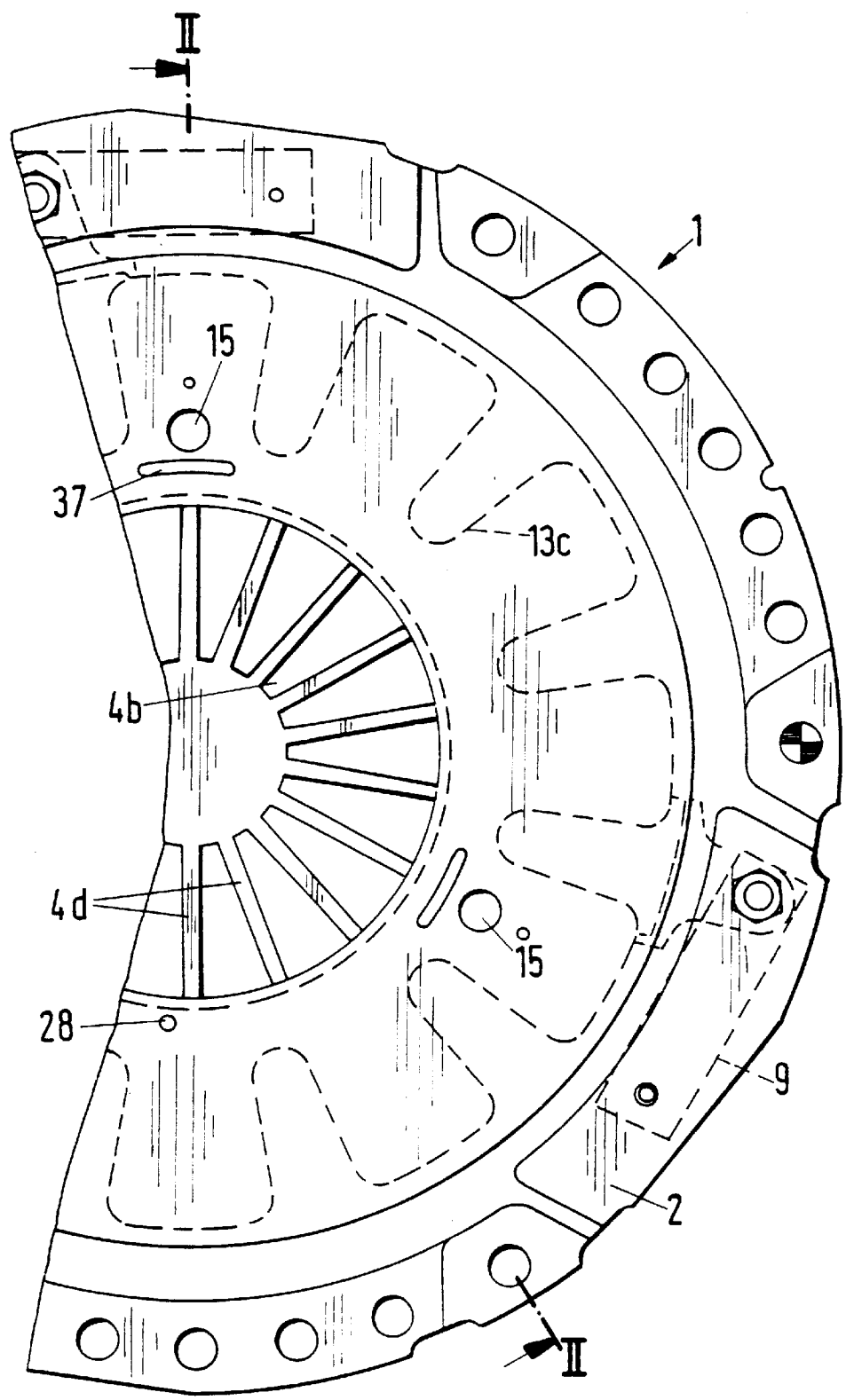
FIG. 1 is a fragmentary elevational view as seen from the right-hand side of FIG. 2 and shows a friction clutch which embodies one form of the present invention.
Figure 2:
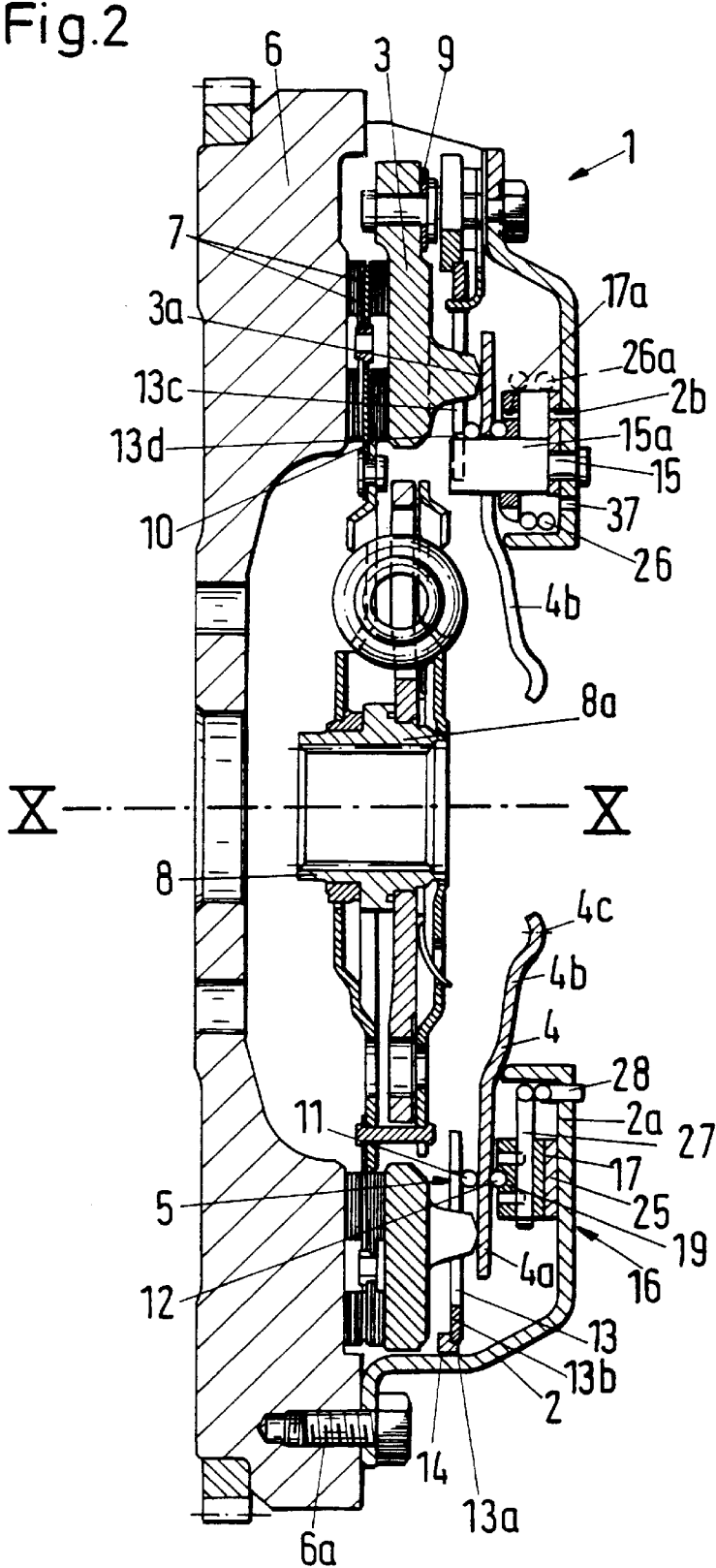
FIG. 2 is a sectional view substantially as seen in the direction of arrows from the line II—II in FIG. 1.

Referring first to FIGS. 1 and 2, there is shown a torque transmitting friction clutch 1 which comprises a housing or cover 2 and a pressure plate 3 which is non-rotatably but axially movably (within limits) connected to the cover 2. A resilient device in the form of a diaphragm spring 4 (hereinafter also called clutch spring) is installed, in stressed condition, between the bottom wall or end wall or bottom end wall 2a of the cover 2, and the pressure plate 3 so as to bias the pressure plate in a direction to the left, as viewed in FIG. 2, namely against the adjacent set of friction linings 7 forming part of a torque transmitting clutch plate or clutch disc 8. The diaphragm spring 4 is tiltable relative to the cover 2 at a location which is determined by a composite annular seat assembly 5 (hereinafter called seat or composite seat for short) carried by the bottom wall 2a. The normal stressed condition of the diaphragm spring 4 is such that it urges the pressure plate 3 against the adjacent set of friction linings 7 of the clutch disc 8 whereby a second set of friction linings 7 forming part of the clutch disc bears against the adjacent friction surface of a rotary counterpressure plate 6 here shown as a flywheel and hereinafter called flywheel for short. The illustrated clutch disc 8 comprises a centrally located hub 8a which can be installed on the input shaft (not shown) of a variable-speed transmission in a motor vehicle and carries the two sets of friction linings 7 with resilient segments 10 between the such sets. The clutch 1 is engaged and the flywheel 6 transmits torque to the input shaft of the transmission when the two sets of friction linings 7 of the clutch disc 8 are clamped between the neighboring friction surfaces of the pressure plate 3 and flywheel 6.

The means for connecting the pressure plate 3 with the cover 2 comprises several circumferentially extending leaf springs 9 (see particularly FIG. 1) which hold the pressure plate 3 against rotation but permit it to move, within limits, axially of the cover 2. The purpose of the resilient segments 10 between the two sets of friction linings 7 forming part of the clutch disc 8 is to establish a progressive buildup (variation) of torque during engagement of the friction clutch 1. Such resilient segments permit limited axial shifting of the two sets of friction linings 7 toward each other to thus establish a progressive increase of axial forces which act upon the friction linings. However, it is equally within the purview of the invention to employ a clutch disc which replaces the illustrated clutch disc 8 and comprises one or two sets of friction linings 7 having no freedom of axial movement relative to each other. Such friction linings can be glued or otherwise affixed to opposite sides of a suitable plate-like carrier surrounding the hub of the modified clutch disc. In such modified friction clutch, one could employ a "substitute" for the resilient segments 10, namely one or more resilient elements in series with the diaphragm spring 4. For example, one could employ one or more resilient elements between the cover 2 and the adjacent portion or seat 12 of the composite seat 5 and/or between the diaphragm spring 4 and the pressure plate 3. Alternatively or in addition to such "substitutes", one can employ a resilient cover 2.

The illustrated diaphragm spring 4 comprises a circumferentially complete annular main or primary portion 4a which is adjacent one or more axially extending protuberances or portions 3a of the pressure plate 3 and serves to generate the major part of forces which are necessary to bias the pressure plate 3 against the adjacent friction linings 7 so as to urge the other set of friction linings against the friction surface of the flywheel 6. The main or primary portion 4a of the diaphragm spring 4 carries radially inwardly extending yieldable prongs 4b having radially innermost portions or tips 4c engageable by a bearing, a pedal or another component which forms part of means for disengaging the friction clutch 1. The main or primary portion 4a of the diaphragm spring 4 includes a radially outer part which engages the portion or portions 3a of the pressure plate 3, and a radially inner part which is disposed between the two portions or seats 11 and 12 of the composite seat 5. Such radially inner part of the main or primary portion 4a is tiltable between the portions 11 and 12 in order to move the radially outer part of the diaphragm spring 4 toward or away from the flywheel 6, i.e., to engage or disengage the clutch 1.

The illustrated portions or seats 11 and 12 of the composite seat 5 are wire rings which flank the radially inner part of the main or primary portion 4a of the diaphragm spring 4 at a location radially inwardly of the portion or portions 3a of the pressure plate 3. A resilient distance or displacement monitoring sensor 13, here shown as a diaphragm spring, is provided to bias the inner ring 11 of the composite seat 5 toward the bottom wall 2a of the cover 2. The illustrated resilient sensor 13 in the form of a diaphragm spring can be replaced by other biasing means without departing from the spirit of the invention. The annular radially outer portion 13b of the sensor 13 is circumferentially complete and comprises an outermost part or portion 13a which reacts against an abutment 14 at the inner side of the cover 2. The sensor 13 further comprises radially inwardly extending resilient tongues 13c which bear upon the adjacent side of the ring 11.

The abutment 14 for the radially outermost part 13a of the annular portion 13a of the sensor 13 can comprise a circumferentially complete annulus which is welded or otherwise secured to the inner side of the cover 2. Alternatively, the abutment 14 can comprise two or more arcuate sections which are affixed to the inner side of the cover 2 to be engaged by the adjacent portion 13b of the sensor 13. The individual segments or portions of the abutment 14 can be bonded, riveted or otherwise affixed to the cover 2. It is also possible to provide an abutment 14 consisting of one or more projections which are of one piece with the cover 2 and are configurated to extend into the path of leftward movement (reference being had to FIG. 2) of the radially outermost part 13a of the sensor 13. Such abutment can consist of radially inwardly deformed portions of the cover 2 or it can include one or more lugs or prongs which are bent from the adjacent portion of the cover to thus establish holes in the cover adjacent the radially outermost part 13a of the sensor 13. The making of such inwardly extending portions, lugs or prongs can take place subsequent to installation of the sensor 13 in the interior of the cover 2. The sensor 13 can be stressed as a result of the making of the abutment 14, or the sensor is already maintained in stressed condition at the time when the abutment 14 is either installed or formed as an integral part of the cover 2.

It is also possible to provide a more pronounced connection between the sensor 13 and the abutment 14. For example, it is possible to provide a bayonet mount which can establish a positive but separable connection between the sensor 13 and the abutment 14. The configuration of the bayonet mount can be such that the sensor 13 can be installed in the cover 2 to have its radially outermost part 13a located to the left of the abutment 14, as viewed in FIG. 2. The radially outermost part 13a is then shifted axially toward the bottom wall 2a of the cover 2 to stress the sensor 13 and to cause such radially outermost part 13a to advance over the adjacent portion or portions of the abutment 14. The next step involves turning of the sensor 13 relative to the abutment 14 and/or vice versa so as to releasably lock the radially outermost part 13a of the sensor in the position which is shown in FIG. 2, namely at the right-hand side of the abutment 14. In such friction clutches, the radially outermost part 13a of the sensor 13 can comprise a plurality of prongs or arms extending radially outwardly beyond the circumferentially complete annular portion 13b of the sensor. The abutment 14 then comprises a plurality of recesses or tooth spaces, which permit the prongs of the sensor 13 to pass therethrough before the sensor is turned so that its prongs are moved out of alignment with the tooth spaces of the abutment 14.

The means for centering the diaphragm spring 4 and/or the sensor 13 in the cover 2 and for simultaneously preventing rotation of such springs relative to the pressure plate 3 comprises axially parallel rivets 15. Such rivets can further serve as a means for centering the rings 11 and 12 of the composite seat 5 in the cover 2. Each rivet 15 comprises an elongated shank 15a which extends in parallelism with the axis (X—X) of rotation of the clutch plate 8 and is anchored in the bottom wall 2a of the cover 2. The shanks 15a extend through slots 4d between the neighboring prongs 4b of the diaphragm spring 4. The tongues 13c of the sensor 13 comprise portions 13d which straddle the adjacent portions of the shanks 15a so that the rivets 15 hold the sensor 13 against rotation in the cover 2.

The resilient sensor 13 is designed to furnish a substantially constant force during a predetermined stage of its axial deformation. The purpose of the sensor 13 is to bias the ring 11 toward the bottom wall 2a of the cover 2 as well as to take up the clutch disengaging force when such force is being applied to the tips 4c of prongs 4b forming part of the diaphragm spring 4. Depression of the tips 4c in a direction to the left, as viewed in FIG. 2, results in tilting of the diaphragm spring 4 between the rings 11 and 12 of the composite seat 5 whereby the main or primary portion 4a of the spring 4 is moved away from the flywheel 6 so that the pressure plate 3 can be retracted by the leaf springs 9 and releases the adjacent set of friction linings 7. In other words, the clutch disc 8 ceases to rotate with the flywheel 6. The arrangement is such that a state of equilibrium, or a state at least closely approximating an equilibrium, exists between (a) that force which is generated upon the ring 11 during the application of a disengaging force to the tips 4c of the prongs 4b and (b) the counter force which is furnished by the sensor 13 and acts upon the ring 11. The term "disengaging force" is intended to denote that maximum force which must be applied to the tips 4c of the prongs 4b in order to disengage the friction clutch 1 against the bias of the sensor 13. Such disengaging force can also be applied to the prongs 4b by disengaging levers or by a pedal, not shown.

In accordance with a feature of the invention, the ring 12 between the diaphragm spring 4 and the bottom wall 2a of the cover 2 is biased by an adjusting or wear compensating device or unit 16 which is installed in the axial space between the cover and the diaphragm spring. The adjusting unit 16 ensures that, when the rings 11 and 12 of the composite seat 5 are shifted axially in a direction toward the pressure plate 3 and flywheel 6, no undesirable clearance will develop between the ring 12 and the cover 2. Otherwise stated, there will be no clearance between the ring 12 and the diaphragm spring 4. Such positioning of the ring 12 relative to the diaphragm spring 4 is desirable and advantageous because this ensures that there is no undesirable lost motion during actuation of the friction clutch 1 which, in turn, ensures optimum efficiency and superior operation of the friction clutch. Axial shifting of the rings 11 and 12 of the composite seat 5 toward the pressure plate 3 and flywheel 6 will take place as a result of wear upon the friction surfaces of the pressure plate 3 and flywheel 6 as well as (and particularly) due to wear upon the friction linings 7. However, the adjustment or compensation in accordance with the invention also takes place in response to wear upon the rings 11 and 12, upon those portions of the diaphragm spring 4 which are adjacent the rings 11, 12 (as seen in the direction of the axis X—X), upon those portions of the diaphragm spring 4 which engage the portion or portions 3a of the pressure plate 3, and upon the portion or portions 3a of the pressure plate. The exact mode of automatic operation of the adjusting unit 16 will be described in full detail with reference to the diagrams which are shown in FIGS. 8, 9, 10 and 11.

Figure 3:
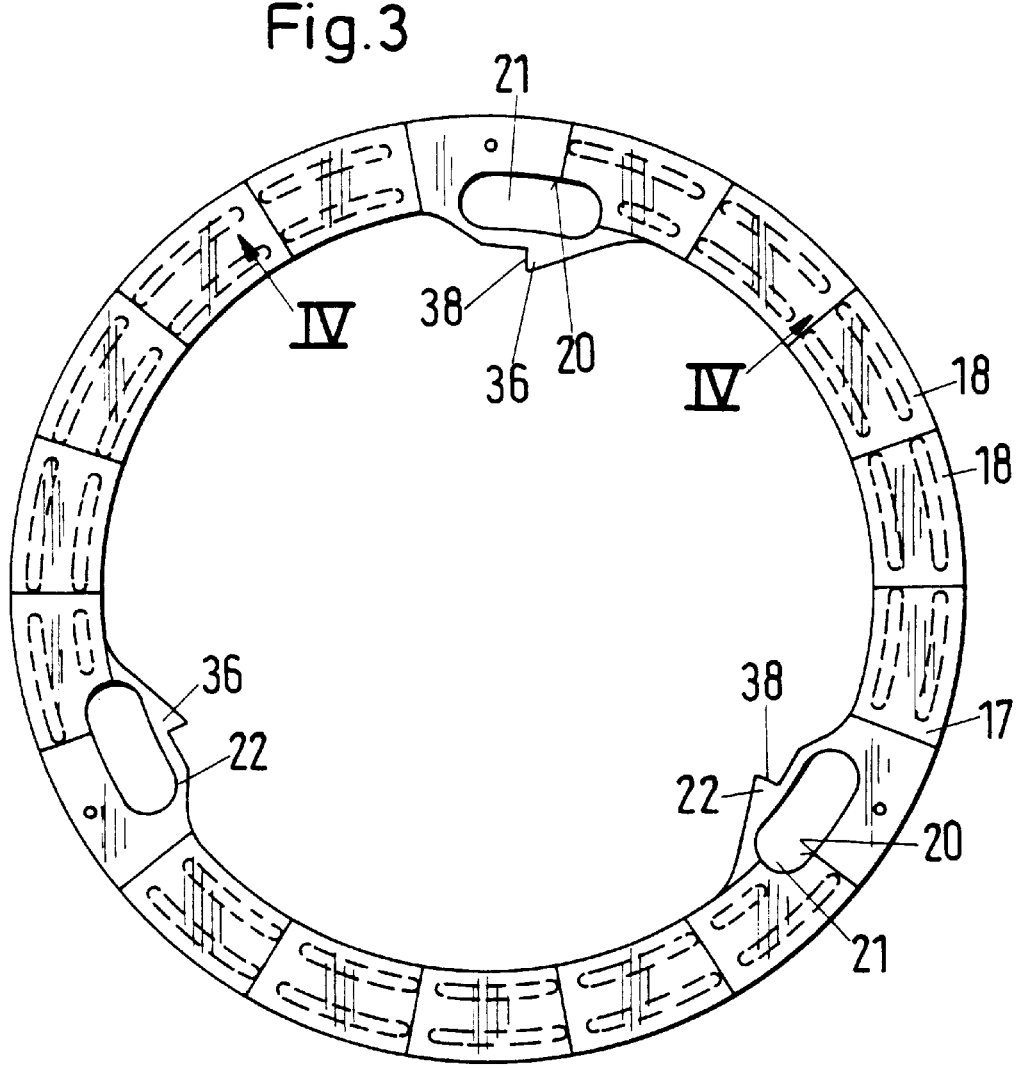
FIG. 3 is a plan view of a first annular adjusting or wear compensating member which is utilized in an adjusting or wear compensating unit or device of the friction clutch shown in FIGS. 1 and 2.
Figure 4:
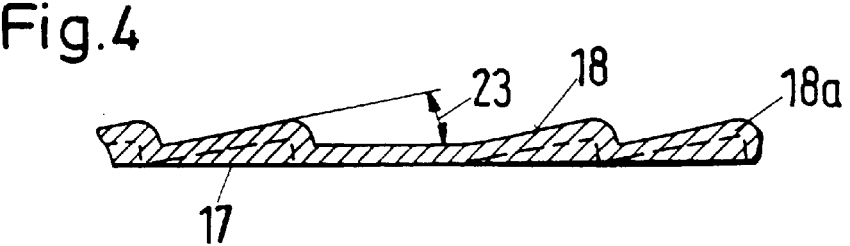
FIG. 4 is a fragmentary sectional view substantially as seen in the direction of arrows from the line IV—IV in FIG. 3.

The adjusting unit 16 comprises a spring-biased ring-shaped adjusting or wear compensating member 17 which is shown in FIGS. 3 and 4. This adjusting member is installed between the diaphragm spring 4 and the bottom wall 2a of the cover 2 and comprises a set of inclines or ramps 18. All of the ramps 18 are inclined in the same direction circumferentially of the adjusting member 17. When the member 17 is installed in the cover 2, its ramps 18 face the bottom wall 2a. That side of the member 17 which faces away from the bottom wall 2a is flat or substantially flat and is provided with a circumferentially extending groove 19 (FIG. 2) which receives a portion of the ring 12. In this manner, the ring 12 (which is centered by the shanks 15a of the rivets 15) centers the member 17 in the cover 2. The configuration of the groove 19 and/or of the adjacent portion of the adjusting member 17 can be such that the ring 12 is not only held against uncontrolled radial movements but is also held against axial movement relative to the member 17. For example, the configuration of the surface bounding the groove 19 can be such that the ring 12 can be received therein by snap action. Alternatively, the plane surface of the member 17 which faces away from the bottom wall 2a can be provided with spaced-apart projections or other configurations which enable the member 17 to clampingly or otherwise engage (e.g., by snap action) the adjacent portions of the ring 12 and to thus ensure that this ring is held against any uncontrolled radial and/or axial movements relative to the member 17.

If the temperature of the friction clutch 1 in the region of the adjusting unit 16 fluctuates within a wide range, it is advisable to provide for some compensatory movement between the ring 12 and the adjusting member 17 of the compensating unit 16. For example, this can be achieved by making the ring 12 a split ring so that it can expand or contract in the circumferential direction of the member 17. It is also possible to assemble the ring 12 of two, three or more discrete arcuate sections, i.e., to provide two or more interruptions in such ring in order to even more fully compensate for eventual pronounced fluctuations of the temperature of the compensating unit 16. This enables the ring 12 to conform its diameter to the varying diameter of the groove 19.

The member 17 which is shown in FIGS. 3 and 4 is made of a plastic material, for example, of a heat-resistant thermoplastic substance which can be reinforced by glass fibers or the like. This renders it possible to mass-produce the member 17 in an injection molding or other suitable machine. The utilization of an adjusting member 17 which is made of a plastic material having a low specific weight brings about the advantage that the mass inertia weight is reduced which entails a reduction of its sensitivity to fluctuations of pressure. It is also possible to make at least the portion or seat 12 of the composite seat 5 from a plastic material. However, it is equally within the purview of the invention to make the member 17 of a metallic sheet material or of a sintered metal. Still further, it is within the scope of the invention to make the ring 12 of one piece with the member 17. This is possible regardless of whether the member 17 is made of a metallic or plastic material. Analogously, the ring or seat 11 can be made of one piece with the sensor 13; all that is necessary is to provide the tongues 13c of the sensor 13 with suitable projections in the form of beads or the like which together constitute a composite or one-piece ring 11.

The rivets 15, and more particularly the shanks 15a of such rivets, preferably further constitute a means for centering the member 17 of the compensating unit 16 in the cover 2 of the friction clutch 1. The rivets 15 are preferably equidistant from each other in the circumferential direction of the cover 2. The shanks 15a extend through suitable openings 21 which are provided in the member 17 and are bounded by surfaces 20 which are engaged by the shanks 15a to thus center the member 17 in the cover 2. The illustrated openings 21 are elongated slots having a substantially constant width (as measured in the radial direction) and extend circumferentially of the member 17. These openings 21 are closely adjacent the radially inner portion of the member 17. As can be seen in FIG. 3, the member 17 further comprises lobes 22 which are disposed radially inwardly of the respective openings 21 and bound the radially inner portions of the adjacent openings.

The member 17 which is shown in FIG. 3 comprises three openings 21 and a total of five ramps 18 between each pair of neighboring openings. The slopes (note the angle 23 in FIG. 4) of the ramps 18 are selected in such a way that the ramps enable the member 17 to compensate for wear upon the pressure plate 3, flywheel 6 and friction linings 7 during the entire useful life of the friction clutch 1. The same applies for the length of the openings 21 in the circumferential direction of the member 17. Such length is selected with a view to permit an angular adjustment of the member 17 relative to the bottom wall 2a of the cover 2 which is necessary to compensate for the aforediscussed wear upon the pressure plate 3, flywheel 6 and friction linings 7 as well as, if necessary, for wear upon the friction clutch itself and, e.g., for the wear upon the rings or seats 11, 12, those portions of the diaphragm spring 4 which are disposed between the rings 11, 12, the portion or portions 3a of the pressure plate 3 and/or the diaphragm spring at the portion or portions 3a. The length of the openings 21 can be selected in such a way that the member 17 is free to perform an angular movement in the range of between 8° and 60°, preferably within a range of between 10° and 30°. In the embodiment which is illustrated in FIG. 3, the angular adjustability of the member 17 relative to the cover 2 is approximately 12°. Furthermore, the angle 23 (which is shown in FIG. 4 and denotes the slope of the ramps 18) is also in the range of 12°. This angle 23 is selected in such a way that, when the ramps 18 of the member 17 and the complementary inclines or ramps 24 of a second annular displacing member 25 (shown in FIGS. 5 and 6 and hereinafter called annulus) are in frictional engagement with each other, the member 17 and the annulus 25 cannot slip because the friction between the abutting surfaces of the ramps 18 and 24 is too pronounced. Depending on the nature of the material of the member 17 and annulus 25 and on the finish of the abutting surfaces of the ramps 18 and 24, the angle 23 can be in the range of between 5° and 20°.

The member 17 is stressed in the circumferential direction by a ring-shaped torsion spring 26 which is shown in FIGS. 1, 2, 7 and 7a. The bias of the spring 26 is selected in such a way that the member 17 is stressed in a direction which is necessary for adjustment in order to compensate for wear upon the pressure plate 3, flywheel 6 and friction linings 7. In other words, the spring 26 tends to bias the member 17 in a direction such that, as the ramps 18 slide along the complementary ramps 24 of the annulus 25, this results in axial displacement of the member 17 in a direction toward the pressure plate 3, i.e., axially of and away from the bottom wall 2a of the cover 2. It is clear that the illustrated torsion spring 26 constitutes but one form of means for biasing the member 17 in a direction to slide along the annulus 25 and to thereby advance axially toward the pressure plate 3. This torsion spring comprises a relatively small number of convolutions 35 (for example, not more than two convolutions) and two legs 27 and 28. The leg 27 extends radially outwardly and the leg 28 extends in part radially and in part axially (see FIG. 7a). The leg 27 is non-rotatably anchored in or is otherwise connected with the member 17, and the leg 28 is non-rotatably anchored in or is otherwise secured to the cover 2. The spring 26 is installed in stressed condition.

A presently preferred form of the displacing annulus 25 is shown in FIGS. 5 and 6. This annulus comprises the aforediscussed ramps 24 which are complementary to the ramps 18 of the member 17. The surfaces along which the ramps 18 abut the ramps 24 can be congruent surfaces. The angle 29 which is shown in FIG. 6 preferably matches the angle 23 which is shown in FIG. 4. As can be readily seen by comparing FIGS. 3 and 5, the distribution of the ramps 24 on the annulus 25 is the same as, or at least similar to, that of the ramps 18 on the member 17. The annulus 25 is non-rotatably secured to the housing 2. To this end, the annulus 25 is provided with a plurality of holes 30 which can receive portions of the rivets 15 so that such rivets also serve as a means for non-rotatably coupling the annulus 25 to the bottom wall 2a of the cover 2. This can be seen in the upper portion of FIG. 2.

FIG. 2 further shows, by broken lines, that the operating means for biasing the member 17 in the circumferential direction of the cover 2 can comprise an additional torsion spring 26a which can be configurated in the same way as the torsion spring 26. Thus, one leg of the torsion spring 26a can be anchored in the member 17 and its other leg can be anchored in the cover 2. The torsion spring 26a is also installed in stressed condition so that it always tends to turn the member 17 relative to the cover 2.

An advantage of the utilization of operating means having two torsion springs 26, 26a is that their bias can increase under the action of centrifugal force when the friction clutch 1 is in use and its cover 2 rotates with the pressure plate 3 and flywheel 6. The flywheel 6 can receive torque from the output element of an engine in a motor vehicle. For example, the increased bias of the spring 26 in response to the action of centrifugal force can be compensated for by the torsion spring 26a. To this end, the springs 26 and 26a are convoluted in such a way that, at least when acted upon by centrifugal force, they generate and apply to the member 17 forces which act in opposite directions as seen in the circumferential direction of the member 17. The diameters of convolutions of the torsion spring 26a are larger than the diameters of convolutions 35 of the torsion spring 26. Reference may be had to FIG. 2. This enables the designer of the clutch to select the centrifugal forces acting upon the torsion springs 26 and 26a in such a way that the forces acting upon the member 17 in the circumferential direction are at least substantially balanced. Adequate balancing can be achieved by appropriate selection of the diameters of convolutions of the springs 26, 26a, by appropriate selection of the diameters of wires of which these springs are made and/or by appropriate selection of the number of their convolutions. FIG. 2 shows that the torsion spring 26 is located radially inwardly and the torsion spring 26a is located radially outwardly of the adjusting member 17. However, it is equally possible to install each of these springs radially inwardly or radially outwardly of the member 17.

FIG. 7 shows the torsion spring 26 in a plan view. When this spring is not under stress, its legs 27, 28 make an angle 31 which can be in the range of 40°–120°. The leg 27 will be moved (relative to the leg 28) to the position 32 when the friction linings 7 are new (i.e., prior to being subjected to any wear). The leg 27 assumes the position 33 of FIG. 7 when the linings 7 have undergone a maximum permissible amount of wear. The angle 34 of adjustment (between the positions 32 and 33 shown in FIG. 7) is approximately 12°. The spring 26 of FIG. 7 is designed in such a way that, when in unstressed condition, only a single convolution 35 extends between the legs 27 and 28. The remaining portion of the spring 26 (namely outside of the angle 31) has two convolutions 35 (FIG. 7a) which overlie each other as seen in the axial direction of the spring 26.

The spring 26a is similar to the spring 26 but, in the embodiment of FIGS. 1 and 2, has a larger diameter and is stressed in a different direction as concerns its bias upon the member 17. The force which the spring 26 applies to the member 17 is greater than the force of the spring 26a.

When the wear upon the component parts of the friction clutch 1 is minimal, i.e., when the clutch is yet to be put to use, the angular positions of the adjusting member 17 and annulus 25 relative to each other are such that the axially extending peaks 18a of the ramps 18 forming part of the member 17 extend close to or actually abut the valley between the axially extending peaks 24a of the ramps 24 on the annulus 25. In other words, the combined thickness of the member 17 and annulus 25 then assumes a minimum value, i.e., these parts occupy a minimum amount of space in the axial direction of the cover 2 between the bottom wall 2a and the diaphragm spring 4.

In the friction clutch 1 of FIGS. 1 and 2, the annulus 25 constitutes a separately produced part which is installed at the inner side of the bottom wall 2a of the cover 2. However, it is also possible to make the annulus 25 an integral part of the cover 2; for example, the lobes 24 can be stamped out of the bottom wall 2a to extend toward the member 17 of the compensating unit 16. Such a mode of making the annulus 25 (namely its lobes 24) is particularly advantageous if the cover 2 is made of a single piece of metallic sheet material.

The shoulders 38 on the pallets 36 of the lobes 22 of the adjusting member 17 can be utilized to ensure proper angular positioning of the member 17 in the cover 2 during assembly of the friction clutch 1. The shoulders 38 can be engaged by a suitable turning or retaining tool which reacts against the cover 2. The tool is put to use during assembly of the friction clutch 1 and is removed from the friction clutch when the attachment of the cover 2 to the flywheel 6 (by threaded fasteners 6a one of which is shown in FIG. 2) is completed. The compensating unit 16 becomes operative as soon as the aforementioned tool is removed, i.e., as soon as the member 17 is free to turn relative to the cover 2 (if and when necessary) to compensate for wear upon the parts 3, 6 and/or 7. As shown in FIGS. 1 and 2, the bottom wall 2a of the cover 2 has circumferentially extending elongated slot-shaped windows 37 which enable the prongs or analogous extensions of the tool to advance toward and to engage the shoulders 38 on the pallets 36 of the lobes 22 of the adjusting member 17 during assembly of the friction clutch 1. The shoulders 38 can be replaced with other configurations (e.g., holes) in or on the member 17, as long as the tool can properly engage and hold the member 17 in the requisite position during assembly of the friction clutch 1. The length of the windows 37 should at least suffice to ensure that the member 17 can be turned back through the maximum angle which is required to compensate for wear upon the pressure plate 3, flywheel 6 and/or friction linings 7. It is also possible to assemble the friction clutch 1 in a first step and to thereupon employ a tool which is to be used to turn the member 17 relative to the cover 2. The prongs of the tool are inserted through the windows 37 of the bottom wall 2a and engage the shoulders 38 on the pallets 36 of the lobes 22. The member 17 is then turned back in a direction to ensure that its ramps 18 cooperate with the ramps 24 of the annulus 25 in a sense to move the member 17 closer to the bottom wall 2a to a position from which the member 17 must turn in order to compensate for wear upon the parts 3, 6 and/or 7 in actual use of the friction clutch 1. The member 17 is then located at a minimum distance from the bottom wall 2a and is secured in such position, for example, with a clamp or a pin extending into registering openings of the cover 2 and member 17 to prevent angular displacement of the thus coupled parts 2, 17 relative to each other. The clamp or pin is removed from the openings when the attachment of the cover 2 to the flywheel 6 is completed, i.e., the unit 16 is then ready to perform its compensating action if and when necessary, depending on the extent of wear upon the pressure plate 3, flywheel 6 and/or friction linings 7.

The dimensions of the windows 37 in the cover 2 are selected in such a way that the member 17 can be returned to its "retracted" position (at a minimal distance from the bottom wall 2a) if and when the cover 2 is to be detached from the flywheel 6. This involves disengagement of the clutch 1 (i.e., the application of axial force against the tips 4c of the prongs 4b in a direction toward the clutch disc 8) so that the diaphragm spring 4 no longer exerts an axially oriented force against the ring 11 of the composite seat 5 and the member 17 can be readily turned relative to the cover 2.

A further possibility for placing the friction clutch 1 into operative condition subsequent to installation of the friction clutch in a motor vehicle (so that the flywheel 6 can receive torque from the output element of the combustion engine) is to change the angular position of the adjusting member 17 (so that the 15 member 17 is located at a minimum distance from the bottom wall 2a of the cover 2) subsequent to attachment of the flywheel 6 to the engine. To this end, the friction clutch 1 can be disengaged by an auxiliary tool so that the stress upon the adjusting member 17 is practically zero, and the adjusting member 17 is then moved (turned) to its proper initial or starting position at a maximum distance from the pressure plate 3. The friction clutch 1 is then engaged so that the retracted adjusting member 17 remains in the proper retracted position prior to its movement toward the pressure plate 3 in order to compensate for wear upon the friction linings 7 and, if necessary, upon one or more aforementioned additional parts including the diaphragm spring 4, the portion or portions 3a of the pressure plate 3 and the rings 11, 12 of the composite seat 5.

Figure 8:
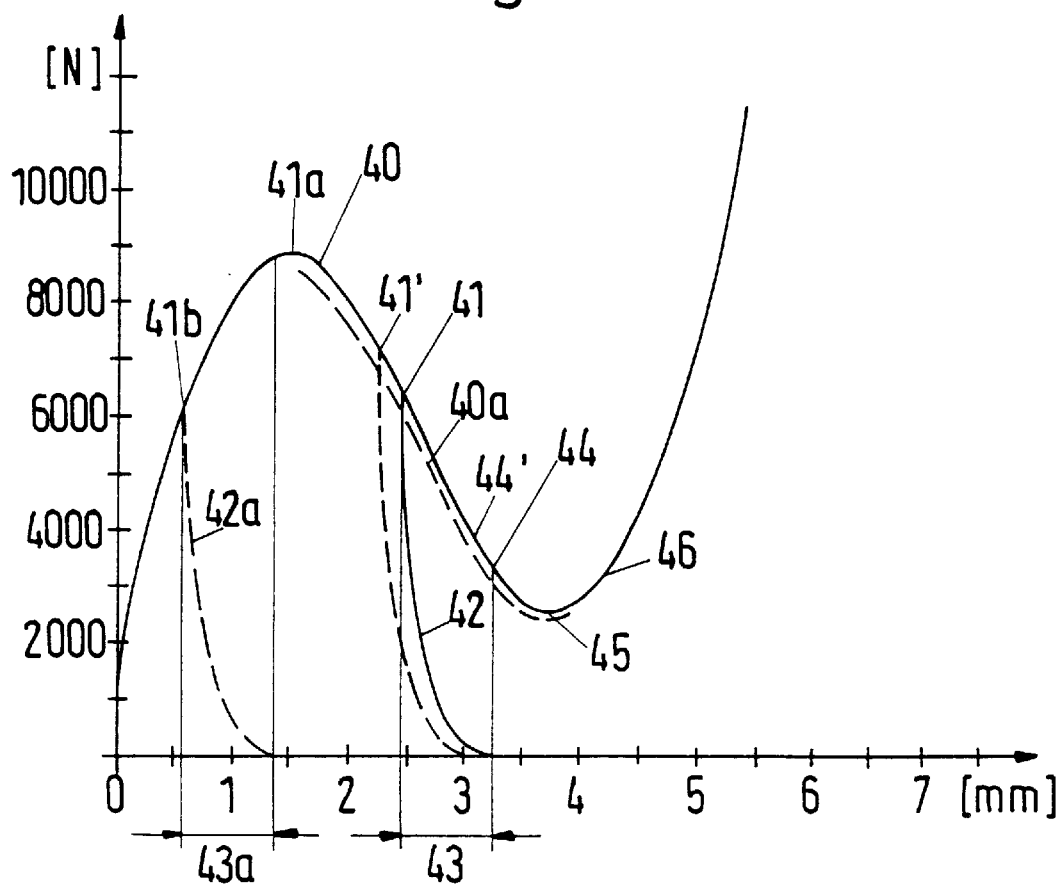
FIG. 8 is a diagram wherein the curves denote variations of the force generated by a diaphragm spring which is used to bias a pressure plate against a clutch disc in the friction clutch of FIGS. 1 and 2.

Referring to the diagram of FIG. 8, the sinusoidal curve 40 denotes the axially oriented force which develops in response to changes of conicity of the diaphragm spring 4 as a result of deformation between two abutments spaced apart from each other a distance corresponding to that of the composite seat 5 from the projecting portion or portions 3a of the pressure plate 3. The distance (in mm) between such abutments is measured along the abscissa, and the force (in nm) which is generated by the diaphragm spring 4 is measured along the ordinate of the coordinate system of FIG. 8. The (operating) point 41 of the curve 40 is indicative of the flattened condition of the diaphragm spring 4, namely the condition which is preferably selected as the initial condition of the diaphragm spring when the friction clutch 1 is engaged, and denotes the force which is generated by the diaphragm spring 4 upon the installation of the friction clutch 1 and while the clutch is engaged; at such time, the spring 4 exerts a maximum force upon the portion or portions 3a of the pressure plate 3 and the latter exerts a maximum force which is used to clamp the friction linings 7 of the clutch disc 8 between the friction surfaces of the pressure plate 3 and flywheel 6. The point 41 can be shifted along the curve 40 toward or away from the abscissa by changing the conicity, i.e., the setting, of the diaphragm spring 4 in the assembled condition of the friction clutch 1.

The curve 42 denotes in FIG. 8 the axial spreading force which is applied by the resilient segments 10 between the two sets of friction linings 7. Such spreading force of the segments 10 opposes the force which the diaphragm spring 4 applies to the pressure plate 3. It is desirable and advantageous that the axial force which is required for the possible resilient deformation of the segments 10 at least match the bias of the diaphragm spring 4; it is also possible to select the mounting of the diaphragm spring 4 and the resiliency and bias of the segments 10 in such a way that the force which is denoted by the curve 42 exceeds the force which is denoted by the curve 40. The stressing of the resilient segments 10 decreases in response to progressing disengagement of the friction clutch 1, and the extent to which the stressing decreases is denoted by the distance 43. This results in a corresponding axial shifting or deformation of the diaphragm spring 4 whereby the segments 10 assist the disengagement of the friction clutch. In other words, the required maximum disengaging force is less than that which would be necessary at the point 41 of the curve 40 in FIG. 8 if the resilient segments 10 were omitted, i.e., in the absence of means for biasing the friction linings 7. The point 44 on the curve 40 denotes the magnitude of the force of diaphragm spring 4 at the instant of disengagement of the friction clutch 1, i.e., the friction linings 7 are no longer engaged by the friction surfaces of the pressure plate 3 and flywheel 6 when the point 44 is exceeded. Due to the degressive characteristic curve of the diaphragm spring 4, the disengaging force which is to be applied at such time is much less than that corresponding to the force denoted by the point 41 of the curve 40. The disengaging force which must be applied in the friction clutch 1 decreases all the way to the minimum or lowest point 45 of the sinusoidal curve 40. From there on, the required disengaging force rises again and the extent of axial movement of the tips 4c of prongs 4b along their predetermined path can be selected in such a way that the magnitude of this force does not exceed the magnitude of the force at the point 44 (i.e., the maximum disengaging force) and preferably remains therebelow. In other words, the force should not rise above that denoted by the point 46.

The magnitude of force which is generated by the sensor 13 is denoted by the curve 47 which is shown in FIG. 9. This curve actually denotes the force which is generated when the conicity of the sensor 13 is changed as a result of stressing. Such change in stressing of the sensor 13 takes place as a result of variations of the distance between two abutments whose radial spacing corresponds to that of the abutment 14 at the inner side of the cover 2 from the seat or ring 11 of the composite seat 5. The distance 48 covered by the sensor 13 is that during which the axial force generated by the sensor remains substantially constant. The magnitude of this force is selected in such a way that it at least approximates the magnitude of the clutch disengaging force as denoted by the point 44 on the curve 40 of FIG. 8. The supporting force to be furnished by the sensor 13 is less than that at the point 44 of the curve 40 by a value corresponding to the lever arm of the diaphragm spring 4. In most instances, such transmission ratio is between 1:3 and 1:5 but can also be less than 1:3 or greater than 1:5 for certain applications of the improved friction clutch.

The just-mentioned transmission ratio of the diaphragm spring 4 denotes the ratio of radial distance of the seat 5 from the portion or portions 3a of the pressure plate 3 to the radial distance of the composite seat 5 from the tips 4c of the prongs 4b forming part of the diaphragm spring 4 and being depressible, for example, by a disengaging bearing of the friction clutch.

The mounting of the sensor 13 in the friction clutch 1 is selected in such a way that the sensor can perform an axial movement in the region of the composite seat 5, namely in a direction toward the friction linings 7, to an extent corresponding at least to the axial adjustment of the pressure plate 3 toward the flywheel 6 as a result of wear upon the friction surfaces of the parts 3, 6 and as a result of wear upon the friction linings 7. This ensures that the axially oriented supporting force for the composite seat 5 remains constant regardless of the wear upon the parts 3, 6 and 7. In other words, the substantially linear portion 48 of the curve 47 in FIG. 9 should have a length not less than that corresponding to the aforediscussed extent of wear and preferably exceeding the latter. This ensures that the unit 16 can also compensate, at least in part, for eventual tolerances during assembly of the friction clutch 1.

In order to ensure the establishment of a practically unchanged (i.e., predetermined) release point 44 for the friction linings 7 when the friction clutch 1 is disengaged, it is possible to employ torque varying means 10 known as a so-called twin-segment biasing means which is to operate between the two sets of friction linings 7. Such biasing means can comprise pairs of discrete parallel resilient segments which are disposed back-to-back. The segments which are disposed back-to-back can be subjected to a certain initial stress in the axial direction of the clutch disc 8. The initial stress can be such that the pairs of resilient segments oppose the bias of the spring 4 with a force which at least matches but preferably at least slightly exceeds the force at the point 44 of the curve 40 in the diagram of FIG. 8. Prestressing of resilient segments between the friction linings 7 of the clutch disc 8 renders it possible to at least substantially compensate for so-called penetration or embedding losses which develop during the useful life of the friction clutch 1 as a result of penetration of the segments 10 into the adjacent friction linings 7. The initial stressing of the pairs of resilient segments between the two sets of friction linings 7 can be such that the segments tend to move the friction linings 7 apart through a distance of 0.3 to 0.8 mm, preferably approximately 0.5 mm. By properly limiting the extent of axial movability of the two sets of friction linings 7 relative to each other and by properly selecting the bias of the segments 10 between the two sets of friction linings, one can ensure that, at least during disengagement of the friction clutch 1, the pressure plate 3 covers a predetermined distance 43 in a direction away from the friction linings under the action of the resilient segments 10 or under the action of equivalents of such. In order to achieve the predetermined distance 43, it is possible to limit the extent of axial movement of the two sets of friction linings 7 in directions toward as well as away from each other, e.g., by the provision of suitable stops, i.e., in directions to stress the segments 10 as well as to enable these segments to dissipate energy. Suitable resilient means for use between the two sets of friction linings 7 are disclosed, for example, in commonly owned copending German patent application Serial No. P 42 06 880.0 the entire disclosure of which is incorporated herein by reference.

Figure 10:
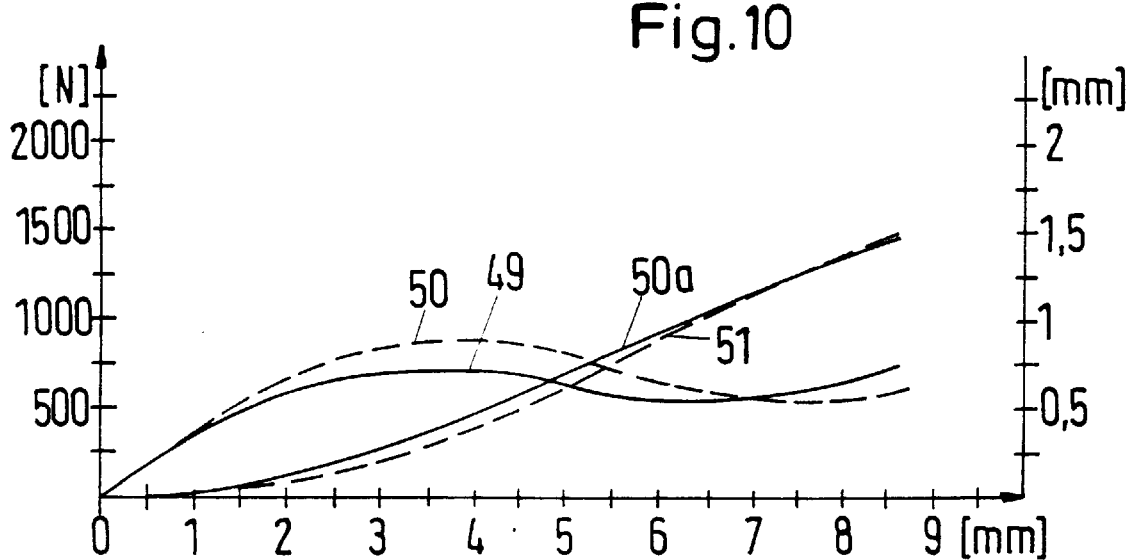
FIG. 10 is a diagram with curves denoting the forces to be applied in order to disengage the friction clutch of FIGS. 1 and 2.

The curve 49 which is shown in FIG. 10 denotes that force which is required to disengage the friction clutch 1 by a disengaging member acting upon the tips 4c of the prongs 4b in order to move the pressure plate 3 from the point 41 to the point 44 (FIG. 8). The curve 49 also indicates the path of movement of tips 4c forming part of the prongs 4b of the diaphragm spring 4.

In order to ensure an optimal operation of the friction clutch 1, i.e., in order to guarantee an automatic compensation for wear upon the friction linings 7, it is desirable—as considered during the actual progress of the disengaging force (denoted by the curve 49 in FIG. 10)—to ensure that the sum of forces which are initially applied to the diaphragm spring 4 by the resilient segments 10 and by the sensor 13 exceed the force which the diaphragm spring 4 applies to the ring 11 of the composite seat 5. Furthermore, even after the pressure plate 3 is disengaged from the friction linings 7, the force which the sensor 13 continues to apply to the diaphragm spring 4 should exceed, or at least match, the required disengaging force which varies during disengagement of the friction clutch in accordance with the curve 49 of FIG. 10 and acts upon the diaphragm spring 4 in the region of the tips 4c of its prongs 4b. Furthermore, the force which the sensor 13 then applies to the ring 11 of the composite seat 5 should be selected in such a way that it prevents a turning of the adjusting member 17 which is biased by the torsion spring 26, i.e., the sensor 13 should prevent any axial shifting of the diaphragm spring 4 at least until close to the instant when the point 41 (corresponding to the initial position of the diaphragm spring) in the upwardly sloping portion of the curve 40 is exceeded.

The heretofore discussed mode of operation of the friction clutch 1 pertains primarily or exclusively to a predetermined mode of installing the diaphragm spring 4 and without taking into consideration the wear upon the friction linings 7. When a certain amount of wear has taken place (e.g., upon the friction linings 7), the position of the pressure plate 3 changes in that the pressure plate migrates toward the flywheel 6 whereby the conicity of the diaphragm spring 4 (and hence the bias of this spring upon the portion or portions 3a of the pressure plate) changes accordingly (because the tips 4c move in a direction to the right, as viewed in FIG. 2) while the friction clutch 1 remains in the engaged condition. Such change of bias of the diaphragm spring 4 upon the pressure plate 3 entails that the point 41 of the curve 40 in the diagram of FIG. 8 migrates toward the point 41' and that the point 44 migrates toward the point 44'. This terminates the state of equilibrium between the diaphragm spring 4 and the sensor 13 at the ring 11 during disengagement of the friction clutch 1. Wear upon the friction linings 7 entails an increase in the magnitude of the force which is applied by the diaphragm spring 4 to the sensor 13 and also causes a shifting of the progress of the disengaging force in a sense toward an increase of such force. The thus obtained progress of the disengaging force is denoted in FIG. 10 by the broken-line curve 50. Since the magnitude of the disengaging force increases, the axially oriented force of the sensor 13 upon the diaphragm spring 4 during disengagement of the friction clutch 1 is overcome so that the sensor 13 yields in the region of the composite seat 5 through an axial distance corresponding essentially to the extent of wear upon the friction linings 7. During such deformation stage of the sensor 13 (which can be said to constitute a means for monitoring the extent of wear upon the parts 3, 6 and/or 7), the diaphragm spring 4 bears against the portion or portions 3a of the pressure plate 3 whereby the conicity of the spring 4 changes together with the amount of energy which is stored therein. Thus, the energy which is stored by the diaphragm spring 4 also changes together with the force which the spring 4 exerts upon the ring 11, i.e., upon the sensor 13 and upon the pressure plate 3. As can be seen in FIG. 8, such change takes place in a sense to reduce the magnitude of the force which is applied by the diaphragm spring 4 to the pressure plate 3 and continues to take place until the magnitude of the axial force applied by the spring 4 to the sensor 13 at the ring 11 is at least substantially neutralized or balanced by the oppositely directed force which is exerted by the sensor 13. In other words, and referring again to the diagram of FIG. 8, the points 41' and 44' of the curve 40 then migrate toward the points 41 and 44, respectively. When the reestablishment of the state of equilibrium is completed, the pressure plate 3 is again ready to be disengaged from the adjacent friction linings 7. During the aforediscussed stage of adjustment in order to compensate for wear upon the friction linings 7, while the friction clutch 1 is being disengaged and the sensor 13 yields, the member 17 of the compensating unit 16 is caused to turn about the axis X—X of the clutch disc 8 under the bias of the stressed torsion spring 26 which causes a displacement of the ring 12 to an extent corresponding to the extent of wear upon the friction linings 7; this, in turn, again eliminates any play at the composite seat 5. When the adjusting step is completed, the magnitude of the disengaging force again corresponds to that denoted by the curve 49 in the diagram of FIG. 10. The curves 50a and 51 in the diagram of FIG. 10 denote the axial displacement of the pressure plate 3 when the magnitude of the disengaging force varies in accordance with the curves 49 and 50, respectively.

The curves which are shown in the diagram of FIG. 11 denote the variations of forces acting upon the cover 2 and upon the sensor 13 during disengagement of the friction clutch 1. The extreme values are omitted. Starting with the engaged condition of FIG. 2, the cover 2 and the pressure plate 3 are first acted upon by a force whose magnitude corresponds to the operating or installation point 41 of the diaphragm spring 4 as denoted by the curve 40 of FIG. 8. As the disengagement of the friction clutch 1 progresses, the magnitude of the axial force exerted by the diaphragm spring 4 upon the cover 2 and the ring 12 decreases in accordance with the curve 52 of FIG. 11, namely to the point 53. When the point 53 is exceeded in the direction of disengagement of the friction clutch 1, a conventional frictional clutch (wherein the diaphragm spring is tiltable at a fixed location relative to the clutch cover, i.e., wherein the ring 11 is fixedly installed in the cover) would operate in such a way that the force exerted by the diaphragm spring 4 upon the cover 2 at the level of the composite seat 5 would change (reverse) its direction. However, the novel friction clutch 1 operates in such a way that the change in the axial direction of the force applied by the diaphragm spring 4 in the region of the composite seat 5 is taken up by the sensor 13. When the magnitude of the force which is being applied by the diaphragm spring 4 reaches the value denoted by the point 54 on the curve 52 of FIG. 11, the diaphragm spring 4 becomes disengaged from the portion or portions 3a of the pressure plate 3. The resilient segments 10 between the two sets of friction linings 7 generate an axially oriented force which assists the disengagement of the friction clutch 1, because it acts against the bias of the diaphragm spring 4, at least to the point 54 on the curve 52 of FIG. 11. The force which is generated by the resilient segments 10 decreases as the extent of displacement of tips 4c of prongs 4b toward the clutch disc 8 increases during disengagement of the friction clutch 1, i.e., in response to progressing axial displacement of the pressure plate 3 in a direction away from the flywheel 6. Thus, the curve 52 of FIG. 11 denotes a resultant of a disengaging force which is being applied to the tips 4c during disengagement of the friction clutch 1 on the one hand and of the axial force which is being applied by the resilient segments 10 of the clutch disc 8 upon the diaphragm spring 4 in the region of portion or portions 3a of the pressure plate 3. When the point 54 is exceeded in the direction of disengagement of the friction clutch 1, the axially oriented force which is being applied by the diaphragm spring 4 to the ring 11 is compensated for by the oppositely directed force which is being applied by the sensor 13. These two forces are balanced by the pressure plate 3 not later than when the axial pressure upon the friction linings 7 is terminated. As the disengaging operation progresses, the axially oriented force which is being applied by the sensor 13 at the composite seat 5 preferably exceeds, at least slightly, the prevailing disengaging force. The portion 55 of the curve 52 in the diaphragm of FIG. 11 indicates that, as the extent of movement to disengage the friction clutch 1 increases, the disengaging force (and the force applied by diaphragm spring 4 to the ring 11) decreases when compared with the disengaging force denoted by the point 54 of the curve 52. The broken-line curve 56 in the diagram of FIG. 11 denotes that condition of the friction clutch 1 when the friction linings 7 have undergone a certain amount of wear but prior to any compensation for such wear in the region of the composite seat 5. It will be noted that the change of orientation (conicity) of the diaphragm spring 4 due to wear upon the friction linings 7 results in an increase of the magnitude of forces which are being applied to the cover 2, to the ring 11 and/or to the sensor 13. This causes the point 54 to migrate in a direction toward 54' which, in turn, entails that in the course of the next-following disengaging operation the axial force which is being applied by the diaphragm spring 4 to the sensor 13 at the ring 11 exceeds the oppositely directed force of the sensor 13. This causes an adjustment in the aforedescribed manner as a result of axial relaxation of the sensor 13. Such adjustment entails that, due to adjustment which is effected by the torsion spring 26, i.e., as a result of turning of the annular adjusting member 17 and the ensuing axial shifting of the ring 12, the point 54' migrates toward the point 54 which, in turn, reestablishes the desired state of equilibrium at the composite seat 5, namely between the diaphragm spring 4 and the sensor 13.

In actual practice (i.e., when the friction clutch 1 is in use), adjustments by the compensating unit 16 are effected continuously or nearly continuously (i.e., by minute steps). The distances between the various points on the curves of FIGS. 8 to 11 are greatly exaggerated for the sake of clarity.

It is very likely that certain changes of various functional parameters and/or operating points will take place during the useful life of the friction clutch 1. For example, improper actuation of the friction clutch 1 can result in overheating of the resilient segments 10 in the clutch disc 8, and this can cause a reduction of the resiliency of these segments, i.e., a reduction of the extent of axial movability of the parts 10. Nevertheless, it is possible to ensure reliable operation of the friction clutch 1 by appropriate selection of the characteristic curve 40 of the diaphragm spring 4 and a corresponding conformance of the curve 47 denoting the displacement-to-force relationship of the sensor 13. A reduction of axial movability of the segments 10 would merely entail that the conicity of the diaphragm spring 4 in the friction clutch 1 of FIGS. 1 and 2 would change in a sense to reduce the magnitude of the force which the spring 4 exerts upon the portion or portions 3a of the pressure plate 3. This can be seen in the diagram of FIG. 8. Furthermore, this would bring about a corresponding change of axial deformation of the sensor 13 and a corresponding axial displacement of the ring 11.

In accordance with a further feature of the invention, it is possible to construct the improved friction clutch in such a way that the resultant of forces acting upon the diaphragm spring 4 increases in response to increasing wear upon the friction linings 7. Such increase can be limited to a certain stage or portion of the maximum permissible displacement due to wear upon the friction linings 7. As mentioned above, the wear upon the friction linings is normally more pronounced than the wear upon the flywheel 6 and upon the pressure plate 3; therefore, the preceding and the next following passages of the description of the friction clutch 1 refer primarily or exclusively to the wear upon the friction linings. The increase of the magnitude of forces acting upon the diaphragm spring 4 can take place as a result of appropriate design of the sensor 13. FIG. 9 shows by broken lines, as at 47a, the characteristic curve denoting a thus modified sensor 13 within the range 48. If the magnitude of forces acting upon the diaphragm spring 4 increases in response to progressing wear upon the friction linings 7, one can at least partially compensate for a reduction of the force which the spring 4 applies to the pressure plate 3 due to a reduction of resiliency of the segments 10, e.g., as a result of penetration or embedding of these segments into the adjacent friction linings 7. It is particularly advantageous if the force for the diaphragm spring 4 increases proportionally with (i.e., at the same rate or nearly at the same rate as) the setting or reduction of bias of the segments 10, for example, due to the aforediscussed embedding into the adjacent friction linings 7. In other words, as the thickness of the clutch disc 8 in the region of the friction linings 7 decreases (i.e., as the distance between the two sets of friction linings decreases due to the reduced bias of the segments 10 as a result of penetration into the friction linings and/or due to the wear upon the friction linings), the magnitude of the forces acting upon the diaphragm spring 4 increases accordingly. It is of particular advantage if the magnitude of such forces increases in such a way that the increase is more pronounced during a first stage and less pronounced during a next-following second stage. These two stages are within the distance 48 as measured along the abscissa of the coordinate system which is shown in FIG. 9. The just-outlined design is desirable and advantageous because the major part of penetration of the segments 10 into the adjacent friction linings 7 takes place mainly during a relatively short period of the full useful life of the friction clutch; thereafter, the positions of the segments 10 relative to the adjacent friction linings 7 are more or less stabilized. Thus, once a certain penetration has taken place, this variable parameter or factor can be disregarded because it no longer affects the operation of the compensation unit 16. The change of magnitude of the force acting upon the diaphragm spring 4 can also take place at least during a certain stage of wear upon the friction linings 7.

The preceding description of operation of the adjusting unit 16 to compensate for wear upon the friction linings 7 did not take into consideration the axially oriented forces which are, or which can be, generated by the leaf springs 9 serving to axially movably but non-rotatably couple the pressure plate 3 to the flywheel 6 and cover 2. If the leaf springs 9 are installed in stressed condition so that they tend to move the pressure plate 3 axially and away from the adjacent friction linings 7, i.e., in a sense to bias the portion or portions 3a of the pressure plate 3 against the diaphragm spring 4, the leaf springs 9 are in a condition to assist the disengagement of the friction clutch 1. Thus, the axially oriented force which is applied by the leaf springs 9 is superimposed upon the forces which are being applied by the sensor 13 and by the diaphragm spring 4 as well as upon the disengaging force which is being applied (e.g., by a suitable disengaging bearing) against the tips 4c of the prongs 4b. Such function of the leaf springs 9 was not considered in the preceding description of the diagrams of FIGS. 8 to 11. The overall force which is being applied to the diaphragm spring 4 in the disengaged condition of the friction clutch 1 to cause the spring 4 to bear upon the ring 12 of the seat 5 is the sum of forces which are generated primarily by the leaf springs 9, sensor 13 and the applied disengaging force acting upon the tips 4c of prongs 4b forming part of the spring 4.

The leaf springs 9 can be installed between the cover 2 and the pressure plate 3 in such a way that their axially oriented force acting upon the diaphragm spring 4 increases in response to progressing wear upon the friction linings 7. For example, the magnitude of the axial force exerted by the leaf springs 9 upon the diaphragm spring 4 in response to increasing wear upon the friction linings 7 can increase in accordance with a curve 47b which is shown in the diagram of FIG. 9 and denotes the variations of such force upon the spring 4 within the distance 48. FIG. 9 further shows that, as the deformation of the sensor 13 increases, the restoring force of the leaf springs 9 upon the pressure plate 3 (this force is also applied to the diaphragm spring 4) also increases. By totalizing the forces denoted by the curve 47b and the characteristic curve of the diaphragm spring 4, one arrives at a resultant force which acts upon the spring 4 in the axial direction in a sense to bias this spring against the ring 12 of the composite seat 5. In order to obtain a variation of forces as denoted by the curve 47a of FIG. 9 (there is an initial increase of force, as at 47d, prior to transition into a substantially constant range of forces within the distance 48), it is desirable to design the sensor 13 in such a way that its characteristic curve corresponds to that shown at 47c in FIG. 9. By adding up the forces denoted by the curves 47b and 47c in the diagram of FIG. 9, one arrives at a sum of forces denoted by the curve 47a. Thus, the magnitude of the force to be applied by the sensor 13 can be reduced by the simple expedient of stressing the leaf springs 9. Furthermore, by properly designing and mounting the leaf springs 9, it is possible to reduce (at least in part) the bias of the resilient segments 10 and/or (at least in part) the extent of penetration of the segments 10 into the adjacent friction linings 7. Thus, one can ensure that the diaphragm spring 4 maintains a substantially unchanged operating point or the same operating range, i.e., the bias of the spring 4 upon the pressure plate 3 remains at least substantially unchanged during the entire useful life of the friction clutch 1. It is further necessary or desirable to take into consideration (while designing of the improved friction clutch and particularly in connection with the design of the sensor 13 and leaf springs 9) the resultant axial forces which are generated by the torsion springs 26, 26a and which act upon the adjusting member 17 of the compensating unit 16 in a sense to oppose the supporting force of the sensor 13 and/or the bias of the leaf springs 9.

If the friction clutch of the present invention is designed to employ prestressed leaf springs 9, it is further necessary or advisable to take into consideration that the prestressing of the springs 9 influences the axial force which the pressure plate 3 applies to the adjacent friction linings 7. Thus, if the leaf springs 9 are prestressed in a sense to urge the pressure plate 3 toward the diaphragm spring 4, the effective force which is applied by the diaphragm spring 4 to the pressure plate 3 is reduced by the extent of the prestressing of the leaf springs 9. Consequently, the friction clutch then operates in such a way that the resultant axial force acting upon the pressure plate 3 and hence upon the adjacent friction linings 7 includes the force of the spring 4 minus the force resulting from prestressing of the leaf springs 9. If one assumes that the curve 40 in the diagram of FIG. 8 denotes the resultant of the forces due to bias of the spring 4 and the force attributable to prestressing of the leaf springs 9 in unused condition of the friction clutch, a reduction of the distance of the pressure plate 3 from the flywheel 6 due to the wear upon the friction linings 7 would result in a shifting of the resulting forces in a sense toward a reduction of forces. FIG. 8 shows a broken-line curve 40a which corresponds, for example, to total wear upon the friction linings 7 in the range of 1.5 mm. Such wear can develop during the useful life of the friction clutch 1, and a shifting from the curve 40 toward the curve 40a results in a reduction of the axial force which is being applied by the diaphragm spring 4 to the sensor 13 during disengagement of the friction clutch; such reduction of the axial force is attributable to the fact that, as the wear upon the friction linings 7 progresses, the moment which is being applied by the leaf springs 9 to the spring 4 and acts in the opposite direction also increases. Such moment develops due to the existence of a radial clearance between the seat 5 and the diameter of the annulus defined by the portion or portions 3a of the pressure plate 3, i.e., at the locus of engagement between the pressure plate and the spring 4.

An important advantage of the improved friction clutch 1 is that the ring 12 of the composite seat 5 is biased against the respective side of the diaphragm spring 4 by a supporting force (furnished by the sensor 13) in such a way that it is not necessary to provide anything more than a mere form-locking connection for the diaphragm spring, i.e., the diaphragm spring is supported against the clutch disengaging force solely by the sensor which bears against the ring 12 to maintain the latter in contact with the diaphragm spring. The diaphragm spring 4 has a degressive characteristic curve within its operating range and is installed in such a way that the supporting force furnished by the sensor 13 and the bias of the spring 4 are related to each other in a special way. Thus, the relationship is such that, in the contemplated built-in condition of the diaphragm spring, in the absence of changes of conicity of the diaphragm spring due to wear, and within the disengagement range of the diaphragm spring, the supporting force is greater than the bias which is applied by the diaphragm spring and opposes the supporting force of the sensor. Whereas, when the conicity of the spring 4 changes as a result of wear, the supporting force is smaller than the bias which is applied by the diaphragm spring to oppose the supporting force within portions of the path of disengagement of the diaphragm spring.

Though the friction clutch 1 comprises a sensor which consists of a single resilient element 13, it is equally within the purview of the invention to employ a sensor which comprises two or more resilient elements in the form of diaphragm springs, coil springs or others. As used herein, the term "supporting force" is intended to denote the sum of all forces which act upon the diaphragm spring 4. In the embodiment of FIGS. 1 to 7a, such sum of forces includes that furnished by the sensor 13, that furnished by the leaf springs 9 and that furnished by the resilient segments 10 of the clutch disc 8 to the extent that these forces act upon the diaphragm spring 4 to urge it against the ring 12 of the composite seat 5. It is presently preferred to employ a sensor including or consisting of a spring (13) which is designed to change its shape as a result of wear-induced adjustment of the diaphragm spring 4 and/or the ring 12 of the composite seat 5. The illustrated sensor 13 is a diaphragm spring. However, as will be described in greater detail hereinafter, it is also possible to employ one or more leaf springs, for example, to design and mount the leaf springs 9 in such a way that they perform the function of non-rotatably, but axially movably, connecting the pressure plate 3 to the cover 2 as well as the function of the sensor 13. The illustrated sensor 13 is designed to directly engage the diaphragm spring 4 and, as shown, such engagement can take place at the same radial distance from the axis X—X as the engagement between the diaphragm spring 4 and the ring 12.

FIG. 2 shows one presently preferred mode of installing the compensating unit 16, namely between the cover 2 and the diaphragm spring 4. Furthermore, the friction clutch 1 embodies a presently preferred form of the compensating unit 16, namely a unit which employs at least two sets of cooperating sloping surfaces, namely those provided on the ramps 18 and 24.

An important advantage of the improved friction clutch is that the conicity (i.e., stressing) of the diaphragm spring 4 remains substantially unchanged during the entire useful life of the friction clutch when the latter is engaged. This, in turn, ensures practically unchanged biasing of the pressure plate 3 in a direction toward the adjacent set of friction linings 7, i.e., the clamping action of the plates 3 and 6 upon the clutch disc 8 (in the engaged condition of the friction clutch) remains practically unchanged as long as the friction clutch is in a condition for use. The constancy of the aforementioned clamping action upon the clutch disc 8 is established and maintained regardless of the extent of wear upon one or more parts of the friction clutch 1, primarily upon the friction linings 7 but preferably also upon the diaphragm spring 4, pressure plate 3 and the rings 11, 12 of the composite seat 5.

Another important advantage of the improved friction clutch 1 is that the mass of the compensating device 16 is not added to the mass of the diaphragm spring 4. Moreover, the device 16 is installed in a part of the friction clutch wherein it is shielded against the influence of wear upon the plates 3, 6 and is also remote from the primary source of heat, namely the friction surfaces of the pressure plate 3 and flywheel 6.

The provision of a composite seat 5 with two portions (here shown as rings 11, 12) which flank the diaphragm spring 4 and enable the diaphragm spring to become tilted, also contributes to the effectiveness of the compensating unit 16. The sensor 13 applies a force against that ring (11) of the composite seat 5 which is disposed between the diaphragm spring 4 and the pressure plate 3. The bias of the spring 4 upon the ring 11 (i.e., upon that ring which is being acted upon by the sensor 13) increases in response to progressing wear upon the friction linings 7 when the friction clutch 1 is being disengaged so that such bias exceeds the force of the sensor 13. The characteristic curve of the diaphragm spring 4 is such that proceeding from the position of initial installation in the friction clutch 1 and taking into consideration the direction of relaxation as a result of wear upon the friction linings 7, the bias which is then applied by the diaphragm spring (and hence the required disengaging force) increases during a first stage of disengagement, and the bias required to be applied by the spring 4 thereupon decreases when the deformation (conicity) of the diaphragm spring increases beyond that during initial installation (no wear upon the friction linings). Such mounting and such selection of the characteristic curve of the diaphragm spring 4 ensure repeated establishment of a state of equilibrium between the bias of the spring 4 during disengagement of the friction clutch and the force which is applied by the sensor 13 to act upon the same part (seat 5) as the bias of the spring 4 while the wear upon the friction linings 7 progresses. The reason is that, when the supporting force which is being applied by the sensor 13 is exceeded by the bias of the spring 4, the sensor 13 is moved away from the ring 12 and the unit 16 is free to compensate for wear upon the friction linings 7. Such compensation takes place under the action of the operating means (springs 26, 26a). The compensation is terminated automatically when the force which is being applied by the sensor 13 prevents further axial displacement of the seat portion 12 in a direction toward the pressure plate 3.

As already mentioned above, the diaphragm spring 4 is preferably installed in the friction clutch 1 in such a way that it exhibits a degressive characteristic, i.e., that its bias decreases at least during a portion of, but preferably during the entire, disengagement range. The mounting of the diaphragm spring 4 can be such that, when the friction clutch 1 is disengaged, the bias of the diaphragm spring reaches or moves beyond the lowest point of the substantially sinusoidal curve denoting the force-to-displacement ratio.

The sensor 13 is preferably designed to apply a substantially constant force, at least within the contemplated range of compensation for wear upon the friction linings 7. A diaphragm spring has been found to constitute a highly satisfactory sensor in the friction clutch of the present invention; such friction clutch is installed in a stressed condition.

The diaphragm spring 4 acts as a two-armed lever because the radially outer part of its main portion 4a acts upon the portion or portions 3a of the pressure plate 3 and the radially inner part of its main portion 4a is disposed between the rings 11, 12 of the composite seat 5. Thus, the diameter of the location of mounting the diaphragm spring 4 in the cover 2 is disposed radially inwardly of the diameter of the locus of engagement between the diaphragm spring and the pressure plate. The radially innermost portion (prongs 4b) of the diaphragm spring 4 forms part of actuating means of the mechanism which is used to disengage the friction clutch 1. However, it is also possible to provide clutch disengaging means with levers other than the prongs 4b.

The friction clutch 1 is designed in such a way that it permits automatic axial movements of the rings 11, 12 toward the pressure plate 3 in order to compensate for wear upon the friction linings 7 but is automatically blocked against axial movement in the opposite direction, i.e., toward the bottom wall 2a of the cover 2. This ensures that the diaphragm spring 4 is held between the rings 11 and 12 without any play.

The annular adjusting member 17 of the compensating unit 16 is biased by the diaphragm spring 4 in the direction of the axis X—X at least in the engaged condition of the friction clutch 1. The annular member 17 is caused to turn when the wear upon the friction linings 7 warrants compensation by the device 16, and such angular displacement results in axial shifting of the ring 12 (and hence of the adjacent portion of the diaphragm spring 4 and of the ring 11) toward the pressure plate 3. Such adjustment takes place during disengagement of the friction clutch 1.

It is further within the purview of the invention to replace the illustrated ramps 18 and/or 24 with otherwise configurated ramps. For example, the abutting surfaces of the ramps on the member 17 and/or of the ramps 24 on the annulus 25 can have a convex or cylindrical outline. The illustrated plane surfaces are preferred at this time because such surfaces of the ramps 18 cooperate with similar surfaces of the ramps 24 to establish a self-locking action when the two sets of ramps are biased against each other in the axial direction of the cover 2.

At least a portion of the compensating unit 16, particularly the annular member 17) is preferably made of a suitable plastic material, preferably a thermoplastic substance (such as polyamide). An advantage of plastic parts is that they can be mass produced (e.g., injection molded) at a low cost. Furthermore, this contributes to a reduction of the overall weight and mass of the friction clutch. Thermoplastic parts can be used because the entire compensating unit 16 is or can be installed at a certain distance from the friction linings 7, i.e., from that portion of the friction clutch which generates maximum amounts of heat. Still further, lightweight thermoplastic parts contribute to a reduction of inertia of the compensating unit 16 which, in turn, enhances the accuracy of adjustments.

The compensating unit 16 is designed in such a way that it acts as a freewheel in the direction of disengagement of the friction clutch 1 but is self-locking in a direction counter to the direction of disengagement. This is achieved by the provision of the aforediscussed ramps 18 and 24 which cooperate to prevent any movements of the annular member 17 in the direction of the axis X—X back toward the bottom wall 2a of the cover 2. Such results can be achieved by appropriate selection of the angles 23 and 29; these angles are normally between 4 and 20 degrees, preferably between 5 and 12 degrees. Self-locking action can be achieved by frictional engagement between the ramps 18 of the set of ramps on the annular member 17 and the set of ramps 24 on the annulus 25. The self-locking action can also be achieved in a number of other ways. For example, a form-locking connection in a direction to prevent the member 17 from moving back toward the bottom wall 2a can be obtained by making one of the two sets of ramps 18, 24 from a relatively soft material and providing the ramps of the other set with serrations or other suitable protuberances or projections capable of penetrating into the softer material of the one set of ramps. Alternatively, the ramps of each of the two sets can be suitably profiled to ensure that the unit 16 acts as a freewheel in a direction to move the member 17 axially of and away from the bottom wall 2a but establishes a self-locking action against any movement of the member 17 back toward the bottom wall 2a. An advantage of the just-outlined undertakings is that the compensating unit 16 need not be provided with any additional means for the sole purpose of permitting axial adjustment of the member 17 and rings 11, 12 in a direction away from, but preventing any axial movement of the member 17 toward, the bottom wall 2a.

An advantage of the operating means (spring 26) which is used in the friction clutch 1 is that such operating means does not adversely influence the operation of other resilient means including the diaphragm spring 4, the sensor 13, the leaf springs 9 and the resilient segments 10. Even under the most adverse circumstances, the influence of the operating means 26 upon the springs 4, 13, 9 and 10 is negligible.

The ramps 18 and/or 24 can be replaced with otherwise configured parts, for example, by wedges, spheres or rollers which are movable in the radial and/or axial direction of the friction clutch in order to effect the required adjustments so as to compensate for wear.

Resilient segments 10 (such as those disclosed in the published German patent application Serial No. 36 31 863) constitute a preferred but optional feature of the clutch disc 8. As already discussed hereinabove, these resilient segments can assist in disengagement of the friction clutch 1 because, when the friction clutch is engaged, the segments 10 are stressed and apply to the pressure plate 3 a reaction force which opposes the bias of the diaphragm spring 4. During disengagement of the friction clutch, the pressure plate 3 moves axially and away from the flywheel 6 under the bias of the leaf springs 9, and such axial movement of the pressure plate is assisted by the stressed resilient segments 10. The bias of the diaphragm spring 4 decreases rather abruptly during disengagement of the friction clutch; this results in a pronounced reduction of the bias of the spring 4 upon the pressure plate 3 which, in turn, entails a reduction of the bias of the segments 10. The effective force which is required to disengage the friction clutch 1 is the difference between the bias of the segments 10 and the bias of the diaphragm spring 4. When the segments 10 are no longer stressed, i.e., when the plates 3, 6 no longer clamp the friction linings 7 of the clutch disc 8, the force which is required for further disengagement of the friction clutch is furnished primarily by the diaphragm spring 4. The characteristics of the spring 4 and of the segments 10 can be related to each other in such a way that, when the plates 3 and 6 release the friction linings 7, a relatively small force is necessary to deform the diaphragm spring. The arrangement may be such that, under extreme circumstances, the selected relationship of the two characteristic curves renders it possible to disengage the friction clutch without the application of any force for deformation of the spring 4 and that, once the plates 3 and 6 have released the friction linings 7, the force with which the diaphragm spring opposes further disengagement of the friction clutch is much less than the bias of the spring 4 upon the pressure plate 3 in the engaged condition of the friction clutch. It is also possible to select the characteristic curves of the diaphragm spring 4 and of the resilient segments 10 in such a way that, when the plates 3, 6 release the friction linings 7, a minimal force or no force at all is required to act upon the diaphragm spring in order to complete the disengagement of the friction clutch. Friction clutches of the just-outlined character can be designed to require actuating forces in the range of 0–200 nm.

In accordance with a further advantageous embodiment of the invention, the friction clutch can be designed in such a way that, at or close to the instant of disengagement of the pressure plate 3 from the clutch disc 8, the axial force which is being applied by the diaphragm spring 4 is zero or close to zero so that the bias of the diaphragm spring during further disengagement of the friction clutch undergoes a transition from positive to negative. This means that, when the friction clutch is fully disengaged, such disengagement persists until the operator of the vehicle wherein the friction clutch is put to use decides to apply an external force in a direction to reengage the friction clutch.

It is desirable and important to design and assemble the friction clutch 1 in such a way that the increase of the bias of the leaf springs 9 as a result of wear upon the friction linings 7 is less than the increase of the disengaging force which develops as a result of the same wear upon the friction linings 7, namely the disengaging force which brings about a tilting of the spring 4 to an extent necessary to compensate for wear. Otherwise, the bias of the pressure plate 3 upon the friction linings 7 in the engaged condition of the clutch 1 would decrease so that no compensation for wear could take place.

Figure 12:
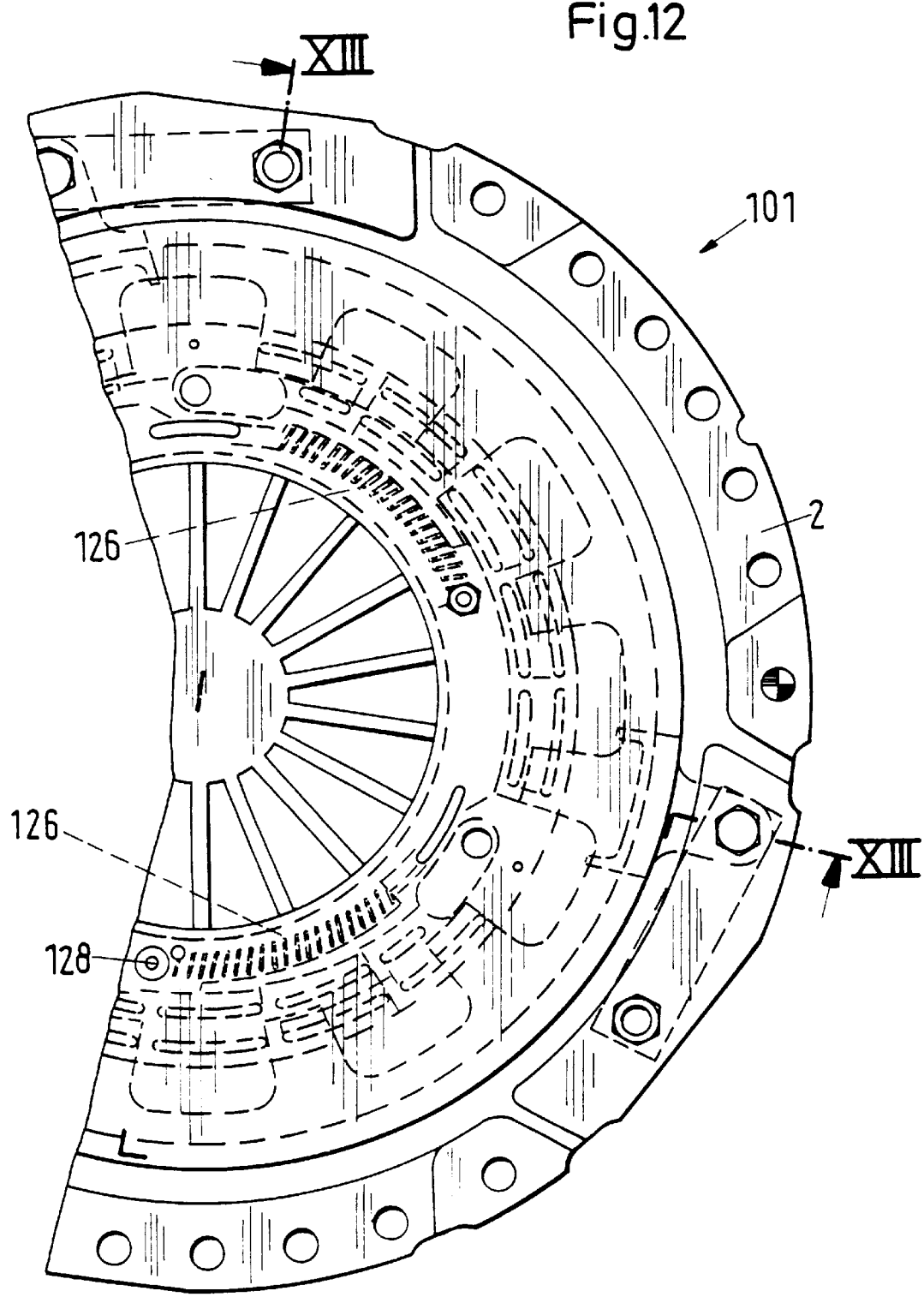
FIG. 12 is a fragmentary elevational view as seen from the right-hand side of FIG. 13 and shows a second friction clutch.
Figure 13:
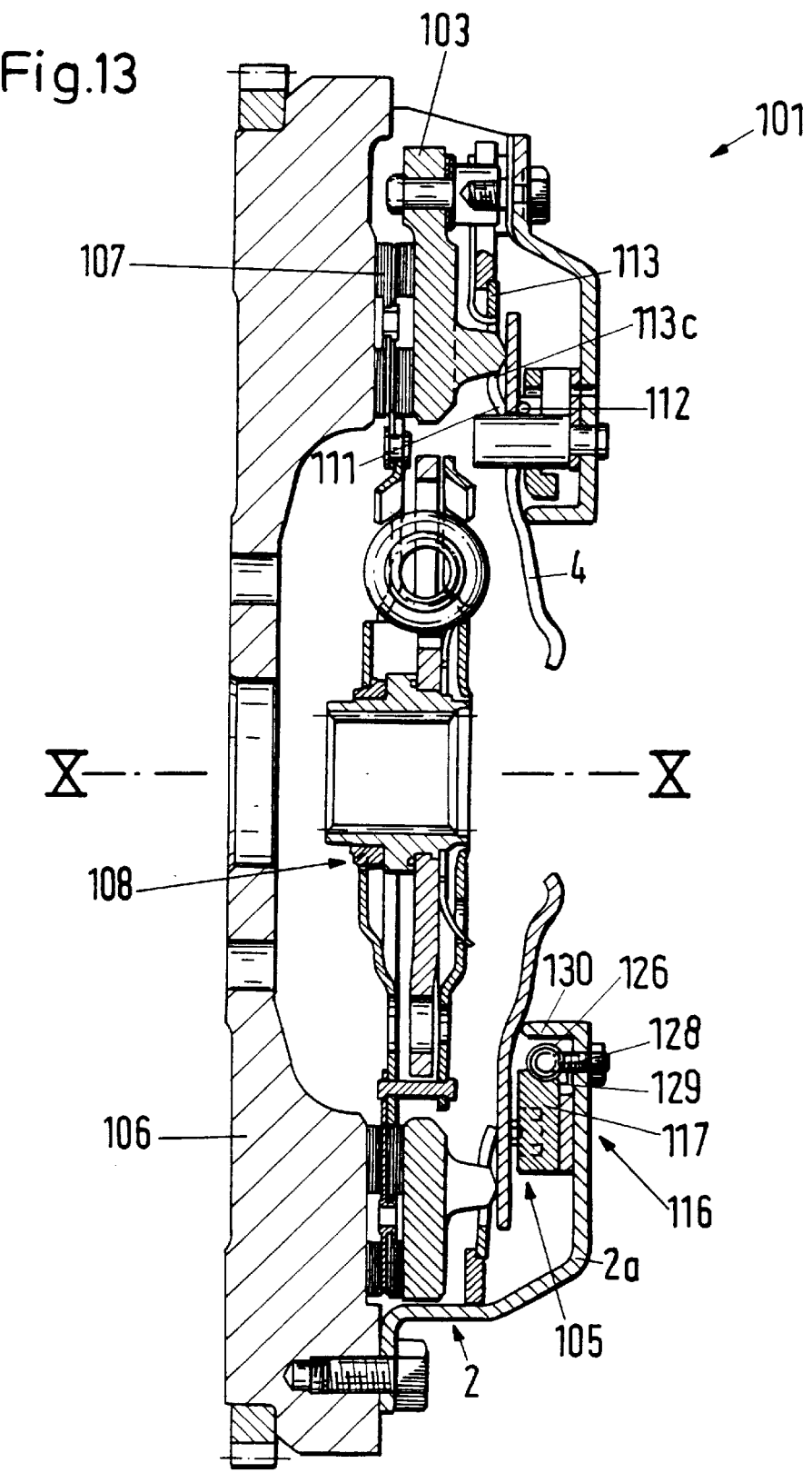
FIG. 13 is a sectional view substantially as seen in the direction of arrows from the line XIII—XIII in FIG. 12.

FIGS. 12 and 13 illustrate certain details of a modified torque transmitting friction clutch 101. One of the differences between the friction clutches 1 and 101 is that the latter employs an operating means including three coil springs 126 (two shown in FIG. 12) which replace the torsion springs 26, 26a in the friction clutch 1 and serve to bias the annular member 117 of the compensating device or unit 116. As concerns its function, the adjusting member 117 is an equivalent of the member 17, i.e., it can cooperate with an annulus corresponding to the annulus 25 of FIGS. 5 and 6 to move the portion 111 of the composite seat 105 in a direction to the right (as viewed in FIG. 13) to an extent which is necessary to compensate for wear upon the friction linings 107 of the clutch plate or disc 108.

Figure 14:
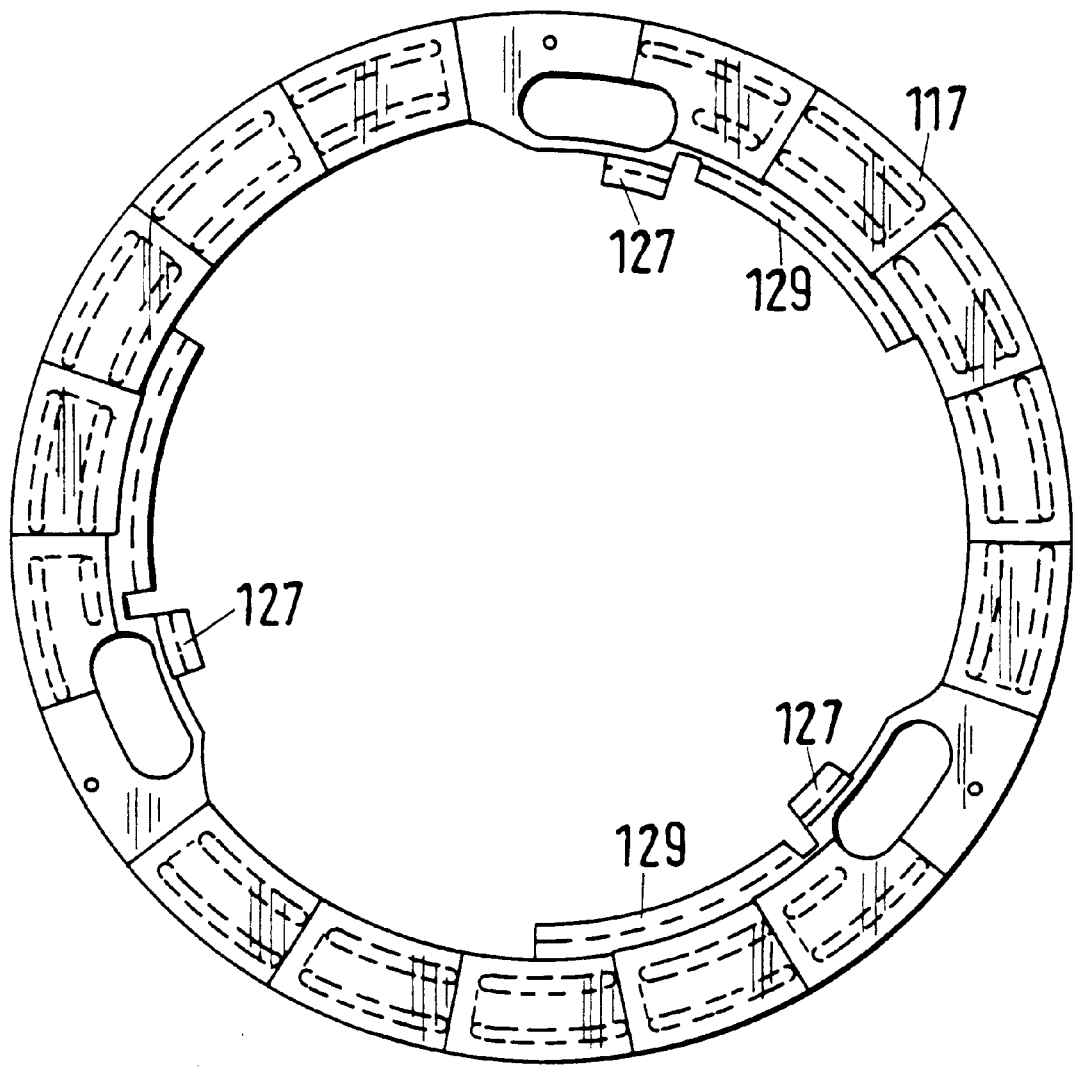
FIG. 14 is a plan view of an annular adjusting or wear compensating member which is utilized in an adjusting or wear compensating device or unit forming part of the second friction clutch.

The friction clutch 101 employs three coil springs 126 which are equidistant from each other in the circumferential direction of the housing or cover 2 and are installed in stressed condition to bias the adjusting member 117 relative to the bottom wall 2a of the cover. As can be seen in FIG. 14, the inner marginal portion of the adjusting member 117 is provided with axially, radially and circumferentially extending projections 127 which serve as stops for the adjacent ends of the respective coil springs 126. The stops 127 are acted upon by the respective springs 126 in a sense to tend to turn the adjusting member 117 about the axis of the cover 2 in a direction to move the portion 111 of the composite seat 105 for the diaphragm spring 4 toward the pressure plate 103. The springs 126 have an arcuate shape because they are adjacent the convex outer sides of arcuate guides 129 forming part of or affixed to the member 117. The other end of each coil spring 126 is in engagement with a discrete post 128 which is anchored in the bottom wall 2a of the cover 2. The illustrated posts 128 have external threads which mate with the threads in tapped bores provided therefor in the bottom wall 2a. However, it is equally possible to replace the externally threaded posts 128 with integral projections in the form of lugs or the like which are obtained by displacing selected portions of the bottom wall 2a in a direction toward the pressure plate 103. Such making of posts or like parts which are of one piece with the bottom wall 2a is particularly advantageous and simple if the cover 2 is made of a metallic sheet material.

The length of the arcuate guides 129 is preferably selected in such a way that they can adequately guide the respective coil springs 126 during each stage of angular displacement of the adjusting member 117 relative to the bottom wall 2a, i.e., during each stage of compensation for wear upon the friction linings 107, pressure plate 103 and/or counterpressure plate 106. The configuration of the guides 129 is such that they can properly prop the respective coil springs 126 from within (i.e., at the concave sides of the arcuate springs) as well as in the axial direction of the bottom wall 2a. Each of the guides 129 can define an arcuate groove or channel which receives a portion of the respective coil spring 126 between the respective post 128 and the respective projection 127. This ensures highly predictable positioning of the coil springs 126 relative to the member 117 and guarantees that these coil springs can turn the member 117 in the proper direction (to move the seat portion 111 toward the pressure plate 103) whenever necessary in order to compensate for wear upon the linings 107, pressure plate 103 and/or counterpressure plate 106. The configuration of the surfaces bounding the channels of the guides 129 on the adjusting member 117 can conform to the configuration of the adjacent portions of the respective coil springs 126. Such configuration of the surfaces bounding the channels or grooves in the guides 129 ensures that the coil springs 126 are adequately guided when the cover 2 is idle as well as when the cover is rotated by the counterpressure plate 106 (this counterpressure plate can constitute or form part of a flywheel which receives torque from the output shaft of a combustion engine in a motor vehicle).

In order to even more reliably ensure optimal retention of coil springs 126 in requisite positions relative to the bottom wall 2a and the member 117, the radially inner portion of the bottom wall 2a can be provided with axially extending arms 130 which are disposed radially inwardly of the coil springs (see FIG. 13). The individual arms 130 can be replaced with a circumferentially complete cylindrical collar of the bottom wall 2a. The arms 130 or the aforementioned circumferentially complete collar of the bottom wall 2a can perform the additional function of serving as an abutment for the adjacent portions of the diaphragm spring 4, i.e., such collar or the arms 130 can limit the extent of dissipation of energy by the diaphragm spring 4.

The provision of means for guiding the coil springs 126 exhibits the advantage that, when the friction clutch 101 is rotated by a combustion engine or the like, the convolutions of the springs 126 cannot leave the illustrated positions under the action of centrifugal force, i.e., they cannot move into frictional engagement with the adjacent portions (such as ramps) of the member 117; this would result in the development of undesirable friction which would prevent the springs 126 from changing the angular position of the member 117 in a manner to accurately compensate for wear upon the friction linings 107, pressure plate 103 and/or counterpressure plate 106. When the friction clutch 101 is driven, the coil springs 126 preferably behave not unlike solid bodies, i.e., they are in frictional engagement with the adjacent guides 129 and such frictional engagement suffices to prevent any angular displacement of the member 117. The arrangement can be such that, when the rotational speed of the friction clutch 101 exceeds the idling speed of the engine, the frictional engagement between the coil springs 126 and the guides 129 under the action of centrifugal force suffices to prevent any angular displacement of the adjusting member 117 relative to the bottom wall 2a of the cover 2, i.e., the springs 126 cannot change the angular position of the member 117. Thus, the angular position of the member 117 with reference to the cover 2 (in order to move the seat portion 111 toward the pressure plate 103) can take place only when the rotational speed of the friction clutch 101 does not exceed the idling speed of the engine. In other words, it is necessary to operate the friction clutch 101 in such a way that its rotational speed is relatively low in order to enable the springs 126 to change the angular position of the member 117 relative to the bottom wall 2a (if necessary).

It is equally possible to block any turning of the member 117 relative to the bottom wall 2a in any one of a number of other ways, i.e., not necessarily as a result of pronounced frictional engagement with the surfaces bounding the grooves or channels of the respective guides 129. For example, the arrangement may be such that the coil springs 126 can change the angular position of the member 117 relative to the bottom wall 2a only when the friction clutch 101 is not driven.

The just-discussed feature of the friction clutch 101 can be incorporated with equal advantage in the friction clutch 1 of FIGS. 1 and 2. The arrangement may be such that the angular position of the member 17 relative to the annulus 25 can be changed only when the clutch 1 is not driven at all or when the clutch 1 rotates within a relatively low range of speeds. For example, the housing or cover 2 of the friction clutch 1 of FIGS. 1 and 2 can be provided with means which prevent the torsion spring 26 and/or 26a from changing the angular position of the member 17 relative to the annulus 25 when the member 17 is acted upon by centrifugal force, i.e., when the friction clutch 1 is driven by the engine in a motor vehicle or the like. For example, the bottom wall 2a of the cover 2 in the friction clutch 1 can carry one or more flyweights which move radially outwardly under the action of centrifugal force to thereby interfere with any changes in the angular position of the member 17 relative to the annulus 5, either by directly engaging the member 17 and/or by preventing the spring 26 and/or 26a from changing the angular position of the member 17 in the cover 2. The flyweight or flyweights can be designed and mounted to bear against the radially innermost portion of the member 17 when the friction clutch 1 of FIGS. 1 and 2 is driven. The flyweight or flyweights must be capable of engaging an holding the member 17 with a force which exceeds the bias of the springs 26, 26a, at least when the rotational speed of the friction clutch 1 reaches a certain value.

Referring again to FIGS. 12–14, the friction clutch 101 can be modified by providing radial supports for portions of or for the entire coil springs 126. Such radial supports can be installed on, or they can form part of, he bottom wall 2a of the cover 2 in the friction clutch 101; for example, the radial supports can be made of one piece with the posts 128. Thus, each post 128 can be replaced with a substantially L-shaped element which includes a portion extending in the circumferential direction of the cover 2 and into the adjacent end convolutions of the respective coil spring 126. Such portions of the L-shaped elements act not unlike retainers and hold the surrounding end convolutions of the respective coil springs 126 against radial movement relative to the bottom wall 2a.

FIG. 13 illustrates that the wire ring or seat 11 of the composite seat which is shown in FIG. 2 can be omitted. More specifically, the wire ring 11 is replaced by a radially inner portion 111 of the sensor 113. The portion 111 can be assembled of several sections each forming part of one of the tongues 113c of the sensor 113. Those sides of the tongues 113c which engage the diaphragm spring 4 in lieu of a wire ring 11 or the like can have a convex or substantially convex shape. Thus, the sensor 113 of FIG. 13 can perform the combined functions of the sensor 13 and wire ring 11 in the friction clutch 1 of FIGS. 1 and 2.

An advantage of a compensating unit which is responsive to the rotational speed of the housing or cover 2 is that the time for carrying out an automatic adjustment can be selected to reduce the likelihood of adversely influencing the operation of the compensating unit by centrifugal force and/or by any other parameters (such as vibrations, oscillation and/or other stray movements) which are attributable to the RPM of the cover. As already mentioned hereinbefore, the arrangement may be such that the compensating unit 116 is ineffective when the cover 2 is rotated at a particular speed or within a particular range of speeds. For example, the unit 116 can be designee to be ineffective when the RPM of the cover 2 exceeds a predetermined threshold value. A presently preferred mode of relating the operability of the compensating unit 116 to the RPM of the cover 2 is to ensure that the unit 116 can be operated only when the RPM of the cover 2 matches or approximates (and especially when it is below) the idling speed of the engine whose output element drives the flywheel 106. It is also possible to design the compensating unit 116 in such a way that it can be operated only when the RPM of the cover 2 is zero or close to zero.

The operating means (26 and 126) which are used in the friction clutches 1 and 101 are installed to bias the respective annular adjusting members (17, 117) in the circumferential direction of the respective housing or cover. This is due to the aforediscussed distribution and orientation of ramps on the annular adjusting member and on the adjacent annular portion of the respective compensating unit 16 or 116. However, it is also possible to employ an annular adjusting member which performs a more complex movement, e.g., which is designed to perform a movement in the circumferential direction of the cover as well as another movement relative to the cover in order to move the seat for the diaphragm spring toward the pressure plate.

Figure 15:
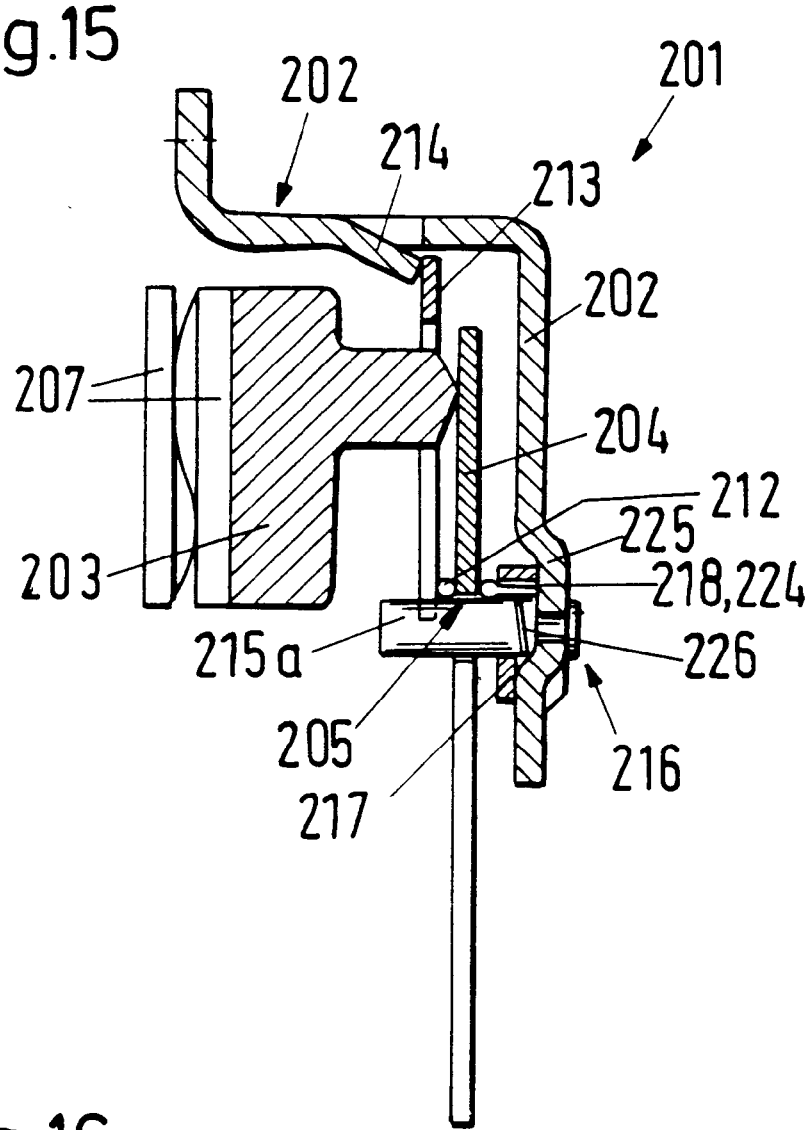
FIG. 15 is a fragmentary axial sectional view of a third friction clutch.
Figure 16:
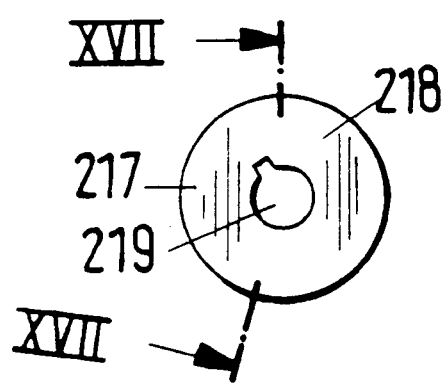
FIG. 16 is a plan view of an annular adjusting or wear compensating member which is utilized in the third friction clutch.
Figure 17:
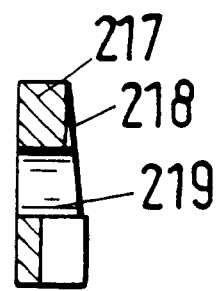
FIG. 17 is a sectional view substantially as seen in the direction of arrows from the line XVII—XVII in FIG. 16.

FIGS. 15 to 17 illustrate certain details of a further torque transmitting friction clutch 201 wherein the circumferentially complete annular adjusting member 17 or 117 is replaced with a set of discrete button or washer-like adjusting and wear compensating members 217. The discrete members 217 are equidistant from each other in the circumferential direction of the cover or housing 202 and each of these members has a ramp 218 which extends at one of its sides in the circumferential direction to cooperate with an adjacent ramp 224 of an annulus 225 forming part of the bottom wall 202a of the cover 202. Each of the illustrated members 217 has a central opening 219 (e.g., a circular bore or hole) which receives a portion of an axially parallel pin-shaped extension 215a of a rivet in such a way that each member 217 can turn about the axis of the respective extension 215a. The annulus 225 is an integral part of the bottom wall 202a and is provided with the aforementioned ramps 224 cooperating with the ramps 218 of the neighboring members 217 to automatically shift (when necessary) the ring 212 of the composite seat 205 toward the pressure plate 203 in order to compensate for wear upon the friction linings 207, the pressure plate 203 and/or the counterpressure plate (not shown in FIG. 15). The members 217 are turnable about the axes of the respective extensions or shanks 215a of rivets by operating means in the form of springs 226 in a sense to move the ramps 218 along the neighboring ramps 224 and to thus shift the ring 212 toward the pressure plate 203. Each spring 226 resembles a helix which surrounds the respective extension 215a, which reacts against the bottom wall 202a and which bears against the corresponding member 217. The end portions of the helical springs 226 are suitably bent so that they can more reliably engage the bottom wall 202a and the corresponding members 217, respectively. For example, the end portions of the springs 226 can be provided with lugs, legs or like projections. When the diaphragm spring 204 is moved axially of the friction clutch 201 of FIG. 15 due to wear upon the friction linings 207, pressure plate 203 and/or the non-illustrated counterpressure plate, the springs 226 are free to change the angular positions of the respective members 217 relative to the corresponding extensions 215a and to thus move the ring 212 toward the pressure plate 203; this compensates for the aforediscussed wear, primarily upon the friction linings 207.

The sensor 213 of the friction clutch 201 of FIG. 15 bears against abutments or lugs 214 which are shown in the form of integral portions of the axially extending part of the cover 202. The lugs 214 preferably constitute inwardly bent parts of the cover which are deformed to the extent necessary to engage the radially outer portion of the sensor 213.

An advantage of the discrete annular adjusting members 217 is that they are less likely to change their positions under the action of centrifugal force, i.e., they are not likely to turn about the respective extensions 215a as a result of rotation of the cover 202 about its own axis. In other words, the adjusting action of such discrete adjusting members 217 is not affected by the magnitude of the centrifugal force.

The discrete annular adjusting members 217 in the friction clutch which is shown in FIG. 15 can be replaced with discrete wedge-like or analogous adjusting members which are mounted for movement in the radial and/or circumferential direction of the cover 202 in order to cooperate with complementary parts on the bottom wall 202a in a sense to displace the ring 212 toward the pressure plate 203 when the need arises, i.e., in order to compensate for wear upon the counterpressure plate, the pressure plate 203 and/or the friction linings 207. Each wedge-like adjusting member can be provided with a longitudinally extending recess to receive a portion of an extension 215a or a like part of or on the bottom wall 202a. This ensures that each wedge-like member can carry out a movement only in a direction which is necessary to adjust the axial position of the ring 212. The arrangement may be such that the wedge-like members which are to be used in lieu of the discrete washer-like adjusting members 217 of FIG. 15 are acted upon by centrifugal force in order to move radially and/or circumferentially of the wall 202a and to thus compensate for wear, particularly for wear upon the friction linings 207. However, it is equally possible to employ operating means in the form of springs which cooperate with wedge-like adjusting members to shift such adjusting members along suitable configurations (such as ramps 224) of the bottom wall 202a in order to move the ring 212 axially toward the pressure plate 203. The extensions 215a can be replaced with other suitable guide means for the wedge-like adjusting members which can be used in lieu of the washer-like members 217; for example, the bottom wall 202a can be grooved to establish predetermined paths for movement of the wedge-like members relative to the cover 202.

The ramps 224 can be provided on the bottom wall 202a to project toward the adjacent annular adjusting members 217 from a plane which is normal to the axis of the cover 202. Alternatively, such ramps can be provided on the adjacent portions of the diaphragm spring 204. This also applies for the embodiments of FIGS. 1–2 and 12–13. It is also possible to provide the annular adjusting members 17, 117 and/or 217 with two sets of ramps 218, one at each side, and to provide complementary ramps 24, 124 or 224 on the bottom wall 2a, 102a or 202a and on the corresponding diaphragm spring 4, 104 or 204. If the adjusting members are wedges or if they resemble wedges, it is advisable to make them from a lightweight material in order to minimize the influence of centrifugal force.

The selection of materials for the cooperating ramps (such as 18 and 24) also plays an important role in connection with the reliability of adjustment of the diaphragm spring toward the clutch disc of the improved friction clutch. An important prerequisite is to select the material of the adjusting member 17 or 117 or of the members 217, and the material of the adjacent annulus 25, 125 or 225 in such a way that the ramps of such parts will not exhibit a tendency to adhere to each other irrespective of the momentary stage of useful life of the respective friction clutch. For example, adherence of one set of ramps to the neighboring ramps can be prevented or avoided by coating at least one of these sets of ramps with a suitable friction-reducing material. If the one and/or the other set of ramps consists of a metallic material, the coating substance will or can be selected with a view to prevent corrosion.

Another mode of preventing the ramps of one set from adhering to the ramps of the other set or sets (and from thus preventing, or interfering with the accuracy of adjustment of the diaphragm spring toward the pressure plate in order to compensate for wear) is to make the materials of the two or more sets of ramps (such as the materials of the annular member 17 and the annulus 25 in the embodiment of FIGS. 1 and 2) of materials having different thermal expansion coefficients. As a rule, the temperature of the friction clutch 1 will fluctuate in actual use as well as prior and between actual use(s) or during and subsequent to actual use. This will entail certain minimal movements of the neighboring ramps 18, 24 relative to each other whenever the temperature of the adjusting member 17 and annulus 25 changes. The aforementioned mode of selecting the materials of the member 17 and annulus 25 (so that they have different thermal expansion coefficients) ensures that the ramps 18 cannot adhere to the ramps 24, i.e., that the adjusting or compensating unit 16 is always in requisite condition to carry out all necessary adjustments in exact dependency on the extent of wear upon the friction linings 7 and/or pressure plate 3 and/or counterpressure plate or flywheel 6.

Still another mode of preventing adherence of neighboring sets of ramps to each other is to select the configuration and/or the deformability (stability) of the corresponding parts (such as the adjusting member 17 and the annulus 25 in the friction clutch 1 of FIGS. 1 and 2) with a view to ensure that the action of centrifugal force upon the parts 17 and 25 is not the same, i.e., that such parts will perform certain movements relative to each other in response to rotation of the friction clutch 1 with the result that the extent of movement of the ramps 18 will depart from that of the ramps 24 and the two sets of ramps will be incapable of adhering to one another.

A further mode of preventing the ramps of one set from adhering to the ramps of the neighboring set or sets is to ensure that the ramps of at least one set (e.g., the ramps 18 in the friction clutch 1 of FIG. 12) are caused to perform at least some axial movements relative to the neighboring ramps (such as 24) during each disengagement of the friction clutch (i.e., during movement of the tips 4c of prongs 4b of the diaphragm spring 4 along a predetermined path extending toward the pressure plate 3 in order to deform the diaphragm spring 4 and to allow the leaf springs 9 to shift the pressure plate 3 axially and away from the flywheel 6). The adjusting member 17 of the compensating unit 16 in the embodiment of FIGS. 1–2 can be coupled with a suitable part or it can be provided with suitable parts which move axially in response to the development of wear at 7, 3 and/or 6. Such part or parts can be installed adjacent the composite seat 5, e.g., on the diaphragm spring 4 and/or on the sensor 13.

Figure 18:
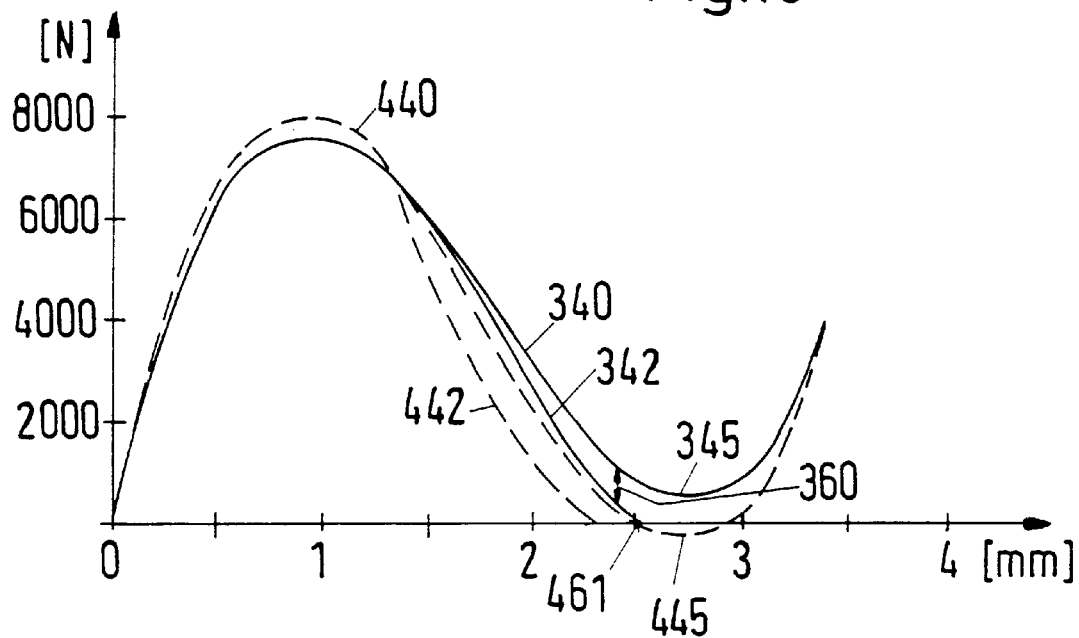
FIG. 18 is a diagram with curves denoting the characteristics of a diaphragm spring corresponding to that which is used in the friction clutch of FIGS. 1 and 2.

The diagram of FIG. 18 shows the characteristic curve 340 of a diaphragm spring corresponding to the diaphragm spring 4 of FIGS. 1 and 2. The curve 340 has a minimum or lowest point 345 denoting a relatively small force which is generated by the diaphragm spring and is in the range of approximately 450 nm (as measured along the ordinate). The highest point or maximum of the curve 340 is located in the range of 7680 nm. The transmission of force as a result of deformation of the diaphragm spring, and as indicated by the curve 340 of FIG. 18, takes place while the diaphragm spring bears against one and reacts against another of two stops which are spaced apart from each other in the radial direction of the respective friction clutch. The situation is analogous to that described with reference to the characteristic curve 40 of the diaphragm spring 4 in the diagram of FIG. 8.

The characteristic curve 340 of the diaphragm spring (such as 4) can be combined with the characteristic curve 342 of a resilient element corresponding to the segments 10 in the clutch disc 8 of the friction clutch 1. As can be seen in FIG. 18, the distance-to-force progress of the curve 342 is similar to that of the curve 340, i.e., these curves are rather close to each other which denotes that a friction clutch embodying the corresponding diaphragm spring and resilient segments 10 can be actuated in response to the exertion of a very small force. Within the operating range of the resilient segments 10, the theoretical disengaging force corresponds to the difference between two vertically aligned points, one on the curve 340 and the other on the curve 342. One such difference is shown in FIG. 18, as at 360. The actually required disengaging force is further reduced by the corresponding lever arms of the actuating means, such as the prongs 4b of the diaphragm spring 4 in the friction clutch 1 of FIGS. 1 and 2. All this is analogous to the construction and mode of operation of the friction clutch 1 as already described with reference to FIGS. 1–2 and 8–11.

The diagram of FIG. 18 further contains a curve 440 which is indicated by broken lines and has a minimum or lowest point 445 denoting a negative force which is generated by a diaphragm spring. In other words, a certain part of the force which is denoted by the curve 440 does not assist in engagement of the friction clutch but rather tends to disengage the friction clutch. Thus, if the deformation of the diaphragm spring which is denoted by the curve 440 progresses beyond the point 461, the friction clutch does not exhibit a tendency to become engaged but automatically remains disengaged. The broken-line curve 442 denotes in FIG. 18 the characteristic curve of resilient segments (such as 10 in the friction clutch of FIGS. 1–2) which can be used in conjunction with the diaphragm spring having a characteristic curve corresponding to that shown at 440. Relatively small (minimal) disengaging forces can be achieved if the curves 440 (diaphragm spring 4) and 442 (resilient segments 10) are at least substantially parallel to each other.

Figure 19:
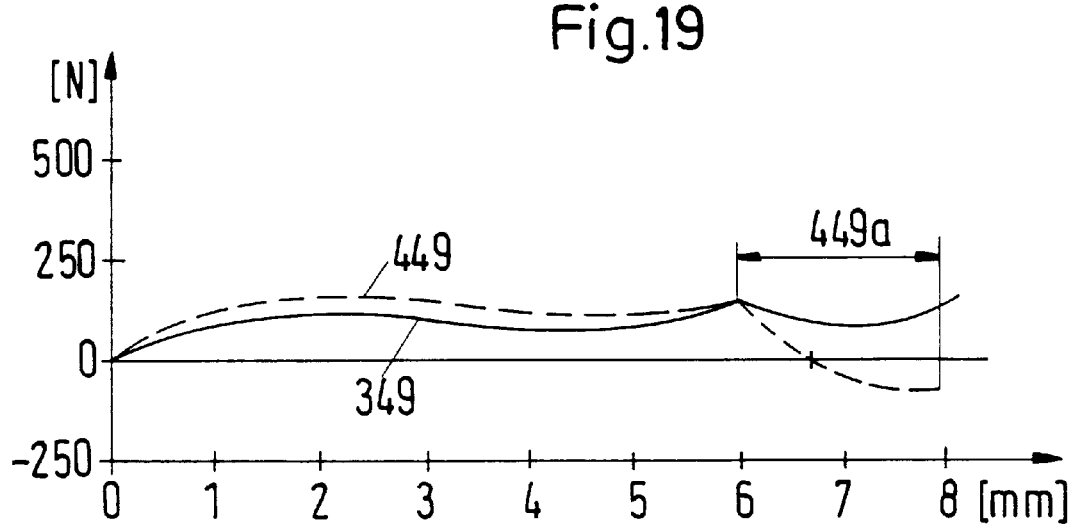
FIG. 19 is a diagram wherein the curves indicate variations of the disengaging force when a friction clutch employs diaphragm springs exhibiting characteristics corresponding to those denoted by the curves in the diagram of FIG. 18.

The curve 349 in the diagram of FIG. 19 denotes the progress of a disengaging force which is to be applied to the tips of the prongs 4b (levers) of a diaphragm spring (i.e., to the actuating means of the means for engaging and disengaging the friction clutch) when the friction clutch is being disengaged and employs a diaphragm spring and resilient segments of the character denoted by the curves 340 and 342 of FIG. 18. As can be seen in FIG. 19, the curve 349 remains in the positive force range (above the abscissa of the coordinate system of FIG. 19) which means that a certain force in a direction to disengage the friction clutch must be applied as long as the friction clutch is to remain in disengaged condition (the pressure plate 3 of FIGS. 1–2 is then disengaged from the adjacent set of friction linings 7).

The broken-line curve 449 in the diagram of FIG. 19 denotes the progress of a clutch disengaging force which develops when the diaphragm spring and the resilient segments of the friction clutch exhibit characteristic curves of the type shown at 440 and 442 in the diagram of FIG. 18. The curve 449 includes a portion (at 449a) which denotes an initial decrease of the disengaging force toward the abscissa and thereupon transits from the positive side to the negative side of the abscissa. This denotes that a friction clutch employing a diaphragm spring represented by the curve 440 and resilient segments represented by the curve 442 can remain in the disengaged condition without the need for the application of any disengaging force to the tips of the prongs (actuating means) of the diaphragm spring.

FIGS. 20, 20a, 21 and 22 illustrate a portion of a torque transmitting friction clutch 501, wherein the diaphragm spring 513 which performs the function of a sensor is coupled to the housing or cover 502 by a bayonet mount 514 so that the sensor 513 is maintained in a predetermined axial position relative to the bottom wall 502a of the cover 502. The main portion 513b of the sensor 513 is provided with radially outwardly extending coupling portions or arms 513d which are offset relative to the general plane of the main portion 513b in a direction toward the bottom wall 502a and extend into female coupling portions 502a' provided in the substantially axially extending marginal portion 502b of the cover 502; the marginal portion 502b surrounds the bottom wall 502a and extends toward the pressure plate 503 of the friction clutch 501. The female coupling portions 502a' which are shown in the drawing constitute lugs which are of one piece with the cover 502 and are obtained as a result of appropriate deformation of corresponding parts of the marginal portion 502b. Each female coupling portion 502a' (these coupling portions form part of the bayonet mount 514 and are of one piece with the cover 502) is preferably flanked by at least one slit or slot (such as the slits 502c, 502d) in the adjacent portion of the cover 502. By actually separating certain parts of the coupling portions 502a' from the adjacent portions of the cover 502, the portions 502a' can be more readily shaped to assume an optimum configuration for cooperation with the male coupling portions 513d of the bayonet mount 514.

As can be readily seen in FIG. 21, the positions and shapes of the coupling portions 502a, and 513d (which together constitute the bayonet mount 514) are selected in such a way that they can further perform the function of means for centering the sensor 513 relative to the cover 502. To this end, the female coupling portions 502a' are provided with rather shallow centering recesses 502e for parts of the respective male coupling portions 513d.

In order to ensure predictable and optimal positioning of the sensor 513 relative to the cover 502 during establishment of engagement between the coupling portions 502a' and 513d of the bayonet mount 514, the substantially axially extending marginal portion 502b of the cover 502 is preferably provided with at least three equidistant female coupling portions 502a'. The arrangement is such that the portions 502a' and 513d of the bayonet mount 514 permit a predetermined angular displacement of the cover 502 and the sensor 513 relative to each other before the bayonet mount is effective to maintain the sensor in an optimum position at a certain distance from the outer side of the bottom wall 502a as well as in properly centered position relative to the cover 502. At such time, the male coupling portions 513d abut stops 502f which form part of the cover 502 and serve to prevent further rotation of the cover 502 and sensor 513 relative to each other in order to activate the bayonet mount 514. As can be seen in FIG. 20a, each stop 502f can constitute an axially extending projection of the cover 502. FIG. 20a further shows that at least one of the female coupling portions 502a' (but preferably at least two or all three coupling portions 502a') is provided with an additional stop 502g which also prevents rotation of the sensor 513 relative to the cover 502. Each stop 502g is engaged by the adjacent male coupling portion 513d of the sensor 513 when the bayonet mount 514 is fully assembled.

In the embodiment which is shown in FIGS. 20 to 22, each of the female coupling portions 502a' is provided with a first stop 502f and with a second stop 502g for the respective male coupling portion 513d. One of the stops 502f, 502g holds the respective coupling portion 513d against rotation in one direction, and the other of the stops 502f, 502g holds the respective coupling portion 513d against rotation in the opposite direction. The stops 502g serve to prevent accidental or unintentional separation of the bayonet mount 514, i.e., they prevent accidental separation of the sensor 513 from the cover 502. Once the bayonet mount 514 is active, the sensor 513 is held in a predetermined angular position relative to the bottom wall 502a of the cover 502.

In order to render the bayonet mount 514 effective, the sensor 513 is first subjected to an initial stress by deforming it axially toward the bottom wall 502a of the cover 502 so that the male coupling portions 513d can enter the adjacent slots or slits 502c and 502d of the cover 502 by moving in the circumferential direction of the friction clutch 501. In this manner, the male coupling portions 513d can be moved behind the adjacent female coupling portions 502a'. The next step of rendering the bayonet mount 514 operative involves turning of the cover 502 and the sensor 513 relative to each other until at least some of the coupling portions 513d reach and are arrested by the corresponding stops 502f. The sensor 513 then dissipates some energy so that at least some of the male coupling portions 513d move axially and away from the bottom wall 502a and enter the spaces between the respective stops 502f and 502g. This ensures that the sensor 513 can no longer become accidentally separated from the (female) coupling portions 502a' of the cover 502. Once the bayonet mount 514 is effective to reliably hold the sensor 513 in the interior of the cover 502, the assembly of the friction clutch 501 can proceed without risking accidental changes in the (centered) position of the sensor 513 relative to the cover 502 and/or unintentional separation of the sensor from the cover. At such time, each of the female coupling portions 502a' is overlapped by one of the male coupling portions 513d.

In the heretofore described embodiments of the improved friction clutch, that circumferentially complete portion of the sensor (such as the main portion 513b of the sensor 513) which actually generates the force (e.g., the force to urge the diaphragm spring 504 of FIG. 21 against the ring 512) extends radially outwardly beyond the points or lines of contact between the diaphragm spring and the pressure plate (such as the diaphragm spring 504 and the portion 503a of the pressure plate 503 shown in FIG. 21). However, it is often desirable and advantageous to position the main portion of the sensor radially inwardly of the locations of engagement between the diaphragm spring and the pressure plate, i.e., radially inwardly of the circle including the points or lines of contact between the diaphragm spring and the pressure plate. With reference to the friction clutch 1 of FIGS. 1 and 2, this would mean that the circumferentially complete portion 13b of the sensor 13 would be located radially inwardly of the points of contact between the diaphragm spring 4 and the projecting portions 3a of the pressure plate 3.

Referring again to the friction clutch 501 of FIGS. 20 to 22, the ramps 524 of the compensating unit 516 are provided directly at the inner side of the bottom wall 502a of the cover 502. The latter is made of sheet metal and the ramps 524 are obtained by appropriate deformation of an annular portion of the bottom wall 502a. The means for biasing the annular adjusting member 517 of the compensating unit 516 includes coil springs 526 which are guided by suitably curved guide elements or mandrels 528 forming part of the member 517 (see particularly FIG. 22). The coil springs 526 react against the cover 502 and bear against the respective projections 527 of the member 517 so that the latter tends to turn in a direction to move (under the action of the ramps 524) toward the pressure plate 503 and to thus compensate for wear upon the pressure plate 503, the counterpressure plate (not shown in FIGS. 20–22) and/or friction linings 507 between the counterpressure plate and the pressure plate 503. As can be seen in FIG. 21, each mandrel 528 can have an elongated rectangular cross-sectional outline to extend substantially diametrically across the entire space within the surrounding convolutions of the respective coil spring 526. The length of the arcuate mandrels 528 can approximate but can be less than the length of the respective coil springs 526. The utilization of relatively long mandrels 528 ensures predictable and satisfactory guidance of the respective coil springs 526, at least in the radial direction of the member 517. In addition, the mandrels 528 can be designed and dimensioned to effectively prevent any, or any appreciable, axial movements (buckling) of intermediate portions of the respective coil springs 526. Another important advantage of the mandrels 528 is that they simplify the assembly of the friction clutch 501.

FIG. 22 shows one of several radially inwardly extending projections 527 which are or can be of one piece with the major portion of the adjusting member 517 and carry the respective mandrels 528. If the member 517 is made of a plastic material (e.g., a material which can be shaped in an injection molding or extruding machine), the projections 527 can be made of one piece with the respective mandrels 528 as well as with the circumferentially complete main portion of the member 517, namely that portion which is provided with ramps 518 serving to cooperate with the ramps 524 on the bottom wall 502a of the cover 502. However, it is equally within the purview of the invention to mass produce the mandrels 528 (or the mandrels 528 and the corresponding projections 527) independently of the main portion of the adjusting member 517 and to thereupon assemble the parts 527 or the parts 527, 528 with the main portion of the member 517, e.g., by resorting to connections which operate with snap action. It is also possible to make the mandrels 528 from a one-piece ring which is severed at a required number of locations to permit entry of the thus obtained arcuate portions of the ring into the corresponding coil springs 526 and to affix each arcuate portion of the subdivided ring to one of the projections 527. The connections between the arcuate portions of the aforementioned ring (i.e., of a blank for the making of the mandrels 528 or their equivalents) and the projections 527 can be designed to operate by snap action. It is preferred to provide the adjusting member 517 with at least three preferably equidistant projections 527.

If desired or necessary, the friction clutch 501 can be constructed in such a way that it comprises one or more additional systems for preventing undesirable movements of the coil springs 526 relative to the cover 502 and/or member 517. For example, and as already explained with reference to the friction clutch 101 of FIGS. 12–13, the cover 502 and/or the member 517 can be provided with suitable means for preventing any undesirable movements of the coil springs 526 under the action of centrifugal force.

The means for coupling one end of each coil spring 526 to the cover 502 of the friction clutch 501 comprises retainers or stops 526a' (one shown in each of FIGS. 20 and 21) which can constitute suitably deformed portions of the cover 502 and extend in the axial direction of the friction clutch. The configuration of the retainers 526a, is preferably such that they not only abut the adjacent outermost convolutions of the respective coil springs 526 but that they are also capable of otherwise guiding or locating the respective coil springs (e.g., in the radial and/or axial direction of the friction clutch 501).

In the friction clutch 601 of FIG. 23, the sensor 613 is located at the outer side of the bottom wall 602a of the housing or cover 602, i.e., at that side of the bottom wall 602a which faces away from the pressure plate 603. An advantage of such mounting of the sensor 613 is that it is subjected to less pronounced thermal stresses; this reduces the likelihood of undesirable reduction or decrease of resiliency of the sensor 613 as a result of excessive thermal stressing. Moreover, the sensor 613 at the outer side of the bottom wall 602a is subjected to much more pronounced cooling action when the friction clutch 601 is in use.

The operative connection between the sensor 613 and the diaphragm spring 604 in the clutch 601 of FIG. 23 is established by way of distancing elements in the form of rivets 615 (only one shown). The shanks of these rivets extend through slots between the neighboring prongs of the diaphragm spring 604 and through openings in the bottom wall 602a of the cover 602. The axes of the rivets 615 are parallel to the axis of the friction clutch 601, and each of these rivets has a head which overlies the outer side of the sensor 613. The rivets 615 constitute but one form of means which can be used to operatively connect the sensor 613 with the diaphragm spring 604. For example, the sensor 613 can be provided with axially extending projections in the form of lugs or the like having suitable tips overlying the ring 611 of the composite seat 605 to maintain the ring 611 in uninterrupted contact with the main portion of the diaphragm spring 604. In fact, it is possible to design the sensor 613 in such a way that it is made of one piece with parts which replace the rivets 615 as well as the ring 611 of the composite seat 605. Still further, the rivets 615 which are rigid with the sensor 613 can be replaced with parts which are articulately connected to the sensor 613.

Referring to FIG. 24, there is shown a portion of a friction clutch 701 with a sensor 713 which is disposed radially inwardly of the locations of contact between the diaphragm spring 704 and the portion or portions 703a of the pressure plate 703. Thus, the sensor 713 is located radially inwardly of the composite seat 705. The radially inner portions (tongues) of the sensor 713 react against the adjacent portions of the cover 702. To this end, the cover 702 is provided with arms 715 which extend through the slots between the prongs of the diaphragm spring 704 and are engaged by the adjacent portions of the sensor 713.

Figure 25:
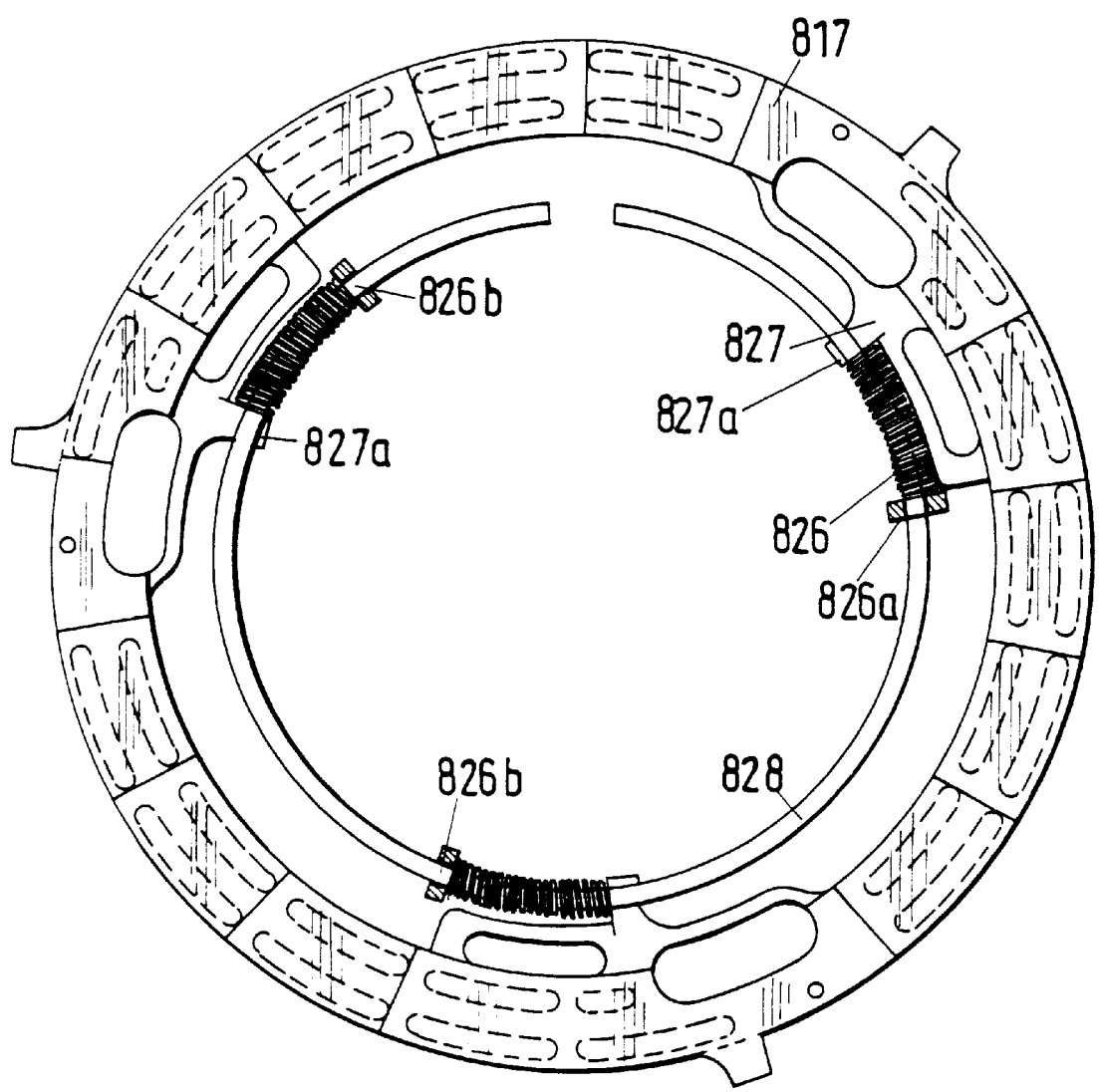
FIG. 25 is a plan view of an annular adjusting member which can be utilized in the adjusting unit of the second or fourth friction clutch.

The annular adjusting member 817 which is shown in FIG. 25 can be utilized with advantage in the friction clutch of FIGS. 20, 20a and 21 in lieu of the annular adjusting member 517 of FIG. 22. The radially inner portion of the member 817 is provided with projections 827 which extend radially inwardly and have radially inwardly projecting extensions 827a. The extensions 827a serve as abutments for the adjacent end convolutions of arcuate coil springs 826 extending in the circumferential direction of the member 817. The other end convolution of each coil spring 826 bears against a retainer 826a forming part of a housing or cover (not shown but corresponding to the cover 502 of FIGS. 20 and 21) and extending in parallelism with the axis of the friction clutch employing the member 817.

In order to facilitate assembly of the adjusting member 817 with the coil springs 826, there is provided a split ring 828 which is concentric or nearly concentric with the member 817 and extends through the extensions 827a, through the coil springs 826 and through the retainers 826a. The ring 828 is affixed to the extensions 827a; for example, the extensions 827a can be provided with grooves or sockets that extend in the circumferential direction of the member 817 and are dimensioned and configurated to receive the respective portions of the split ring 828 by snap action. Each retainer 826a can be provided with a groove 826b which extends in substantial parallelism with the axis of the member 817 and is configurated and dimensioned to receive the adjacent portion of the split ring 828 with freedom of movement of the ring relative to the retainer 826a in the circumferential direction of the member 817. At the very least, the ring 828 can move circumferentially of the member 817 to the extent which is necessary to compensate for wear upon the friction linings, the pressure plate and/or the counterpressure plate in the friction clutch which employs the structure of FIG. 25.

It is presently preferred to configurate the extensions 827a and the retainers 826a in such a way that the sockets of the extensions 827a (for reception of the adjacent portions of the split ring 828 by snap action) face in one axial direction and the grooves 826b (for reception of adjacent portions of the ring 828 with freedom of movement in the circumferential direction of the member 817) face in the opposite axial direction. In other words, the sockets of the extension 827a can be open in a direction toward or away from the bottom wall of the housing or cover of the friction clutch employing the structure of FIG. 25, and the grooves 826b of the retainers 826a can be open in a direction away from the bottom wall of such housing or cover.

Figure 26:
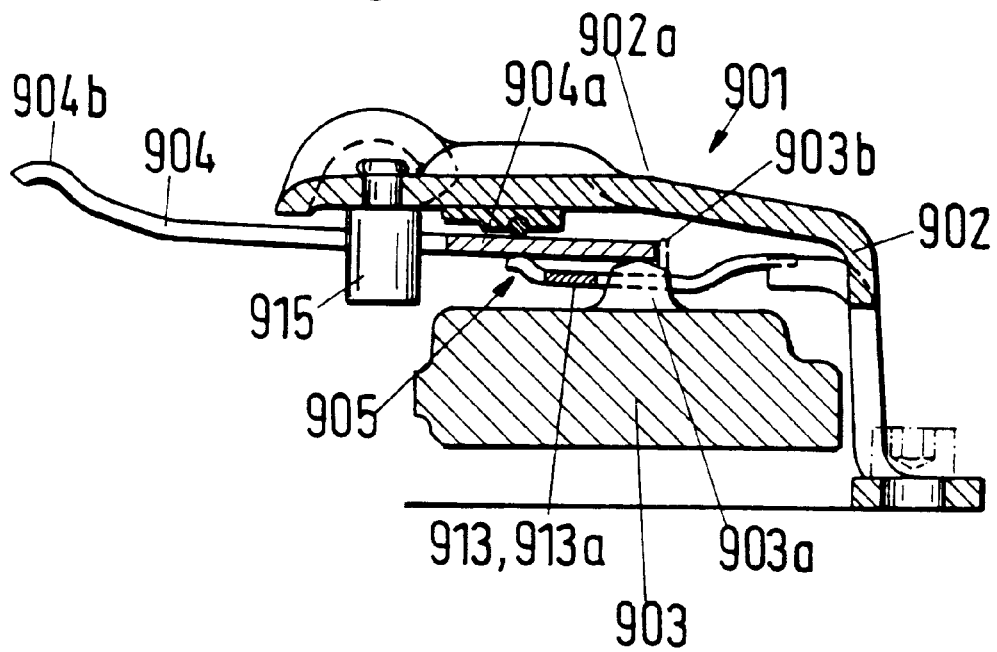
FIG. 26 is a fragmentary axial sectional view of a seventh friction clutch.

FIG. 26 illustrates a friction clutch 901 with a diaphragm spring 904 having a main portion 904a. The median part of the main portion 904a is in contact with the parts of the composite seat 905, and the radially outermost part of the main portion 904a is positioned to bear against the projecting portion or portions 903a of the pressure plate 903 when the friction clutch 901 is engaged. The prongs 904b of the diaphragm spring 904 (i.e., the actuating means of the means for engaging and disengaging the friction clutch 901) extend radially inwardly beyond the main portion 904a, i.e., radially inwardly beyond the composite seat 905. The distance of the seat 905 from the radially innermost part of main portion 904a of the diaphragm spring 904 is greater than in heretofore known friction clutches wherein the means for biasing the pressure plate toward the friction linings of the clutch disc includes a diaphragm spring reacting against the housing or cover of the friction clutch. In the embodiment of FIG. 26, the ratio of the width of that part of the main portion 904a which extends radially inwardly beyond the composite seat 905 to the width of that part of the main portion 904a which extends radially outwardly beyond the seat 905 is approximately 1:2. It is often desirable that such ratio be between 1:6 and 1:2. By selecting the position of the composite seat 905 relative to the main portion 904a of the diaphragm spring 904 in the just-outlined manner, the maker of the friction clutch 901 reduces the likelihood of damage to and/or overstressing of the main portion 904a in the region of engagement with the seat 905. In other respects, the friction clutch 901 of FIG. 26 can be constructed and assembled in a manner as described with reference to the friction clutch 101 of FIGS. 12 and 13.

FIG. 26 further shows, by broken lines, an axially extending centering projection 903b on the illustrated axially projecting portion 903a of the pressure plate 903. The pressure plate 903 can be provided with a circumferentially complete projecting portion 903a or with a discontinuous projecting portion, e.g., with at least three equidistant discrete projecting portions 903a. The single projecting portion or each discrete projecting portion 903a of the pressure plate 903 can be provided with a centering projection 903b for the diaphragm spring 904. The centering projections 903b render it possible to dispense with all other means for centering the diaphragm spring 904 relative to the bottom wall 902a of the housing or cover 902. Though FIG. 26 shows a rivet 915 which is to center the diaphragm spring 904, such rivet is optional if the projecting portion or portions 903a of the pressure plate 903 are provided with centering projections 903b.

It is further possible to replace the rivets 915 and/or the centering projection or projections 903b of the pressure plate 903 in the friction clutch 901 of FIG. 26 with a set of centering projections which are of one piece with or are affixed (e.g., welded) to the bottom wall 902a of the cover 902. For example, the centering projections of the cover 902 can constitute lugs which are bent out of the bottom wall 902a and extend in parallelism with the axis of the friction clutch 901 toward the pressure plate 903. Alternatively, the centering projections of the cover 902 can constitute inwardly bulging portions (rather than lugs) of the bottom wall 902a.

The diaphragm spring which constitutes the sensor 913 in the friction clutch 901 of FIG. 26 is designed in such a way that its circumferentially complete main or basic portion 913a is disposed radially inwardly of the projecting portion or portions 903a of the pressure plate 903. In order to prop the diaphragm spring 904 on the one hand, and to be adequately propped against the cover 902 on the other hand, the sensor 913 is further provided with radial arms in the form of tongues including a set extending from the main portion 913a radially inwardly to form part of the composite seat 905 (such as a substitute for the wire ring 11 in the composite seat 5 of FIGS. 1–2) and a set extending from the main portion 913a radially outwardly to react against lugs forming part of the substantially axially extending portion of the cover 902.

Figure 27:
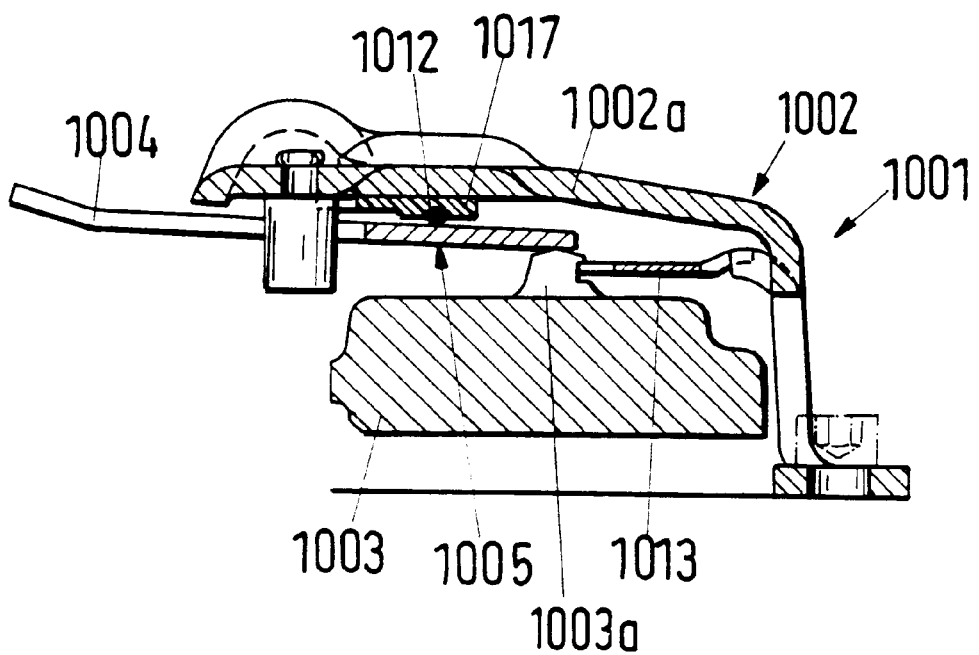
FIG. 27 is a fragmentary axial sectional view of an eighth friction clutch.

Referring to FIG. 27, there is shown a friction clutch 1001 including a diaphragm spring 1013 constituting a sensor and serving to transmit a force which opposes the force to be applied in order to disengage the friction clutch and which also opposes the force of the diaphragm spring or clutch spring (resilient device) 1004. The sensor 1013 reacts against the housing or cover 1002 and bears against the projecting portion or portions 1003a of the pressure plate 1003. In other words, the sensor 1013 is installed in axially stressed condition between the cover 1002 and the pressure plate 1003. In this embodiment of the present invention, the composite seat 1005 does not provide a bearing for tilting of the diaphragm spring 1004 in a direction to disengage the friction clutch 1001. The diaphragm spring 1004 engages a wire ring 1012 which forms part of the seat 1005 and contacts that side of the main portion of the diaphragm spring 1004 that faces toward the annular adjusting member 1017 and the bottom wall 1002a of the cover 1002. The sensor 1013 constitutes the means for biasing the main portion of the diaphragm spring 1004 against the wire ring 1012 of the seat 1005. This sensor is dimensioned, configurated and installed in such a way that, during disengagement of the friction clutch 1001, the axial force generated by the sensor 1013 and acting upon the diaphragm spring 1004 is or becomes larger than the force which is required to disengage the friction clutch 1001. The arrangement should be such as to ensure that, when the wear upon the friction linings (not shown in FIG. 27) is nil or minimal, the diaphragm spring 1004 continuously engages the wire ring 1012 of the composite seat 1005. To this end, and as already described in connection with the previously discussed embodiments of the improved friction clutch, it is necessary to properly relate the superimposed forces acting in the axial direction of the friction clutch 1001. Such forces are generated by the sensor 1013, by the resilient segments (not shown) of the clutch disc in the friction clutch 1001, by leaf springs (if any) which connect the pressure plate 1003 with the cover 1002 in such a way that the parts 1002, 1003 have a certain freedom of axial movement but cannot turn relative to each other, by the diaphragm spring 1004, by the means for disengaging the friction clutch 1001, and by resilient means (e.g., coil springs or torsion springs) acting upon the adjusting member 1017 of the compensating unit in order to compensate for wear upon the pressure plate 1003, the counterpressure plate (not shown) and/or the friction linings of the clutch disc between the pressure plate 1003 and the counterpressure plate.

The operation of the friction clutch 1001 of FIG. 27 is as follows: The sensor 1013 is designed in such a way that its force corresponds to the disengaging force at the point of adjustment. When the friction linings (not shown in FIG. 27) have undergone a certain amount of wear (and/or when one or more other parts of the friction clutch 1001 have undergone a certain amount of wear, 20 such as the portion or portions 1003a of the pressure plate 1003 and/or the adjacent portion of the diaphragm spring 1004), the conicity of the diaphragm spring 1004 is changed accordingly. If the friction clutch 1001 is then disengaged against the more pronounced resistance of the diaphragm spring 1004, the diaphragm spring is first tilted at the ring 1012 to a position close to the adjustment point. At such point, the disengaging force equals the force of the sensor 1013 plus the remaining force of the resilient segments (not shown in FIG. 27) forming part of the clutch disc; therefore, further disengagement of the friction clutch 1001 causes a tilting of the diaphragm spring 1004 at the portion or portions 1003a of the pressure plate 1003 until an equilibrium is established between the disengaging force and the force of the sensor 1013. The diaphragm spring 1004 is disengaged from the ring 1012 and the latter is free to be adjusted (in response to angular displacement of the annular adjusting member 1017 of the compensating unit) in a direction to compensate for wear. As the disengagement of the friction clutch 1001 continues, the magnitude of the disengaging force continues to decrease, the force of the sensor 1013 prevails and the sensor then causes the pressure plate 1003 to push the diaphragm spring 1004 against the ring 1012 of the composite seat 1005. Further tilting of the diaphragm spring 1004 then takes place with reference to the ring 1012. During transition from engagement of the diaphragm spring 1004 with the ring 1012 to engagement of the diaphragm spring with the portion or portions 1003a of the pressure plate 1003, the diaphragm spring changes its tendency to act as a two-armed lever. The diaphragm spring then temporarily reacts against the pressure plate 1003 with the then prevailing disengaging force and, as already mentioned above, is lifted off the ring 1012 of the composite seat 1005 on the cover 1002. However, and as the disengagement of the friction clutch 1001 continues, the resulting drop of bias of the diaphragm spring 1004 enables the force of the sensor 1013 to prevail and to push the diaphragm spring back against the ring 1012 which results in blocking or deactivation of the compensating unit including the annular adjusting member 1017, i.e., the adjusting operation is completed. The diaphragm spring 1004 is then in condition to act as a two-armed lever during further disengagement of the friction clutch 1001. This diaphragm spring is preferably designed by full consideration of all spring forces which are directly or indirectly applied or applicable to oppose its bias. Such forces include particularly that of the sensor 1013 and the forces adapted to be applied by parts which are movable in the axial direction of the cover 1002 and form part of the compensating device including the member 1017.

Figure 28:
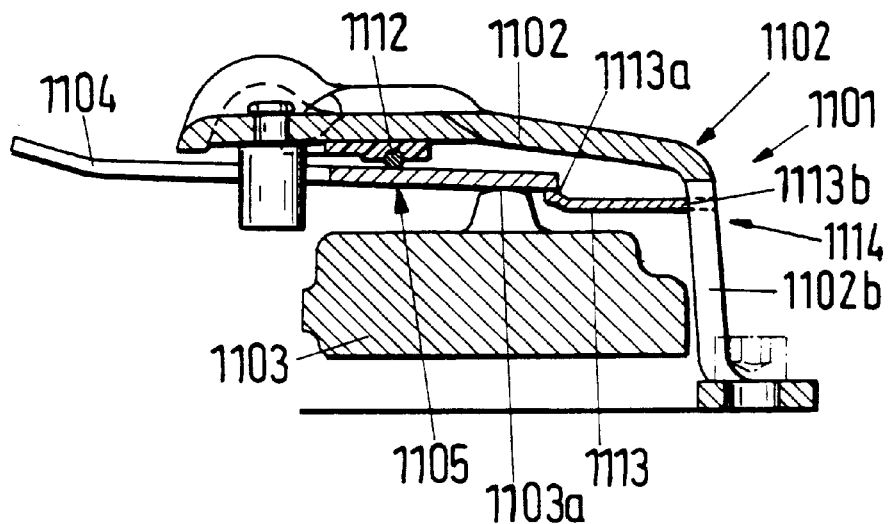
FIG. 28 is a fragmentary axial sectional view of a ninth friction clutch.

FIG. 28 shows a portion of a torque transmitting friction clutch 1101 wherein the sensor 1113 engages the diaphragm spring 1104 radially outwardly of the ring 1112 of the composite seat 1105. The location of engagement between the sensor 1113 and the housing or cover 1102 of the friction clutch 1101 is also disposed radially outwardly of the ring 1112 and radially outwardly of that portion or those portions 1103a of the pressure plate 1103 which is or are biased by the diaphragm spring 1104. The radially outermost portion of the sensor 1113 is constituted by radially outwardly extending arms 1113b which engage the cover 1102 in a manner similar to that shown in and already described with reference to FIG. 21, namely by resorting to a bayonet mount 1114. The latter maintains the sensor 1113 at a predetermined axial distance from the bottom wall 1102a of the cover 1102 and prevents undesirable angular movements of the sensor relative to the cover 1102. In order to facilitate the installation of the sensor 1113 in the cover 1102, the latter is provided with axially parallel slots 1102b which receive the arms 1113b in order to assemble the bayonet mount 1114. The arms 1113b can be introduced into the respective slots 1102b in the axial direction of the cover 1102. The diaphragm spring 1104 is caused to bear upon the ring 1112 of the seat 1105 under the bias of the sensor 1113.

The friction clutch 1101 of FIG. 28 exhibits the advantage that the diaphragm spring 1104 is stressed and acts not unlike a two-armed lever as soon as, and as long as, the friction clutch remains in the engaged condition. In other words, the diaphragm spring 1104 is stressed between the ring 1112 of the composite seat 1105 and the portion or portions 1103a of the pressure plate 1103. However, when the friction clutch 1101 is being disengaged, the diaphragm spring 1104 bears only or practically exclusively against the sensor 1113 and is tilted at that portion (1113a) of the sensor 1113 which can be said to form part of the composite seat 1105 and serves as a substitute for the ring 11 in the composite seat 5 of the friction clutch 1. At the same time, the portion 1113a of the sensor 1113 moves in the axial direction of the cover 1102 so that the diaphragm spring 1104 then acts not unlike a one-armed lever.

The sensor 1113 can be designed in such a way that it can engage any desired or selected portion of the diaphragm spring 1104, i.e, it can also engage the diaphragm spring at a selected radial distance from the axis of the cover 1102 anywhere between the composite seat 1005 and the location or locations of engagement between the diaphragm spring and the portion or portions 1103a of the pressure plate 1103. However, it is also possible to place the diameter of contact between the sensor 1113 and the diaphragm spring 1104 radially inwardly of the composite seat 1105. If the friction clutch 1101 is designed in the just-outlined manner, the axial propping or supporting force to be furnished by the sensor 1113 tends to increase in response to decreasing the diameter of the locations of contact between the portion 1113a of the sensor and the diaphragm spring 1104. Furthermore, the width of that range during which the force to be applied by the sensor 1113 is at least substantially constant must increase with increasing distance of the location of contact between the portion 1113a of the sensor and the diaphragm spring 1104 from the diameter of contact between the diaphragm spring and the composite seat 1105.

Figure 29:
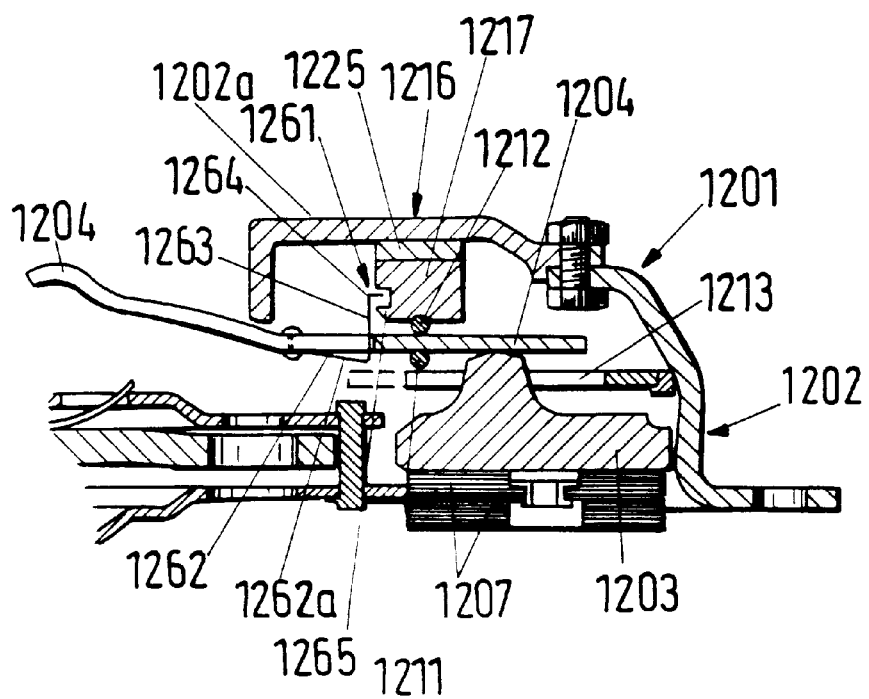
FIG. 29 is a fragmentary axial sectional view of a tenth friction clutch.

The friction clutch 1201 of FIG. 29 comprises a compensating unit 1216 whose operation is analogous to that of the aforedescribed compensating units, especially those in the friction clutches 1 and 101. The seat for the diaphragm spring 1204 comprises two rings 1211, 1212 which are disposed at opposite sides of the diaphragm spring. The seat 1211 is adjacent the pressure plate 1203 and is biased by the sensor 1213 so that it is normally maintained in contact with the respective side of the diaphragm spring 1204.

The friction clutch 1201 further comprises a device 1261 which prevents the ramps on the adjusting member 1217 of the compensating unit 1216 from adhering to the adjacent ramps on the annulus 1225 which is immediately adjacent the inner side of the bottom wall 1202a of the cover or housing 1202. The unit 1261 is designed in such a way that it prevents the ramps of the two sets of ramps from adhering to each other during the entire useful life of the friction clutch 1201. The non-illustrated ramps on the annulus 1225 are or can be identical with or analogous to the ramps 24 of the annulus 25 which forms part of the friction clutch 1 of FIGS. 1–2 and is shown in FIGS. 5 and 6. Adherence of the ramps on the annular adjusting member 1217 to the ramps on the annulus 1225 of the compensating unit 1216 would prevent this unit from automatically compensating for wear upon the friction linings 1207 and preferably also upon certain other parts of the friction clutch 1201.

The device 1261 can be said to constitute a ramp separating assembly in a sense that it does not prevent one set of ramps from contacting the ramps of the other set but is effective to prevent the ramps of the two sets from adhering to one another with a force which could affect the accuracy and reliability of the compensating unit 1216. The arrangement is such that the device 1261 is effective during disengagement of the friction clutch 1201 and, if the friction linings 1207 have undergone an amount of wear which warrants the activation of the unit 1216, i.e., a compensation for such wear, the device 1261 can apply to the adjusting member 1217 a force in the axial direction of the cover 1202. Such force suffices to terminate any adherence of the ramps on the annular adjusting member 1217 to the ramps on the annulus 1225. The illustrated device 1261 comprises an element 1262 which is resilient in the axial direction of the cover 1202 and is connected to the diaphragm spring 1204. The element 1262 comprises a ring-shaped diaphragm-like main or basic portion 1262*a* having a radially inner portion which is connected (e.g., riveted) to the diaphragm spring 1204. The radially outer part of the main portion 1262*a* of the element 1262 (which also resembles a diaphragm spring) is provided with axially extending projections 1263. These projections extend through axial holes or windows of the diaphragm spring 1204 and their free ends are bent at 1264 to overlie a shoulder 1265 of the annular adjusting member 1217. The projections 1263 are preferably equidistant from each other in the circumferential direction of the element 1262. The shoulder 1265 can constitute a circumferentially complete shoulder if the peripheral surface of the annular adjusting member 1217 is provided with a ring-shaped groove or recess. It is also possible to provide the peripheral surface of the member 1217 with several spaced-apart grooves or recesses each of which is bounded by a separate shoulder 1265 for one of the free ends 1264.

The axial distance between the free ends 1264 and the shoulder 1265 in the engaged condition of the friction clutch 1201 is selected in such a way that the free ends 1264 do not contact the adjusting member 1217, the same as during the major part of disengagement of the friction clutch. The arrangement is preferably such that the free ends 1264 of the projections 1263 engage and pull the shoulder 1265 in a direction away from the annulus 1225 only when the friction clutch 1201 is fully disengaged. The resilient element 1262 is then stressed between the diaphragm spring 1204 and the adjusting member 1217. This ensures that, when warranted by wear upon the friction linings 1207 (or by additional wear upon these friction linings), the ring 1211 can be shifted axially of the cover 1202 toward the pressure plate 1203 because the two sets of ramps (on the member 1217 and on the annulus 1225) do not adhere to each other and the member 1217 can be turned in order to effect the necessary adjustment which compensates for initial wear or for additional wear upon the friction linings 1207.

The device 1261 is further designed to prevent an adjustment by the member 1217 of the compensating unit 1216 when the extent of disengagement is excessive, for example, due to improper assembly of the friction clutch 1201, particularly as a result of improper basic or initial setting of the unit 1216. This function is accomplished by the device 1261 in that, when the change of conicity of the diaphragm spring 1204 during disengagement of the friction clutch 1201 is excessive, the element 1262 biases the adjusting member 1217 toward the diaphragm spring 1206 which, in turn, prevents the member 1217 from turning relative to the diaphragm spring and hence also relative to the annulus 1225 of the compensating unit 1216. With reference to the diagram of FIG. 8, the device 1261 ensures that, when the change of conicity of the diaphragm spring 1204 is such as to cause the point 46 to migrate upwardly and away from the abscissa, the annular member 1217 is no longer free to turn relative to the annulus 1225 and relative to the diaphragm spring because, at such time, the retaining force of the sensor 1213 is overcome. In other words, in the absence of any undertaking to the contrary, the adjusting member 1217 would then change its angular position and would compensate for (non-existent or insufficient) wear upon the friction linings 1207. This would result in a change of operating point, i.e., a change of the position or shape of the diaphragm spring 1204 in a direction to reduce its bias upon the pressure plate 1203. Referring again to the diagram of FIG. 8, this would mean that the operating point 41 would be transferred along the curve 40 in a direction toward the lowest point 45 of this curve.

Referring to FIGS. 30, 31 and 32, there is shown a portion of a friction clutch 1301 wherein the compensating unit comprises an annular adjusting member 1317. The means for operating the compensating unit in order to compensate for wear upon the friction linings (not shown) of the clutch disc comprises coil springs 1326 each of which surrounds an arcuate retainer in the form of a mandrel 1328 forming part of the bottom wall 1302*a* of the cover or housing 1302. The cover 1302 is made of a metallic sheet material and the mandrels 1328 are elongated tongues which are bent out of the bottom wall 1302*a* in a manner best shown in FIGS. 31 and 32. To this end, the bottom wall 1302*a* is provided with U-shaped cutouts 1302*a*" each of which surrounds three sides of the respective mandrel 1328. As can be seen in FIGS. 31 and 32, the mandrels 1328 are flat, they have an arcuate shape and they are preferably disposed in a plane which is at least close to the general plane of the bottom wall 1302*a*. It is also possible to employ mandrels which extend substantially tangentially of a circle having its center on the axis of the friction clutch 1301. The mandrel 1328 which is shown in FIG. 32 is offset from the general plane of the bottom wall 1302*a* by a distance corresponding to half the thickness of the bottom wall. The width of each mandrel 1328 is or can be selected in such a way that each such mandrel can adequately guide the respective coil spring 1326 in the radial and axial directions of the cover 1302.

The annular adjusting member 1317 of the compensating unit in the friction clutch 1301 comprises radially outwardly extending arms 1327 which are disposed between the bottom wall 1302*a* and the diaphragm spring 1304. The radially outermost portions of the arms 1327 are provided with axially extending bifurcated (generally U-shaped) portions or sockets 1327*a* each having two prongs 1327*b* flanking the respective mandrel 1328 (see particularly FIGS. 31 and 32). Thus, the springs 1326 bear against the prongs 1327*b* on the arms 1327 of the annular member 1317 and react against the bottom wall 1302*a* so that they tend to turn the member 1317 relative to the ramps 1324 which are provided directly at the inner side of the bottom wall 1302*a* in axial alignment with the ramps (not specifically shown) of the member 1317. The prongs 1327*b* extend axially of the cover 1302 through the respective U-shaped cutouts 1302*a*" of the bottom wall 1302*a*.

The ramps 1324 are of one piece with the bottom wall 1302*a* and are preferably formed in such a way that the bottom wall is provided with slots 1324*a* to establish passages 1324*b* for the flow of cool atmospheric air. The passages 1324*b* are preferably oriented in such a way that they have inlets facing in the direction of rotation of the cover 1302 when the latter is driven by the flywheel on the output element of a combustion engine in a motor vehicle. Forced circulation of atmospheric air when the cover 1302 is set in rotary motion ensures highly desirable and highly effective cooling of the entire friction clutch 1301. The cooling action is particularly beneficial to the annular adjusting member 1317 if the latter is made of a plastic material. This results in highly effective reduction of thermal stresses upon the member 1317. Of course, the air streams which are admitted through the passages 1324*b* can also serve to cool one or more additional parts of the friction clutch 1301.

In accordance with a further embodiment of the present invention, the diaphragm spring which urges the pressure plate against the adjacent set of friction linings forming part of a clutch disc can be biased by a sensor including one or more leaf springs which are installed, for example, between the pressure plate and the cover to bear (directly or indirectly) against the diaphragm spring. Such leaf springs can correspond to the leaf springs 9 in the friction clutch 1, i.e., they can be installed to hold the pressure plate against rotation relative to the cover but to permit limited axial movements of the pressure plate in the axial direction of the cover. In other words, the leaf springs 9 of the friction clutch 1, or analogous leaf springs, could perform the function of non-rotatably but axially movably coupling the pressure plate 3 to the cover 2 and the function of acting as a sensor which urges the diaphragm spring 4 against its seat. Moreover, such leaf springs could also replace the ring 11 of the composite seat 5. All that is necessary is to design and install the leaf springs 9 in such a way that, when the friction clutch 1 is actuated at a time when the wear upon the friction linings is nil or negligible, the diaphragm spring 4 continues to abut the ring 12 of the composite seat 5. However, when the friction linings 7 have been subjected to an amount of wear which warrants compensation by the unit 16, i.e., when the disengaging force of the diaphragm spring 4 is increased, the leaf springs 9 should permit an appropriate adjustment of the diaphragm spring. Leaf springs which can be used to perform all of the above-outlined functions are preferably designed to exhibit a displacement-to-force characteristic which is practically linear for the maximum required adjustment of the friction clutch, i.e., for maximum adjustment of the diaphragm spring. In other words, and as already described with reference to the diagram of FIG. 9, the leaf springs should exhibit a characteristic curve corresponding to the portion of the curve 47 or 47a within the distance 48.

Figure 33:
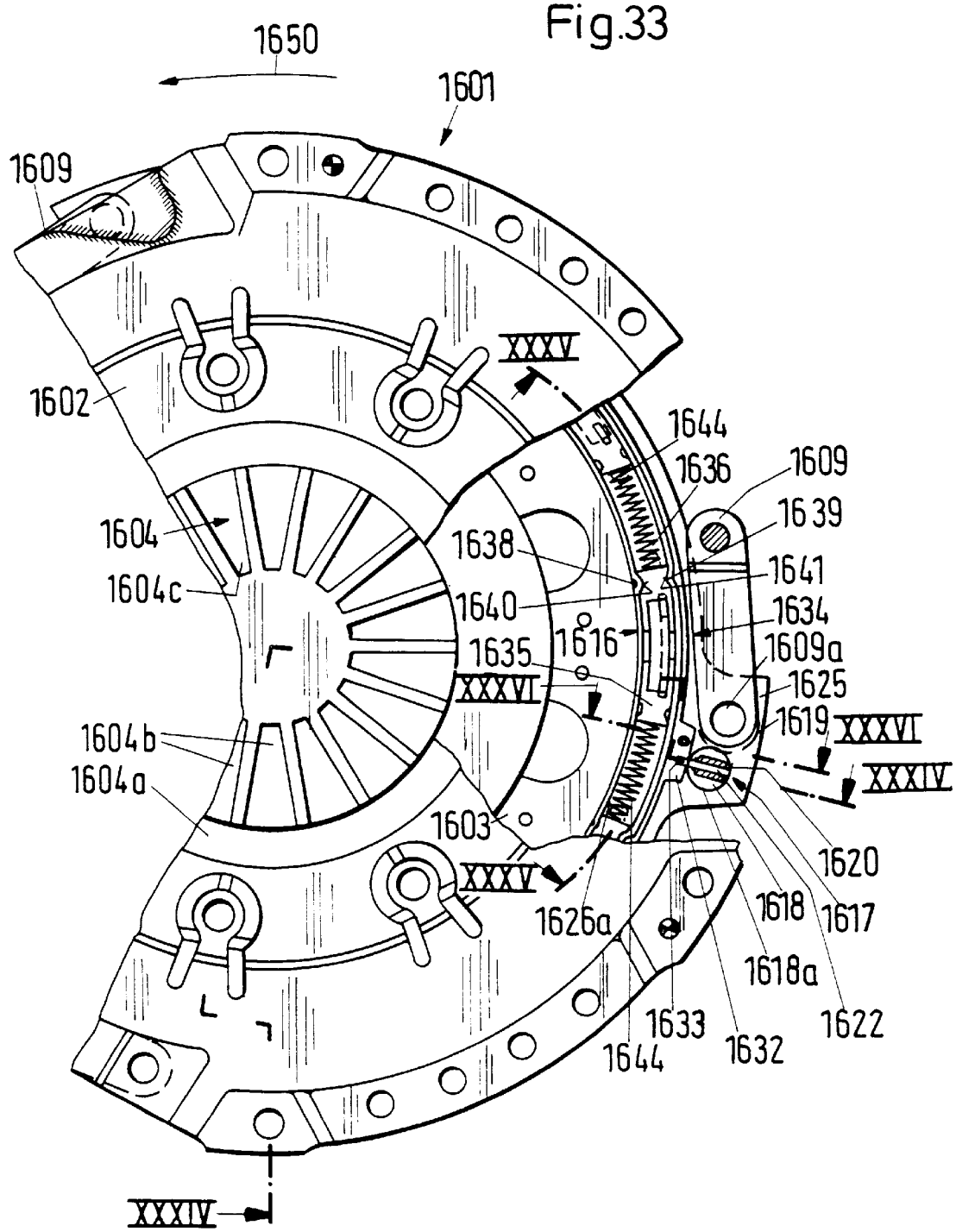
FIG. 33 is a fragmentary front elevational view of a friction clutch which embodies the invention, certain parts of the friction clutch being broken away to reveal portions of the compensating and arresting means.
Figure 34:
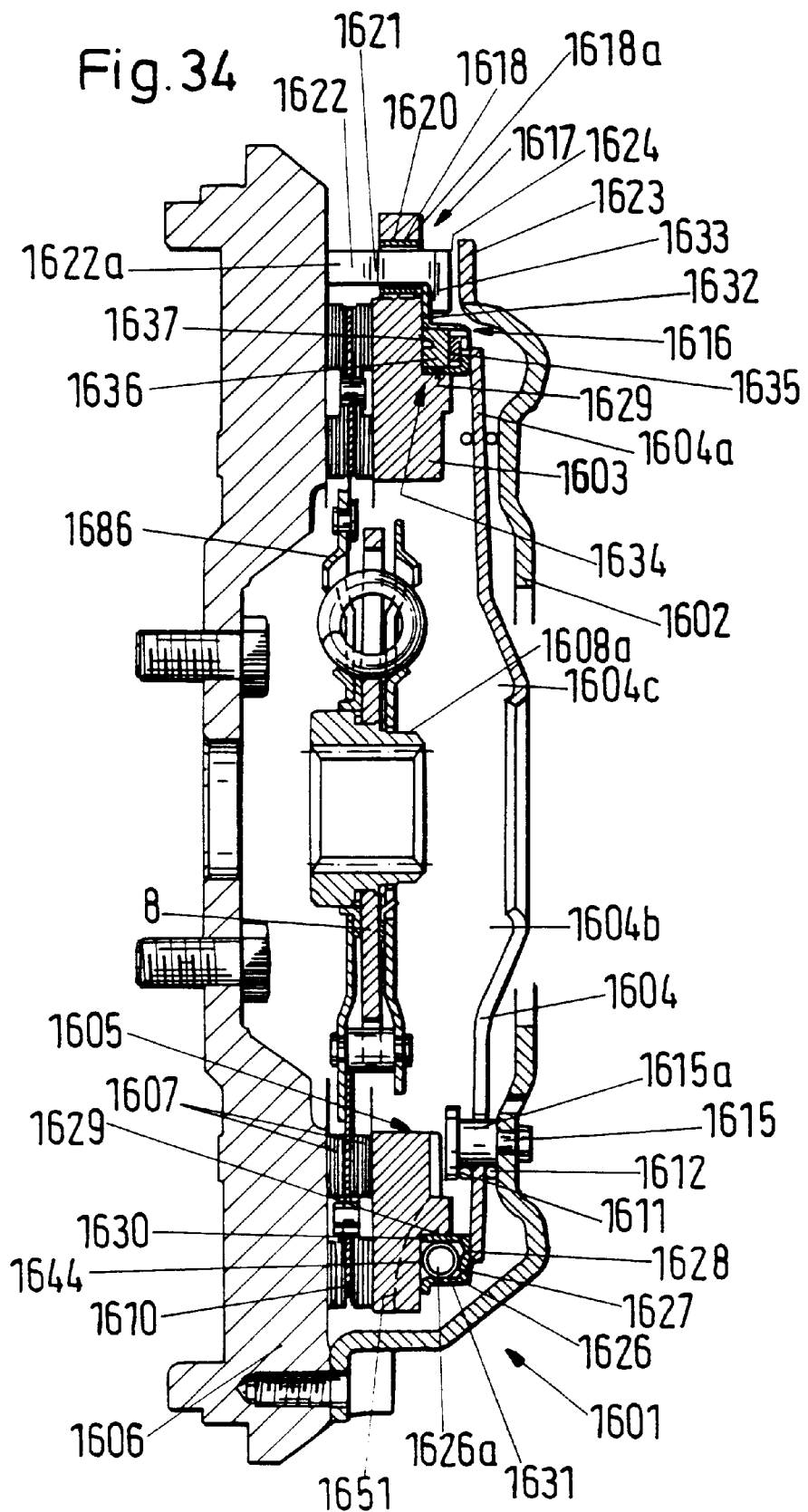
FIG. 34 is a sectional view substantially as seen in the direction of arrows from the line XXXIV—XXXIV in FIG. 33.

The friction clutch 1601 which is shown in FIGS. 33 and 34 comprises a rotary housing or cover 1602 and a rotary pressure plate 1603 which is coaxial with and shares all angular movements of the cover. Leaf springs 1609 are provided to axially movably connect the pressure plate 1603 with the cover 1602 so that the pressure plate can move away from the cover in response to engagement of the friction clutch 1601 and toward the cover when the friction clutch is being disengaged. The extent of axial movability of the pressure plate 1603 away from the cover 1602 is limited by a rotary counterpressure plate 1606 and the friction linings 1607 of a torque transmitting clutch disc or clutch plate 1608 having a hub 1608a connectable to the input shaft of a variable-speed transmission in a motor vehicle. The counterpressure plate 1606 is or can constitute a flywheel which is driven by the output element (e.g., a crankshaft) of a combustion engine in a motor vehicle. The outer marginal portion 1623 of the cover or housing 1602 is bolted or screwed to the marginal portion of the counterpressure plate 1606 so that these parts rotate as a unit when the plate 1606 is driven by the output element of the engine.

The friction clutch 1601 further comprises at least one actuating device and a resilient device 1604 which is installed between the cover 1602 and the pressure plate 1603. The illustrated resilient device 1604 is a stressed diaphragm spring which reacts against the cover 1602 and indirectly bears against the pressure plate 1603 when the friction clutch 1601 is engaged, i.e., when the plates 1603 and 1606 compress the friction linings 1607 between them so that the hub 1608a can transmit torque to the input element of the transmission. A composite seat 1605 is provided on the cover 1602 to tiltably mount an annular main portion 1604a of the diaphragm spring 1604. The actuating device of the friction clutch 1601 includes a set of resilient prongs 1604b which extend radially inwardly from the main portion 1604a of the diaphragm spring 1604 and whose radially innermost portions or tips 1604c can be moved to the left (as viewed in FIG. 34) in order to disengage the friction clutch 1 by tilting the main portion 1604a at the seat 1605 so that the substantially tangentially extending leaf springs 1609 can retract the pressure plate 1603 axially of and away from the counterpressure plate 1606 and hence from the linings 1607 of the clutch disc 1608. The friction linings 1607 of the clutch disc 1608 are mounted on two sets of resilient carriers 1610 which, in turn, are mounted on a disc 1608b of the clutch plate 1608. The carriers 1610 permit a gradual buildup of torque in response to engagement of the friction clutch 1601, namely when the prongs 1604b are released by the aforediscussed bearing of the clutch engaging-disengaging (actuating) means so that the main portion 1604a of the diaphragm spring 1604 automatically reassumes the position which is shown in FIG. 34. Thus, the pressure plate 1603 then bears against the adjacent friction lining 1607 and urges the other friction lining 1607 against the adjacent friction surface of the counterpressure plate 1606 which is assumed to be driven by the output element of the combustion engine. The magnitude of torque which is being transmitted from the counterpressure plate 1606 to the input element of the transmission increases gradually in response to engagement of the friction clutch 1601 because this entails gradual deformation of the carriers 1610 under the bias of the diaphragm spring 1604 while the latter moves the pressure plate 1603 axially of the cover 1602 toward the counterpressure plate 1606.

The illustrated friction clutch 1601 can be modified by omitting the carriers 1610 and by mounting the friction linings 1607 directly on the disc 1602b of the clutch plate 1608. Such friction linings can be rigidly or practically rigidly affixed to the disc 1602b.

The composite seat 1605 for the main portion 1604a of the diaphragm spring 1604 comprises two individual seats 1611, 1612 in the form of wire rings. The wire ring 1612 is installed between the inner side of the cover 1602 and the adjacent side of the main portion 1604a of the diaphragm spring 1604, and the wire ring 1611 is disposed at that side of the main portion 1604a which faces the pressure plate 1603. The means for centering the wire rings 1611, 1612 and the main portion 1604a of the diaphragm spring 1604 in the cover 1602 comprises fastening elements in the form of rivets 1615 which are secured to the cover 1602 and have shanks 1615a extending through slots between neighboring prongs 1604a of the diaphragm spring 1604. The axes of the rivets 1615 are parallel to the common axis X—X of the plates 1603, 1606, cover or housing 1602, clutch disc or plate 1608 and diaphragm spring 1604.

The wear upon the friction linings 1607 (and at least to some extent also upon the friction surfaces of the plates 1603 and 1606) increases in response to repeated engagements and disengagements of the friction clutch 1601 by the actuating device including the prongs 1604b and the means for moving the tips 1604c of the prongs 1604b in the direction of the axis X—X. The improved friction clutch 1601 comprises novel and improved means for accounting at least for wear upon the friction linings 1607, and such means includes a unit 1616 which compensates for wear and is installed between the cover 1602 and the pressure plate 1603 (and more specifically between the plate 1603 and the diaphragm spring 1604) for movement in the direction of the axis X—X to a position which depends from (i.e., which is a function of) the extent or wear upon the friction linings 1607. The aforementioned accounting means further comprises a unit 1617 which serves to arrest the compensating unit 1616 in an optimum position, namely when the position of the compensating unit 1616 accurately reflects the extent of wear at least upon the friction linings 1607 or upon the friction linings as well as upon the plates 1603 and 1606.

The improved arresting unit 1617 is provided on the pressure plate 1603.

The arresting unit 1617 of the friction clutch 1601 which is shown in FIGS. 33 and 34 comprises or constitutes at least one sensor serving as a means for monitoring the extent of wear upon the friction linings 1607 and including a sensor element 1622 which is movable relative to the pressure plate 1603 into abutment with at least one axially fixed part (such as the counterpressure plate 1606 or the cover 1602) of the friction clutch 1601 to thereby limit the extent of movability of the pressure plate 1603 away from the counterpressure plate 1606.

The arresting unit 1617 further comprises a sleeve 1618 which is non-rotatably installed in a bore or hole 1620 of the pressure plate 1603. The sleeve 18 defines a slot 1621 for the sensor element 1622 here shown as comprising two leaf springs extending in parallelism with the axis X—X. The two leaf springs of the sensor element 1622 bear against each other, and at least one of these leaf springs is or can be slightly arched. It is presently preferred to assemble the sensor element 1622 of two leaf springs having convex sides which face and abut each other. These leaf springs are installed in the slot 1621 of the sleeve 1618 in prestressed condition so that a predetermined force must be applied in order to effect a relative movement between the leaf springs of the sensor element 1622 and the sleeve 1618 in parallelism with the axis X—X. Otherwise stated, it is necessary to overcome a predetermined friction before the leaf springs of the sensor element 1622 can be shifted in the slot 1621 of the sleeve 1618.

The length of the sensor element 1622 in the direction of the axis X—X is selected in such a way that, when the friction clutch 1601 is engaged (so that the friction linings 1607 are clamped between the plates 1603 and 1606), the leaf springs of the sensor element 1622 and a stationary part of the friction clutch (note the marginal portion 1623 of the cover or housing 1602) define a clearance or gap 1624 of predetermined width. This is shown in the upper portion of FIG. 34. The width of such clearance or gap 1624 corresponds to the extent of axial movement of the pressure plate 1603 from a position of engagement with the adjacent friction lining 1607 to a position corresponding to that when the clutch 1601 is disengaged. The left-hand end portion 1622a of the sensor element 1622 (as viewed in FIG. 34) bears against the counterpressure plate 6 when the clutch 1601 is engaged. This ensures that, as the wear upon the friction linings 1607 progresses, the pressure plate 1603 moves axially relative to the leaf springs of the sensor element 1622. Thus, the frictional engagement between the leaf springs of the sensor element 1622 and the sleeve 1618 is then overcome under the bias of the diaphragm spring 1604 which urges the pressure plate 1603 toward the counterpressure plate 1606 in engaged condition of the friction clutch 1601. The sleeve 1618 can be made of a suitable plastic material or of any other material which can be used to establish optimal friction between the surface bounding the slot 1621 and the adjacent surfaces of leaf springs forming part of the sensor element 1622.

The bore or hole 1620 which is shown in the upper portion of FIG. 34, and into which the leaf springs of the sensor element 1622 are fitted in predetermined axial and angular positions, is machined into or is otherwise formed in a radially outwardly extending projection or lobe 1625 (see FIG. 33) of the pressure plate 1603. This projection further carries a rivet 1609a for one end portion of one of the leaf springs 1609, which springs axially movably connect the pressure plate 1603 to the cover or housing 1602, i.e., to the counterpressure plate 1606 (which is fixedly connected with the cover 1602).

Any shifting of the sleeve 1618 relative to the lobe 1625 in a direction toward the counterpressure plate 1606 can be prevented by the expedient of providing the sleeve with a collar 1618a which abuts the right-hand side of the pressure plate 1603 (as viewed in FIG. 34) and faces the inner side of the cover 1602. Movements of the sleeve 1618 in the opposite direction (toward the cover 1602) can be prevented by dimensioning the adjacent leaf spring 1609 in such a way that it partially overlies the sleeve (this is indicated in FIG. 33 by broken lines as at 1619). The leaf spring 1609 which is shown at the three o'clock position of FIG. 33 can be designed to actually urge the sleeve 1618 axially into the bore or hole 1620. Angular movements of the sleeve 1618 into the bore or hole 1620 can be prevented by suitable profiling of the external surface of the sleeve and of the surface bounding the hole 1620. Furthermore, the sleeve 1618 can be provided with a socket which receives the adjacent portion 1619 of the leaf spring 1609 to thus even further reduce the likelihood of any angular movements of the sleeve in the bore or hole 1620.

Figure 37:
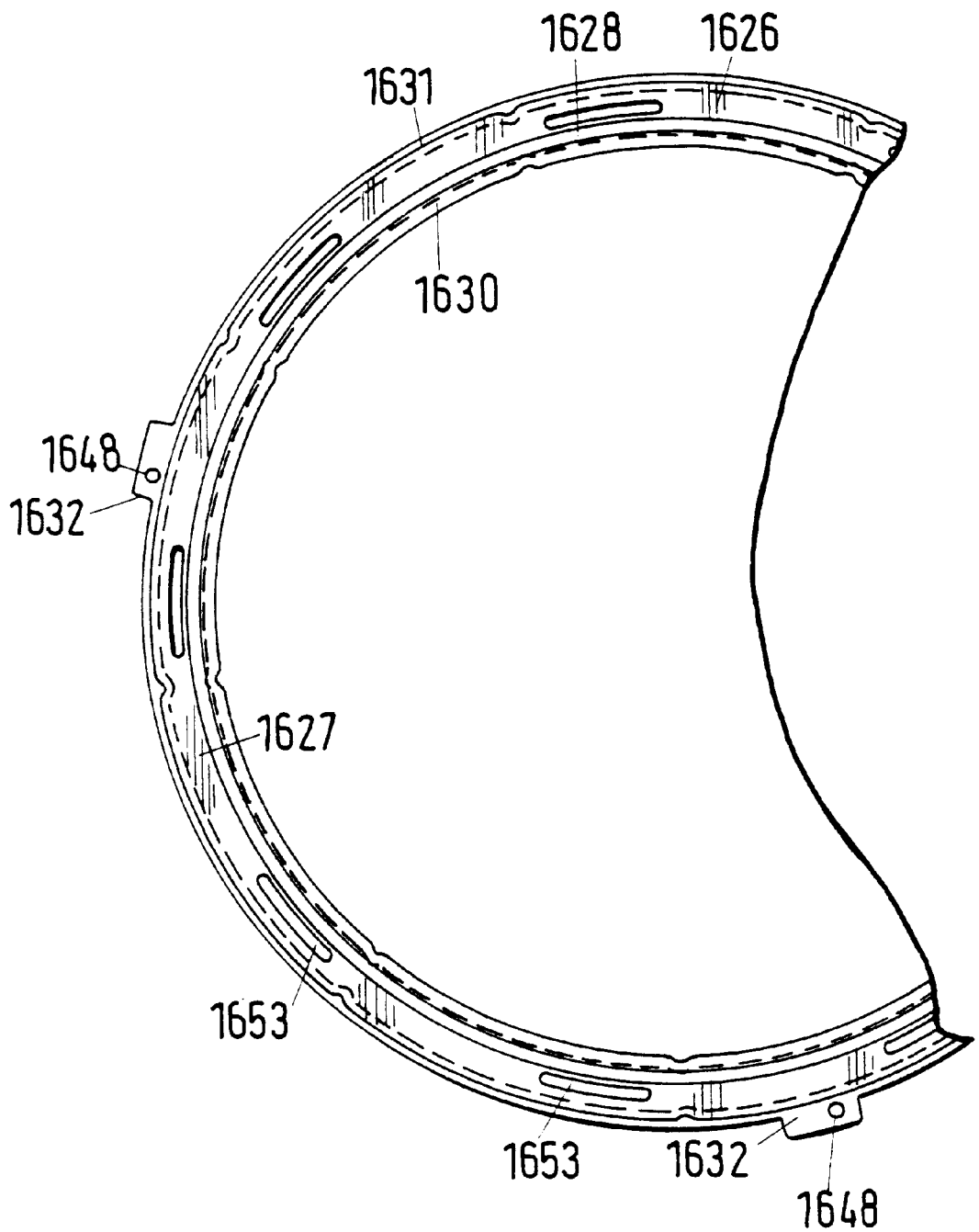
FIG. 37 is a fragmentary elevational view of a ring-shaped locating element of the compensating means in the friction clutch of FIGS. 33 to 36.

The compensating unit 1616 for wear upon the friction linings 1607 comprises a ring-shaped locating element 1626 having a U-shaped cross-sectional outline and being acted upon by the diaphragm spring 1604, at least when the friction clutch 1601 is engaged. The locating element 1626 can be made of a metallic sheet material and a portion thereof is shown in detail in FIG. 37. As can also be seen in FIG. 34, the element 1626 comprises a washer-like bottom wall 1627 which is adjacent the radially outermost part of the main portion 1604a of the diaphragm spring 1604, and two spaced-apart inner and outer cylindrical or substantially cylindrical sidewalls 1630, 1631 extending from the bottom wall 1627 toward the counterpressure plate 1606 and flanking an annular space or channel 1626a. The outer side of the bottom wall 1626 is provided with a plurality of arcuate protuberances 1628 or with a circumferentially complete ring-shaped protuberance extending toward the cover 1602. Such protuberance or protuberances 1628 (it is assumed that the illustrated ring-shaped locating element 1626 has a plurality of equidistant arcuate protuberances 1628) can be formed by impressing grooves or recesses into the inner side of the bottom wall 1627, i.e., by simply deforming selected portions of the bottom wall 1627. The provision of an annulus of arcuate protuberances 1628 with passages or channels between neighboring protuberances exhibits the advantage that the passages or channels establish paths for the circulation of air which cools the locating element 1626 when the main portion 1604a of the diaphragm spring 1604 bears against the protuberances 1628 in engaged condition of the friction clutch 1601.

The pressure plate 1603 is provided with means for centering the locating element 1626 (see particularly FIG. 34). The centering means comprises at least one shoulder 1629 which engages the adjacent outer side of the inner sidewall 1630 of the locating element 1626 and ensures that the axis of the element 1626 coincides with the axis X—X. The centering shoulder 1629 can constitute a circumferentially complete cylindrical surface or it can be composed of a plurality of relatively short arcuate surfaces.

The radially outer sidewall 1631 of the locating element 1626 of the compensating unit 1616 is provided with a plurality of preferably equidistant radially outwardly projecting extensions in the form of lugs or stops 1632 each of which cooperates with a sensor element 1622 of the arresting unit 1617. It is preferred to provide the friction clutch 1601 with an arresting unit 1617 which comprises a plurality of preferably equidistant sensor elements 1622, one for each lug or stop 1632 on the outer sidewall 1631 of the locating element 1626. Each sensor element 1622 comprises a second end portion or leg 1633 which extends radially inwardly of the pressure plate 1603 and overlies the adjacent stop 1632. Such mounting limits the axial movability of the locating element 1626 in the direction of the axis X—X and away from the pressure plate 1603, i.e., toward the cover 1602.

The compensating unit 1616 of the friction clutch 1601 further comprises or cooperates with an equalizing unit 1634 which is installed between the pressure plate 1603 and the locating element 1626 and serves to automatically compensate for wear upon the friction linings 1607 in response to disengagement of the friction clutch, i.e., in response to movement of the pressure plate 1603 axially and away from the counterpressure plate 1606, namely toward the cover or housing 1602. The equalizing unit 1634 becomes effective in response to detection of some wear upon the friction linings 1607 or in response to detection of additional wear upon such linings. The equalizing action of the unit 1634 is automatic and involves an adjustment of the position of the locating element 1626. The equalizing unit 1634 is effective only in response to disengagement of the friction clutch 1601 and is self-locking during engagement, i.e., when the diaphragm spring 1604 is free to move the pressure plate 1603 away from the cover 1602 and into engagement with the adjacent friction lining 1607 to urge the other friction lining 1607 against the axially fixed counterpressure plate 1606. Thus, the equalizing unit 1634 ensures that the axial position of the ring-shaped locating element 1626 relative to the pressure plate 1603 can change only in response to disengagement of the friction clutch 1601 but remains unchanged during subsequent engagement so that the clutch plate 1608 is again in a condition to transmit torque from the combustion engine (i.e., from the counterpressure plate 1606) to the input element of the variable-speed transmission. The extent of axial displacement (if any) of the locating element 1626 during disengagement of the friction clutch 1601 is proportional to the extent of wear (or to the extent of additional wear) at least upon the friction linings 1607 or upon the friction linings and the plate 1603 and/or 1604.

Figure 35:
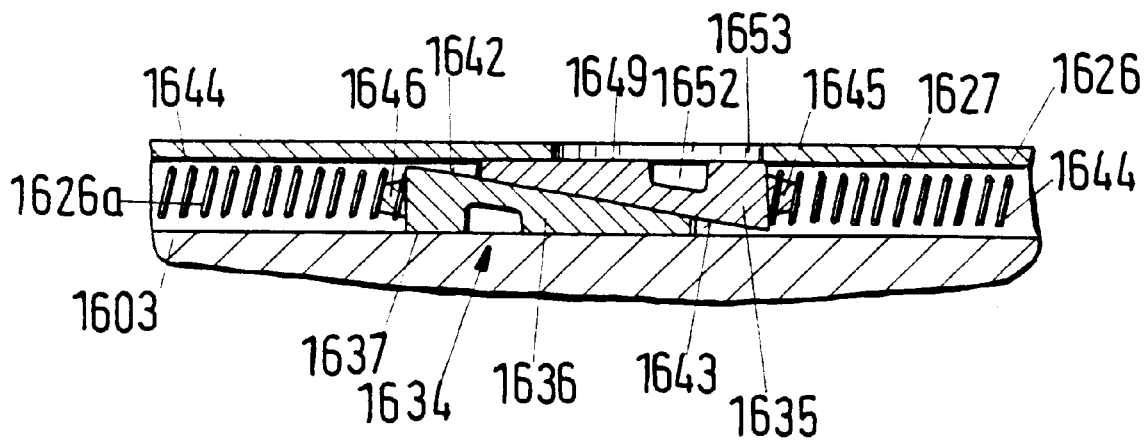
FIG. 35 is a sectional view substantially as seen in the direction of arrows from the line XXXV—XXXV in FIG. 33.

The illustrated equalizing unit 1634 comprises several pairs of complementary ramps 1642, 1643 which are preferably equidistant from each other in the circumferential direction of the locating element 1626 and are installed in the annular space 1626a. As can be seen in FIG. 35, the ramps 1642 are provided on wedge-like members 1636 which abut the pressure plate 1603, and the ramps 1643 are provided on wedge-like members 1635 which abut the inner side of the bottom wall 1627 of the locating element 1626. The pressure plate 1603 has a radially extending annular surface 1637 in abutment with the adjacent wedges 1636 which are non-rotatably but axially movably guided in the space 1626a of the locating element 1626. To this end, the sidewalls 1630, 1631 of the locating element 1626 are provided with ribs 1638, 1639 or other suitable projections which extend into the space 1626a and into complementary recesses or sockets 1640, 1641 of the wedges 1636. The ribs 1638, 1639 and the sockets 1640, 1641 extend in parallelism with the axis X—X.

Each wedge 1635 is installed between one of the wedges 1636 and the inner side of the bottom wall 1627 of the locating element 1626. The arrangement is such that the ramp 1642 of each wedge 1636 abuts the ramp 1643 of the adjacent wedge 1635, and such ramps slope in the circumferential direction of the locating element 1626. The wedges 1635 and their ramps 1643 are movable in the space 1626a in the circumferential direction of the locating element 1626. The equalizing unit 1634 further comprises means for biasing the set of wedges 1635 against the adjacent wedges 1636 in the circumferential direction of the locating element 1626, and such biasing means comprises coil springs 1644 (see particularly FIGS. 33 and 35) each of which reacts against a wedge 1636 of one pair of wedges 1635, 1636 and bears against a wedge 1635 of the neighboring pair of such wedges. As already explained above, the wedges 1636 are held against movement in the circumferential direction of the locating element 1626 by the respective ribs 1638, 1639 and sockets 1640, 1641 but the wedges 1635 can move circumferentially of the locating element 1626 to thereby move the wedges 1636 axially and to change the axial distance of the element 1626 and the pressure plate 1603 relative to each other. FIG. 35 shows that the end portions of the wedges 1635 and 1636 are respectively provided with retainers in the form of studs 1645, 1646 which extend into the adjacent end convolutions of the respective coil springs 1644 of the equalizing unit 1634. Intermediate portions (convolutions) of the coil springs 1644 are guided by the adjacent surfaces of the walls 1627, 1630, 1631 forming part of the locating element 1626 as well as by the surface 1637 of the pressure plate 1603.

Figure 36:
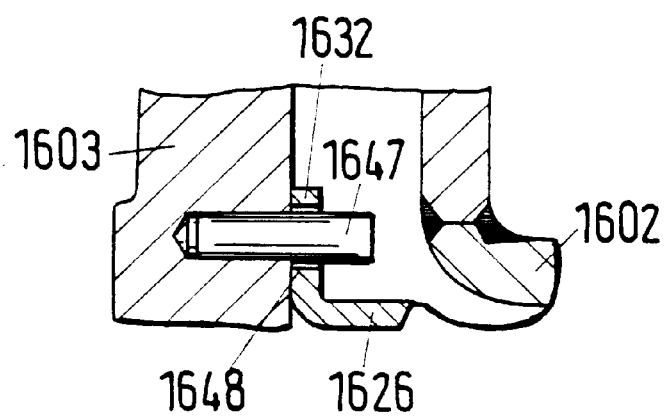
FIG. 36 is a sectional view substantially as seen in the direction of arrows from line XXXVI—XXXVI in FIG. 33.

The illustrated locating element 1626 is mounted in such a way that it cannot turn relative to the pressure plate 1603. As can be seen in FIG. 36, the means for preventing rotation of the parts 1603 and 1626 relative to each other comprises at least one pin or stud 1647 which is recessed into the pressure plate 1603 and extends in parallelism with the axis X—X and into a complementary opening 1648 (see also FIG. 37) of one of the stops 1632 at the outer side of the bottom wall 1627 of the locating element 1626. The pin or stud 1647 of FIG. 36 further ensures that, when the friction clutch 1601 is in use, the end portions or legs 1633 of the sensor elements 1622 are always aligned with the adjacent stops 1632.

The wedges 1635 and 1636 can be made of a heat-resistant plastic material which can be a thermoplastic material or a pressure setting (duroplastic) material. It is often advisable to reinforce the wedges 1635, 1636 by filaments of glass or the like. By making them of a plastic material, the wedges 1635 and 1636 can be mass-produced in an injection molding, extruding or other suitable machine.

It is also within the purview of the invention to make at least one set (1635 or 1636) of the wedges from a friction generating material, e.g., a material which is customarily employed to make the friction linings 1607. Still further, the wedges 1635 and/or 1636 can be made of metallic sheet material or of sintered material.

The slopes and the dimensions (particularly the length) of the ramps 1642 and 1643 are selected in such a way that an axial adjustment of the locating element 1626 and pressure plate 1603 can be carried out during the entire useful life of the friction clutch 1601, i.e., that the extent of axial movability of the ramps suffices to account for minimal as well as for maximum permissible or acceptable wear upon the pressure plate 1603 and/or 1606 and/or upon the friction linings 1607.

The slopes (shown at 1649 in FIG. 35) of the ramps 1642 and 1643 (i.e., the inclination of a ramp 1642 or 1643 relative to a plate which is normal to the axis X—X) are selected in such a way that mere biasing of the abutting ramps 1642, 1643 against each other in the direction of the axis X—X does not entail any angular displacement of the wedges 1635 relative to the adjacent wedges 1636. Thus, frictional engagement between the abutting ramps 1642, 1643 suffices to ensure that the positions of the circumferentially movable ramps 1635 relative to the adjacent ramps 1636 remain unchanged. The slope 1649 of the ramps 1642, 1643 will depend upon a number of parameters including the materials of the wedges 1635, 1636, the finish of the ramps 1642, 1643 and/or others. In most instances, the slope 1649 will be in the range of 5–20°, preferably between 8 and 12°, most preferably at least close to 10°. The orientation of the circumferentially movable wedges 1635 in the annular space 1626a is such that their narrower leading ends (the ends opposite the studs 1645) face in the direction of rotation of the pressure plate 1603 (arrow 1650 in FIG. 33) when the friction clutch 1601 is in use.

The bias of the coil springs 1644 for the circumferentially movable wedges 1635 is preferably related to the slope 1649 with a view to ensure that the resultant force acting upon the ring-shaped locating element 1626 in the direction of the axis X—X is smaller than the force which must be applied to move the sensor elements 1622 of the arresting unit 1617 in the axial direction of the friction clutch 1601.

In designing the diaphragm spring 1604, it is necessary to take into consideration that the bias to be applied to the pressure plate 1603 in engaged condition of the friction clutch 1601 must be increased to take into account (a) the force that is required to shift the sensor elements 1622 and (b) the force of the stressed leaf springs 1609 acting between the cover 1602 and the pressure plate 1603. Still further, it is necessary to take into consideration the wear upon the contacting surfaces of the diaphragm spring 1604 and the ring-shaped locating element 1626 as well as the wear upon contacting surfaces of the sensor elements 1622 and the counterpressure plate 1606, and also between the sensor elements 1622 and the housing or cover 1602. The wear upon the sensor elements 1622, counterpressure plate 1606, cover 1602, diaphragm spring 1604 and element 1626 should be relatively small, especially when compared with the wear upon the friction linings 1607.

It is also necessary to ensure that the resiliency of the arcuate leaf springs constituting the sensor elements 1622 should not be unduly diminished as a result of exposure to extensive heat which develops at the pressure plate 1603 as a result of engagement of the friction clutch 1601. To this end, the sleeves 1618 for the sensor elements 1622 are preferably made of a material which exhibits a low thermal conductivity and has a high friction coefficient. As already mentioned above, the wedges 1635, 1636 can be made of the same material as the friction linings 1607 and/or of the same material as the sleeves 1618 for the sensor elements 1622.

More satisfactory cooling of the friction clutch 1601, particularly of the pressure plate 1603, can be achieved by providing the pressure plate with an array of recesses, grooves or channels (one such channel is indicated in FIG. 34 by broken lines, as at 1651). The channels 1651 preferably extend substantially radially of the pressure plate 1603 and preferably alternate with pairs of cooperating wedges 1635, 1636 (as seen in the circumferential direction of the pressure plate 1603 and locating element 1626). Each such channel 1651 is preferably provided in that side or surface (1627) of the pressure plate 1603 which confronts the locating element 1626. The cooling action can be improved still further, or such cooling action can be established if the channels 1651 are omitted, by providing the locating element 1626 with coolant conveying channels in the region of the springs 1644 in the annular space 1626a. If provided, such channels preferably extend from the bottom wall 1627 in parallelism with the axis X—X to establish paths for the flow of coolant between the locating element 1626 and the diaphragm spring 1604.

It is also within the purview of the invention to apply films or other coats or layers of wear-resistant material (such as molybdenum). For example, films of molybdenum or other strongly wear-resistant material can be applied to the regions of contact between the diaphragm spring 1604 and the locating element 1626, to the regions of contact between the sensor elements 1622 and the counterpressure plate 1603, to the regions of contact between the sensor elements 1622 and the cover 1602 and/or to the regions of contact between other parts which should be capable of standing long periods of use. It is also possible to replace coats of molybdenum or the like with layers of hard chrome. Still further, it is possible to employ wear-resistant plastic materials. For example, those portions of the sensor elements 1622 which are adjacent the counterpressure plate 1606 and the marginal portion 1623 of the cover 1602 can be provided with jackets of suitable strongly wear-resistant plastic material.

The leaf springs 1609 (which transmit torque between the cover 1602 and the pressure plate 1603) are installed in stressed condition so that they move the pressure plate 1603 axially of and away from the counterpressure plate 1606, i.e., away from the friction linings 1607 and toward the cover 1602, when the friction clutch 1601 is disengaged. Such mounting of the leaf springs 1609 in stressed condition ensures that the locating member 1626 abuts the diaphragm spring 1604 at least substantially during the entire stage of disengagement of the friction clutch 1601, namely until the arresting means 1617 becomes effective.

The extent of axial displacement of the tips 1604c of prongs 1604b for the purpose of disengaging the friction clutch 1601 is preferably selected in such a way that, when the disengagement of the friction clutch is completed, the radially outermost part of the main portion 1604a of the diaphragm spring 1604 is slightly disengaged from the locating element 1626. Thus, disengagement of the friction clutch results in such axial movement of that part of the diaphragm spring 1604 which is nearest to the locus of application of bias to the pressure plate 1603 in engaged condition of the clutch that this movement covers a distance greater than the clearances 1624 between the sensor elements 1622 and the adjacent parts of marginal portion 1623 of the cover 1602. As explained hereinbefore, the clearances 1624 have a width corresponding to the extent of movability of the pressure plate 1603 away from the counterpressure plate 1606.

FIG. 34 shows the components of the improved friction clutch 1601 prior to any, or any appreciable, wear upon the friction linings 1607 and/or other parts. Once the components (especially the friction linings 1607) have undergone at least some wear, the position of the pressure plate 1603 is changed in a direction toward the counterpressure plate 1606, i.e., the thickness of that part of the clutch plate 1608 which includes the linings 1607 is reduced. This, in turn, entails a change of conicity of the main portion 1604a of the diaphragm spring 1604 and hence of the magnitude of force which is being applied by the diaphragm spring to the pressure plate 1603 in the engaged condition of the friction clutch 1601. The arrangement is preferably such that the bias of the spring 1604 upon the pressure plate 1603 increases. The aforediscussed changes (as a result of wear upon the friction linings 1607) entail that the pressure plate 1603 changes its axial position relative to the sensor elements 1622 which abut the counterpressure plate 1606 (at 1622a in FIG. 34). The diaphragm spring 1604 biases the locating element 1626 in a direction toward the counterpressure plate 1606 to an extent corresponding to the extent of wear upon the friction linings 1607, i.e., to an extent corresponding to the extent of axial displacement of the pressure plate 1603 away from the cover 1602 and toward the counterpressure plate 1606. Therefore, the extensions 1632 of the element 1626 move away from the adjacent legs 1633 of the corresponding sensor elements 1622 through a distance matching (at least substantially) the extent of wear upon the friction linings 1607. The locating element 1626 does not change its axial position relative to the pressure plate 1603 during engagement of the friction clutch 1601 because it is biased toward the pressure plate by the diaphragm spring 1604 and the equalizing unit 1634 is self-locking in the course of engagement of the clutch, i.e., the equalizing unit 1634 then acts not unlike a lock in the axial direction of the clutch 1601. However, when the friction clutch 1601 is thereupon disengaged, the leaf springs 1609 bias the pressure plate 1603 in a direction toward the cover 1602, i.e., away from the friction linings 1607 and counterpressure plate 1606. The axial displacement of pressure plate 1603 toward the cover 1602 (under the bias of the leaf springs 1609) continues until the sensor elements 1622 ultimately reach the cover 1602, and more particularly the marginal portion 1623 of the cover. The extent of such axial movement of the pressure plate 1603 can be said to correspond to the extent of one stage of movement of the tips 1604c of prongs 1604b during disengagement of the clutch 1601, and the axial position of the locating element 1626 relative to the pressure plate 1603 remains unchanged during the just-described stage of disengagement of the clutch. As the disengagement continues, the pressure plate 1603 comes to a halt (i.e., it can no longer move away from the counterpressure plate 1606) but the locating element 1626 is free to continue its movement with the adjacent portion of the diaphragm spring 1604 until the extensions 1632 on the bottom wall 1627 of the element 1626 reengage the adjacent end portions or arms 1633 of the respective sensor elements 1622. The locating element 1626 is moved axially by the wedges 1635 which are biased by the respective coil springs 1644. Thus, the wedges 1635 move circumferentially of the locating element 1626 and relative to the neighboring wedges 1636 as long as the extensions 1632 of the bottom wall 1627 have freedom of movement toward and into engagement with the end portions or legs 1633 of the adjacent sensor elements 1622. As already mentioned above, the pressure plate 1603 is lifted off and away from the friction linings 1607 under the bias of the leaf springs 1609 which are installed between the pressure plate and the cover 1602 in such a way that they are stressed axially in a sense to bias the pressure plate 1603 toward the cover 1602. If the tilting of the main portion 1604a of the diaphragm spring 1604 in a direction to effect a disengagement of the friction clutch 1601 continues, the radially outermost part of the main portion 1604a moves axially and away from the locating element 1626 as soon as the latter is intercepted by the end portions or legs 1633 of the sensor elements 1622 (such legs then engage the adjacent extensions 1632 of the bottom wall 1627). It has been found that the just-described disengagement of the radially outer part of the main portion 1604a of the diaphragm spring 1604 from the ring-shaped locating element 1626 is particularly desirable and advantageous for proper operation of the arresting unit 1617 and equalizing unit 1634.

The units 1617 and 1634 ensure that the axial displacements of the locating element 1626 under the action of the two sets of wedges 1635, 1636 invariably reflect the extent of wear at least upon the friction linings 1607. The reason is that the locating element 1626 is confined to movement in the direction of the axis X—X between the sensor elements 1622 on the one hand and the pairs of wedges 1635, 1636 on the other hand. This ensures that the extent of axial movability of the locating element 1626 cannot and does not exceed the extent of axial shortening of the radially outer portion of the clutch plate 1608 due to progressive wear upon the friction linings 1607 as a result of repeated engagement and disengagement of the friction clutch 1601.

Another advantage of the just-described construction and mode of operation of the units 1616, 1617 and 1634 is that the extent of axial movement of the locating element 1626 is always properly related to the extent of wear upon the friction linings 1607, even if the means for disengaging the friction clutch 1601 performs a movement beyond a position in which the clutch is already disengaged. Thus, even if the prongs 1604b are flexed toward the counterpressure plate 1606 to an extent greater than required to complete the disengagement of the friction clutch 1601, this cannot result in undue or improper or unnecessary axial displacement of the parts of the units 1617 and 1634 because, even if the sensor elements 1622 happen to impinge upon the marginal portion 1623 of the housing or cover 1602 with a relatively large force, the self-locking equalizing unit 1634 ensures that the sensor elements 1622 remain adequately supported by way of the abutments 1632. Thus, when the friction clutch 1601 is disengaged, the sensor elements 1622 can be acted upon by axially oriented forces which are effective in a direction toward the counterpressure plate 1606 and are stronger than the strength of the force-locking connection between the sensor elements 1622 and the pressure plate 1603; this does not result in axial displacement of sensor elements 1622 and pressure plate 1603 relative to each other.

The improved system including the units 1616, 1617 and 1634 ensures that the characteristic curve range of the diaphragm spring 1604 remains unchanged during the entire useful life of the friction clutch 1601. Furthermore, the bias of the diaphragm spring 1604 remains at least substantially constant when the friction clutch 1601 is engaged, regardless of the extent of wear upon the friction linings 1607, i.e., the bias of the diaphragm spring 1604 upon the pressure plate 1603 remains unchanged. This renders it possible to employ a diaphragm spring having a degressive characteristic curve during disengagement of the friction clutch 1601, and such diaphragm spring is preferably employed in combination with a clutch plate 1608 wherein the two friction linings 1607 flank several pairs of resilient carriers 1610 tending to move the two friction linings 1607 axially and away from each other. The carriers 1610 ensure that the magnitude of disengaging force which is required to effect a movement of the pressure plate 1603 away from the counterpressure plate 1606 can be reduced to a relatively low value and remains practically constant during the entire useful life of the friction clutch 1601 provided that the spring characteristic of the friction linings 1607 remains at least substantially unchanged during the interval which elapses between the initial use of clutch 1601 (with intact linings) and the time when the wear upon the friction linings has reached the maximum permissible value.

When a friction clutch of the above-outlined character is being disengaged, the diaphragm spring 1604 is tilted at the seat 1605 and the resilient carriers 1610 for the friction linings 1607 dissipate energy during a certain initial stage of disengagement of the clutch. Such dissipation of energy by the carriers 1610 assists the disengagement of the friction clutch 1601. Thus, the maximum value of the disengaging force can be reduced accordingly, i.e., such maximum force is less than a theoretical disengaging force which is determined by the condition of the diaphragm spring 1604 and the leaf springs 1609 in the engaged condition of the friction clutch. Once the carriers 1610 for the friction linings 1607 have dissipated their energy, the friction linings 1607 are released and, due to the degressive characteristic curve of the diaphragm spring 1604 during disengagement of the friction clutch 1601, the remaining disengaging force which must be applied to the tips 1604c of the prongs 1604b is already much smaller in comparison with that which would correspond to the conditions and/or positions shown in FIG. 34. As the disengagement of the clutch 1601 continues, the magnitude of the disengaging force continues to decrease at least until it reaches a minimum or lower threshold value of the preferably sinusoidal characteristic curve of the diaphragm spring 1604.

The units 1617 and 1634 of the friction clutch 1601 of FIGS. 33 and 34 can be designed in such a way that, when the pressure plates 1603, 1606 and the cover 1602 rotate, the convolutions of coil springs 1644 in the annular space 1626a of the ring-shaped locating element 1626 abut the internal surface of the outer sidewall 1631 so that the bias of such springs upon the respective wedges 1635 is reduced (e.g., all the way to zero) as a result of frictional engagement of the convolutions with the wall 1631. Thus, when the friction clutch 1601 rotates, the coil springs 1644 can be said to be rigid or practically rigid (their bias upon the respective wedges 1635 is zero or close to zero due to frictional engagement of such springs with the wall 1631). In addition, the action of centrifugal force upon the wedges 1635 (when the friction clutch 1601 rotates) causes these wedges to frictionally engage the internal surface of the outer sidewall 1631 with the same result as described above in connection with frictional engagement between the convolutions of the springs 1644 and the wall 1631, i.e., the wedges 1635 are then held against movement in the circumferential direction of the locating element 1626. The arrangement can be such that the magnitude of centrifugal force upon the coil springs 1644 and/or upon the wedges 1635, at least above the idling speed of the engine which rotates the counterpressure plate 1606, is sufficient to ensure that the springs 1644 are incapable of shifting the mobile wedges 1635 in the circumferential direction of the locating element 1626 so that the distance of the locating element 1626 and the pressure plate 1603 from each other remains unchanged. In other words, the improved friction clutch 1601 can be designed to ensure that any compensation for wear at least upon the friction linings 1607 can take place only when the clutch is rotated at or below the idling speed of the engine, namely when the action of centrifugal force upon the coil springs 1644 and/or upon the mobile wedges 1635 does not suffice to block the movements of wedges 1635 relative to the wedges 1636.

However, it is also within the purview of the invention to design the equalizing unit 1634 in such a way that the wedges 1635 can be caused to move relative to the adjacent wedges 1636 only when the engine which drives the counterpressure plate 1606 is arrested or only when the RPM of the engine is low or very low, e.g., even below the idling speed.

The materials of the pairs of wedges 1635, 1636 and of the parts which are adjacent these wedges can be selected in such a way that the ramps 1642, 1643 of the wedges do not tend to adhere to each other during any stage of useful life of the friction clutch, i.e., that the ramps 1642, 1643 do not tend to prevent, or do not actually prevent, those adjustments of the ramps 1635 relative to the adjacent ramps 1636 which are necessary or desirable in order to compensate for wear upon the friction linings 1607 alone or upon the friction linings and certain other parts which are likely to undergo at least some wear during the useful life of the friction clutch 1601. For example, at least one of each pair of neighboring ramps 1642, 1643 can be coated with a material which reduces the likelihood of undesirable adherence of the wedges to one another. This also applies for eventual coating of those surfaces of the movable ramps 1635 which contact the walls of the locating element 1626.

Adherence of the abutting ramps 1642, 1643 to each other can be prevented in many other ways. For example, the friction clutch 1601 can be provided with at least one device which positively urges the neighboring ramps 1642, 1643 axially of the locating element 1626 and away from each other in automatic response to disengagement of the clutch, i.e., when the condition of the clutch is such that an adjustment or compensation for wear upon the friction linings 1607 should take place. Such device or devices can be designed to reliably separate the ramps 1643 from the adjacent ramps 1642 not later than when the disengagement of the friction clutch 1601 is completed so that the units 1616, 1617 and 1634 are then in a condition to effect the necessary compensation for wear upon the friction linings 1607 provided that the wear upon the linings has progressed to an extent which warrants an initial adjustment or a further adjustment during useful life of the clutch.

When the friction clutch 1601 is still new or is yet to be fully assembled (e.g., prior to attachment of the marginal portion 1623 of the housing or cover 1602 to the counterpressure plate 1606 so that an intact clutch plate 1608 is disposed between the plates 1603 and 1606), the wedges 1635 are maintained in retracted positions departing from those which are shown in FIG. 35. Thus, the wedges 1635 are located further to the right of the respective wedges 1636 so that the distance between the bottom wall 1627 of the locating element 1626 and the pressure plate 1603 is reduced to a minimum. In other words, the combined thickness of the locating element 1626 and pressure plate 1603 (as seen in the direction of the axis X—X) is then reduced to a minimum value. In order to maintain the mobile wedges 1635 in their fully retracted positions, these wedges are preferably provided with suitably configured portions (note the recesses 1652 in FIG. 35) which are accessible through windows 1653 (e.g., elongated slots extending circumferentially of the locating element 1626) in the bottom wall 1627. A suitable tool (not shown) can be provided to enter the recesses of the wedges 1635 through the respective windows 1653 and to maintain the mobile wedges 1635 in fully retracted positions. The tool is put to use during assembly of the friction clutch 1601 and is thereupon withdrawn so that the wedges 1635 can assume positions which are determined by the respective coil springs 1644 or analogous biasing means. Detachment of the tool results in activation of the equalizing unit 1634. The length of the windows 1653 in the circumferential direction of the bottom wall 1627 should suffice to ensure maximum displacement of the wedges 1635 relative to the locating element 1626, i.e., to permit maximum compensation for wear upon the friction linings 1607. When the friction clutch 1601 is new, the mobile wedges 1635 can be held in their fully retracted positions by the sensor elements 1622 which secure the locating element 1626 in the retracted position.

The automatically adjusting connections between the sensor elements 1622 and the pressure plate 1603 should be designed in such a way that the force which is required to shift the sensor elements 1622 axially of the friction clutch 1601 and relative to the pressure plate 1603 exceeds the magnitude of the resultant force acting upon the locating element 1626 and being generated by the coil springs 1644 acting upon the mobile wedges 1635.

The friction clutch 1601 of FIGS. 33 and 34 can be modified by making the ramps 1636 of one piece with the locating element 1626. Otherwise stated, the ramps 1636 can be omitted as long as the locating element 1626 is provided with ramps 1642 which cooperate with the adjacent ramps 1643 of the mobile wedges 1635. The coil springs 1644 then serve as a means for turning the locating element 1626 relative to the pressure plate 1603. The extensions 1632 of the thus modified locating element 1626 must be lengthened in the circumferential direction of the bottom wall 1627 in order to ensure that they can cooperate with the corresponding end portions or legs 1633 inspite of the angular movability of locating element 1626 relative to the pressure plate 1603, i.e., during the entire useful life of a friction clutch which employs the modified locating element 1626.

An advantage of the just-described modified locating element 1626 is that it permits angular adjustments of the locating element radially of the pressure plate 1603 and from the outside in the fully assembled condition of the friction clutch. For example, the locating element 1626 can be turned relative to the pressure plate 1603 by engaging its extensions 1632; these extensions are accessible through windows (not shown) in the cover or housing 1602 of the thus modified friction clutch. The windows in the cover 1602 can further serve to receive the radially outwardly extending lobes 1625 of the pressure plate 1603 and the leaf springs 1609.

An important advantage of the improved friction clutch is that the 20 compensating unit 1616 cooperates with the arresting unit 1617 to ensure that the bias of the diaphragm spring 1604 upon the pressure plate 1603 remains at least substantially constant during the entire useful life of the clutch, i.e., regardless of the extent of wear upon the friction linings 1607 and, if warranting consideration, also regardless of the wear upon the pressure plate 1603, counterpressure plate 1606, cover 1602 and diaphragm spring 1604. The arresting unit 1617 constitutes a safety feature which prevents overcompensation for wear upon the friction linings 1607, i.e., which ensures that the axial adjustment of the pressure plate 1603 in response to wear upon the friction linings 1607 is not excessive. The arresting unit 1617 is mounted on the pressure plate 1603, and the adjustment in the axial position of the pressure plate 1603 is preferably carried out in the course of disengagement of the friction clutch 1601. The sensor element or elements 1622 of the arresting unit 1617 ensure that the extent of movement of the pressure plate 1603 relative to the cover 1602 during disengagement of the friction clutch 1601 remains at least substantially unchanged irrespective of the extent of wear upon the friction linings 1607. Each sensor element 1622 can be directly or indirectly coupled to the pressure plate 1633 by automatic adjusting means to be displaced relative to the pressure plate by the fixed part 1602 or 1606 of the clutch. This relieves the compensating unit 1616 during disengagement of the friction clutch so that the position of the pressure plate 1603 can be adjusted (if and when necessary) to the extent determined by the sensor element or elements 1622 in cooperation with the locating element 1626.

As mentioned before, the arresting unit 1617 can comprise a single sensor element 1622. The provision of several sensor elements 1622 is preferred in many instances because this reduces the likelihood of misalignment of the axis of the pressure plate 1603 relative to the axis X—X of the counterpressure plate 1606 in disengaged condition of the friction clutch 1601.

The aforementioned automatic adjusting means includes the means for frictionally connecting the leaf springs of each sensor element 1622 to the pressure plate 1603 or an equivalent of such connecting means. The frictional engagement between the sensor elements 1622 and the pressure plate 1603 is overcome when the magnitude of a predetermined force is exceeded during engagement of the friction clutch 1601. This results in axial displacement of sensor elements 1622 relative to the pressure plate 1603 through a distance corresponding to the ascertained extent of wear upon the friction linings 1607. However, it is also possible to employ a compensating unit which acts not unlike a freewheel and is designed to permit an adjustment of the sensor element or elements 1622 relative to the pressure plate during engagement but blocks any shifting of the sensor element or elements relative to the pressure plate during disengagement of the friction clutch.

The illustrated compensating unit 1616 and its equalizing unit 1634 with the two sets of ramps 1642, 1643 exhibit the advantage that the axial position of the pressure plate 1603 is automatically adjusted to compensate for wear upon the friction linings 1607 during disengagement of the friction clutch but that the unit 1616 is self-locking during engagement of the friction clutch. Thus, the unit 1616 can compensate for wear when the locating element 1626 is relieved but the condition of the unit 1616 remains unchanged when the element 1626 is under stress. The locating element 1626 can be moved axially of and away from the pressure plate 1603 but cannot move toward the pressure plate. Accordingly, the illustrated compensating unit 1616 also acts like a freewheel during disengagement but is self-locking during engagement of the friction clutch 1601.

It has been found that the equalizing unit 1634 of the illustrated compensating unit 1616 operates quite satisfactorily if the friction coefficient of the material of the ramps 1635 is different from that of the ramps 1636 and if one of these friction coefficients matches or approximates the friction coefficient of the material of the friction linings 1607. By properly selecting the just discussed friction coefficients as well as the slope 1649 of the ramps 1642 and 1643, the unit 1616 is self-locking when the diaphragm spring 1604 is free to stress the locating element 1626 in the direction of the axis X—X. As already mentioned above, the slope 1649 can be in the range of 5–20°, preferably 8–12° and most preferably approximately 10°. The self-locking feature exhibits the advantage that it is not necessary to provide any additional means for the express purpose of ensuring that the compensating unit 1616 is self-locking during certain stages of operation of the friction clutch 1601.

The springs 1644 of the equalizing unit 1634 can be installed in stressed condition in such a way that an adjustment of axial position of the pressure plate 1603 (in response to wear upon the friction linings 1607) can take place even while the engine drives the counterpressure plate 1606, the pressure plate 1603, the cover 1602 and the diaphragm spring 1604. Furthermore, the stressing of the springs 1644 can be selected with a view to ensure that their bias does not influence, or does not appreciably influence, the operation of other resilient components, particularly that of the diaphragm spring 1604 and of the leaf springs 1609 which connect the pressure plate 1603 to the cover 1602. The wedges 1635 which are biased by the springs 1644 and cooperate with the wedges 1636 to change the axial position of the pressure plate 1603 in order to compensate for wear upon the friction linings 1607 form part of the means for locking or deactivating and unlocking or activating the compensating unit 1616, i.e., they can cooperate with the neighboring ramps 1636 to permit or to block the movements of the pressure plate 1603 and the locating element 1626 relative to each other.

The feature that disengagement of the friction clutch 1 entails an axial movement of the diaphragm spring 1604 at the location of engagement with the pressure plate 1603 (by way of the locating element 1626) exceeds the extent of movability of the pressure plate 1603 as determined by the sensor elements 1622 is desirable and advantageous on the ground that the compensating unit 1616 is then relieved and is free to adjust the axial positions of the pressure plate and the locating element relative to each other. This enhances the accuracy of compensation for wear upon the friction linings 1607.

The carriers 1610 for the friction linings 1607 of the clutch plate 1608 can be constructed and assembled in a manner as disclosed, for example, in published German patent application Serial No. 36 31 863. As already mentioned hereinbefore, the resilient carriers 1610 can assist in manipulation of the friction clutch 1601, particularly as concerns the disengagement in order to interrupt the transmission of torque from the counterpressure plate 1606 to the clutch plate 1608. Thus, the carriers 1610 store additional energy when the clutch 1601 is engaged, and such energy is dissipated during the initial stage of disengagement of the clutch. The stressed carriers 1610 generate a reaction force acting counter to the bias of the diaphragm spring 1604 upon the pressure plate 1603. As the pressure plate 1603 moves away from the counterpressure plate 1606 during the initial stage of disengagement of the clutch 1601, such movement is enhanced or promoted by the carriers 1610 which tend to move the two friction linings 1617 apart or to increase the axial length of that portion of the clutch plate 1608 which includes the friction linings and the carriers. This takes place simultaneously with an abruptly decreasing part of the characteristic curve of the diaphragm spring 1604 during disengagement of the clutch so that the bias of the spring 1604 upon the pressure plate 1603 decreases. This entails a reduction of the bias of the carriers 1610 upon the pressure plate 1603. The actually required disengaging force equals the difference between the restoring force of the carriers 1610 and the bias of the diaphragm spring 1604. The bias of the leaf springs 1609, which are stressed between the pressure plate 1603 and the cover 1602, also warrants consideration. Once the carriers 1610 have dissipated the stored energy during disengagement of the clutch 1601, the force which is required to continue with disengagement of the clutch is determined primarily by the bias of the diaphragm spring 1604. The force-distance characteristics of the diaphragm spring 1604, carriers 1610 and leaf springs 1609 can be related to each other in such a way that, when the pressure plate 1603 releases the clutch plate 1608, the force which is required to continue to stress the diaphragm spring during disengagement of the clutch is rather small. In fact, it is possible to select and relate these characteristics in such a way that the characteristic of the carriers 1610 equals or approximates the combined characteristics of the diaphragm spring and leaf springs 1609 so that the last stage of disengagement of the clutch necessitates the exertion of a very small force or that such final stage of disengagement does not necessitate the application of any external force.

As a rule, the axial bias which is generated by the leaf springs 1609 warrants consideration. The bias of the diaphragm spring 1604 is selected by consideration of the fact that this spring must effect axial movements of the sensor elements 1622 and the pressure plate 1603 relative to each other. It is of advantage to select the force which is required to move the sensor elements 1622 and the pressure plate 1603 relative to each other in such a way that it reliably exceeds the resultant axial force attributable to the biasing of the wedges 1635 against the wedges 1636 so that such force can be taken up by the sensor elements 1622.

Figure 38:
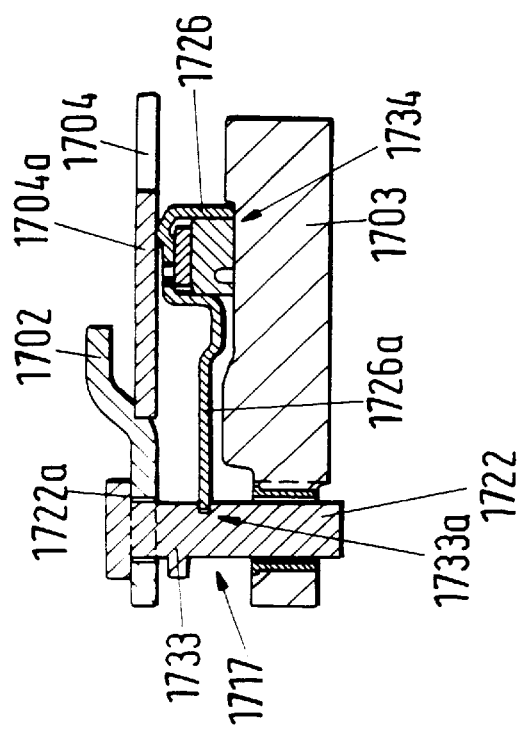
FIG. 38 is a fragmentary axial sectional view of a pull type friction clutch embodying modified compensating and arresting means.

An advantage of the aforedescribed novel system which compensates for wear upon the friction linings 1607 is that it can be incorporated with equal or similar advantage in the so-called drawn or pull type friction clutches wherein the tips of the prongs on the main portion of the diaphragm spring must be pulled away from the counterpressure plate in order to disengage the friction clutch. In such pull type friction clutches, the radially outermost part of the main portion of the diaphragm spring is tiltable in a seat of the cover, and a radially inner part of the main portion serves to bias the pressure plate axially toward the friction linings when the friction clutch is engaged. Reference may be had to FIG. 38 which shows a portion of a pull type friction clutch. All such parts of this friction clutch which are identical with or clearly analogous to corresponding parts of the friction clutch 1601 of FIGS. 33 to 37 are denoted by similar reference characters plus 100.

The equalizing unit 1734 of the pull type friction clutch of FIG. 38 is installed between the pressure plate 1703 and the diaphragm spring 1704. The radially outermost part of the annular main portion 1704*a* of the diaphragm spring 1704 is tiltable relative to the cover 1702. The equalizing device 1734 can be identical with the equalizing device 1634. The locating element 1726 cooperates with the sensor elements 1722 (one shown) of the arresting unit 1717. The sensor elements 1722 are adjusted relative to the pressure plate 1703 in that their enlarged end portions or collars 1722*a* engage the outer side of the cover 1702. The legs 1733 of the sensor elements 1722 limit the extent of axial movability of the pressure plate 1703 during disengagement of the pull type friction clutch embodying the structure of FIG. 38. In order to ensure proper operation of the friction clutch of FIG. 38, the ring-shaped locating element 1726 is mounted at least with minimal freedom of axial movement relative to the sensor elements 1722. This is achieved by the provision of a connection between the locating element 1726 and the sensor elements 1722. The connection includes radially outwardly extending resilient portions 1726*a* forming integral or separable parts of the outer sidewall of the locating element 1726 and extending into notches 1733*a* provided in the sensor elements 1722. The resiliency of the portions 1726*a* is such that the elements 1722 and 1726 are movable relative to each other in the axial direction of the pull type friction clutch.

In accordance with a further modification which is not specifically shown in the drawings, each sensor element 1722 can cooperate with the diaphragm spring 1704 (instead of cooperating with the cover or housing 1702). The cooperation is effective in at least one axial direction of the pull type friction clutch and takes place at least while the friction clutch is engaged. The abutment between a sensor element 1722 and the diaphragm spring 1704 of such modified clutch is located at least close to the radial level of the locus where the diaphragm spring 1704 is tiltable relative to the housing or cover 1702. If the invention is embodied in a pull type friction clutch, it is often advisable that the diameter of location of the diameters of locations of engagement between the diaphragm spring 1704 and the sensor element or elements 1722 be larger than the diameter of locations where the diaphragm spring 1704 is tiltable relative to the cover 1702. This can be seen in FIG. 38 wherein the locus of tiltable mounting of the radially outermost part of main portion 1704a of the diaphragm spring 1704 is located radially inwardly of the illustrated sensor element 1722.

Figure 39:
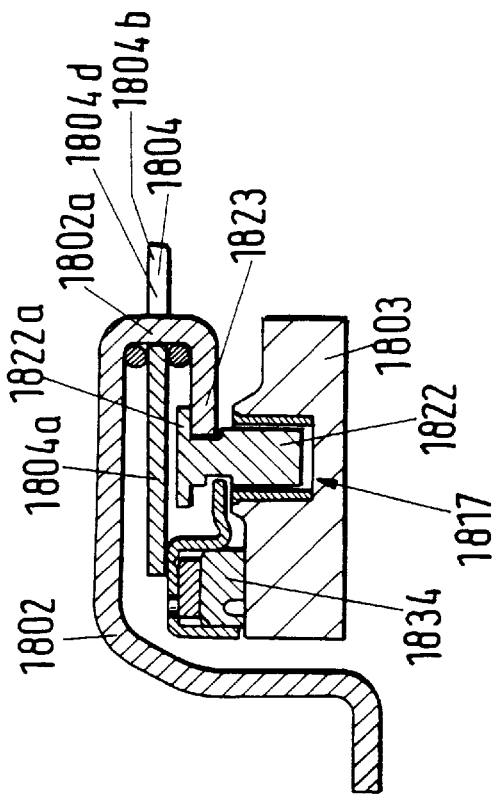
FIG. 39 is a fragmentary axial sectional view of a friction clutch embodying compensating and arresting means departing from those shown in FIGS. 33–37 and FIG. 38.

FIG. 39 shows a portion of a further friction clutch wherein the arresting unit 1817 is also installed directly in the body of the pressure plate 1803. Each sensor element 1822 of the arresting unit 1817 includes an abutment in the form of a collar or lug 1822a which engages an inwardly bent portion 1823 of the cover or housing 1802. The portions 1823 are of one piece with a portion of a seat 1802a for the diaphragm spring 1804. The illustrated seat 1802a comprises prongs which are bent inwardly from the major portion of the cover 1802 and extend through slots 1804d between the radially inwardly extending prongs 1804b of the diaphragm spring 1804. The equalizing unit 1834 of the friction clutch including the structure of FIG. 39 is installed in the cover 1802 radially outwardly of the main portion 1804a of the diaphragm spring 1804 and radially outwardly of the sensor elements 1822 forming part of the arresting unit 1817.

The friction clutch including the structure of FIG. 39 can be modified by installing the sensor elements 1822 in such a way that they are not coupled to the portion 1823 of the cover 1802 but rather to the diaphragm spring 1804. The arrangement may be such that the sensor elements 1822 are coupled to the diaphragm spring 1804 in a manner to be supportable for movement in at least one of the two axial directions, at least when the friction clutch is being engaged. To this end, the diaphragm spring 1804 can be provided with axial openings through which the elements 1822 extend. The portion 1822a of each sensor element 1822 is then in engagement with the diaphragm spring 1804 (rather than with the portion 1823 of the cover 1802) when the thus modified friction clutch of FIG. 39 is engaged. The portions 1822a can be lifted off the diaphragm spring 1804 when the friction clutch is disengaged because the diameter of the circle on which the portions 1822a of the sensor elements 1822 are located is smaller than the diameter of the location where the diaphragm spring 1804 is tiltably mounted in the cover 1802. This is due to the fact that the portions 1822a are nearer to the tilting diameter of the diaphragm spring 1804 than the locations of engagement between the diaphragm spring 1804 and the pressure plate 1803.

FIG. 40 shows a friction clutch which embodies or is mounted on one (secondary) mass or flywheel 1903 of a composite (twin) flywheel 1901 further including a flywheel or primary mass 1902 and a damper 1909 between the masses 1902, 1903. The primary mass 1902 of the composite flywheel 1901 can be connected to the output element (e.g., a crankshaft, not shown) of an internal combustion engine and transmits torque to the secondary mass or flywheel 1903 corresponding, for example, to the flywheel 6 in the friction clutch 1 of FIGS. 1 and 2. The friction clutch which embodies or is combined with the secondary flywheel 1903 is denoted by the reference character 1904. The friction clutch 1904 further comprises a pressure plate 1928 and a torque transmitting clutch disc or clutch plate 1905 between the pressure plate 1928 and the secondary mass 1903. The hub 1905a of the clutch disc 1905 can transmit torque to the input element of a variable-speed transmission in the power train of a motor vehicle. The shaft of the input element of the transmission is indicated at X—X.

An antifriction bearing 1906 is installed between the masses 1902 and 1903 of the composite flywheel 1901; this bearing is disposed radially inwardly of bolts 1908 or other suitable fasteners which are used to secure the primary mass 1902 to the output element of the engine. The primary mass 1902 has bores or holes 1907 for the shanks 1940a of the fasteners 1908. The damper 1909 between the masses 1902, 1903 of the flywheel 1901 includes energy storing elements in the form of coil springs 1910 acting in the circumferential direction of the flywheel 1901 and being confined in an annular compartment 1912 constituting the radially outer part of a chamber 1911 between the masses 1902 and 1903.

The chamber 1911 is at least partially filled with a viscous fluid, such as oil, grease or another lubricant.

At least the major part of the primary mass 1902 is constituted by a member 1913 which is made of a metallic sheet material and includes a substantially radially extending flange-like portion 1914 having an axial protuberance 1915 which is of one piece therewith and is located radially inwardly of the holes or bores 1907 for the fasteners 1908. The antifriction bearing 1906 which is shown in FIG. 35 comprises a single row of spherical rolling elements 1906a and an inner race 1916 surrounding the free end of the axially extending protuberance 1915 of the flange 1914. The outer race 1917 of the bearing 1906 is received in a central opening provided in the radially innermost portion of the secondary mass 1903; the latter resembles a substantially flat disc or washer.

The radially outermost part of the flange 1914 forming part of the primary mass 1902 is of one piece with a first wall 1918 which surrounds at least one-half of the compartment 1912 and is welded or otherwise sealingly secured to a second wall 1919 surrounding another part of the compartment 1912. The wall 1918 and/or 1919 can directly or indirectly guide the radially outermost portions of convolutions forming part of the energy storing elements 1910 in the compartment 1912. The reference character 1920 denotes a welded seam which connects the walls 1918, 1919 to each other radially outwardly of the compartment 1912 and ensures that the confined viscous fluid cannot escape from the chamber 1911 under the action of centrifugal force when the composite flywheel 1901 receives torque from the output element of the engine.

The compartment 1912 is divided into a series of arcuate sections, one for each energy storing element 1910, and such sections are separated by partitions which constitute abutments for the adjacent end convolutions of the respective energy storing elements 1910. The partitions can be made of one piece with the wall 1918 and/or 1919 of the primary mass 1902; they may constitute inwardly bent pockets of the walls 1918 and 1919. Such mode of making partitions between the energy storing elements 1910 is particularly desirable when the parts of the primary mass 1902 are made of a ductile metallic sheet material.

The energy storing elements 1910 are further acted upon by radially outwardly extending arms 1921 adjacent the secondary mass 1903. The arms 1921 also alternate with the energy storing elements 1910, as seen in the circumferential direction of the composite flywheel 1901, and cooperate with the aforediscussed pockets of the primary mass 1901 to ensure that the elements 1910 store energy (or additional energy) whenever the mass 1902 turns relative to the mass 1903 and/or vice versa. These arms are provided on or can constitute integral parts of the housing or cover 1922 of the friction clutch 1904. As shown, the arms 1921 are of one piece with the axially extending portion 1923 of the cover 1922. Each arm 1921 extends radially outwardly into the compartment 1912 between the ends of the two neighboring energy storing elements 1910. The axially extending portion 1923 of the cover 1922 has a portion 1923a which extends beyond the arms 1921 in a direction toward the mass 1902 and surrounds the mass 1903. The means for connecting the cover 1922 to the mass 1903 can comprise inwardly extending portions (not specifically shown) of the portion 1923 and complementary sockets in the periphery of the mass 1903. Other connecting means (e.g., in the form of radially extending pins or the like) can be used with similar advantage.

The cover 1922 includes a bottom wall 1926 which extends substantially at right angles to the axis X—X denoting the input element of the transmission and is remote from the arms 1921. This bottom wall is outwardly adjacent a diaphragm spring 1927 which acts not unlike a two-armed lever and serves to urge the pressure plate 1928 axially toward the friction linings 1929 of the clutch disc 1905. The projecting portion or portions 1928a of the pressure plate 1928 are engaged by the circumferentially complete radially outer main portion of the diaphragm spring 1927, and the latter includes radially inwardly extending prongs 1927a forming part of actuating means for the friction clutch 1904, i.e., of means for engaging and disengaging the clutch.

FIG. 40 further shows resilient segments 1965 which are disposed between the two groups or sets of friction linings 1929 and perform the same function as the segments 10 in the friction clutch 1 of FIGS. 1 and 2.

The chamber 1911 and its compartment 1912 are disposed, at least to a large extent, radially outwardly of the secondary mass 1903 of the composite flywheel 1901. This renders it possible to position the member 1913 of the primary mass 1902 (i.e., of that mass which is to be directly connected with the output element of an engine) into immediate or close proximity to the secondary mass 1903 in a region radially inwardly of the chamber 1911. FIG. 40 shows a relatively narrow clearance 1930 which is established between the member 1913 of the primary mass 1902 and the secondary mass 1903. Such design contributes significantly to compactness of the friction clutch 1904, as seen in the direction of the axis X—X, and more particularly of the aggregate including the friction clutch 1904 proper, the composite flywheel 1901 and the clutch disc 1905.

The chamber 1911 is sealed by an annular sealing element 1931 which is installed between the radially inner portion of the wall 1919 (i.e., of the primary mass 1902) and the axially extending portion 1923 of the cover 1922.

The aforementioned clearance 1930 between the member 1913 of the primary mass 1902 and the secondary mass 1903 can be utilized to ensure desirable cooling of the composite flywheel 1901. This is achieved by inducing one or more currents of cool atmospheric air to flow through the clearance when the aforementioned aggregate or assembly is in actual use, i.e., when the output element of the engine drives the primary mass 1902 and the latter drives the secondary mass 1903 through the damper 1909 including the energy storing elements 1910 in the compartment 1912 of the chamber 1911. The means for cooling the flywheel 1901 further comprises passages or channels 1933 which extend through the secondary mass 1903 radially inwardly of a friction surface 1932 which is engageable by the adjacent set of friction linings 1929 when the friction clutch 1904 is engaged. The channels 1933 communicate with the clearance 1930. The cooling action is further enhanced by the provision of additional channels 1935 which extend axially through the secondary mass 1903 and are disposed radially outwardly of the friction surface 1932. The channels 1935 communicate with the clearance 1930, the same as the channels 1933. The channels 1933 supply cool atmospheric air into the radially inner portion of the clearance 1930, and such air then flows radially outwardly to cool the composite flywheel 1901 and to leave the clearance 1930 through the channels 1935. These channels can admit the atmospheric air into the cover 1922 which is provided with outlets to permit escape of heated air into the surrounding atmosphere.

The secondary mass 1903 is provided with holes or bores 1934 which are disposed radially inwardly of the channels 1933 and are aligned with the holes or bores 1907 to permit introduction of the fasteners 1908 which serve to affix the primary mass 1902 to the output element (e.g., a crankshaft) of an engine. In addition, the holes or bores 1934 can also promote circulation of air in the clearance 1930, i.e., they can contribute to more satisfactory cooling of the composite flywheel 1901.

A further sealing element 1936 is disposed in the clearance 1930 to seal the latter from the radially innermost portion of the annular chamber 1911 for the supply of viscous fluid and for the energy storing elements 1910 of the damper 1909. The sealing element 1936 can include or constitute a membrane or a diaphragm spring.

The wall 1919 of the primary mass 1902 is provided with a starter gear 1939 which is preferably welded thereto.

The composite flywheel 1901 including the masses 1902, 1903 and the group including the friction clutch 1904 and the clutch disc 1905 together constitute a preassembled module A which is or which can be assembled at the manufacturing plant and can be put to storage or shipped to a maker of motor vehicles to be affixed to the output element of an engine by the fasteners 1908 or in any other suitable way. The assembly of the module A at the plant contributes significantly to lower cost of the improved aggregate, to lower cost of its storage and shipment, and to lower cost of its attachment to the output element of an engine. In order to assemble the module A, the friction clutch 1904 is assembled with the secondary mass 1903 and with the clutch disc 1905 in a first step. The thus obtained subassembly including the components 1903, 1904 and 1905 is thereupon assembled with the primary mass 1902 by placing the member 1913 of the primary mass next to the secondary mass 1903 so that the masses 1902, 1903 are coaxial with one another. This takes place before the wall 1919 is affixed (welded) to the wall 1918 of the primary mass 1902. The wall 1919 surrounds the axially extending portion 1923 of the cover 1922 and is welded (at 1920) to the wall 1918 in a next following step. Of course, the energy storing elements 1910 are inserted into the compartment 1912 of the chamber 1911 prior to welding of the walls 1918, 1919 to each other.

The antifriction bearing 1906 is installed between the masses 1902, 1903 in automatic response to proper positioning of the member 1913 of the mass 1902 relative to the mass 1903; such bearing is installed first on the axially extending protuberance 1915 of flange 1914 of the member 1913. The fasteners 1908 are inserted into the holes 1907 of the portion 1914a of the flange 1914 before the masses 1902, 1903 are angularly movably coupled to each other by the damper 1909. Each fastener 1908 can constitute a hexagon socket screw, i.e., a screw with a polygonal socket 1940 in its head. The initial positions of the fasteners correspond to that of the fastener 1908 shown in the lower half of FIG. 40. It is preferred to provide means for yieldably holding the shanks 1940a of the fasteners 1908 in the axial positions corresponding to that of the shank forming part of the fastener 1908 shown in the lower half of FIG. 40. The holding means prevent accidental displacement or loss of the fasteners 1908 and ensure that the shanks 1940a of these fasteners are maintained in optimum positions for introduction into complementary tapped bores or holes of the output element of the engine.

The clutch disc 1905 is centered between the pressure plate 1928 of the friction clutch 1904 and the friction surface 1932 of the secondary mass 1903 of the composite flywheel 1901 and is maintained in such position while the module A is in storage or in transport to the automobile assembly plant. The angular position of the clutch disc 1905 in the module A is such that its holes or bores 1943 are aligned with the holes or bores 1934 in the secondary mass 1903; this renders it possible to introduce the working end of a tool (e.g., a device analogous to a screwdriver) into the sockets 1940 in the heads of fasteners 1908 in order to drive the shanks 1940a of such fasteners into the complementary tapped bores or holes in the output element of the engine. The tool can further extend through aligned holes or bores 1944 which are provided in the prongs 1927a of the diaphragm spring 1927 and communicate with the slots between neighboring prongs. The diameters of the holes or bores 1943 are smaller than the diameters of the heads 1940 of the fasteners 1908 so that, once installed in a manner as shown in the lower part of FIG. 40, the fasteners 1908 of a module A cannot become lost or misplaced because they are confined in optimum positions for attachment to the output element of an engine in a motor vehicle. The openings 1944 in the prongs 1927a of the diaphragm spring 1927 can constitute simple recesses or notches; such recesses or notches communicate with the slots between the respective prongs 1927a to provide room for introduction of the aforediscussed tool which must also pass through the holes 1943 and into the holes 1934 in order to enter the sockets 1940 in the heads of the respective fasteners 1908.

It is often preferred to distribute the tapped holes or bores in the output element of the engine and the holes or bores 1907 in the member 1914 of the primary mass 1902 in such a way that the mass 1902 can be affixed to the output element in a single angular position, i.e., the holes 1907 need not be equidistant from each other. The dimensions of the openings 1934, 1943 and 1944 are selected in such a way that they permit the working end of a tool to engage the heads of the fasteners 1908, one after the other, even if the holes 1934 are uniformly distributed in the secondary mass 1903, the holes 1943 are uniformly distributed in the clutch disc 1905, and the holes 1944 are uniformly distributed in the pronged portion of the diaphragm spring 1927. The working end of the tool has a shape such that it can be non-rotatably received in the preferably hexagonal socket 1940 in the head of a fastener 1908.

The assembly of a module A at the manufacturing plant contributes significantly to convenience, simplicity and lower cost of installation of the aggregate (including the composite flywheel 1901, the friction clutch 1904 and the clutch disc 1905) in a motor vehicle. This will be readily appreciated since the making of the module A renders it possible to dispense with a number of time-consuming operations which are necessary to install heretofore known friction clutches in automatic vehicles. For example, the clutch disc 1905 is properly centered in the module A so that no centering of the clutch disc is needed immediately prior or during attachment of the composite flywheel 1901 to the output element of the engine. Furthermore, the clutch disc 1905 is already installed between the secondary mass 1903 and the pressure plate 1928 at the time the secondary mass 1903 is to be coupled to the primary mass 1902 by the bearing 1906 and the damper 1909, and the friction clutch 1904 is properly attached to the output element as soon as the latter is connected with the primary mass 1902 by fasteners 1908. Still further, it is no longer necessary to employ a centering mandrel, to center the clutch disc 1905 relative to the pressure plate 1928 at the motor vehicle assembly plant, to select and insert the fasteners 1908, to connect the friction clutch 1904 with the composite flywheel 1901 and/or to extract a centering mandrel during or subsequent to attachment of the friction clutch to the engine.

The friction clutch 1904 is provided with an adjusting unit 1945 which is or can be identical with or analogous to any one of the adjusting units shown in and described with reference to the preceeding Figures. The adjusting unit 1945 includes a sensor 1946 (e.g., in the form of a diaphragm spring corresponding, for example, to the spring 13) and an annular member 1947 corresponding, for example, to the member 17 in the friction clutch 1 of FIGS. 1 and 2.

It is normally preferred, primarily for the purpose of reducing the cost, to establish a permanent connection between the cover 1922 and the secondary mass 1903. Such permanent connection can be established by bonding (such as welding) or by deformation of selected portions of the mass 1903 and/or cover 1922 so that the separation of these parts would involve at least partial destruction (such as extensive deformation) of the cover and/or of the secondary mass. The establishment of such permanent connection renders it possible to avoid the use of screws, bolts and/or other threaded or other fasteners. Since the aggregate including the twin-mass flywheel 1901, the clutch disc 1905 and the friction clutch 1904 is designed to remain fully assembled during its entire useful life, i.e., until the wear upon the friction linings 1929 becomes excessive, there is no urgent need to establish a readily separable connection between these parts or to establish a connection which would permit repeated assembly and dismantling of the aggregate. In spite of the absence of means for permitting repeated dismantling and assembly of the aggregate which is shown in FIG. 40, such aggregate functions satisfactorily during its entire useful life because the adjusting unit 1945 compensates for wear upon the friction linings 1929 but preferably also for wear upon one or more additional parts such as the secondary mass 1903 and/or the pressure plate 1928. The dimensions of the freshly installed friction linings 1929 can be selected with a view to ensure that they become useless due to excessive wear only after expiration of the anticipated useful life of the aggregate. As a rule, the useful life of the aggregate will be selected to at least match the anticipated life span of the motor vehicle in which the aggregate is being put to use.

Twin-mass flywheels which can be used in the improved aggregate, e.g., in a manner as shown in FIG. 40, are disclosed, for example, in published German patent applications Serial Nos. 37 21712, 37 21711, 41 17 571, 41 17 582 and 41 17 579. The disclosures of all of these published patent applications are incorporated herein by reference. The features which are disclosed in the just enumerated published patent applications can be combined with the features of the improved friction clutch and/or with the features of the improved aggregate in a number of different ways. By way of example only, the aforementioned published German patent application Serial No. 41 17 579 discloses several manners of establishing a connection between the housing or cover and a flywheel in such a way that the connection cannot be terminated without at least partial destruction of the flywheel and/or housing.

The utilization of an adjusting device 1945 in an aggregate which employs a composite flywheel for transmission of torque from a prime mover to the cover and/or pressure plate of a friction clutch is advisable and advantageous on the additional ground that the damper 1909 between the masses 1902, 1903 can prevent the transmission to the mass 1903 (i.e., to the counterpressure plate of the friction clutch 1904) of a number of stray movements which would be likely to adversely influence the operation of the adjusting unit 1945. The damper 1909 is preferably installed radially outwardly of the friction linings 1929 and radially outwardly of the friction surface 1932 on the secondary mass 1903 and/or pressure plate 1903. In a composite flywheel of the type shown in FIG. 40, the friction diameter of the clutch disc 1905 should be smaller than in conventional friction clutches which renders it necessary to increase the biasing force in dependency on the ratio of average friction radii in order to be in a position to transmit a predetermined engine torque. If a conventional friction clutch (without the adjusting unit 1945) were used, this would necessitate an increase of the disengaging force. By employing in the aggregate of FIG. 40, a friction clutch with an adjusting unit 1945 (e.g., an adjusting unit of the type described with reference to FIGS. 1 and 2), it is now possible to reduce the disengaging force and to thus avoid an increase of disengaging force and to thus avoid an increase of disengaging force above that which is required in a conventional friction clutch. In fact, it is now possible to reduce the disengaging force below that which must be applied in a conventional friction clutch in spite of the fact that the disengaging force below that which must be applied in a conventional friction clutch in spite of the fact that the adjusting unit 1945 renders it possible to compensate for wear during the entire useful life of the friction clutch and/or of the structure (such as a motor vehicle) in which the improve friction clutch is put to use.

Referring to FIGS. 41 and 42, there is shown a torque transmitting arrangement or assembly 5501 comprising a counterpressure plate 5503 which is non-rotatably connectable to the output element K (e.g., a crankshaft) of an internal combustion engine, and a friction clutch 5504 connected to the plate 5503 in such a way that a clutch plate or clutch disc 5505 is disposed between the plate 5503 and a pressure plate 5528 of the friction clutch 5504. The hub of the clutch disc 5505 transmits torque to the input element (e.g., an externally splined shaft) of a variable-speed transmission in the power train between the friction clutch 5504 and the wheels of a motor vehicle. The axis of the input element of the transmission is shown at X—X.

The friction clutch 5504 comprises a housing or cover 5522 having an axially extending marginal portion 5523 which surrounds the pressure plate 55528 and the friction linings 5529 of the clutch disc 5505. The free end 5523a of the marginal portion 5523 (the latter can be said to resemble a relatively short sleeve or tube) surrounds the counterpressure plate 5503 and is non-rotatably connected thereto. For example, the free end 5523a can be provided with radially inwardly extending protuberances, lugs or like parts 5524 which extend into complementary sockets or recesses of the counterpressure plate 5503 to ensure that this plate and the cover 5522 rotate as a unit. However, it is also possible to connect the cover 5522 with the counterpressure plate 5503 in any one of a number of other ways; for example, these parts can be welded to each other or the connections between these parts can include threaded fasteners, pins, studs, posts or like parts preferably extending in the radial direction of the counterpressure plate 5503 and of the marginal portion 5523 of the cover 5522. The just discussed connecting means preferably also serve to accurately center the counterpressure plate 5503 and the cover 5522 relative to each other.

The cover 5522 comprises an annular section or bottom wall 5526 which extends radially inwardly of the marginal portion 5523 and is outwardly adjacent a diaphragm spring 5527 which acts not unlike a two-armed lever and serves to bias the pressure plate 5528 toward the adjacent set of friction linings 5529 forming part of the clutch disc 5505. The radially outermost part of the circumferentially complete main portion of the diaphragm spring 5527 can bear against the projecting portion or portions of the pressure plate 5528, and a radially inner part of such main portion is tiltably mounted at the inner side of the bottom wall 5526 by a seat. The radially inwardly extending prongs 5527a of the diaphragm spring 5527 constitute the actuating means of the means for engaging and disengaging the friction clutch 5504. When the clutch 5504 is engaged, the radially outermost part of the main portion of diaphragm spring 5527 causes the pressure plate 5528 to bear against the adjacent set of friction linings 5529 and also causes the other set of friction linings 5529 to bear against the friction surface of the counterpressure plate 5503. The means for engaging and disengaging the friction clutch 5504 further comprises a conventional bearing or a pedal (similar or analogous to a gas pedal in a motor vehicle) which must be actuated by the driver in order to move the prongs 5527a along their predetermined path and to thus effect the engagement or disengagement of the friction clutch 5504.

The means for transmitting torque between the pressure pate 5528 and the cover 5522 of the friction clutch 5504 which is shown in FIG. 41 comprises leaf springs 5521 each having a first end portion affixed to the cover 5552 and a second end portion affixed to the pressure plate 5528. It is presently preferred to employ rivets 5521 a or analogous fasteners as a means for connecting the leaf spring 5521 to the pressure plate 5528 and/or to the cover 5522. As can be seen in the upper part of FIG. 40, the rivets 5521 a are preferably of the type known as blind rivets; in FIG. 40, one such blind rivet is denoted by the character 1990.

The friction clutch 5504, i.e., the torque transmitting arrangement or assembly 5501, comprises an adjusting unit 5545 which is analogous to the adjusting units of friction clutches shown in the preceeding Figures and includes a diaphragm spring or sensor 5546 and an annular adjusting member 5547. The adjusting unit 5545 serves to compensate for wear upon the pressure plate 5528 and upon the counterpressure plate 5503 but particularly or primarily for wear upon the friction linings 5529.

The adjusting unit 5545 includes ramps which are provided directly in the annular member 5547 and are designed in such a way that they establish air transmitting passages 5547a. The member 5547 is located at the inner side of the bottom wall 5526 of the cover 5522, and the passages 5547a extend in the direction of rotation of the friction clutch 5504. Such passages promote desirable cooling of the friction clutch 5504 when the counterpressure plate 5503 is rotated by the output element K of the engine because the passages induce the flow of currents of cool air. This reduces the thermal stresses upon the annular member 5547 which can be made of a suitable plastic material. The annular member 1947 of the adjusting unit 1945 of the friction clutch 1904 shown in FIG. 40 can be constructed and configurated in the same way as the annular member 5547.

The means for affixing the counterpressure plate 5503 to the output element K of the engine comprises an axially elastic coupling element 5550 which enables the plate 5503 to perform limited axial movements relative to the output element and/or vice versa. The illustrated coupling element 5550 is a disc having a stiffness or rigidity such that it can effectively damp axial, wobbling, angular and/or other stray movements which the output element K would transmit to the friction clutch 5504 and which could interfere with accuracy of adjustments carried out by the unit 5545. The coupling element 5550 need not damp any and all stray movements; however, its damping action should be sufficient to ensure that the unit 5545 can properly adjust the position of the pressure plate 5528 in dependency upon the extent of wear on certain parts of the friction clutch 5504 and the aggregate 5501, especially in dependency on the wear upon the friction linings 5529. Furthermore, the elastic coupling element 5550 ensures proper operation of the friction clutch 5504 by ensuring proper operation of the adjusting unit 5545. Otherwise stated, the coupling element 5550 should constitute a barrier which is capable of transmitting torque from the output element K of the engine to the counterpressure plate 5503 but is also capable of shielding the counterpressure plate 5503 and the friction clutch 5504 from any such axial, angular and/or other stray movements of the output element K which could adversely affect the operation of the friction clutch 5504 and particularly the operation of the adjusting unit 5545. In the absence of the coupling element 5550, or of a functional equivalent of this coupling element, the unit 5545 would be likely to carry out unnecessary adjustments of the position of the pressure plate 5528 relative to the counterpressure plate 5503 or not to carry out such adjustments when they are warranted in view of the extent of wear upon the friction linings 5529. Unnecessary adjustments by the unit 5545 would be attributable primarily to the mass of various parts of the aggregate 5501 and to acceleration of such mass due to vibration of the output element K and (in the absence of the elastic coupling element 5550) of various parts of the friction clutch 5504. Alternatively, the relatively simple adjusting unit 5545 would have to be replaced with a much more complex adjusting unit, namely a unit designed with a view to take into consideration a host of additional variables including the inertia-induced forces acting upon the component parts of the adjusting unit. Moreover, all such inertia-induced forces would have to be properly related to each other in order to ensure that the thus modified adjusting unit would respond only and alone to signals pertaining to the extent of wear upon the pressure plate 5528, the counterpressure plate 5503 and/or the friction linings 5529. As a rule, a thus modified adjusting unit (to be used in lieu of the unit 5545 in the absence of the coupling element 5550) would require a number of additional parts and its space requirements would greatly exceed those of the unit 5545.

The adjusting unit 5545 of FIG. 41 operates between the cover 5522 and the pressure plate 5528 of the friction clutch 5504. However, it is equally possible to equip the aggregate 5501 with a friction clutch of the type shown in the preceeding Figures, e.g, with a friction clutch wherein the adjusting means serving to compensate for wear upon the friction linings is disposed between the diaphragm spring and the pressure plate which is biased by the diaphragm spring.

The radially outer portion of the counterpressure plate 5503 in the aggregate 5501 of FIG. 41 is fixedly connected to the elastic coupling element 5550 by bolts 5551 or analogous threaded fasteners. For example, the bolts 5551 can be replaced with blind rivets of the type shown in FIG. 40, as at 1990, to connect leaf springs with the pressure plate 1928 of the friction clutch 1904. A narrow radially extending gap 5552 is established between the neighboring surfaces of the counterpressure plate 5503 and the coupling element 5550 radially inwardly of the fasteners 5551; the width of this gap (as measured in the direction of the axis X—X) determines the maximum amplitude of axial stray movements which can be damped by the element 5550 when the aggregate 5501 of FIG. 41 is in use. More specifically, the width of the gap 5552 determines the maximum amplitude of those axial movements which are directed from the output element K toward the counterpressure plate 5503. The width of the gap 5552 further determines the extent of maximum movability of the friction clutch 5504 and counterpressure plate 5503 toward the output element K. As a rule, the central portion of the counterpressure plate 5503 does not contact the coupling element 5550 if the engine functions properly.

The counterpressure plate 5503 is a ring which surrounds an axial protuberance 5553 of a washer-like member 5554; the latter is fixedly secured to the central portion of the elastic coupling element 5550 and can serve as a means for centering the element 5550 on a coaxial stub-like tubular projection 5555 of the output element K. The radially inner portion of the element 5550 is clamped between a front end face 5557 of the output element K and the centering member 5554.

The axial protuberance 5553 of the centering member 5554 has radially outwardly extending portions 5558 which constitute stops in that they limit the extent of movability of the counterpressure plate 5503 axially and away from the central portion of the elastic coupling element 5550 and output element K. To this end, the projecting portions or stops 5558 extend behind the central portion of the plate 5503, i.e., such central portion of the plate 5503 is located between the central portion of the element 5550 and the stops 5558. A narrow slot or clearance 5559 is normally established between the stops 5558 and the central portion of the plate 5503, and the width of this clearance 5559 can equal or approximate the width of the gap 5552.

The surface surrounding the central opening of the counterpressure plate 5503 can be slipped onto the centering member 5554 without any or with a minimum of play, i.e., the plate 5503 can be mounted on the member 5554 without any or with a minimum of radial play but is movable axially thereon to the extent which is determined by the gap 5552 and the clearance 5559. In other words, the centering member 5554 can be said to constitute a guide which confines the counterpressure plate 5503 to movements in the direction of the axis X—X. However, it is equally within the purview of the invention, and often preferable, to mount the radially inner portion of the ring-shaped counterpressure plate 5503 on the portion 5553 of the centering member 5554 with at least some radial play to thus ensure that, in normal operation of the aggregate 5501 (and assuming that the operation of the engine including the output element K is satisfactory), the counterpressure plate 5503 need not be in any contact with the centering member 5554 and/or its portion 5553 and/or the projections 5558 and/or the central portion of the elastic coupling element 5550.

It is further within the purview of the invention to provide the aggregate 5501 with additional means for preventing the transfer of stray movements between the output element K and the counterpressure plate 5503 or to use such additional means in lieu of the element 5550. For example, the additional preventing means can be designed to damp any such stray movements which cannot be damped and/or otherwise counteracted by the coupling element 5550 to thus even further ensure reliable operation of the adjusting unit 5545. Such additional preventing means can be designed to destroy energy which is attributable to vibratory and/or other stray movements of the output element K, e.g., in a manner as shown in FIG. 42, namely by relying on friction.

FIG. 42 shows that the radially innermost portion of the counterpressure plate 5503 and the external surface of the annular portion 5553 of the centering member 5554 are separated from each other by a further damper 5560. For example, the damper 5560 can consist of or can utilize a ring which is undulated in the circumferential direction so that its undulations extend radially. The ring of the damper 5560 can be installed in radially stressed condition to establish friction between its external surface and the surface surrounding the central opening of the counterpressure plate 5503 whenever the output element K causes the member 5554 and its portion 5553 to perform stray movements in the direction of the axis X—X. In other words, the ring 5560 can prevent the transfer of stray movements from the output element K to the counterpressure plate 5503 or reduces the amplitude of such movements to an acceptable minimum. It is possible to utilize a friction generating ring 5560 in the form of a split ring.

The radially outermost portion of the elastic coupling element 5550 carries a starter gear 5561 which can be welded or otherwise affixed thereto.

The coupling element 5550, the counterpressure plate 5503, the clutch disc 5505 and the friction clutch 5504 can be assembled into a module (corresponding to the module A shown in FIG. 40) which can be assembled at the manufacturing plant for convenient storage or shipment to an automobile assembling plant, and mounted on the output element K of an engine with substantial savings in space, initial cost and assembly cost. The fasteners 5556 which are shown in FIG. 41 and serve to secure the centering member 5554 and the coupling element 5550 to the output element K can constitute hexagon socket screws or bolts. As already described with reference to FIG. 40, such fasteners can be installed in the aforediscussed module in such a way that they cannot be lost and are maintained in optimum positions for attachment to the output element K of the engine.

The clutch disc 5505 of the aggregate 5501 which is shown in FIG. 41 is installed between and is centered relative to the pressure plate 5528 of the friction clutch 5504 and the counterpressure plate 5503 of the aggregate 5501. Moreover, the openings or holes 5562 which are provided in the clutch disc 5505 are in at least partial alignment with openings 5564 in the pronged radially inner portion 5527a of the diaphragm spring 5527 in order to permit the penetration of the working end of a tool 5563 into the polygonal sockets in the heads of the fasteners 5556 when it becomes necessary to drive the shanks of such fasteners into complementary tapped bores or holes in the output element K. The illustrated clutch disc 5505 comprises an input portion including the friction linings 5529, an output portion including the aforementioned hub which can be non-rotatably slipped onto the input element of a transmission, and a suitable damper employing coil springs or otherwise configurated energy storing elements disposed between the input and output portions; the holes 5562 are disposed radially inwardly of the damper between the input and output portions of the clutch disc 5505 which is shown in FIG. 41. The holes 5564 in the pronged portion 5527a of the diaphragm spring 5527 are optional, i.e., such holes or bores are necessary only if the tool 5563 cannot pass through the slots between the neighboring prongs of the diaphragm spring 5527. The extent of alignment between the holes or bores 5564, the holes or bores 5562 and the heads of the fasteners 5556 should suffice to ensure that the working end of the tool 5563 will be capable of entering the sockets in the heads of the fasteners 5556 even if the holes which are provided in the central portion of the elastic coupling element 5550 to permit the shanks of the fasteners to pass therethrough are not exactly equidistant from each other. As already described with reference to FIG. 41, such nuclear distribution of holes in the coupling element 5550 and in the output element K is often desirable in order to ensure that the counterpressure plate 5503 can be mounted on the output element K in a single predetermined angular position of these parts relative to each other.

As already described with reference to the previously discussed embodiments of the present invention, the adjusting unit 5545 enables the friction clutch 5504 to operate satisfactorily during its entire useful life. This is due to the fact that the unit 5545 can compensate at least for wear upon the friction linings 5529 of the clutch disc 5505. Moreover, the adjusting unit 5545 renders it possible to permit the utilization of a diaphragm spring 5527 which is best suited to ensure that the magnitude of the force acting upon the pressure plate 5528 to clamp the friction linings 5529 between the friction surfaces of the plates 5503, 5528 remains within an optimal range for a long interval of time, particularly until the wear upon the linings 5529 has progressed to an extent which warrants discarding of the aggregate 5501. The diaphragm spring 5527 is preferably designed and mounted in such a way that it must merely furnish a force which is necessary to ensure adequate biasing of the pressure plate 5528 for the purpose of transmitting the desired torque from the clutch disc 5505 to the input element of the variable-speed transmission in the power train of a motor vehicle. The adjusting unit 5545 ensures proper positioning of the diaphragm spring 5527 during the entire life span of the aggregate 5501, i.e., it ensures that the bias of the diaphragm spring 5527 upon the pressure plate 5528 is satisfactory and practically unchanged whenever the friction clutch 5504 is engaged during the entire life span of the friction clutch.

The clutch disc 5505 further comprises resilient segments 5565 which constitute a means for gradually reducing the torque which is transmitted by the clutch disc 5505 during a portion of movement of the prongs 5527a along their path to disengage the friction clutch 5504. Furthermore, the segments 5565 ensure a gradual increase of torque which can be transmitted from the clutch disc 5505 to the variable-speed transmission during engagement of the friction clutch 5504, i.e., while the prongs 5527a of the diaphragm spring 5527 are caused to move in the opposite direction. This, in turn, renders it possible to reduce the magnitude of the force which is necessary to disengage the friction clutch 5504 and to ensure a more satisfactory variation of such forces in the course of the actual disengaging operation. Thus, a desired variation of clutch disengaging force or forces can be achieved by the simple expedient of properly relating the forces which are generated by the resilient segments 5565 (or equivalents of such segments) and the diaphragm spring 5527, i.e., by properly relating the force-to-displacement ratios of such resilient means. This renders it possible to optimally design the elastic coupling element 5550, i.e., to ensure that the element 5550 will damp any and all stray movements which would be likely to adversely influence the operation of the adjusting unit 5545. As mentioned above, such stray movements can include axial wobbling, bending, angular, tilting and/or other movements which are carried out by the output element K and should not be transmitted to the counterpressure plate 5503. The magnitude of disengaging forces acting upon the coupling element 5550 is minimal. Thus, the fores which are required to disengage the friction clutch 5504 can be taken up by the element 5550 without any appreciable axial displacement of the aggregate 5501.

The elastic coupling element 5550 can be designed and mounted to shield the counterpressure plate 5503 (and hence the adjusting unit 5545) from a number of stresses which could result in unintentional or unnecessary adjustment of the distance of the pressure plate 5528 from the counterpressure plate 5503. It is particularly important to ensure that the coupling element 5550 is capable of counteracting the transmission of axial and wobbling movements of the output element K to the friction clutch 5504. As concerns the construction and mounting of the elastic coupling element 5550, reference may also be had to published European patent applications Serial Nos. 0 385 752 and 0 464 997 as well as to SAE Technical Paper No. 9 003 91. The disclosures of the two European patent applications and of the Technical Paper are incorporated herein by reference.

The coupling element 5550 is particularly effective in preventing undesirable adjustments by the unit 5545 due to axial stray movements of the pressure plate 5528 relative to the cover 5522 when the friction clutch 5504 is disengaged. Such undesirable adjustments would be attributable to vibratory movements of the counterpressure plate 5503 and/or diaphragm spring 5527. Any unintentional adjustments of the diaphragm spring 5527, i.e., any adjustments which are not necessary to compensate for wear upon the friction linings 5529 but are attributable to axial, wobbling and/or other stray movements of the output element K, could result in an undesirable reduction of the bias of the diaphragm spring upon the pressure plate 5528 below an acceptable minimum and would prevent the friction clutch 5504 (and its clutch disc 5505) from transmitting torques of desired magnitude.

The aforediscussed design of the improved friction clutch renders it possible to maintain the disengaging force at a low value in spite of a reduction of the outer diameter of the friction linings and the resulting need to increase the bias of the diaphragm spring or its equivalent(s) upon the pressure plate. Since the disengaging force is reduced, the stressing of the bearing (such as the bearing 1906 in FIG. 40) is less pronounced. Thus, it is possible to employ a less expensive antifriction bearing and/or a bearing whose space requirements are low.

Still another advantage of the improved friction clutch and/or of an aggregate which employs such friction clutch and/or of a driving unit which employs the improved friction clutch and/or the improved aggregate is that compensation for wear entails a pronounced lengthening of the useful life of the friction clutch. This renders it possible to avoid frequent (or any) replacement of parts which are subject to wear, particularly the clutch disc 1905. This, in turn, brings about the aforediscussed advantage that it is now possible to establish a permanent connection between the counterpressure plate and the cover of the friction clutch, i.e., a connection whose termination necessitates at least partial destruction of at least one of the interconnected parts. Such connection can include that which is shown in FIG. 40 and/or a connection which employs rivets, welded seams or the like. The establishment of a permanent or practically permanent connection is particularly desirable and advantageous when the dimensions of the space which is available for the improved friction clutch and/or the improved aggregate and/or the improved driving unit are small or extremely small, e.g., in a compact motor vehicle. Thus, even relatively small reductions of space requirements (such as avoiding the use of screws or bolts whose heads would project radially outwardly beyond the cover 1922 and/or beyond the composite flywheel 1901) are important to ensure that the friction clutch can be used in a particular series of motor vehicles. The construction which is shown in FIG. 40, as well as the construction which is shown in FIG. 41, ensures that, with the exception of the starter gear 5561, the radially outermost part of the composite flywheel 1901 or the radially outermost part of the cover 5522 determines the maximum space requirements of the improved aggregate or driving unit because the means for connecting the cover to the counterpressure plate 1903 or 5503 does not extend radially beyond the flywheel 1901 or the housing 5522.

The improved friction clutch with automatic compensation for wear upon one or more parts (e.g., with the adjusting unit 5545 of FIG. 41) can be utilized with particular advantage in driving units which are used in motor vehicles, especially in vehicles employing at least partially automatic (including automatic and semiautomatic) transmissions. The friction clutch is then installed between a prime mover (such as the engine of a vehicle) and the transmission and is operated or controlled at least in dependency upon the operation of the at least partly automatic transmission. It is presently preferred to establish a fully automatic control for the friction clutch. Automated and fully automatic controls for a friction clutch are disclosed, for example, in published German patent application Serial No. 40 11 850.9 to which reference may be had, if necessary.

In heretofore known driving units which employ an automatic or semiautomatic transmission and a conventional friction clutch, actuation of the friction clutch and the design of actuating means (such as electric motors and/or cylinder and piston assemblies) present numerous problems. Actuation of a conventional friction clutch necessitates the application of a relatively large disengaging force which, in turn, necessitates the use of rather bulky and powerful actuating means therefor. This contributes to the weight, space requirements and cost of such driving units, i.e., of units which employ at least partly automated transmissions in conjunction with conventional friction clutches. Moreover, the inertia of relatively large, bulky and heavy actuators which are employed in conventional driving units prolongs their reaction time. If the actuators are cylinder and piston units, the application of relatively large forces to actuate the friction clutch necessitates the flow of large quantities of a hydraulic or pneumatic fluid which also contributes to longer reaction times of such actuators. Moreover, it is necessary to employ one or more relatively large pumps which are required to supply the cylinder and piston units with requisite quantities of a pressurized fluid.

Attempts to eliminate some drawbacks of the just discussed conventional driving units include the utilization of compensating springs which are intended to reduce the actuating force necessary to disengage the friction clutch and to thus permit the utilization of smaller (more compact) actuators. Reference may be had, for example, to published German patent application Serial No. 33 09 427. However, since the disengaging force varies during the useful life of a conventional friction clutch (the required force is relatively small when the friction clutch is new but increases with increasing wear upon the friction linings during the life span of the friction clutch), a compensating spring can reduce only a relatively small fraction of the normally required disengaging force. If one takes into consideration all tolerances, it is still necessary to provide actuators which must furnish a disengaging force exceeding that which is necessary for an unused conventional friction clutch, and this in spite of the utilization of compensating springs. On the other hand, a driving unit which employs the improved friction clutch with an adjusting unit capable of compensating for wear at least upon the friction linings, and with a prime mover as well as an automatic or semiautomatic transmission, renders it possible to greatly reduce the disengaging force well below that which is required for proper operation of conventional driving units. Such reduction can take place directly in the friction clutch, and the magnitude of the disengaging force remains practically unchanged during the entire useful life of the friction clutch. This renders it possible to simplify and thus reduce the cost, bulk and reaction time of the actuators with attendant savings in space requirements and weight of the entire driving unit. Thus, the driving unit can be designed to stand relatively small pressures and/or forces. Furthermore, this results in a substantial reduction or even complete elimination of losses due to friction and/or decreasing resiliency of parts in the disengaging means for the improved friction clutch.

The improved friction clutch and/or the aggregate or assembly employing the improved friction clutch is susceptible of numerous additional modifications without departing from the spirit of the present invention. For example, the features of various described and shown clutches and/or aggregates can be used interchangeably or in combination with each other. Furthermore, the improved friction clutch and/or the improved aggregate and/or a motor vehicle which embodies the improved friction clutch or aggregate can also embody numerous additional features which are known per se but could further enhance the useful life and/or other desirable characteristics of the improved friction clutch and/or aggregate. Still further, at least some individual features of the aforedescribed friction clutches and/or aggregates embody features which are or could be considered to be novel and patentable per se.

Figure 43:
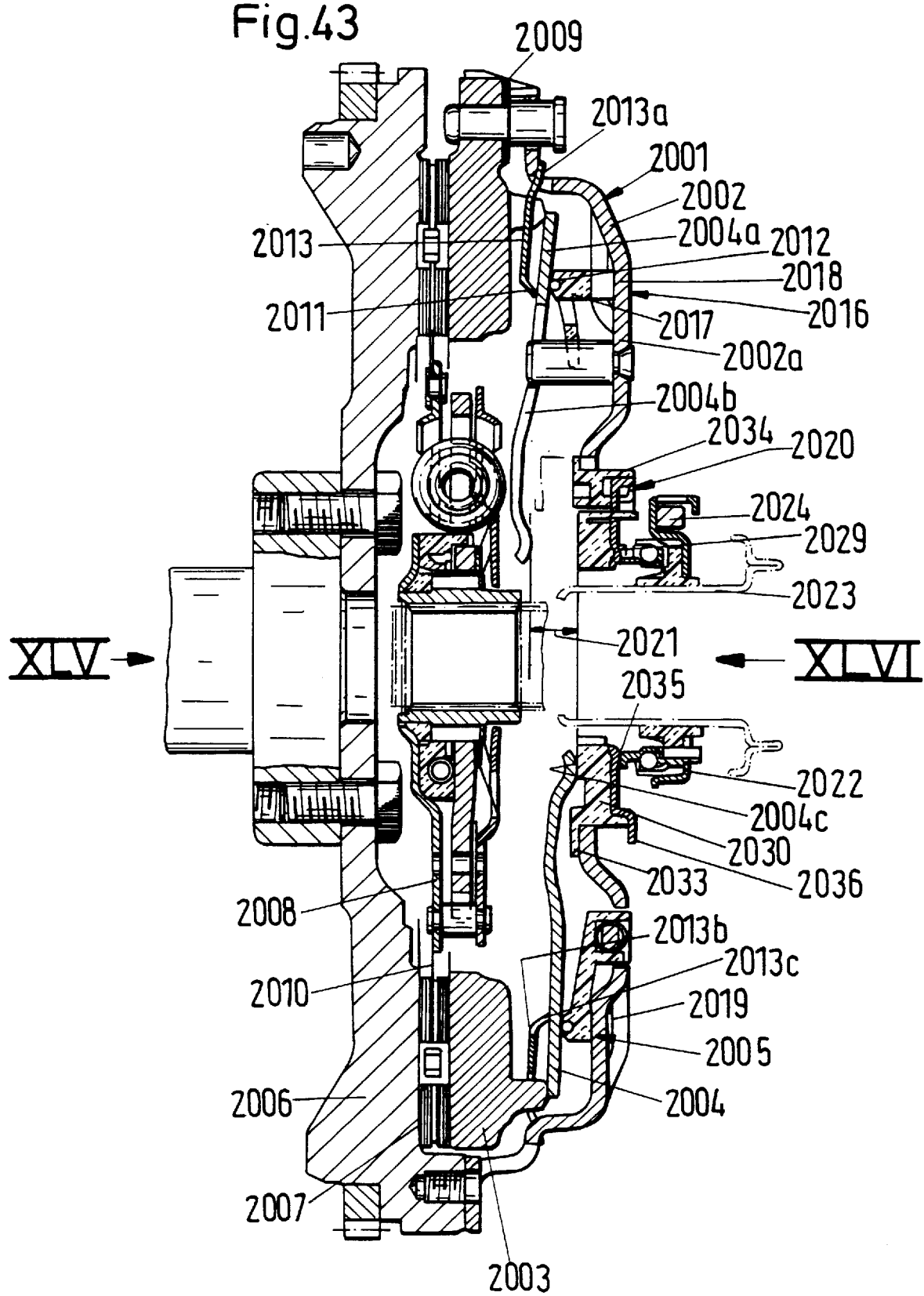
FIG. 43 is a sectional view of a further clutch assembly which is constructed in accordance with the invention.

The clutch assembly which is shown in FIG. 43 comprises a friction clutch 2001 with a housing 2002 and a pressure plate 2003 which is non-rotatably connected to but is movable axially within limits relative to the housing. A biasing diaphragm spring 2004 is stressed between the pressure plate 2003 and the cover 2002 and is tiltable relative to a ring-shaped seat assembly 2005 which is carried by the housing. The spring 2004 acts upon the pressure plate to urge the latter toward a counterpressure plate 2006, for example a flywheel, whereby the friction linings 2007 of the clutch disc 2008 are clamped between the friction surfaces of the pressure plate 2003 and the counterpressure plate 2006.

The pressure plate 2003 is non-rotatably connected with the housing 2002 by circumferentially or tangentially oriented leaf springs 2009. In the illustrated example, the clutch disc 2008 comprises so-called springy friction lining segments 2010 which ensure a progressive buildup of torque during engagement of the friction clutch 2001 by permitting a limited axial shifting of the two friction linings 2007 in a direction toward each other to thus effect a gradual increase of axial forces acting upon the friction linings 2007. However, one could also utilize a clutch disc wherein the friction linings 2007 are substantially rigidly attached to a disc-shaped carrier.

In the illustrated embodiment, the diaphragm spring 2004 comprises a ring-shaped main portion 2004a which applies the biasing force and actuating prongs 2004b which extend radially inwardly from the main portion. The diaphragm spring 2004 is installed in such a way that its radially outer zones act upon the pressure plate 2003 and its radially inner portions are tiltable relative to the seat assembly 2005.

The seat assembly 2005 comprises two tilting seats 2011, 2012 and the diaphragm spring 2004 is held or clamped between the two seats. The seat 2011 which is provided at that side of the diaphragm spring which faces the pressure plate is biased axially in a direction toward the housing 2022. To this end, the seat 2011 forms part of a diaphragm spring 2013 or a member which resembles a diaphragm spring and the radially outer marginal portion 2013a of this spring resiliently bears against the housing 2002 to thus urge the radially inwardly disposed seat 2011 axially against the actuating diaphragm spring 2004 and hence also toward the housing 2002. The diaphragm spring 2013, which is installed axially between the pressure plate 2003 and the actuating diaphragm spring 2004, comprises a ring-shaped portion 2013b and tongues 2013c which extend radially inwardly from the portion 2013b and constitute the seat 2011.

In the illustrated example, the means for supporting the diaphragm spring-shaped member 2013 comprises a bayonet mount-like connection or lock which is installed between the housing 2002 and the tongue-like arms 2013a of the diaphragm spring-shaped member 2013.

The diaphragm spring-shaped member or diaphragm spring 2013 constitutes a sensor spring which generates an at least approximately constant force while it covers a predetermined working distance. The sensor spring 2013 takes up at least the major part of the clutch disengaging force which is being applied to the tips 2013a of the tongues so as to thereby ensure the development of an at least substantial equilibrium between the force which develops as a result of the application of disengaging force upon the tilting seat 2011 and the opposing force which the sensor spring 2013 applies to the seat 2011.

The tilting seat 2012 which faces the housing 2002 is propped relative to the housing by an adjusting device 2016. This adjusting device 2016 ensures that no undesirable play can develop between the tilting seat 2012 and the housing 2002 or between the tilting seat 2012 and the diaphragm spring 204 in response to axial displacement of the tilting seats 2011 and 2012 in a direction toward the pressure plate 2003 and hence in a direction toward the counterpressure plate 2006. This prevents the development of lost motion or dead travel during actuation of the friction clutch 2001 to thus ensure optimum efficiency and satisfactory operation of the friction clutch 2001. Axial shifting of the tilting seats 2011 and 2012 takes place in response to axial wear upon the friction surfaces of the pressure plate 2003 and counterpressure plate 2006 as well as upon the friction linings 2007.

The adjusting device 2016 comprises a spring-biased adjusting element in the form of a ring-shaped member 2017 which is provided with circumferentially extending and axially rising sloping ramps 2018 distributed along the periphery of the member 2017. The adjusting element 2017 is installed in the clutch 2001 in such a way that the sloping ramps 2018 face the bottom wall 2002a of the housing.

The adjusting ring 2017 is spring biased in the circumferential direction to turn in the adjusting direction, i.e., in a direction which brings about axial displacement of the adjusting ring 2017 in a direction toward the pressure plate 2003, namely in the axial direction away from the housing section 2002a. Such direction of axial movement is achieved as a result of movement of the sloping ramps 2018 relative to opposing ramps 2019 which are formed in the bottom wall 2002a of the cover.

The clutch assembly comprises a compensating device 2020 which ensures that the disengaging means of the friction clutch 2001 which are constituted by the diaphragm spring prongs 2004b can be actuated without play in the axial direction and can cover an unchanging distance 2021.

The compensating device 2020 is disposed between a disengaging member 2022, which comprises a disengaging bearing, and the tips 2004c of the prongs. The disengaging member 2022 is movable axially along a schematically illustrated tubular guide 2023 in order to actuate the friction clutch 2001. The tubular guide 2023 is carried by a transmission case, not specifically shown, and surrounds the input shaft of the transmission. The clutch disc 2008 is non-rotatably mounted on the input shaft of the transmission. The force which is required to axially displace the disengaging member 2022 is furnished by actuating means 2024 which, in the illustrated embodiment, is constituted by a schematically illustrated disengaging fork. Such fork can also be mounted on the transmission. However, it is also possible to employ disengaging members which can be actuated hydraulically or pneumatically, namely disengaging members comprising a cylinder-piston unit which operates with a pressurized fluid medium.

Figure 44:
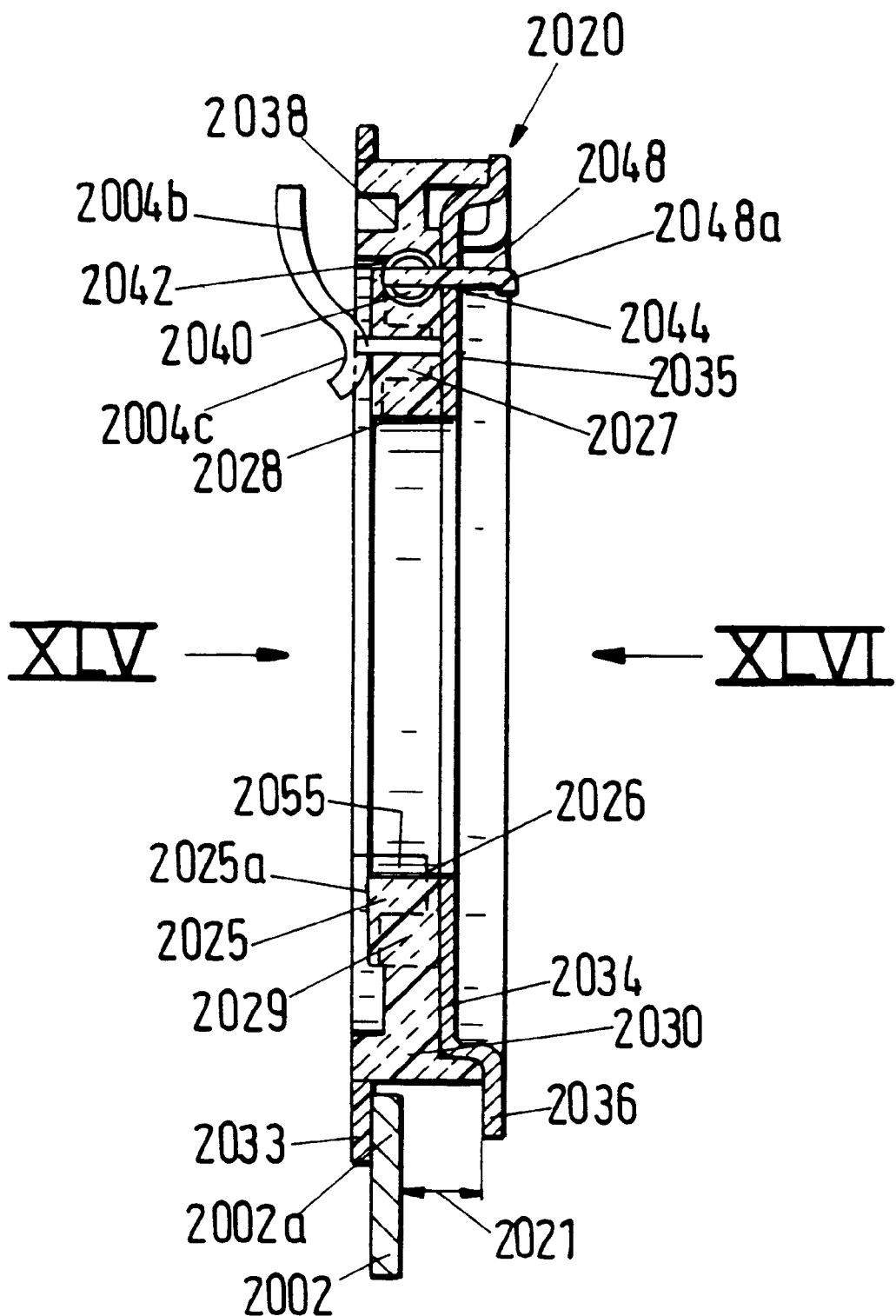
FIG. 44 shows a compensating device in section and drawn to a larger scale.
Figure 45:
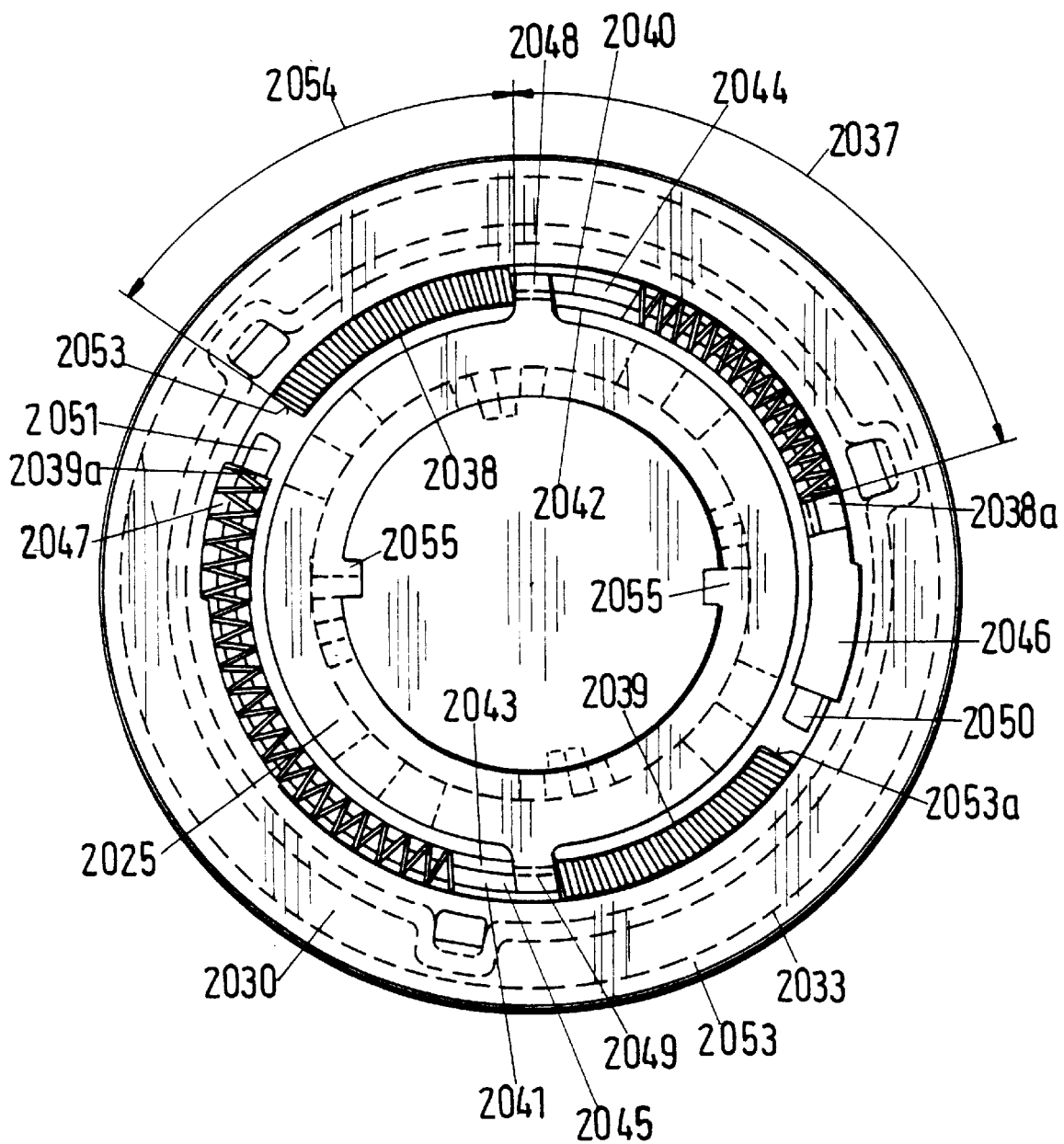
FIG. 45 is a view as seen in the direction of arrow XLV in FIGS. 43 and 44.
Figure 47:
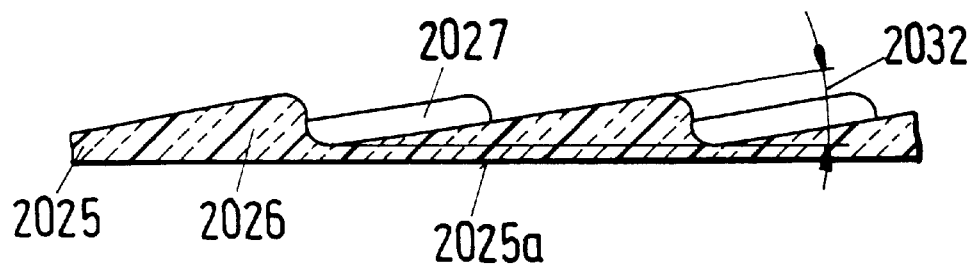
FIG. 47 is a sectional view taken along the line XLVII—XLVII in FIG. 46.
Figure 46:
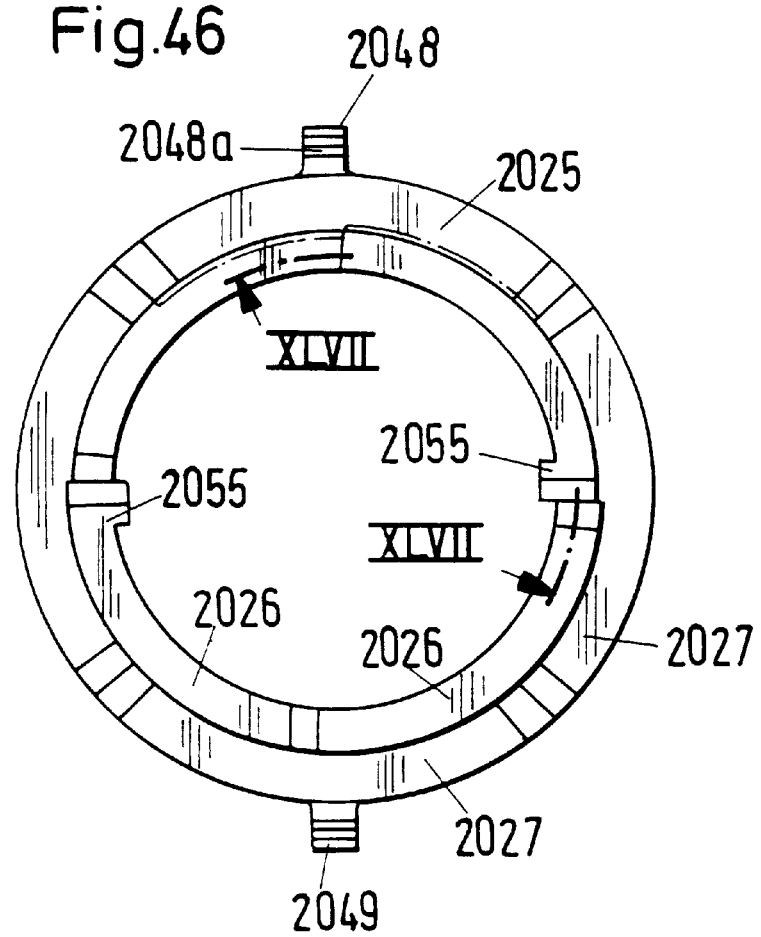
FIG. 46 is a view of the adjusting ring which engages the disengaging means of the friction clutch as seen in the direction of arrow XLVI in FIGS. 43 and 44.

The compensating device 2020 is shown drawn to a larger scale in FIGS. 44 and 45. This device comprises an adjusting element in the form of a ring-shaped member 2025 which is illustrated in FIGS. 46 and 47. In the illustrated embodiment, the adjusting element 2025 comprises two sets of axially rising sloping ramps 2026, 2027 which are offset relative to each other in the radial direction and extend in the circumferential direction. The ramps of each of the two sets are distributed along the periphery of the member 2025. As can be readily seen in FIG. 47, the radially inner sloping ramps 2026 are offset in the circumferential direction with respect to the radially outwardly disposed sloping ramps 2027, namely by approximately one-half the length of a sloping ramp or the pitch of the ramps. As can be seen in FIGS. 43 and 44, the adjusting element 2025 has a front surface 2025a which directly abuts the tips 2004c of the prongs. The sloping ramps 2026, 2027 face axially and away from the actuating means 2004b. The adjusting element 2025 is spring biased in the circumferential direction, namely in the direction of adjustment. This is the direction in which the movement of the ramps 2026, 2027 along the opposing ramps 2028, 2029 of a supporting ring 2030—shown in detail in FIGS. 48 and 49—must take place in order to effect an axial displacement of the adjusting ring 2025 in a direction toward the pressure plate 2003, namely in the axial direction and away from the disengaging member 2022.

As can be seen in FIGS. 48 and 49, the opposing sloping ramps 2028, 2029 also form two sets of sloping ramps which are offset relative to each other in the radial direction as well as in the circumferential direction. The ramps 2026, 2027 of the adjusting element 2025 and the ramps 2028, 2029 of the supporting ring 2030 complement each other and are interlaced in the axial direction. The offsetting of ramps in the circumferential direction ensures the establishment of a satisfactorily centered guidance of the adjusting element 2025 and the supporting ring 2030. As can be seen particularly in FIG. 44, the components 2025 and 2030 of the compensating device 2020 are axially interfitted into each other. The angle 2031 of slope (FIG. 49) of the opposing sloping ramps 2028, 2029 on the supporting ring 2030 corresponds to the angle 2032 (FIG. 47) of the sloping ramps 2026, 2027 on the adjusting element 2025. The supporting ring 2030 can be non-rotatably connected with the housing 2002 but can be moved within limits relative to the housing in the axial direction. The extent of axial movement is limited by radial portions 2033 of the supporting ring 2030 because such portions abut the radially inner portions of the bottom wall 2002a of the cover in the engaged condition of the friction clutch 2001. Such abutment is effected by the stressed resilient actuating means 2004b. During disengagement of the friction clutch 2001, the extent of movement is limited by a sheet metal part 2034 provided at that side of the supporting ring 2030 which faces away from the actuating means 2004b and can be acted upon by the disengaging member 2022 at the region of the diameter 2035. This sheet metal part 2034 also comprises radial portions 2036 which can abut the radially inner portions of the bottom wall 2002a of the cover during disengagement of the friction clutch 2001.

In the illustrated example, the adjusting ring 2025 as well as the supporting ring 2030 are made of a heat-resistant synthetic plastic material, such as for example a thermoplastic substance which, in addition, can be reinforced by fibers. In this manner, such parts can be readily produced by injection molding.

As seen in the circumferential direction, the sloping ramps 2026, 2027 and the oppositely sloping ramps 2028, 2029 are configured in such a way that they enable the members 2025 and 2030 to turn relative to each other through an angle which permits an adjustment for the wear upon the friction surfaces of the pressure plate 2003 and counterpressure plate 2006 as well as to compensate for wear upon the friction linings 2007 during the entire useful life of the friction clutch 2001. Depending upon the design of the sloping ramps, the anglo of adjustment can be in the range of between 30° and 90°. In the illustrated embodiment, such angle of rotation, denoted in FIG. 45 by the reference character 2037, is approximately 75°. The angles of slope 2031 and 2032 of the ramps and opposing ramps can be within the range of between 6° and 14°, preferably about 8°. The actual slope angles 2031 and 2032 of the ramps and opposing ramps vary in the radial direction of the respective ramps because the same difference between levels must be achieved for a selected angle of rotation. Thus, this means that the angles 2031 and 2032 of the ramps decrease with increasing diameter.

The force which is necessary for adjustment of the element 2025 and acts in the circumferential direction is applied by energy storing elements which, in the illustrated embodiment, include two arcuate coil springs 2038, 2039 which are mounted in stressed condition between the supporting ring 2030 and the adjusting element 2025. These coil springs 2038, 2039 react against the supporting ring 2030 which is held against rotation relative to the cover 2002 and they turn the adjusting ring 2025 as soon as the actuating means or prongs 2004b of the diaphragm spring move away from the bottom wall 2002a of the cover or from the disengaging member 2022 as a result of wear upon the friction linings. As can be readily seen by referring particularly to FIGS. 45 and 48, the coil springs 2038, 2039 are received, respectively, in channel-shaped toroidal recesses 2040, 2041 of the ring 2030. As can be seen in FIG. 44, a recess 2040 whose cross-sectional outline conforms to the convolutions of the energy storing elements 2038, 2039 extends along more than one-half of the cross-section of a spring 2028 or 2029 and, as shown in FIGS. 45 and 48, a slit-shaped opening 2042, 2043 is provided at that side which faces the actuating means 2004b and a slit-shaped opening 2044, 2045 is provided at that side of the supporting ring 2030 which faces away from the actuating means 2004b. The springs 2038, 2039 are secured relative to the supporting ring 2030 in the axial direction by surfaces which flank the recesses 2040, 2041. To facilitate the introduction of the coil springs 2038, 2039, the sector-shaped recesses 2040, 2041 are provided with threading20 in portions 2046, 2047 each having an introduction facilitating width, as seen in the radial direction, which at least equals the outer diameters of convolutions of the coil springs 2038, 2039. The energy storing elements 2038, 2039 can be introduced into the sector-shaped recesses 2040, 2041 by advancing through the threading-in portions 2046, 2047 at an oblique angle. Once the still unstressed coil springs 2038, 2039 are introduced into the sector-shaped recesses 2040, 2041, the adjusting element 2025 is assembled with the supporting ring 2030. To this end, axial projections 2048, 2049 which are provided on the adjusting ring 2025 to further constitute the biasing portions or supporting portions for the coil springs 2038, 2039 are each introduced into one of the axially extending slit-shaped portions 2050, 2051 which are adjacent the threading-in portions 2046, 2047 to thus place the stressing projections 2048, 2049 adjacent one end portion each of the unstressed coil springs 2038, 2039. The unstressed condition of an energy storing element 2038 or 2039 can be seen in FIG. 45 and is denoted by the character 2039a. The other end portions of the coil springs 2038, 2039 abut the bottoms 2053, 2053a provided in the sector-shaped recesses 2040, 2041 as seen in the circumferential direction. The springs 2038, 2039 can be stressed by rotating the adjusting ring 2025 and the supporting ring 2030 relative to each other. Upon rotation of the rings 2025, 2030 relative to each other through a predetermined angle which exceeds the circumferential length of the threading-in portions 2046, 2047, the stressing projections 2048, 2049 of the adjusting ring 2025 respectively overlie the end portions of slits 2044, 2045, as seen in the axial direction, so that the adjusting ring 2025 and the supporting ring 2030 can be moved toward each other until the sloping ramps 2026, 2027 and the oppositely sloping ramps 2028, 2029 come into actual contact with each other. The slits 2044, 2045 and the axial projections 2048, 2049 are positioned relative to each other in such a way that a snap-in connection is established between the parts 2025, 2030 as seen in the axial direction. To this end, the end portions of the axial projections 2048, 2049 comprise hook-shaped portions 2048a which can abut radially extending portions of the supporting ring 2030. The springs 2038, 2039 are caused to assume stressed positions 2054 corresponding to the unused condition of the friction clutch 2001 in response to additional angular movement of the parts 2025 and 2030 relative to each other through an angle 2037 (FIG. 45). Thereafter, the parts 2025, 2030 can be fixed in such positions by suitable means, not shown. For example, such means can include a form-locking connection which is effective between the parts 2025 and 2030 and can be removed after the mounting of the friction clutch 2001 on the counterpressure plate 2006 is completed, and such removal of the form-locking connection results in activation of the compensating device 2020. The angle of adjustment which can be achieved to compensate particularly for the wear upon the friction linings corresponds to the angle of rotation which is shown in FIG. 45, as at 2037. Upon completed angular movement through the angle 2037, the axial projections 2048, 2049 of the ring 2025 abut at the ends of the slits 2044, 2045 of the ring 2030, as seen in the direction of adjustment of the ring 2025. A stressed position of a coil spring 2038, 2039 corresponding to the just described position is shown in FIG. 45 and is denoted by the character 2038a.

When the friction clutch 2001 is new, the axially extending cams 2026, 2027 and 2028, 2029 which constitute the sloping ramps and the oppositely sloping ramps extend axially into each other to a maximum extent. Thus, the overlapping rings 2025, 2030 occupy a minimum of space as seen in the axial direction.

In the illustrated embodiment, the extent of actuating movement in the direction of disengagement of the friction clutch 2001 is determined by the sheet metal member 2034. In accordance with a non-illustrated modification, the abutment portions which are required for such purpose and which cooperate, for example, with the cover 2002, can also be provided on the disengaging member 2022, namely on that race of the bearing which rotates with the friction clutch or on a part which is connected therewith. The extent of axial movement of the friction clutch 2001 in at least one of the two axial directions can also be limited by at least one abutment which can be provided on the tubular guide 2023 to arrest the disengaging member 2022.

Furthermore, the disengaging member 2022 could act directly upon the actuating means 2004b and a corresponding compensating means could be provided between the disengaging member 2022 and the disengaging means 2024.

It is advisable to stress the disengaging member 2022 in a direction toward the actuating means 2004b to such an extent that the thus stressed member 2022 does not adversely affect the operation of the friction clutch 2001 and the compensating device 2020.

As can be seen in FIGS. 44 to 46, the adjusting ring 2025 is provided with radially inwardly disposed cams 2055 adapted to be engaged by a rotating or retaining means which, if necessary, can abut the housing 2002 or the supporting ring 2030 to prevent rotation. Such retaining means can be provided during the making or during assembly of the friction clutch 2001 or of the compensating device 2020 to be thereupon removed upon completion of the mounting of the friction clutch 2001 on the flywheel 2006.

Figure 50:
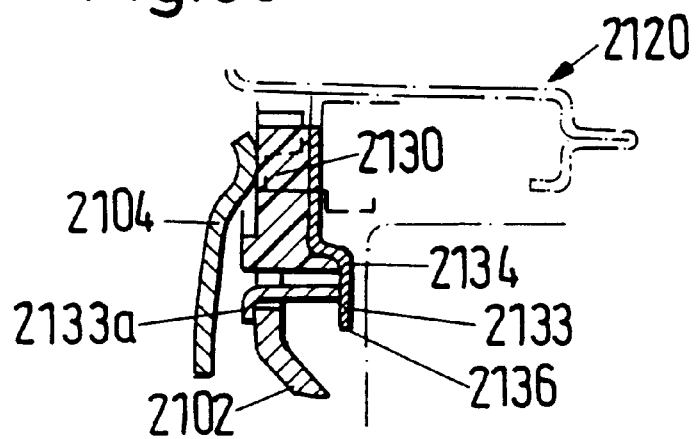
FIG. 50 shows a detail of a modification of the compensating device which is shown in FIG. 44.

The detail which is shown in FIG. 50 constitutes a modified version of the lower half of the compensating device 2020 shown in FIGS. 43 and 44. In the modification which is shown in FIG. 50, the extent of axial movement between the compensating device 2120 and the housing 2102 in the engaged condition of the friction clutch is limited by hook-shaped axially extending arms 2133 which are of one piece with the sheet metal part 2134. The arms 2133 are provided at the outer marginal portion of the sheet metal part 2134 which acts as a pusher and the arms extend axially through the cover 2102. The free ends of the arms 2133 confront the diaphragm spring 2104 and include radially outwardly extending portions 2133a overlying radially that side of the cover 2102 which faces the diaphragm spring 2104. Such construction ensures that the axial forces which the diaphragm spring 2104 applies to the compensating device 2120 can be taken up by the pusher 2134 which is made of metallic sheet material so that the compensating device 2120 can take up larger axial forces than the compensating device 2020 of FIG. 44 wherein the abutments 2033 are provided on the supporting ring 2030 which is made of a plastic material. Such axial forces can be applied to the compensating device 2020 or 2120, among others, during transport, i.e., prior to installation of the friction clutch, because the resilient prongs of the main diaphragm spring 2004 or 2104 then bear axially upon the supporting ring or plastic compensating element 2030, 2130. The pusher 2134 which is made of metallic sheet material can be provided with at least two, preferably three or more hook-shaped arms 2133 which are preferably distributed symmetrically or uniformly along the periphery of the pusher. The thickness of the metallic sheet material of the pusher 2134 can be selected in dependency on the magnitude of axial forces which are to be resisted by the pusher. The ring 2130 is made of a plastic material and is non-rotatably connected with the pusher 2134. In a manner similar to that shown in FIG. 44, the pusher or the shaped sheet metal part 2134 also comprises radially outer portions 2136 which extend between the hook-shaped arms 2133, as seen in the circumferential direction, and serve to limit the extent of disengaging movement or to prevent an excessive overtravel by abutting the housing 2102.

Figure 51:
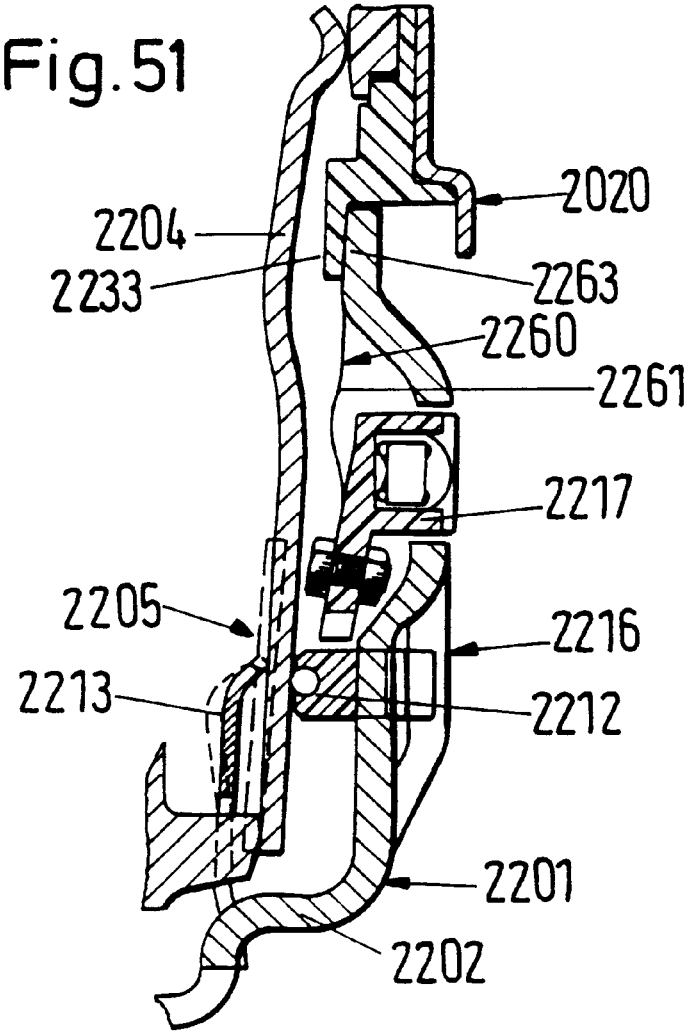
FIG. 51 is a sectional view of a further detail of the novel clutch assembly.

That part of a friction clutch 2201 which is shown in FIG. 51 is constructed substantially in the same way as the lower right-hand portion of the friction clutch 2001 of FIG. 43. FIG. 51 shows portions of the clutch housing 2202, the tilting seat assembly 2205 for the diaphragm spring 2204, the adjusting device 2216 and the compensating device 2220. As concerns the mode of operation of the adjusting device 2216 and compensating device 2220, reference should be had to the description of FIGS. 43 to 50 and/or to German patent applications Nos. P 43 06 505.8 and P 42 39 289.6 the disclosures of which are to be considered as being incorporated into the specification of the present application.

The embodiment of FIG. 51 comprises a rotation preventing device 2260 for the adjusting element which latter is shown in the form of an adjusting ring 2217.

The adjustment—or rotation preventing device 2260 ensures that, prior to installation of the friction clutch 2201, the adjusting element 2217 assumes a predetermined position relative to other parts, particularly relative to the housing 2202. The adjustment preventing device 2260 is particularly suited to ensure that, when the friction clutch 2201 is still new, the adjusting element 2217 can be maintained in its retracted position, namely at least close to the zero position, prior to any adjustment even though the diaphragm spring 2204 does not bear upon the adjusting ring 2217 in the region of the combined tilting and supporting seat 2212. This is attributed to the fact that, prior to mounting of the friction clutch 2201 or when the friction clutch 2201 is ready for shipment, the resilient prongs 2204b of the main diaphragm spring 2204 bear axially against the compensating device 2220 in a manner as can be seen by referring to FIGS. 43 and 44. Due to such abutment, the main diaphragm spring 2204 urges the force sensor 2213—here shown as a diaphragm spring—axially and away from the housing 2202 and adjusting ring 2217 whereby the adjusting ring 2216 is no longer stressed in the axial direction and toward the housing 2202. Therefore, the ring 2217 could change its position were it not for the provision of the rotation preventing device 2260. Thus, the ring 2217 would not assume the desired retracted position, in which it permits an adjustment particularly to compensate for wear upon the friction linings of the clutch disc, during mounting of the friction clutch 2201 on the output shaft of a combustion engine. The parts which are shown in FIG. 51 assume the solid-line positions when the friction clutch is mounted on a flywheel. The diaphragm spring 2204 and the sensor spring 2213 assume the broken-line positions of FIG. 51 prior to mounting of a new friction clutch. As can be seen, an axial distance or clearance is established between the adjusting element 2217 or the ring-shaped seat 2212 and the diaphragm spring 2204 prior to mounting of the friction clutch 2201.

Figure 52:
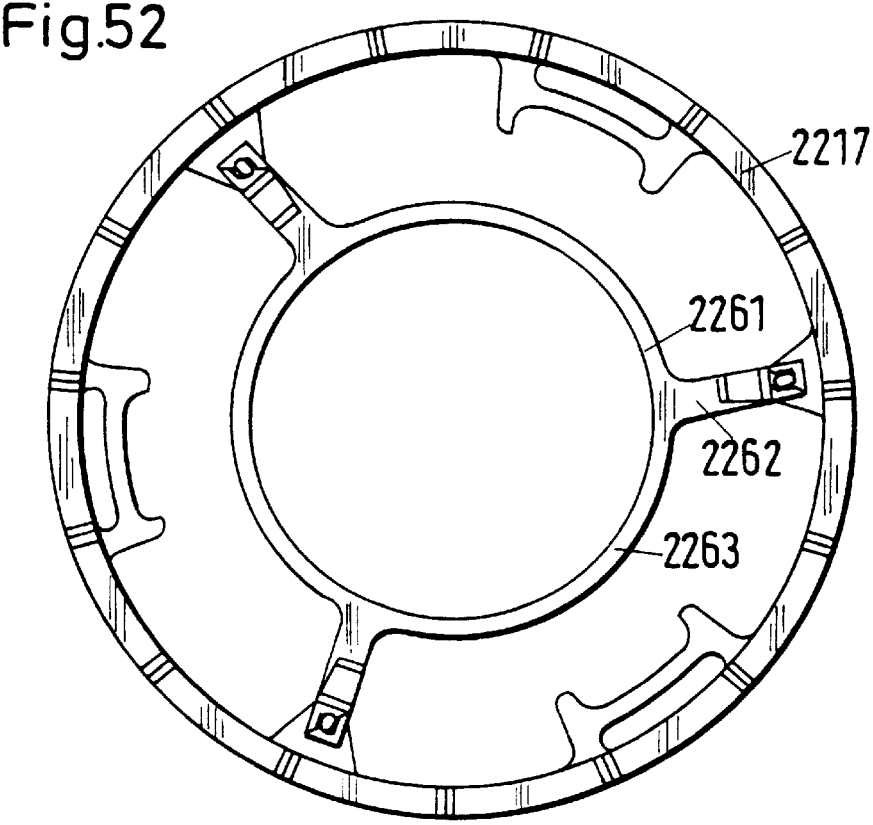

The adjustment preventing device 2260 which, in addition to other functions, serves to be active during transport of the friction clutch 2201, comprises at least one securing element 2261 which is held against rotation relative to the housing 2202 and cooperates with the housing to prevent rotation of the adjusting element 2217 at least prior to installation of the friction clutch 2201 and, if necessary, also in the engaged condition of an installed friction clutch 2201. For example, and as shown in FIG. 52, the securing element 2261 can comprise discrete arms 2262 which extend in the radial direction and the radially outer portions of which are fixedly secured to the adjusting ring 2217. The radially inner portions of the arms 2262 can be clamped between the housing 2201 and an abutment 2233 provided at that side of the housing 2202 which faces the diaphragm spring 2204. This establishes a force-locking connection between the adjusting element 2217 and the housing 2202. The arms 2262 can constitute or resemble leaf springs and their radially inner portions can be connected to each other by a ring-shaped part 2263. In the illustrated embodiment, the arms 2262 20 are connected with the adjusting element 2217 by threaded fasteners. However, it is also possible to rivet the arms 2262 to the adjusting element 2217 or the arms can even include portions which are non-rotatably secured to the adjusting element 2217 by being embedded in the plastic material of the adjusting element.

The compensating device 2220 or its abutment 2233 cooperates with the housing 2202 and with the axially clampable portions of the securing element 2261 to form a coupling or brake for the adjusting element 2217; such brake or coupling is effective in the disengaged condition of the friction clutch 2201.

The braking or clamping action of the securing element 2261 is terminated during disengagement of the clutch so that the adjusting element or adjusting ring 2217 can carry out an adjustment when necessary.

It is of advantage to construct the securing element 2261 or the strips which resemble leaf springs and constitute the element 2261 in such a way that the spring gradient or spring rate is low in the axial direction but that it is relatively rigid or stiff in the circumferential direction.

Figure 53:
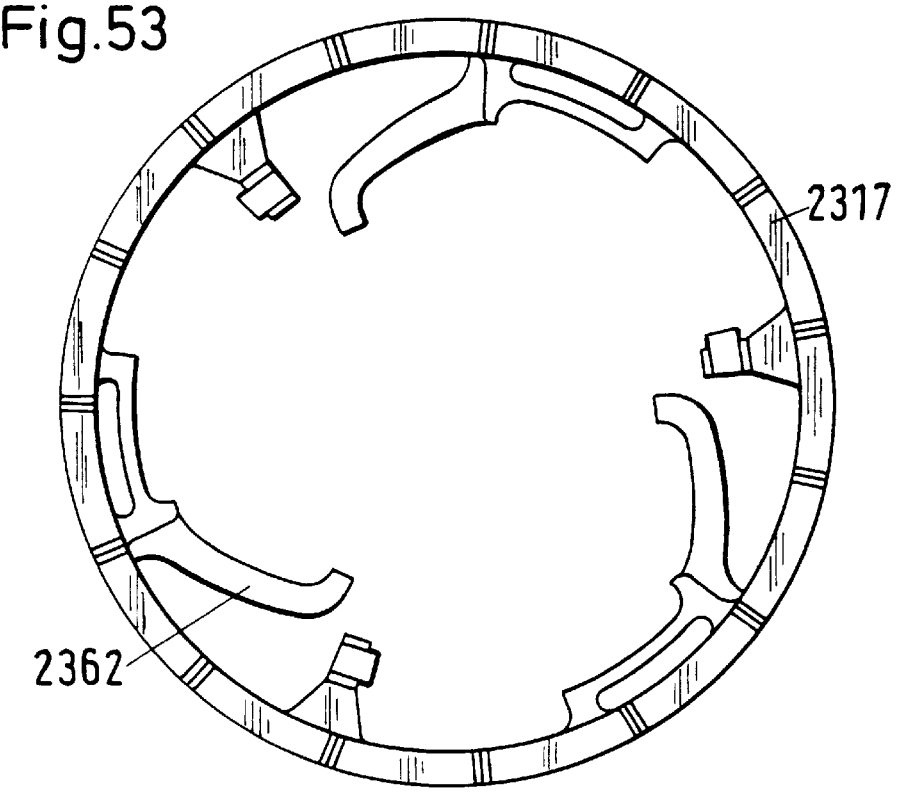
FIGS. 52 and 53 show wear compensating rings which can be utilized in the novel clutch assemblies, e.g., in that which is shown in FIG. 51.

In that embodiment of an adjusting ring 2317 which is shown in FIG. 53, the strips 2362 are resilient in the axial direction and are molded into the plastic ring 2317. In a manner similar to that shown in FIG. 52, the radially inner portions of the strips 2362 can be connected to each other by a circular ring-shaped member.

Figure 54:
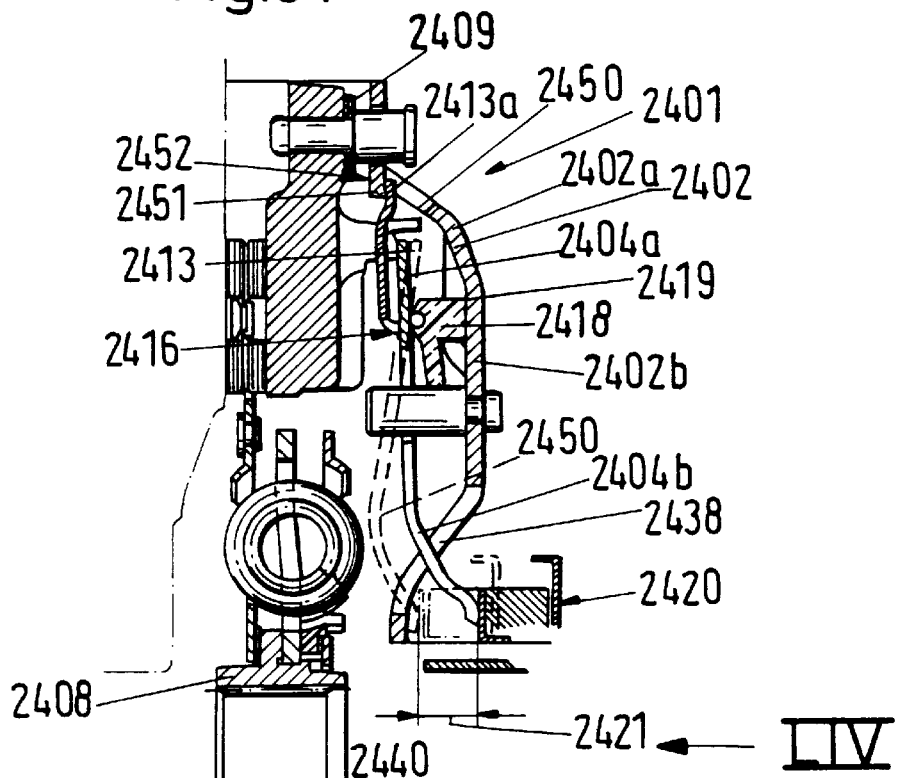
FIG. 54 is a sectional view of a further clutch assembly.
Figure 55:
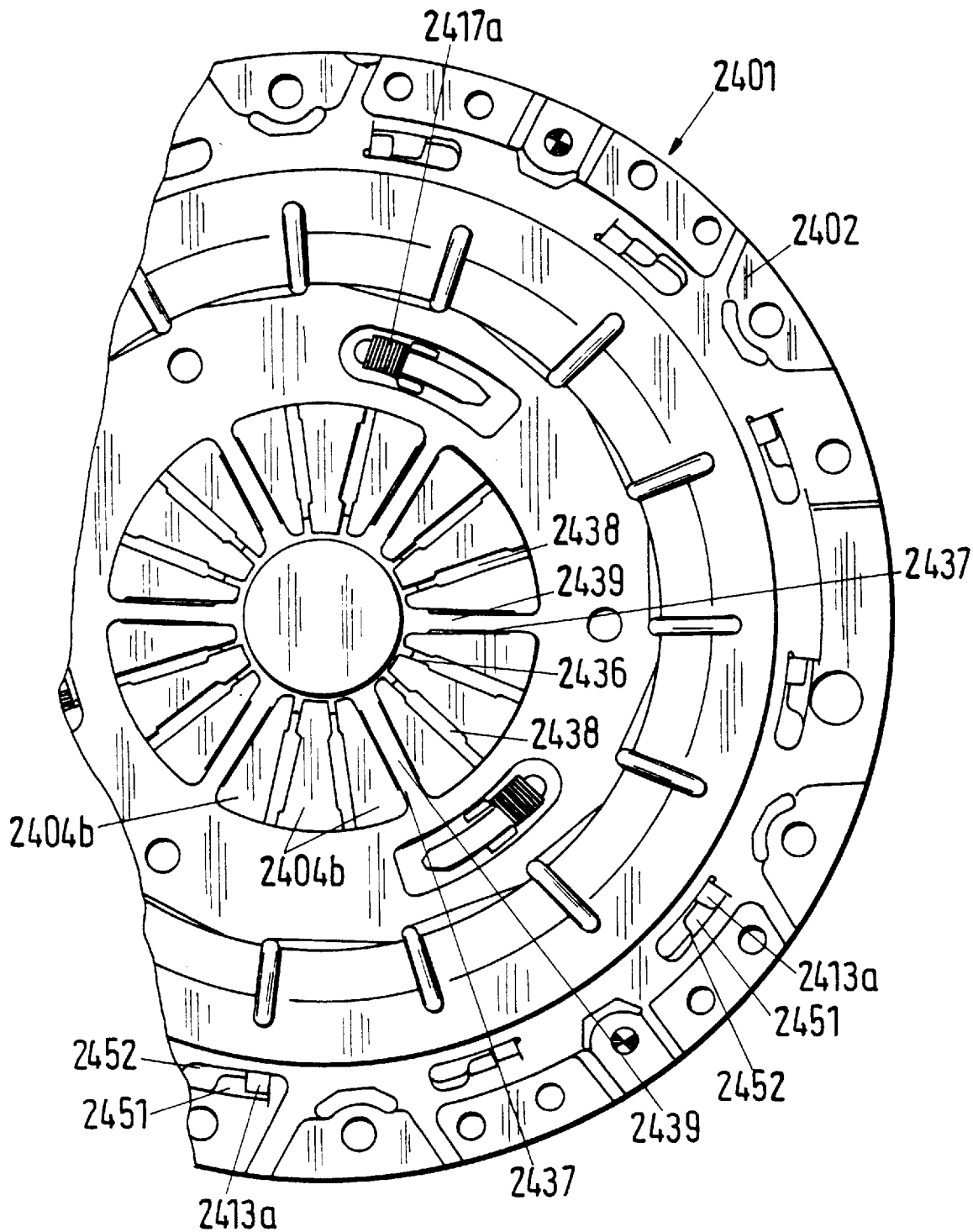
FIG. 55 is a partial view as seen in the direction of arrow LV in FIG. 54.

The clutch unit or friction clutch 2401 which is shown in FIGS. 54 and 55 comprises a housing which constitutes a sheet metal cover 2402, a pressure plate 2403 which is non-rotatably connected with but is free to carry out limited axial movements relative to the cover, and a biasing diaphragm spring 404 which is stressed between the pressure plate and the cover 2402. With reference to the housing 2402, the biasing diaphragm spring 2404 is mounted to constitute a two-armed lever which is tiltable or pivotable in a tilting seat assembly 2405. Those portions of the diaphragm spring 2404 which are located radially inwardly of the ring-shaped tilting seat assembly 2405 bear upon the pressure plate 2403 in a direction toward the friction linings 2407 of a clutch disc 2408 which can be clamped between the pressure plate and a flywheel. The transmission of torque between the pressure plate 2403 and the cover 2402 takes place by way of leaf springs 2409 which can be stressed in a direction to urge the pressure plate 2403 away from the friction linings 2407.

The diaphragm spring 2404 comprises a ring-shaped main portion 2404a as well as prongs 2404b which extend radially inwardly from the main portion.

The tilting seat assembly 2405 comprises two tilting seats 2411, 2412 and the diaphragm spring 2404 is held or clamped between the two seats against axial movement with reference thereto. The mounting and the construction of the tilting seats 2411 and 2412 are similar to and their functions are the same as those of the tilting seats 2011 and 2012 which were described with reference to FIG. 43. As concerns the parts which act upon the tilting seats 2411, 2412 and the automatic adjusting operation of the tilting seat assembly 2405, reference should be had to the description pertaining to FIG. 43.

The disengaging means of the friction clutch 2401 are constituted by the prongs 2404b of the diaphragm spring and can be actuated in the axial direction by a disengaging device 2420 which can change the conicity of the diaphragm spring 2404. The disengaging device 2420 can comprise a compensating device 2020 in a manner similar to that described with reference to FIGS. 43 to 49. However, such a disengaging device 2420 is not necessary in clutch disengaging systems with a self-adjusting disengaging bearing. In such disengaging systems, the disengaging device 2420 can be connected with that race of the disengaging bearing which rotates with the clutch 2401 at least in the course of a disengaging operation.

In order to avoid an excessive disengaging movement of the disengaging means which is constituted by the prongs 2404b of the diaphragm spring, the clutch 2401 or the housing 2402 is provided with movement limiting means 2436 for the prongs 2404b of the diaphragm spring. The movement limiting means 2436 limit the extent of tilting or the tilting angle of the diaphragm spring 2404 by propping the prongs 2404b of the diaphragm spring in the axial direction and by thus taking up axially the disengaging force acting upon the disengaging device 2420.

In the illustrated embodiment, the movement limiting means 2436 is constituted by a ring-shaped abutment portion 2436 defined by the radially inner portions of the cover 2402. The tips 2404c of the prongs abut the portion 2436 upon completion of a predetermined axial movement 2421. The ring-shaped abutment portion 2436 is designed in such a way that it is located at least close to the disengagement diameter of the prongs of the diaphragm spring, namely that diameter at which the disengaging device 2420 engages the prongs 2404b of the diaphragm spring. The abutment portion 2436 is disposed axially between the prongs 2404b of the diaphragm spring or the tips 2404c of the prongs and the clutch disc 2408.

The ring-shaped abutment portion 2436 is connected with the cover body 2402a by radially extending ribs or webs 2437. As can be seen in FIG. 55, six such webs are provided in the illustrated embodiment. However, it is possible in many instances—to provide only three such webs. It is also possible to provide a larger number of webs, for example nine, in those types of clutches which necessitate the application of particularly large disengaging forces.

The webs 2437 extend from the bottom wall 2402b of the cover or from the cover body 2402a radially inwardly and are inclined axially toward the pressure plate 2403 or the clutch disc 2408. The abutment portion 2436 is shifted axially relative to the bottom wall 2402b of the cover toward the interior of the cover. The resilient prongs 2404b extend through openings 2438 which are disposed between the ring-shaped abutment portion 2436, the cover body 2402a which is located radially outwardly, and connecting ribs 2437. To this end, the radially inner portion of the length of each prong 2404b forming part of the diaphragm spring of the illustrated embodiment is bent or oriented in the axial direction counter to the direction in which the webs 2437 extend. As can be seen in FIG. 55, the prongs 2404b of the diaphragm spring form groups of three for each opening or cutout 2438. Slots 2439 are provided between the groups of three to receive the webs 2437. The slots 2439 and the webs 2437 are positioned relative to each other in such a way that it is possible to properly tilt the diaphragm spring 2404.

Insertion of the prongs 2404b of the diaphragm spring into the openings 2438 is carried out during installation of the friction clutch 2401. To this end, the inner diameter 2440 of the diaphragm spring 2404 is larger than the outer diameter 2441 of the ring-shaped abutment portion 2436 in the unstressed condition of the diaphragm spring. Such unstressed condition of the diaphragm spring 2404 is shown in FIG. 54 by dot-dash lines. The inner diameter is the diameter of a circle defined by the tips 2404c of the prongs. This ensures that the prongs of the diaphragm spring 2404 can be pushed axially into the openings 2438 of the cover 2402, at least in the fully unstressed condition of the diaphragm spring. During assembly of the friction clutch 2401 or not later than during mounting of the friction clutch, e.g., on a flywheel, the diaphragm spring 2404 is tilted to thus reduce the inner diameter 2440 which is the diameter of a circle surrounded by the prongs 2404b of the diaphragm spring. When the friction clutch is mounted on a flywheel, the diaphragm spring 2404 assumes the operative position and the tips 2404c of the prongs define a circle having a diameter 2442 which is smaller than the outer diameter 2441 of the abutment portion 2436. The diaphragm spring 2404 is tiltably mounted on the housing 2402 and its prongs 2404 are configured in such a way that the inner diameter of the circle surrounded by the prongs is smaller than the outer diameter of the abutment portion 2436 even after the prongs have covered the tilting distance 2421.

The axially limited maximum possible actuation distance 2421 is selected in such a way that, after the linings 2407 have undergone a maximum permissible amount of wear, the clutch 2401 still provides at least the necessary full disengagement distance which is required for satisfactory operation, namely for proper disengagement of the clutch assembly 2401. The clutch 2401 or the sensor spring 2413 which ensures automatic compensation for the wear upon the friction linings in the clutch, as well as the adjusting device 2416, are designed in such a way that, when the friction clutch 2401 is new, undesirable axial adjustment of the tilting seat assembly 2405 does not take place, even upon completion of movement through the full distance 2421.

The mode of operation and the cooperation between the abutment portion 2436 and the prongs 2404b of the diaphragm spring will be explained and demonstrated with reference to the following numerical example:

The prescribed disengagement distance for the friction clutch 2401 amounts to between 8.4 and 10 mm; this takes into consideration the existing tolerances. The clutch 2401 is designed in such a way that, when the clutch is still new, undesired axial adjustment of the tilting seat assembly 2405 could take place only if the disengagement distance were increased to more than 14 mm. The abutment 2436 is designed and positioned in such a way that, when the friction clutch is still new, those portions which come into engagement with the abutment 2436, namely the tips 2404c of the prongs, can cover an axial distance 2421 of 12.5 mm. When the tips 2404c of the prongs of the diaphragm spring engage the abutment 2436 and apply the maximum disengaging force, the cover can again yield resiliently through an axial distance of approximately 0.5 mm so that it is possible to cover a maximum distance 2421 of 13 mm.

It is now assumed that the friction linings 2407 can be subjected to a maximum wear of 3 mm. This means that, during the useful life of the friction clutch 2401, the diaphragm spring is displaced by 3 mm in a direction toward the clutch disc as a result of axial shifting of its tilting seat assembly 2405. The maximum possible distance which can be covered for disengagement of the clutch is thus reduced from approximately 13 mm to approximately 10 mm, so that after elapse of the useful life of the clutch, the distance to be covered for engagement is still within the required tolerance of between 8.4 and 10 mm.

In the illustrated embodiment, the abutment 2436 is of one piece with the cover 2402. However, this abutment could also constitute a separate part which is connected to the cover 2402. The webs 2437, too, can constitute separate parts or can be of one piece with a discrete part constituting the abutment 2436.

The clutch unit 2401 which is shown in FIGS. 54 and 55 further comprises device or means which effect an increase of supporting force acting upon the diaphragm spring 2404 during operation of the clutch unit 2401 at least within those portions of the RPM range of the clutch when the clutch rotates while the friction linings undergo wear. Such increase of the supporting force prevents that, due to undesirable influences which arise at least within a certain RPM range during actuation of the clutch unit 2401, an adjustment or compensation based upon an undesirable axial yielding or retraction of the sensor means in the form of the sensor spring 2413, which cooperates with the tilting seat 2411, could take place.

Figure 54A:
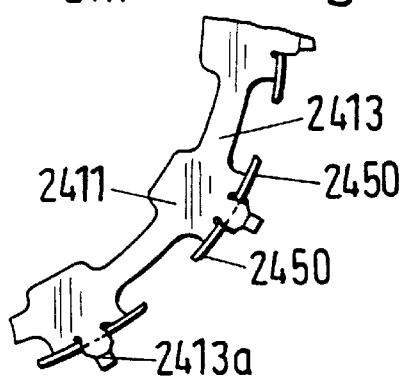
FIG. 54a a fragmentary view of the sensor spring which is utilized in FIG. 54.

FIG. 54 illustrates means 2450 which operate in dependency upon the RPM or centrifugal force to increase the axial force acting upon the tilting seat 2411. The means 2450 depend upon the centrifugal force and are constituted by tongues 2450 which are formed at the outer periphery of the diaphragm spring sensor 2413 and are bent in a direction toward the cover 2402. As can be seen in FIG. 54a, the sensor spring 2413, which resembles a diaphragm spring, comprises tongue-like arms 2413a which extend radially outwardly and bear axially upon the cover 402 in a manner as shown in FIGS. 54 and 55. A bayonet type mount or lock 2452 is provided between the arms 2413a and those portions 2451 of the cover 2402 which abut and axially prop the arms 2413a. The bayonet mount-like connection 2452 is designed in such a way that, when the sensor spring 2413 and the housing 2402 are moved axially toward each other, the arms 2413a overlie the supporting portions 2451 of the housing 2402 in response to subsequent relative angular movement of the parts 2413 and 2402 relative to each other. During assembly of the sensor spring 2413 with the cover 2402, the sensor spring 2413 is first elastically stressed in the axial direction prior to rotation of the parts 2413 and 2402, and is thereupon relieved subsequent to rotation so that the arms 2413a are biased against the cover 2402. As can be seen in FIG. 54a, a tongue 2450 is provided at each side of a radially extending arm 2413a. When the clutch unit rotates, the tongues 2450 are subjected to the action of centrifugal force which results in the generation of a force that is superimposed upon the force generated due to stressing of the sensor spring 2413, i.e., the two forces are added to each other, and this results in an increase of the supporting force for the actuating diaphragm spring 2404 in the region of the tilting seat 2411. This additional force which acts upon the tilting seat 2411 and is generated by the tongues 2450 increases in response to increasing RPM. However, such increase of the force can be limited in that, once a certain RPM is reached, the tongues 2450 undergo such deformation or tilting under the action of the centrifugal force that they bear radially outwardly against the housing 2402 so that, at such time, no additional or practically no additional increase of the additional force, namely of the force which is generated by the RPM-dependent means 2450, takes place in the region of the tilting seat 2411.

In considering the relationship of axial forces or of the equilibrium of forces between the tilting seat 2411 and the diaphragm spring 2404, it is further necessary to take into consideration the leaf springs which constitute the torque transmitting means 2409. Such leaf spring-like torque transmitting means 2409 can be installed in stressed condition between the housing 2402 and the pressure plate 2403 in such a way that the torque transmitting means is biased against the diaphragm spring 2404 with at least some force during the entire useful life of the clutch unit 2401. Thus, the axial force which is generated by the torque transmitting means 2409 opposes the force which the diaphragm spring 2404 applies to the pressure plate 2403 and is added to the axial force which the sensor spring 2413 applies to the diaphragm spring 2404 so that the sum of the two forces opposes axially the disengaging force which is being applied to the tips 2404c of the prongs. Thus, the actual sensor force, which opposes axial movement of the diaphragm spring 2404 when the clutch unit 2401 does not rotate is furnished by the resultant of the forces generated by the torque transmitting means 2409 and the sensor spring 2413 and of the force acting upon the diaphragm spring 2404. When the clutch unit 2401 rotates, the resulting force is superimposed upon an additional force which is dependent upon the RPM or upon the centrifugal force and is generated by the tongues 2450.

If a clutch disc 2408 is provided with a device, e.g., in the form of friction lining springs 2453, which ensures a gradual increase or gradual decrease of the transmitted torque during actuation of the friction clutch 2401 and during a portion of the disengagement movement of the pressure plate 2403, such device 2453 assists the axial propping of the diaphragm spring 2404 against the adjusting element in the form of an adjusting ring 2417 until the pressure plate 2403 releases the friction linings and hence the clutch disc 2408. This ensures that the adjusting ring 2417 remains in axially stressed condition between the diaphragm spring 2404 and the housing or cover 2402 at least close to the instant of unclamping of the friction linings 2407 so that no adjustment can take place. When, during disengagement of the clutch unit 2401, the pressure plate 2403 no longer engages the friction linings 2407, and if the clutch unit does not comprise the leaf spring1 like torque transmitting means 2450, the axial stressing force acting upon the main diaphragm spring 2404 is furnished only by the resultant of the forces applied by the leaf spring-like torque transmitting means 2409 and by the sensor diaphragm spring 2413. Such resultant sensor force opposes the disengaging force which is being applied to the tips 2404c of the prongs. Within certain RPM ranges, especially at high engine RPM, vibrations which cause axial oscillation of the pressure plate 2403 are likely to develop, for example, by the engine. If the pressure plate 2403 oscillates in the axial direction, this pressure plate 2403 is likely to become disengaged from the main or diaphragm spring 2404 so that the resultant sensor force decreases for a short interval of time because the axial force which is generated by the leaf spring-like torque transmitting means 2409 no longer acts upon the diaphragm spring 2404. Consequently, the relationship of forces between the diaphragm spring 2404 or the disengaging force acting upon the spring 2404 and the resulting supporting or propping force acting upon the spring 2404 is disturbed, namely the supporting or propping force acting upon the diaphragm spring 2404 during such stages of operation of the clutch unit 2401 is too small so that the clutch is adjusted prematurely or not at a time when an adjustment is desired, whereby the operating point of the diaphragm spring 2404 is shifted in a direction toward the diaphragm spring minimum. Furthermore, particularly high circumferential accelerations of the crankshaft can develop during certain stages of operation of the engine, especially at a higher engine RPM, and such accelerations entail—due to inertia of the adjusting ring 2417—the development of circumferentially acting forces which, due the presence of adjusting ramps 2418, 2419 which operate between the adjusting ring 2417 and the housing 2402, are likely to apply to the diaphragm spring 2404 an axial force component acting counter to the direction of application of the resultant sensor force, and this can also result in undesired or unintended adjustment for wear. Moreover, the development of vibrations can result in a reduction of frictional engagement between the sloping ramps 2418, 2419 and in an increase of the axial force generated by the adjusting spring 2417a—i.e., by the spring which acts in the circumferential direction upon the adjusting member 2417—and acting upon the diaphragm spring 2404; this also promotes undesired adjustments.

In order to eliminate the aforediscussed drawbacks of a clutch unit 2401 without resorting to the centrifugal force dependent supporting means 2450, the embodiment which is shown in FIGS. 54 and 55 is provided with tongues 2450 which are acted upon by centrifugal force. Such centrifugal force dependent means 2450 compensate for undesirable influences which are a function of RPM in that the means 2450 generate a supporting force which acts in parallel with the force generated by the sensor spring 2411 and increases in dependency upon the RPM and/or in dependency upon centrifugal force.

The centrifugal force-dependent means can be designed in such a way that the adjustment in the clutch unit 2401 which is necessary to compensate for wear can take place only when the clutch unit is idle or its RPM is low. Thus, when the clutch unit 2401 rotates and/or when its RPM is above a value at which critical vibrations are likely to develop, the operation of the adjusting device 2416 can be blocked for all practical purposes.

Figure 56:
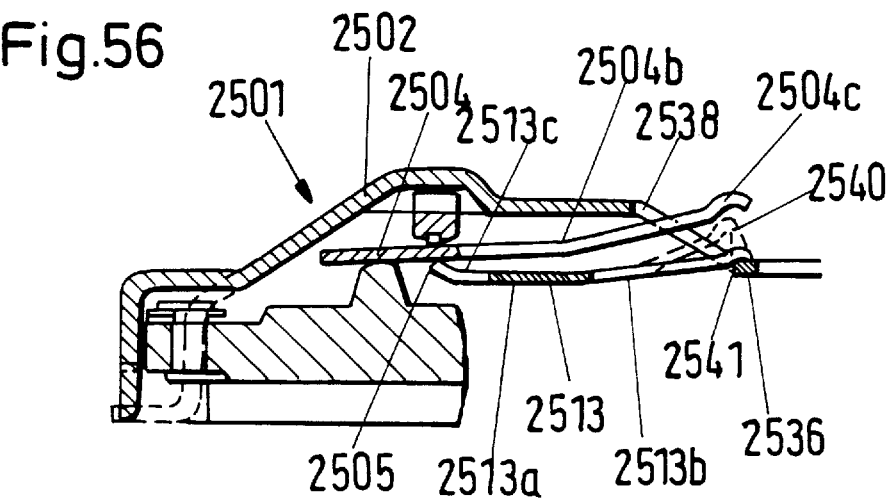
FIG. 56 shows a further possibility of constructing the novel friction clutch.

In the embodiment of a friction clutch 2501 which is shown in FIG. 56, the sensor spring 2513 is disposed radially inwardly of the tilting seat assembly 2505 for the diaphragm spring. The sensor spring 2513 comprises a ring-shaped main portion 2513a and tongues 2513b which extend radially inwardly from the main portion. These tongues 2513b of the sensor spring 2513 bear upon the ring20 shaped abutment portion 2536 which is mounted and designed in a manner similar to that of the ring-shaped abutment portion 2436 shown in FIGS. 54 and 55. The tips of tongues 2513b of the sensor abut that side of the abutment portion 2536 which faces the tips 2504c of the prongs of the diaphragm spring. The main portion 2513a further comprises tongues 2513c which extend radially outwardly therefrom and abut and hence provide axial support for the diaphragm spring 2504.

The mounting of the sensor spring 2513 on the cover 2502 can be carried out in such a way that the spring is deformed in the stressing direction to assume a conical shape and its deformation suffices to ensure that the inner diameter which is surrounded by the inner tongues 2513b is larger than the outer diameter 2541 of the abutment portion 2536. In this manner, the supports 2513b can be inserted into the openings 2538 of the cover 2502 in a manner similar to that already described in connection with the prongs 2404b and openings 2438 of the clutch shown in FIGS. 54 and 55. When the insertion of the tongues 2513b into the openings 2538 is completed, the stressing of the sensor spring 2513 can be terminated so that the inner portions of the tongues 2513b are shifted to define a circle having a smaller diameter and to contact the abutment portion 2536.

A further possibility of mounting the sensor spring 2513 on the cover 2502 is that one bends portions of the inner tongues 2513b axially in a direction toward the cover 2502 so that they surround a circle having a diameter 2540 which is larger than the outer diameter of the abutment portions 2536. Once the sensor spring, and more particularly its tongues 2513b, are introduced into the openings 2538 of the cover, then tongues 2513b can be bent back in such a way that their radially inner portions bear upon the abutment portion 2536. Such bending of the tongues 2513b back from the position which is shown in FIG. 56 by broken lines to the position which is shown by solid lines entails pivoting with attendant plastic deformation of the material of the diaphragm spring. In order to effect plastic deformation of the sensor tongues 2513b, such tongues can bear axially against the prongs 2504b and more specifically against the tips 2504c of the prongs forming part of the diaphragm spring 2504. The tongues 2513b can be bent by a tool which supports the prongs 2504b of the actuating diaphragm spring 2504 from above and acts upon the undersides of the sensor spring tongues 2513b, namely in the region of the diameter of the circle defined by the tongues 2513b.

The abutments 2436 and 2536 which limit the extent of disengagement movement or the magnitude of the tilting angle of the diaphragm springs 2404 and 2504, respectively, exhibit the advantage that they are integrated into the corresponding clutches 2401 and 2501 as well as that the abutments act in the regions of the prongs 2404b and 2504b which can ensure that, when the prongs 2404b and 2504b of the diaphragm spring s actually bear upon the respective abutments 2436 and 2536, the prongs of the diaphragm springs are not deformed, or are only negligibly deformed, in the axial direction. This can further ensure that the prongs 2404b, 2504b do not actually contact a part of the clutch disc 2408 or 2508 when the prongs assume positions corresponding to the disengaged conditions of the respective clutches 2401 and 2501. That position which the diaphragm spring 2404 assumes in the disengaged condition of the clutch is shown in FIG. 54 by broken lines and is identified by the reference character 2450. Thus, one can avoid abutment or sliding movement between the clutch disc 2408 and the prongs 2404b of the diaphragm spring when the clutch is disengaged, i.e., when the clutch and the clutch disc 2508 rotate relative to each other.

In those embodiments which are shown in FIGS. 54 to 56, the abutments 2436, 2536 are disposed in the regions of the tips 2404c, 2504c of the prongs of the respective diaphragm springs. However, such abutments can also be designed in other ways and can be disposed radially outwardly of the tips of the inner tongues 2404c, 2504c. It is advisable in the aforementioned modified constructions to select the radial lever arms between the tips 2404c, 2504c of the prongs and abutments which are disposed radially outwardly thereof in such a way that no excessive flexing of the prongs 2404b, 2504b of the respective diaphragm springs can take place under the action of the disengaging force acting thereon and due to the fact that they are being supported by the abutments.

The aforementioned excessive or unduly long disengaging movement can be caused by a disengaging system or actuating system which acts upon the clutch actuating means. The actuating means of the illustrated and described embodiments are the prongs of the diaphragm springs. Such actuating systems normally further comprise a bearing which acts upon the actuating means of the friction clutch, an actuating member, such as for example a clutch pedal, and a power train between the disengaging bearing and the actuating member. Such power train can comprise a master cylinder as well as a slave cylinder. In disengaging systems which employ a master cylinder and a slave cylinder, an unacceptably long disengaging movement which exceeds the satisfactory disengaging movement can be caused in that, due to rapidly following engagements and disengagements of the friction clutch, the slave cylinder cannot reset in time, i.e., it does not reach the end position so that, during the immediately following renewed disengagement, the slave cylinder covers a distance which corresponds to the normal disengagement distance but the combined disengagement distance for the clutch corresponds to the sum of the normal disengagement distance and the remaining resetting movement which did not take place. This can result in such total actuating movement for the friction clutch which considerably exceeds the contemplated maximum permissible disengaging distance of the clutch. In other words, the extent of actual movement is likely to exceed the spare or additional travel for actuation which is normally provided for in a clutch.

Due to the novel undertakings, such as the provision of the abutments 2036, 2436, 2536, it is now possible to prevent excessive disengaging movements or overtravel during actuation of friction clutches in spite of the fact that one can ensure those normal disengaging movements which are needed during the useful life of the clutch.

Thus, in accordance with the invention, it is now possible to provide in clutches in general, and especially in clutches which are provided with an adjusting device capable of compensating at least for the wear upon the friction linings of the clutch disc, in the clutch actuating train an abutment or stop which prevents overtravel of the clutch actuating means during actuation of the clutch. For example, such an abutment can limit the disengaging movement of the disengaging bearing or the extent of tilting of the diaphragm spring. However, such an abutment can also be installed at another location. Furthermore the actuating movement of the friction clutch can be limited to a predetermined constant value by providing a suitable exact barrier, such as an abutment, against excessive movement in the direction of disengagement as well as in the direction of engagement.

It is of advantage if such a limitation of the extent of movement takes place in the region of the disengaging bearing because, at such location, the chain of tolerances between the actuating means, such as the prongs of the diaphragm spring in the friction clutch, and the component parts whose movement is to be limited to a predetermined distance is small.

In view of the provision of such a barrier, i.e., of the aforediscussed abutment, the disengaging movement takes place in a direction toward a practically rigid barrier which might be undesirable under certain circumstances because it could entail overstressing of component parts, especially of those in the disengaging system. Moreover, this might be undesirable to the person operating, for example, a foot actuated system. Therefore, a further development of the invention provides in the actuating train of the friction clutch resiliently or elastically yieldable means and/or means for limiting the pressure in the disengaging system, and such means is maintained under an initial stress or necessitates the application of a minimal deforming force or opening force which at least slightly exceeds the maximum required force or the required maximum pressure for actuation of the clutch. This ensures that the clutch pedal can be further depressed or that the actuating motor can complete its movement toward a predetermined position after the abutment becomes effective. The yieldable means in the actuating train of the friction clutch can be installed between the clutch actuating means and the disengaging bearing or between such bearing and the disengagement effecting actuating means.

Figure 57:
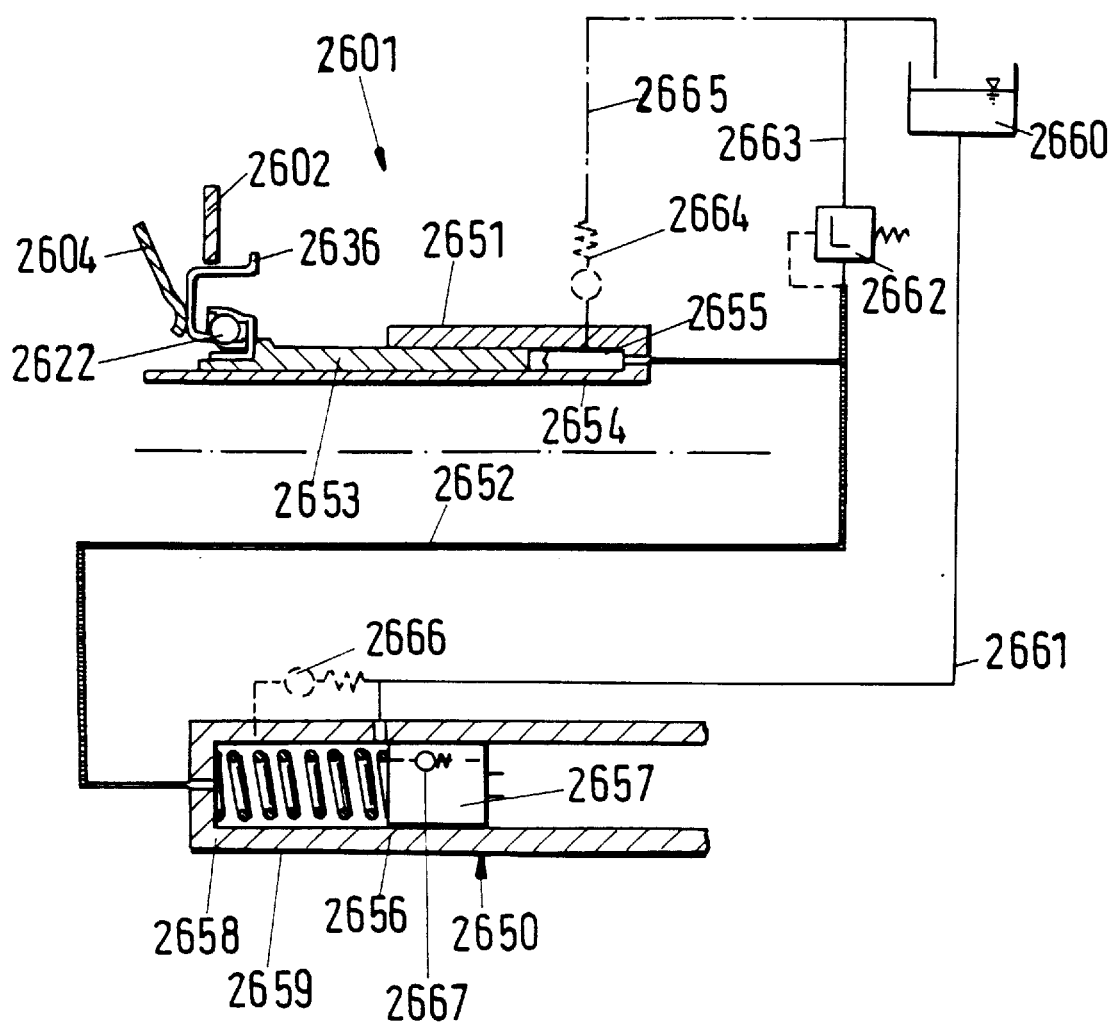
FIG. 57 is a view of a schematically illustrated disengagement system for a clutch assembly according to the invention.

FIG. 57 illustrates a disengagement system 2601 and several possible embodiments of means for limiting the maximum force which can be applied by the disengaging bearing 2622 to the clutch actuating means 2604 and/or to the clutch housing 2602. The structure which is shown in FIG. 57 comprises an axial stop 2636 which engages the housing 2602 when the disengaging bearing 2622 completes a movement through a predetermined distance in a manner similar to that described in connection with the abutment 2036 shown in FIGS. 43 and 44. However, it is also possible to limit the disengagement movement in another way, e.g., as described with reference to FIGS. 54 to 56. The disengaging system 2601 comprises a master cylinder 2650 and a slave cylinder 2651. The two cylinders are connected to each other by a conduit 2652. The piston 2653 of the slave cylinder 2651 carries the disengaging bearing 2622 and is axially movably received in a housing 2654. The plenum chamber 2655 receives a hydraulic medium, such as for example oil, through the conduit 2652. The cylinder unit 2650 comprises a housing 2656 which cooperates with a piston 2657 therein to define a variable-volume plenum chamber 2658. The plenum chamber 2658 is connected with the plenum chamber 2655 by the conduit 2652. The plenum chamber 2658 accommodates a restoring or resetting spring 2659 for the piston 2657. The piston 2657 can be moved axially by way of a clutch pedal or an actuating motor, such as an electric motor or a pump. The circuit for the pressurized fluid in the disengaging system 2601 is connected with a reservoir 2660 for pressurized fluid. The master cylinder 2650 is preferably directly connected with the reservoir 2660 for pressurized fluid by a conduit 2661.

In order to limit the clutch actuating force which is being applied to the disengaging means 2604 and/or to the housing 2602, the embodiment of FIG. 57 provides in the circuit for the pressurized fluid in the disengaging system 2601 at least one means which limits to a predetermined value the pressure developing in the circuit for the pressurized fluid in response to actuation of the friction clutch. In the embodiment of FIG. 57, such means is constituted by at least one pressure limiting valve. FIG. 57 illustrates several possible locations for such a pressure limiting valve. One such pressure limiting valve 2662 can be installed, for example, in the system of conduits 2652 and then comprises a return conduit 2663 leading back to the reservoir 2660 for pressurized fluid. However, in lieu of the pressure limiting valve 2662, it is also possible to provide a pressure limiting valve 2664 which is carried by the housing 2654 or is actually integrated into the housing, which communicates with the plenum chamber 2655 and which is connected with the reservoir 2660 for pressurized fluid by a return flow conduit 2665.

FIG. 57 shows a further alternative possibility of employing a pressure limiting valve 2666. The pressure limiting valve is in communication with the plenum chamber 2658 of the master cylinder and can be carried by or integrated into the housing 2656. The pressure limiting valve 2666 is further provided with a return conduit discharging into the container 2660 for pressurized fluid. To this end, the pressure limiting valve can be provided with its own return conduit or with a connection to the conduit 2661.

A further possibility of utilizing a pressure relief valve 2667 consists in that the valve is integrated into the piston 2657 of the master cylinder 2650. The relief side of this valve 2667 must include a connection with the reservoir 2660 for pressurized fluid or at least with an intermediate reservoir.

In lieu of a pressure relief valve, the circuit for pressurized fluid can comprise a hydromagazine which limits the maximum pressure developing in the disengaging system by relieving the system and by thus acting not unlike a buffer or energy storing means upon activation of abutments which limit the extent of disengaging movement.

Figure 58:
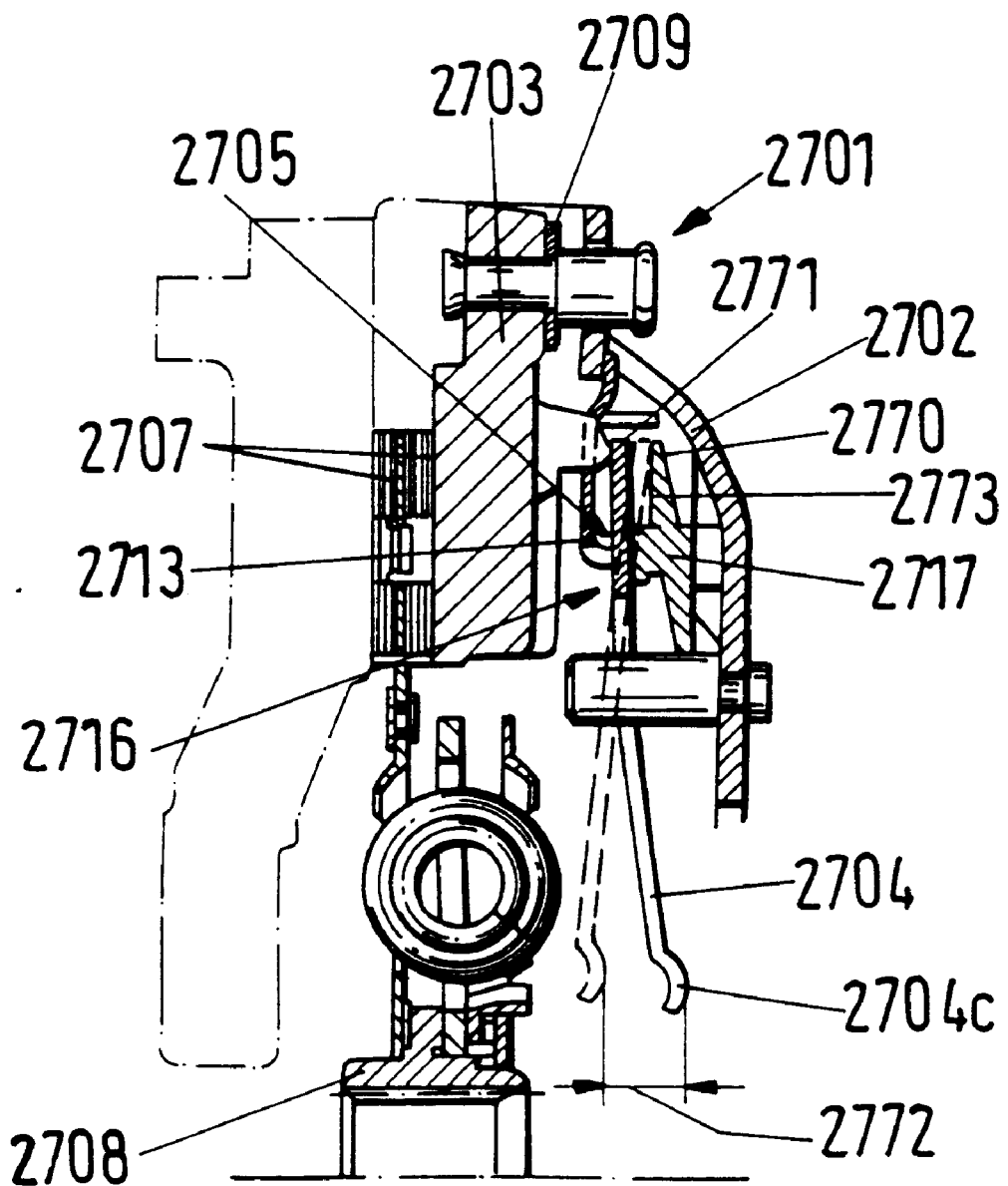
FIG. 58 shows a further novel design of a friction clutch which comprises a brake for the adjusting ring.

The clutch unit 2701 which is shown in FIG. 58 employs, in a manner similar to those described in connection with the preceding Figures, an adjusting device 2716 which automatically compensates for wear developing upon the friction linings 2707 of the clutch disc 2708. In the illustrated embodiment, the basic design and the mode of operation of the adjusting device 2716 correspond to those described with reference to FIGS. 54 and 55. The adjusting element or adjusting ring 2717 comprises abutment or stop portions 2770 which can cooperate with the diaphragm spring 2704 during disengagement of the clutch unit 2701. The relative axial arrangement of the abutment portions 2770 with respect to those portions 2771 of the diaphragm spring 2704 which cooperate therewith is selected in such a way that, in the course of a disengaging operation, the portions 2771 of the diaphragm spring are axially supported, at least indirectly but preferably directly, by the abutment portions 2770 which are carried by the adjusting ring 2717. The mutual propping or supporting preferably takes place at least close to that instant when the extent of the disengaging movement reaches or slightly exceeds the desired movement or, otherwise stated, when the change of conicity of the diaphragm spring 2704 in the region of the tips 2704c of its prongs reaches or slightly exceeds the desired change. The movement beyond the desired movement can take place because of a defect in or an improper adjustment of the disengaging system. Due to the fact that the diaphragm spring 2704 is axially supported by the abutment portions 2770, the adjusting ring 2717 is secured against unintended rotation. Thus, for all practical purposes, the diaphragm spring 2704 acts not unlike a brake for the adjusting ring 2717 and becomes effective when the extent of disengaging movement exceeds the predetermined value 2772.

The abutment—or stop portions 2770 of the illustrated embodiment are constituted by a ring-shaped projection 2773 which is provided on the ring 2717 radially outwardly of the tilting seat assembly 2705. In lieu of a ring-shaped radial projection, it is also possible to provide several radial arms 2773 which are distributed in the circumferential direction. The projection or the arms 2773 which are used in the illustrated embodiment extend to the radially outer edge of the diaphragm spring 2774. As soon as the movement through the predetermined distance 2772 is completed, the radially outer portion 2771 of the diaphragm spring 2704 abuts the abutment portions 2770 of the adjusting ring 2717. When the predetermined distance 2772 is exceeded, the tilting diameter of the diaphragm spring 2704 is increased because such diameter is moved from the diameter of the tilting seat assembly 2705 to the contact diameter between the portions 2771 of the diaphragm spring 2704 and the abutment portions 2770. Owing to such movement of the tilting diameter of the spring 2704, the disengaging force which is required in the region of the prongs 2704c because the lever action of the diaphragm spring is changed from i to i+1, namely because before the disengagement distance 2772 is covered the diaphragm spring acts not unlike a two-armed lever but is pivoted not unlike a one-armed lever when the distance 2772 is exceeded. Due to such reduction of the disengaging force, one further ensures that the diaphragm spring 2704 is urged in a direction toward the housing 2702 and the adjusting ring 2717 by, among others, the resulting axial supporting force generated by the sensor spring 2713 and the leaf springs 2709. Thus, the entire diaphragm spring 2704 can no longer be shifted axially in a direction away from the adjusting ring 2717 and cover 2702. When the predetermined distance 2772 is exceeded, the sensor spring 2713 is resiliently stressed in the axial direction because the diaphragm spring 2704 is then lifted off the adjusting ring 2717 in the region of the tiltable bearing assembly 2705.

It is advantageous to provide the projection or the arms 2773 on the adjusting ring 2770, which is made of a plastic material, by resorting to an injection molding operation. The maximal force which is applied to the arms 2773 in the axial direction equals the difference between the minimum disengaging force in the region of the prongs 2704c of the diaphragm spring and the axial sensor or supporting force which is being applied by the sensor spring 2713 and the leaf spring elements 2709. The arms 2773 are designed in such a way that they can withstand such maximum force without pronounced deformation.

A further important advantage resides in that the axial stroke of the pressure plate 2703 remains practically constant and, therefore, the axial force which the leaf springs 2709 apply to the main diaphragm spring 2704 does not undergo further reduction when the extent of movement exceeds the distance 2772. Since the force which is being applied by the leaf springs 2709 constitutes a portion of the resultant force, the remaining residual bias of such leaf springs further reduces the likelihood that the distance 2722 would be exceeded in the friction clutch 2701. Consequently, when the improved friction clutch is utilized, for example, in passenger cars, the excess movement or overtravel in the region of the tips 2704c of the prongs can be in the range of between 0.5 and 2 mm without adversely influencing the operation of the adjusting device 2716.

The extent of lifting of the pressure plate 2703 can also be limited in that, when the extent of disengaging movement exceeds a predetermined distance, the pressure plate 2703 abuts axially the sensor spring 2713. To this end, suitable projections, such as for example cam lobes, protuberances or the like, can be provided on the sensor spring 2713 and/or on the pressure plate 2703.

Figure 59:
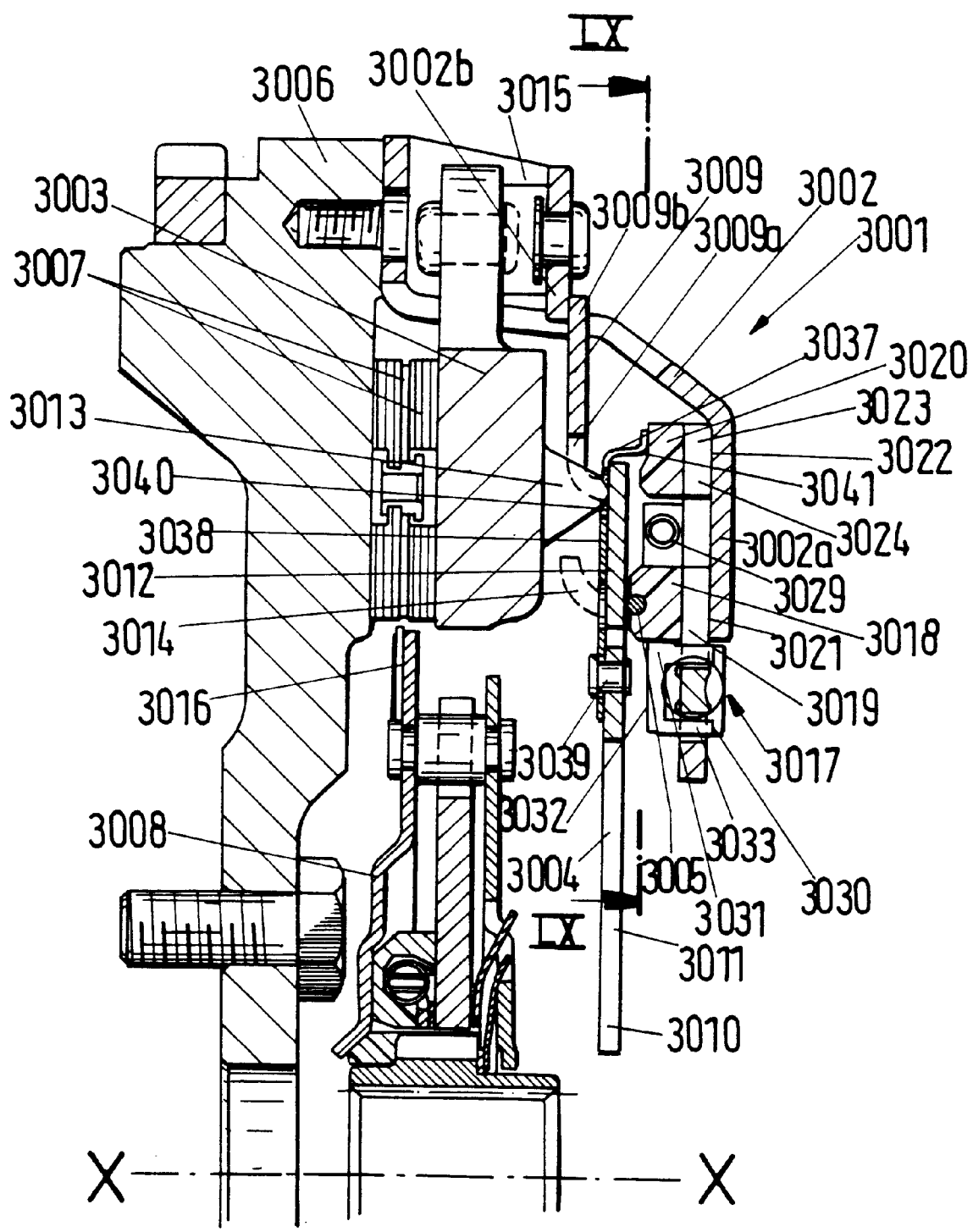
FIG. 59 is a fragmentary axial sectional view of a push-type friction clutch which is equipped with a wear compensating unit embodying one presently preferred form of the instant invention.
Figure 60:
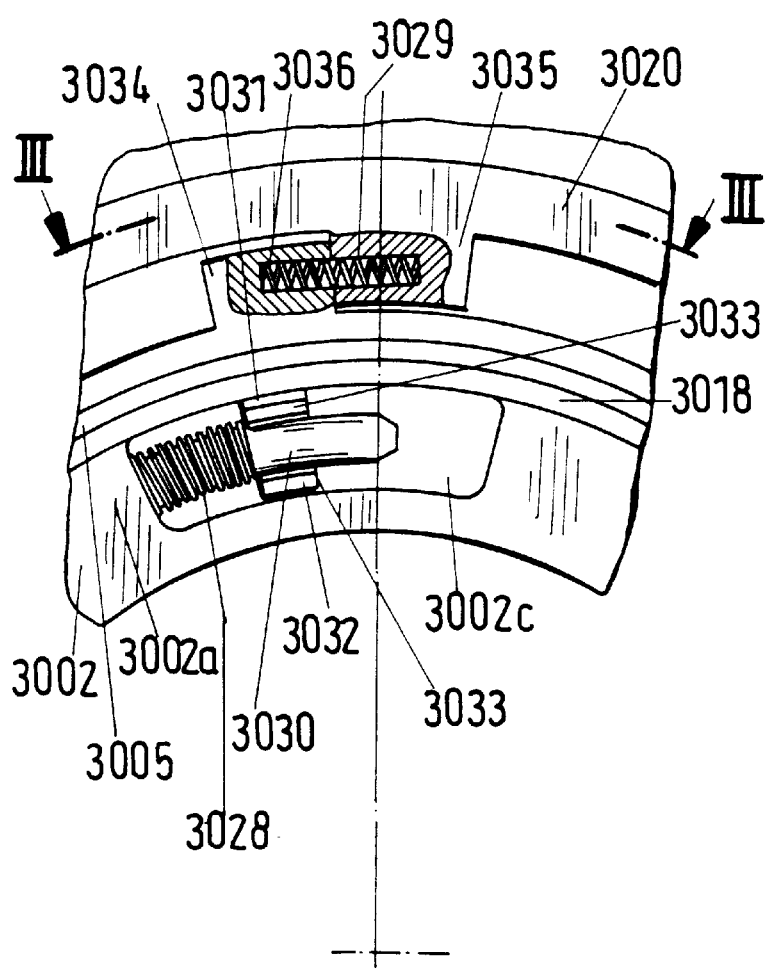
FIG. 60 is an enlarged fragmentary sectional view substantially as seen in the direction of arrows from the line LX—LX in FIG. 59.
Figure 61:
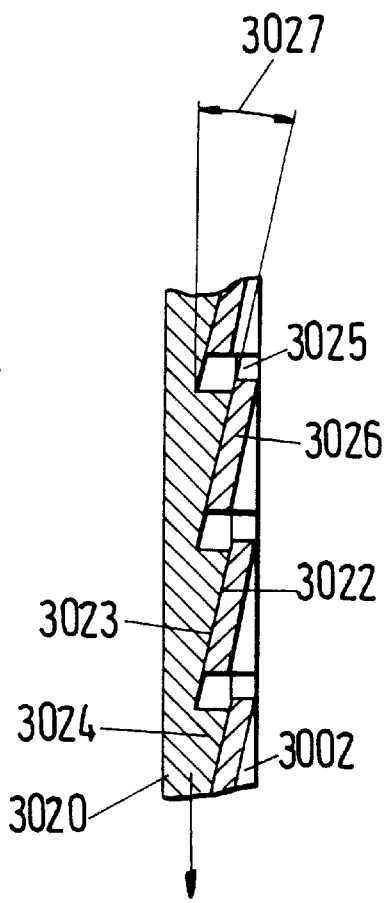
FIG. 61 is a fragmentary sectional view substantially as seen in the direction of arrows from the line LXI—LXI in FIG. 60.

Referring to FIGS. 59 to 61, there is shown a friction clutch 3001 which can be utilized in the power train of a motor vehicle to transmit torque from the output element (e.g., a crankshaft) of a combustion engine to the input element (e.g., a shaft) of a variable-speed transmission serving to transmit torque to the front and/or rear wheels of the vehicle. The illustrated friction clutch 3001 comprises a housing or cover 3002 and a pressure plate 3003 which is non-rotatably but axially movably coupled to the housing 3002 by a set of resilient elements in the form of leaf springs 3015. The extent of axial movability of the pressure plate 3003 relative to the housing 3002 is limited by the position of a counterpressure plate 3006 (e.g., a flywheel which is affixed to the output element of the engine by screws [one shown] or by other suitable fasteners), by the position of a diaphragm spring or clutch spring 3004 at the inner side of the bottom end wall 3002a of the housing 3002, and by the extent (see 3043 in FIG. 65) of the wear upon the circumferentially complete washer-like radially outer portion 3012 of the diaphragm spring 3004 as well as by the wear upon the pressure plate 3003, the counterpressure plate 3006 and friction linings 3007 of a clutch disc or clutch plate 3008 between the plates 3003 and 3006. The common axis of the plates 3003, 3006, of the diaphragm spring 3004 and of the clutch disc 3008 is shown at X—X. The purpose of the central portion or hub of the clutch disc 3008 is to transmit torque to the aforementioned input element of the transmission when the friction clutch 3001 is engaged, namely when the diaphragm spring 3004 is free to bias the left-hand side (friction surface) of the pressure plate 3003 against the adjacent set of friction linings 3007 and to thereby urge the other set of friction linings 3007 against the adjacent side (friction surface) of the counterpressure plate 3006 while the latter is driven by the engine.

The housing 3002 can be made of a metallic sheet material and is non-rotatably affixed to the counterpressure plate 3006 so that the distance between the end wall 3002a and the confronting friction surface of the plate 3006 remains unchanged. The right-hand side or surface of the pressure plate 3003 (as viewed in FIG. 59) is provided with an annulus of projections 3013 which are engaged and biased by the radially outer portion 3012 of the diaphragm spring 3004 when the friction clutch 3001 is engaged. The radially inner part of the diaphragm spring portion 3012 (i.e., the part which is located radially inwardly of the projections 3013 on the pressure plate 3003) is engaged by a circular wire-like seat 3005 which is partly recessed into a bearing here shown as a ring 3018, the purpose of which will be explained hereinafter. It is within the purview of the invention to make the seat 3005 of one piece with the ring 3018.

The radially inner portion of the diaphragm spring 3004 includes a set of substantially radially extending prongs or tongues 3011 having free end portions or tips 10 disposed relatively close to the axis X—X and being engageable by a suitable bearing (not shown) or the like to disengage the friction clutch 3001 by tilting the illustrated portion of the diaphragm spring 3004 relative to the seat 3005. At such time, the diaphragm spring 3004 acts not unlike a two-armed lever the outer arm of which is pivoted in a direction to the right (as viewed in FIG. 59), i.e., away from the counterpressure plate 3006, to permit a movement of the pressure plate 3003 axially and away from the counterpressure plate, e.g., under the bias of the leaf springs 3015 and/or under the bias of other resilient means, such as a prestressed energy storing device 3009. The pressure of the plate 3003 upon the adjacent friction linings 3007 is then relaxed or terminated so that the plates 3003, 3006 and the housing 3002 as well as the diaphragm spring 3004 can turn relative to the clutch disc 3008 and its friction linings 3007 and/or vice versa.

In order to reengage the friction clutch 3001, the diaphragm spring 3004 is caused or permitted to reassume the position of FIG. 59 in which its radially outer portion 3012 bears against the projections 3013 so that the plates 3003, 3006 are compelled to clamp the friction linings 3007 between them, i.e., the clutch disc 3008 is compelled to rotate with the counterpressure plate 3006.

The illustrated prestressed energy storing device 3009 is a diaphragm spring which acts not unlike a sensor (hereinafter called sensor for short) and bears against the left-hand side of the diaphragm spring 3004, namely against that side which confronts the pressure plate 3003 and faces away from the seat 3005 and the end wall 3002a of the housing. The sensor 3009 is stressed in the direction of the axis X—X by being clamped between the radially outer portion of the housing 3002 and the portion 3012 of the diaphragm spring 3004. The magnitude of the force which the sensor 3009 applies to the diaphragm spring 3004 is preferably selected in such a way that it exceeds the maximum clutch disengaging force, i.e., the maximum force which is necessary to tilt the diaphragm spring 3004 relative to the seat 3005 (by exerting a force against the tips 3010 of the prongs 3011 constituting the radially inner portion of the spring 3004) in order to permit rotation of the plates 3003, 3006 relative to the clutch disc 3008 and/or vice versa. The prongs 3011 are separated from each other by substantially radially extending slots (see FIG. 71) and their radially outermost parts merge into the washer-like portion 3012 of the diaphragm spring 3004.

In the friction clutch 3001 of FIGS. 59 to 61, the sensor 3009 bears against the adjacent side or surface of the circumferentially complete portion 3012 of the diaphragm spring 3004 at least substantially at the level of engagement between the spring 3004 and the projections 3013 of the pressure plate 3003. In other words, the radial distance of the projections 3013 from the axis X—X is at least substantially the same as that between the axis X—X and the location of engagement between the diaphragm spring 3004 and the sensor 3009. Thus, the sensor 3009 (which, as already stated above, constitutes or can constitute a diaphragm spring) applies to the washer-like portion 3012 of the diaphragm spring 3004 torque in a direction counter to that applied by the portion 3012 to the projections 3013 of the pressure plate 3003 when the friction clutch 3001 is engaged. Consequently, the force with which the portion 3012 of the diaphragm spring 3004 actually bears against the projections 3013 of the pressure plate 3003 is less than would be the bias of the portion 3012 in the absence of the sensor 3009. This fact must be taken into consideration in designing the friction clutch, i.e., in selecting the characteristics and mounting of the diaphragm spring 3004 and sensor 3009 in order to ensure that the bias of the portion 3012 upon the projections 3013 (as influenced [weakened] by the sensor 3009) suffices to ensure that the clutch disc 3008 is compelled to rotate with the plates 3003, 3006 when the friction clutch 3001 is engaged and the engine drives the counterpressure plate 3006, the pressure plate 3003, the housing 3002 and the diaphragm spring 3004 about their common axis X—X.

That portion of the sensor 3009 which biases the diaphragm spring 3004 in a direction away from the pressure plate 3003 includes a plurality of substantially L-shaped or hook-like tongues 3009a which constitutes the radially innermost part of the sensor 3009 and alternate with the projections 3013 as seen in the circumferential direction of the washer-like portion 3012. The free end portions or tips of the tongues 3009a bear against the adjacent side or surface of the portion 3012 to urge such portion toward the end wall 3002a of the housing 3002.

The sensor 3009 is affixed to the housing 3002 by a bayonet mount including radially outwardly extending projections 3009b on the sensor 3009 and complementary projections or abutments 3002b on the housing 3002 radially outwardly of the end wall 3002a and radially inwardly of the locations of connection between the marginal portion of the housing 3002 and the counterpressure plate 3006. The median portion of the sensor 3009 in the friction clutch 3001 of FIGS. 59 to 61 resembles a washer having radially inwardly extending arms constituting the tongues 3009a and radially outwardly extending arms constituting the projections 3009b. The sensor 3009 must be turned relative to the housing 3002 in order to assemble or disengage the bayonet mount between the projections 3009b and the abutments 3002b. Such turning of the sensor 3009 must be preceded by axial stressing of the sensor so that the projections 3009b alternate with the abutments 3002b, as seen in the circumferential direction of the housing 3002. The housing 3002 is thereupon turned relative to the sensor 3009 and/or vice versa so that each projection 3009b overlies one of the abutments 3002. The illustrated abutments 3002b can be replaced with stamped portions of the housing 3002 without departing from the spirit of the invention. It is also possible to replace the abutments 3002b with tongue-like projections which are forced behind the outer marginal portion of the sensor 3009 after the latter has been stressed in the axial direction. The same holds true for the aforementioned stamped portions of the housing 3002. Still further, it is possible to weld, rivet or otherwise affix to the housing 3002 several component parts corresponding to and performing the function of the abutments 3002b in order to ensure that the sensor 3009 can be installed in an axially stressed condition so as to bear against the diaphragm spring 3004, preferably at the level of projections 3013 on the pressure plate 3003.

It is equally possible to construct, configurate and mount the diaphragm spring 3004 and the sensor 3009 in such a way that the latter engages the diaphragm spring radially inwardly of the projections 3013 on the pressure plate 3003. For example, it is often desirable and advantageous to assemble the diaphragm spring 3004 and the sensor 3009 in such a way that the sensor engages the diaphragm spring at the level of the seat 3005; this is indicated in FIG. 59 by broken lines, as at 3014. The parts 3014 then replace the tongues 309a of the sensor 309. An advantage of the just described mounting of the sensor 3009 and diaphragm spring 3004 relative to each other is that the bias of the sensor 3009 against the diaphragm spring 3004 does not affect the bias of the washer-like portion 3012 of the diaphragm spring upon the projections 3013 of the pressure plate 3003.

The aforementioned leaf springs 3015 constitute one presently preferred means for connecting the pressure plate 3003 to the housing 3002 with no freedom of angular movement but with limited freedom of movement in the directions of the axis X—X. The leaf springs 3015 can extend substantially tangentially of the radially outermost portion of the pressure plate 3003.

The clutch disc 3008 which is shown in FIG. 59 further comprises resilient segments 3016 which are interposed between the two sets of friction linings 3007 and ensure a progressive buildup or variation of torque during engagement of the friction clutch 3001. The purpose of the resilient segments 3016 is to yield during engagement of the friction clutch 3001, i.e., during axial movement of the pressure plate 3003 toward the counterpressure plate 3006 because the tips 3010 of prongs 3011 forming part of the diaphragm spring 3004 are caused or permitted to move in a direction to the right toward the position of FIG. 59 in which the washer-like portion 3012 of the diaphragm spring bears against the projections 3013 of the pressure plate 3003 with a force which is determined in part by the initial stressing of the springs 3015, by the extent of wear upon the projections 3013 and adjacent parts of the washer-like portion 3012, by the extent of wear upon the friction surface of the counterpressure plate 3006 and by the extent of wear upon the friction linings 3007. The arrangement is such that the resilient segments 3016 yield during a certain stage of engagement of the friction clutch 3001 to thus ensure progressively increasing clamping of the friction linings 3007 between the adjacent friction surfaces of the plates 3003, 3006 while the diaphragm spring 3004 is caused or permitted to move the plate 3003 axially toward the plate 3006. Analogously, the bias upon the friction linings 3007 decreases gradually during disengagement of the friction clutch 3001 in that the resilient segments 3016 are permitted to dissipate energy during a certain stage of movement of the pressure plate 3003 axially of and away from the counterpressure plate 3006.

It is possible to replace the resilient segments 3016 with rigid segments which are affixed to a disc-shaped carrier or holder of the clutch disc 3008. It is further possible to omit the segments 3016 and to mount the friction linings 3007 directly on the holder or carrier of the clutch disc 3008.

An important advantage of the resilient sensor 3009 is that the diaphragm spring 3004 invariably bears against the seat 3005 during each and every stage of normal disengagement of the friction clutch 3001 as well as during each and every stage of normal tilting of the diaphragm spring 3004 relative to the seat 3005. Moreover, the sensor 3009 ensures that the diaphragm spring 3004 bears against the seat 3005 with a certain force acting in the direction of the axis X—X.

The sensor 3009 is preferably designed in such a way that it furnishes at least a substantially constant force during a certain stage of operation of the friction clutch 3001. This sensor takes up, at least substantially, the disengaging force which is applied to the tips 3010 forming part of the prongs 3011 of the diaphragm spring 3004 in a direction to disengage the friction clutch 3001, i.e., in a direction to the left as seen in FIG. 59. As used herein, the term "disengaging force" is intended to denote the maximum force which must be applied to the tips 3010 of the prongs 3011 (or to the disengaging levers, not shown) during actuation of the friction clutch 3001 and which must be taken up by the sensor 3009. In order to ensure satisfactory operation of the friction clutch 3001, the resulting axial force, which is supplied by the sensor 3009 and possibly by certain other components (such as, for example, the leaf springs 3015) and acts upon the diaphragm spring 3004, must exceed the maximum disengaging force, but must also be smaller than the remaining force generated by the diaphragm spring 3004 and applied to the projections 3013 of the pressure plate 3003. On the other hand, the force which is being applied by the sensor 3009 must suffice to take up certain undesirable forces, such as forces due to inertia developing as a result of axial vibrations of the pressure plate 3003. It is presently preferred to design the sensor 3009 in such a way that it applies to the diaphragm spring 3004 an axially oriented force which is between 1.1 and 1.4 times the maximum disengaging force.

The seat 3005 for the tiltable diaphragm spring 3004 is integrated into an automatic wear compensating system or unit 3017 which serves to effect axial shifting of the diaphragm spring in a direction toward the counterpressure plate 3006 in order to compensate for wear, primarily upon the friction linings 3007 but preferably also upon the diaphragm spring 3004 and the friction surfaces of the plates 3003 and 3006. Furthermore, the compensating unit 3017 ensures that no undesired clearance or play can develop between the diaphragm spring 3004 and the seat 3005 and/or between the seat 3005 and the housing or cover 3002. Such construction and mode of operation of the automatic wear compensating unit 3017 prevent the development of undesirable lost motion during actuation of the friction clutch 3001. The mode of operation of the wear compensating unit 3017 will be described with reference to FIGS. 62 to 66 and 62a to 66a; this unit ensures automatic adjustment of the seat 3005 in the direction of the axis X—X in order to compensate for the aforediscussed wear primarily upon the friction linings 3007 but preferably also upon the plates 3003, 3006 and the diaphragm spring 3004. The elimination of undesired lost motion ensures optimal operation of the friction clutch 3001 in spite of eventual slight or pronounced wear upon the parts 1003, 1004, 1006 and/or 1007, as well as an optimal efficiency of the friction clutch.

The wear compensating unit 3017 in the friction clutch 3001 of the FIGS. 59 to 61 comprises the aforementioned ring-shaped part 3018 (hereinafter called ring for short) which constitutes a wear compensating element of the unit 3017. That side or surface of the ring 3018 which confronts the end wall 3002a of the housing 3002 is provided with a set of circumferentially extending arcuate wedge-like ramps 3019 forming part of a device serving as a means for axially displacing the seat 3005 and hence the diaphragm spring 3004 in a direction toward the counterpressure plate 3006 whenever necessary in order to compensate for wear upon the friction linings 3007. The distribution of ramps 3019 on the ring 3018 is or can be similar to that of ramps 3023 at one side (see FIG. 61) of a second ring 3020 also forming part of the wear compensating unit 3017 and being concentric with and disposed radially outwardly of the ring 3018. The ramps 3019 and 3023 of the respective rings 3018, 3020 slope axially of the pressure plate 3003 in a direction from the right-hand side of the diaphragm spring 3004 (as viewed in FIG. 59) toward the inner side of the end wall 3002a.

The ring 3018 is installed in the friction clutch 3001 in such a way that the ramps 3019 face the end wall 3002a and that the other side of this ring abuts the seat 3005. FIG. 59 shows that the left-hand side of the ring 3018 is provided with a relatively shallow ring-shaped socket or grove for a portion of the seat 3005. As already mentioned hereinbefore, the seat 3005 can constitute an integral part of the ring 3018; such seat can be a separately produced part which is thereupon bonded to the ring 3018 or the seat can be of one piece with the ring 3018 (i.e., the seat 305 can be formed simultaneously with and as a result of forming the ring 3018).

The ramps 3019 of the ring 3018 abut complementary ramps 3021 which, in the embodiment of FIGS. 59 to 61, are provided directly on the inner side of the end wall 3002a of the housing 3002. The configuration and distribution of complementary ramps 3021 for the ramps 3019 of the ring 3018 is or can be analogous to that of complementary ramps 3022 which are provided on the end wall 3002a (see also FIG. 61) and cooperate with the adjacent annulus of ramps 3023 at the respective side of the second ring 3020 forming part of the automatic wear compensating unit 3017. Each of the ramps 3019, 3021, 3022 and 3023 can resemble an elongated arcuate wedge or lobe 3024 extending circumferentially of the respective ring 3018 or 3020.

The complementary ramps 3021 and 3022 can be provided at the inner side of the end wall 3002a in a stamping or any other suitable deforming or shaping machine. It is presently preferred to provide the end wall 3002a with passages in the form of slots 3025 or the like (see the passages 3025 between the ramps 3022 of the stamped portions 3026 of the end wall 3002a in FIG. 61) which permit circulation of air when the friction clutch 3001 is in use to thus cool the rings 3018, 3020, the diaphragm spring 3004, the seat 3005, the pressure plate 3003 and the friction linings 3007. This prolongs the useful life of the cooled parts and of the entire friction clutch. Similar passages are or can be provided in the end wall 3002a between the complementary ramps 3021 for the ramps 3019 on the ring 3018.

As can be seen in FIG. 61, the stamped portions 3026 of the end wall 3002a are oriented in such a way that (as seen in the direction of rotation of the housing 3002 when the friction clutch 3001 is in use) the front parts of the stamped portions 3026 project axially outwardly beyond the adjacent portions of the end wall 3002a and beyond the rear or trailing ends of the respective stamped portions. Thus, the stamped portions 3026 act not unlike the blades or vanes of a fran to draw cool atmospheric air into the passages 3025 with attendant pronounced cooling of several constituents in actual use of the friction clutch. The numerous streamlets of cool atmospheric air enter the housing 3002 through the passages 3025 to forcibly cool the adjacent constituents, especially those (such as the friction linings 3007) which are subjected to pronounced thermal stresses during certain stages of operation of the friction clutch 3001. This prolongs the useful life of the friction linings 3007. Adequate cooling of parts in the housing 3002 is also important if certain constituents are made of a material which should not be subjected to very pronounced thermal stresses. For example, adequate cooling of the rings 3018, 3020 renders it possible to make such parts of the wear compensating unit 3017 from a suitable plastic material (e.g., a heat-resistant or reasonably heat-resistant thermoplastic material). The making of rings 3018, 3020 from a plastic material is preferred in many instances because this renders it possible to mass-produce these rings in available extruders or like plastic processing machines. However, it is equally within the purview of the invention to make the ring 3018 and/or 3020 of a metallic sheet material or of a sintered material. Cooling of the rings 3018, 3020 is particularly desirable and advantageous if such rings are made of a plastic material.

The length (as seen in the circumferential direction of the rings 3018, 3020) and the slope of the ramps 3019, 3023 and of the corresponding complementary ramps 3021, 3022 are selected in such a way that the axial position of the pressure plate 3003 can be changed (in a direction toward the counterpressure plate 3006) to an extent which is necessary to ensure the possibility of maximum compensation for wear, primarily upon the friction linings 3007 but preferably also on the friction surfaces of the plates 3003 and 3006 and upon the diaphragm spring 3004. In other words, the rings 3018, 3020 should be mounted in such a way that they can turn relative to the end wall 3002a of the housing 3002 through angles which enable the cooperating ramps 3019, 3021 and 3022, 3023 to shift the respective rings 3018, 3020 axially of the pressure plate 3003 toward the counterpressure plate 3006 to an extent which ensures adequate operation of the friction clutch 3001 even after maximum permissible wear upon several parts including the friction linings 3007 (for at least upon such friction linings). Furthermore, the ramps 3019, 3023 and the complementary ramps 3021, 3022 must be dimensioned and configured in such a way that they remain in adequate surface-to-surface contact with one another (i.e., the ramps 3019 with the adjacent ramps 3021 and the ramps 3023 with the adjacent ramps 3022) when the wear upon the friction linings 3007 reaches the maximum permissible value.

Such adequate surface-to-surface contact between the cooperating sets of ramps 3019, 3021 and 3022, 3023 is necessary in order to ensure that the rings 3019, 3020 can cooperate with the end wall 3002a to take up the axial forces which develop while the friction clutch 3001 is in use at a time when the friction linings 3007 have undergone a maximum permissible amount of wear. This is particularly important in connection with the ring 3018 which is installed to take up the entire bias of the diaphragm spring 3004.

It is presently preferred to select the dimensions and the slope of the ramps 3019, 3021, 3022 and 3023 in such a way that the rings 3018, 3020 can turn relative to the housing 3002 through angles of between 10 and 90 degrees, preferably between 30 and 80 degrees. The slope (note the angle 3027 in FIG. 61) of the ramps is preferably selected in such a way that it is between 4 and 30 degrees, preferably between 4 and 15 degrees. The slope angle 3027 which is shown in FIG. 61 is approximately 12 degrees. The arrangement is preferably such that the slope (angle 3027) suffices to ensure that, when the ramps 3019 and 3023 are biased against the respective complementary ramps 3021 and 3022, the frictional engagement between abutting ramps 3019, 3021 and 3022, 3023 suffices to generate friction which prevents slippage between the rings 3018, 3020 on the one hand and the end wall 3002a on the other hand. In other words, when the rings 3018 and 3020 should not turn relative to the housing 3002, friction between the abutting ramps 3019, 3021 and 3022, 3023 suffices to establish what can be termed a self-locking action between the rings 3018, 3020 and the end wall 3002a, such locking action being attributable to friction between the ramps 3019, 3023 and the respective complementary ramps 3021, 3022.

The slope angle 3027 of the ramps 3019, 3021, 3022, 3023 is preferably further dependent upon the characteristics of two coil springs 3028 and 3029 (FIG. 60) the former of which is installed to operate between the housing 3002 and the ring 18 and the latter of which is installed to operate between the rings 3018, 3020. More specifically, the slope angle 3027 will be selected by taking into consideration the magnitude of forces which the coil springs 3029, 3029 apply circumferentially of the end wall 3002a against the ring 3018 and/or 3020. The ring 3018 compensates for wear upon the friction linings 3007, and the ring 3020 acts not unlike a detector which ascertains the need for and/or the extent of axial adjustment of the ring 3018 toward the counterpressure plate 3006 in order to compensate for the aforediscussed wear. The slope angle of the ramps 3019, 3021 can, but need not, be the same as the slope angle of the ramps 3022, 3023. Thus, the slope angle (shown in FIG. 61 at 3027) of the ramps 3022, 3023 between the ring 3020 and the end wall 3002a can be smaller or larger than the slope angle of the ramps 3019 and 3021.

The ring 3018 is biased in the circumferential direction, namely in a direction in which its ramps 3019 must slide along the complementary ramps 3021 of the end wall 3002a in order to move this ring axially away from the end wall 3002a and toward the counterpressure plate 3006, i.e., to compensate for wear upon the friction linings 3007 (and, if necessary, upon the plates 3003, 3006 and the diaphragm spring 3004). The ring 3020 is biased circumferentially in the same direction, i.e., to move away from the end wall 3002a and toward the counterpressure plate 3006, when it is free to turn about the axis X—X. The biasing or adjusting means for the ring 3018 includes the aforementioned coil spring 3028. It is clear that the means for turning those portions of the displacing device which include the ramps 3019, 3023 can include two or more coil springs 3028 or analogous springs which can cause the ring 3018 to turn about the axis X—X in a direction to ensure that ramps 3019, 3021 compel it to move axially toward the counterpressure plate 3006. The other coil spring 3029 of the means for turning the ramps 3019, 3023 of the displacing device about the axis X—X relative to the ramps 3021, 3022, respectively, is installed between the rings 3018 and 3020 in such a way that the two rings operate in series. Thus, the coil spring 3029 can serve to change the angular position of the ring 3018 as well as the angular position of the ring 3020.

The coil spring 3028 is mounted on a lug-shaped retainer 3030 which is of one piece with the housing 3002. If the housing 3002 is made of a metallic sheet material, the retainer 3030 can constitute a suitably deformed (e.g., partly stamped out) portion of the housing. To this end, the illustrated housing 3002 is provided with a substantially U-shaped cutout 3002c. The illustrated retainer 3030 has an arcuate shape and extends circumferentially or substantially tangentially of the ring 3019 and is located at least close to the plane of the adjacent portion of the end wall 3002a (i.e., the retainer 3020 and the adjacent portion of the end wall 3002a are or can be disposed at the same axial distance from the friction surface of the counterpressure plate 3006). The width of the retainer 3030 is selected in such a way that the convolutions of the spring 3029 surrounding the retainers are fixed in the radial and axial directions of the housing 3002 and ring 3018.

The ring 3018 comprises or carries a portion or arm 3031 which extends inwardly from the internal surface of this ring and is disposed between the end wall 3002a and the diaphragm spring 4 (FIG. 59). The radially innermost portion 3032 of the arm 3031 is forked or U-shaped and includes two tines or prongs 3033 at opposite sides of the retainer 3030. The prongs 3033 extend in parallel with the axis X—X and through the U-shaped cutout 3002c of the end wall 3002a. One end convolution of the coil spring 3028 bears against the prongs 3033 of the arm 3031 to bias the ring 3018 circumferentially of the end wall 3002a in a direction to urge the ramps 3019 to slide along the respective complementary ramps 3021. When the ramps 3019 are free to slide along the adjacent ramps 3021 under the bias of the coil spring 3028, the resulting movement of the ring 3018 has a component in the direction of the axis X—X, namely toward the pressure plate 3003. In other words, the rotating or turning ring 3018 causes the seat 3005 and hence the diaphragm spring 3004 to move away from the end wall 3002a and toward the plates 3003, 3006.

The ring 3018 is further provided with at least one radially outwardly extending arm 3034 which can cooperate with a radially inwardly extending arm 3035 of the ring 3020 to constitute a barrier or block against rotation of the rings 3018, 3020 relative to each other. The arm 3034 is not located in the path of movement of the arm 3035 about the axis X—X when the ring 3020 is caused to turn (i.e., when the ramps 3023 are caused to slide along the adjacent complementary ramps 3022) in a direction to move axially toward the pressure plate 3003. The confronting surfaces of the arms 3034, 3035 are provided with recesses or sockets 3036 (FIG. 60) in the form of blind bores or holes which receive portions of the coil spring 3029. The latter is installed between the arms 3034, 3035 in at least slightly stressed condition. When the coil spring 3029 is compressed to such an extent that the confronting surfaces of the arms 3034, 3035 actually abut each other, the ring 18 is compelled to share all further angular movements of the ring 3020 in a counterclockwise direction, as viewed in FIG. 60.

The wear compensating unit 3017 further comprises a wear detector 3037 here shown as a membrane-like spring (and hereinafter called membrane for short). The membrane 3037 includes a washer-like portion or section 3038 which is resilient and is disposed at the left-hand side of the diaphragm spring 3004 (as viewed in FIG. 59). As shown, the portion or section 3038 of the membrane 3037 can actually abut the respective side of the diaphragm spring 3004. This section 3038 preferably bears against the diaphragm spring 3004 with a predetermined force acting in the direction of the axis X—X so that the washer-like portion 3012 of the spring 3004 is urged toward the ring 3020. The radially inner portion of the section 3038 is fixedly connected to the diaphragm spring 304; FIG. 59 shows one of preferably several fasteners in the form of rivets 3039 disposed radially inwardly of the ring 3018 and coupling the membrane 3037 to the radially innermost part of the washer-like portion 3012. The rivets 3039 constitute but one form of means for fastening the membrane 3037 to the diaphragm spring 3004; for example, such connection can be replaced with a bayonet mount.

That part of the section 3038 of membrane 3037 which is disposed at the level of tongues 3009a of the sensor 3009 (i.e., at the same radial distance from the axis X—X) is provided with cutouts in the form of windows 3040 dimensioned to permit passage of the tongues 3009a substantially in parallel with the axis X—X. Such configuration of the section 3038 ensures that the tongues 3009a cannot influence the elastic deformation of the membrane 3037. The radially outermost part of the illustrated membrane 3037 is provided with substantially axially parallel portions 3041 serving as axial abutments for the ring 3020. Thus, in order to move axially and away from the end wall 3002a, the ring 3020 must overcome the resistance of the abutments 3041.

The initial bias of the membrane 3037 upon the diaphragm spring 3004 and the ring 3020 is selected in such a way that the ring 3020 cannot turn relative to the end wall 3002a when the friction clutch 3001 is engaged and the wear upon the friction linings 3007 is nil (or practically nil) as well as upon each axial adjustment of the ring 3018 to compensate for wear upon the friction linings 3007, i.e., when the unit 3017 has already compensated for wear upon the friction linings. The bias of the membrane 3037 is further selected with a view to take into consideration certain other parameters, such as undesirable forces which are generated (when the friction clutch 3001 is in use) by various components of the clutch; these forces can include forces which are attributable to inertia. Thus, biasing of the membrane 3037 must be selected with a view to ensure that this membrane can take up axial forces which are generated as a result of axial oscillations, e.g., of the ring 3020, without any or without appreciable deformation of the membrane, especially in the engaged condition of the friction clutch 3001.

The friction clutch 3001 must be assembled in such a way that the membrane 3037 cannot be lifted off the ring 3020 as a result of wear, especially as a result of wear upon the friction linings 3007. Otherwise, the ring 3020 would be free to perform certain undesirable angular movements to stress the membrane 3037. Such movement of the ring 3020 would result in axial adjustment of the diaphragm spring 3004, not for the purpose of compensating for wear upon the friction linings 3007, but rather for the purpose of ensuring that the membrane 3037 is maintained under the requisite tension.

Figure 62:
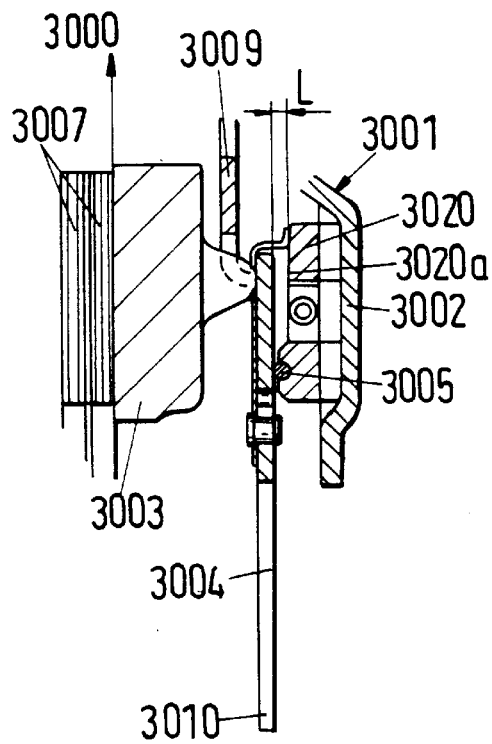
FIG. 62 is a view of a detail in FIG. 59, showing the diaphragm spring in a position it assumes when the friction clutch is new and in its engaged condition, the same as in FIG. 59.

The mode of operation of the friction clutch 3001 of FIGS. 59 to 61 will be explained with reference to FIGS. 4 to 8 and 4a to 8a. FIGS. 4 and 4a show certain parts of the friction clutch in positions when the friction clutch is new, i.e., when the wear upon the pressure plate 3003, the counterpressure plate, the friction linings 3007 and the diaphragm spring 3004 is nil. The clutch 3001 is engaged, i.e., the diaphragm spring 3004 is caused or permitted to bear upon the projections of the pressure plate 3003 so that the two sets of friction linings 3007 are compelled to share the angular movements of the counterpressure plate when the engine (which drives the counterpressure plate) is on. The distance L between the right-hand side of the diaphragm spring 3004 (as seen in FIG. 62) and the confronting surface 3020a of the ring 3020 matches the required distance to be covered by the pressure plate 3003 in a direction away from the counterpressure plate in order to disengage the friction clutch 3001. The membrane 3037 abuts the left-hand side of the diaphragm spring 3004 (as viewed in FIG. 62) and the left-hand side of the ring 3020 to prevent rotation of this ring, i.e., the wear compensating unit is inactive. The washer-like portion of the diaphragm spring 3004 bears against the seat 3005 and thus prevents rotation of the ring 3018 about the axis X—X, i.e., the axial position of the diaphragm spring 3004 cannot be changed.

Figure 62A:
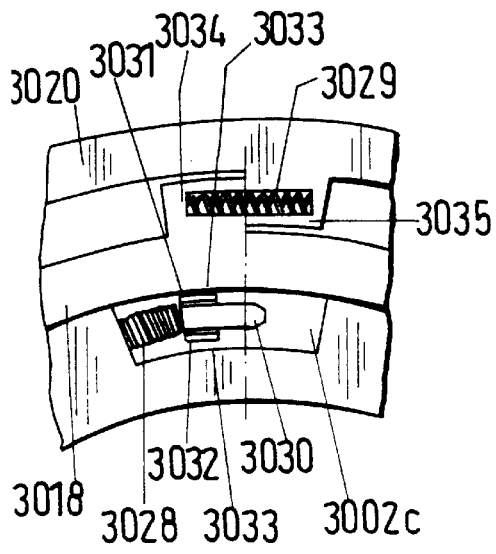
FIG. 62a is a sectional view corresponding to that of FIG. 60 and illustrating the rings of the wear compensating unit in their starting positions.

FIG. 62a shows that the arms 3034, 3035 of the rings 3018, 3020 abut each other, i.e., the coil spring 3029 stores energy and the ring 3020 (whose rotation is blocked by the membrane) holds the ring 3018 against rotation in a direction to move the diaphragm spring 3004 toward the pressure plate 3003. The coil spring 3028 serves as a means for maintaining the coil spring 3029 in fully compressed (stressed) condition as shown in FIG. 62a. During the entire useful life of the friction clutch 3001, the force of the spring 3028 must exceed the bias of the spring 3029 in the compressed condition of the spring 3029 as shown in FIG. 62a. This holds true for the entire range of angular adjustments of the ring 3018, i.e., for the entire range of axial movements of the diaphragm spring 3004 away from the end wall of the housing 3002 in order to compensate for wear upon the friction linings 3007 and preferably also upon the parts 3003, 3004 and 3006.

Figure 63:
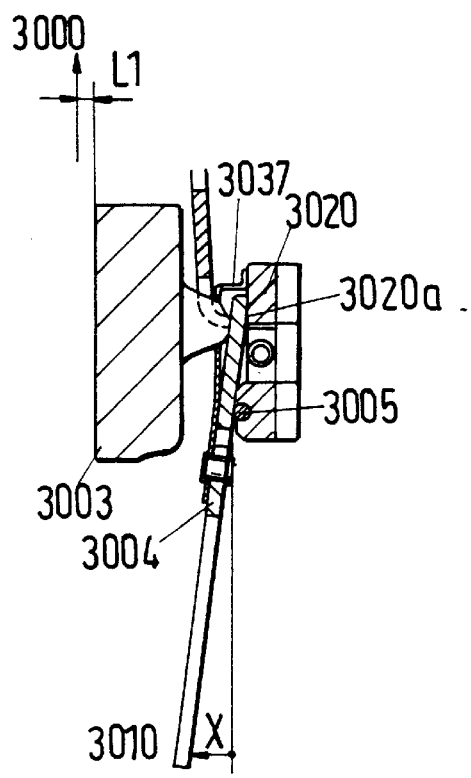
FIG. 63 illustrates the structure of FIG. 62 but with the diaphragm spring in a position it assumes when the new friction clutch is disengaged.
Figure 63A:
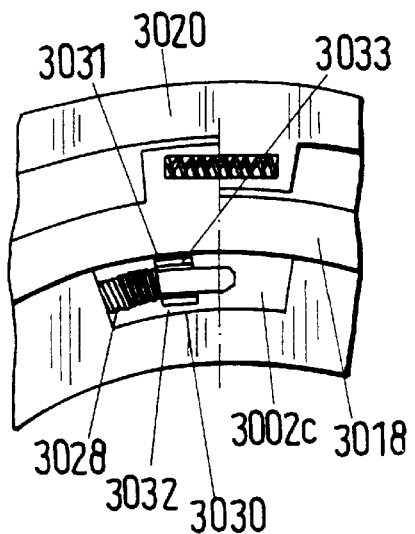
FIG. 63a is a view similar to that of FIG. 62a and showing that the positions of the rings do not change in response to tilting of the diaphragm spring from the position of FIG. 62 to the position of FIG. 103.

When the friction clutch 3001 is in the process of being disengaged, the diaphragm spring 3004 is tilted from the angular position of FIG. 62 toward the angular position of FIG. 63 When it reaches the angular position of FIG. 63, the tip 3010 of the illustrated prong of the diaphragm spring 3004 has been tilted (about the fulcrum defined by the seat 3005) through a distance X. At such time, the radially outermost part of the washer-like portion of the diaphragm spring 3004 reaches and abuts the surface 3020a of the ring 3020. Such tilting of the diaphragm spring 3004 has resulted in axial movement of the pressure plate 3003 through the distance L1 because the pressure plate 3003 is biased away from the counterpressure plate 3006 by the leaf springs 3015 (FIG. 59). The distance L1 between the zero (0) or starting axial position of the pressure plate 3003 of FIG. 62 and the axial position of FIG. 63 suffices to ensure a relaxation of the pressure by the friction surfaces of plates 3003, 3006 against the adjacent sets of friction linings 3007. Axial movement of the pressure plate 3003 from the 0-position of FIG. 62 through the distance L1 to the axial position of FIG. 63 results in axial stressing of the membrane 3037. Accordingly, the radially outermost portion 3041 of the membrane 3037 bears upon the ring 3020 with a greater force and prevents the ring 3020 from turning, i.e., the wear compensating unit remains inactive during that stage of disengagement of the friction clutch 3001 which involves tilting of the diaphragm spring 3004 from the position of FIG. 62 to the position of FIG. 63. This is desirable and advantageous because the ring 3020 is even more reliably prevented from turning or permitting a turning of the ring 3018, i.e., from changing the axial position of the seat 3005, and hence of the diaphragm spring 3004, relative to the end wall of the housing 3002. A comparison of FIGS. 62a and 63a shows that the angular positions of the rings 3018 and 3020 relative to each other and relative to the end wall of the housing 3002 remain unchanged while the diaphragm spring 3004 is being titled from the position of FIG. 62 to the position of FIG. 63.

The distance X which is covered by the tips 301B of prongs forming part of the diaphragm spring 3004 during tilting of the latter from the position of FIG. 62 to the position of FIG. 63 is the minimum distance required to ensure that the pressure plate 3003 is moved by the leaf springs 3015 axially through the distance L1 in a direction away from the counterpressure plate. This minimum distance X must be covered by the tips 3010 before the wear compensating unit is capable of moving the seat 3005 in a direction away from the end wall of the housing 3002.

In order to achieve the required minimum axial movement of the pressure plate 3003 away from the 0-position of FIG. 62, it is normally preferred to ensure that the tips 3010 of the prongs on the diaphragm spring 3004 cover a distance which at least slightly exceeds the distance X shown in FIG. 63. This can be seen in FIG. 64 wherein the distance ΔX is desirable in order to account for tolerances and vibrations. As also shown in FIG. 64, a movement of the tips 3010 beyond the distance X (such as through the additional distances ΔX) causes the diaphragm spring 3004 to begin to act not unlike a one-armed lever in that the radially outermost part of the washer-like portion of the diaphragm spring 3004 begins to pivot at the surface 3020a of the ring 3020, whereby the radially inner part of the washer-like portion of the diaphragm spring moves toward the pressure plate 3003 and away from the seat 3005. The normally small or very small clearance between the right-hand side of the washer-like portion of the diaphragm spring 3004 and the seat 3005 is shown in FIG. 64, as at 3042. Thus, the diaphragm spring 3004 no longer causes the seat 3005 to bear against the ring 3018. Nevertheless, the ring 18 is still held against rotation under the bias of the coil spring 3028 because the washer-like portion of the diaphragm spring 3004 bears against the surface 3020a of the ring 3020, i.e., the latter is held against rotation relative to the end wall of the housing 3002. As shown in FIG. 64a, the arms 3034, 3035 of the rings 3018, 3020 continue to abut each other and, since the ring 3020 is held against rotation by the washer-like portion of the diaphragm spring 3004 as well as by the membrane 3037, the coil spring 3028 is incapable of turning the ring 3018 in a direction which would enable the cooperating ramps 3019 and 3021 to shift the seat 305 axially and away from the end wall of the housing 3002. The bias of the washer-like portion of the diaphragm spring 3004 upon the ring 3020 is assisted by the bias of the sensor 3009 whose tongues bear against the adjacent side of the washer-like portion. A comparison of FIGS. 62, 63 and 64 will show that the change in conicity of the diaphragm spring 3004 as a result of movement of the tips 3010 through the distance X or X+ΔX entails a change of conicity of the sensor 3009 because the illustrated sensor also constitutes a diaphragm spring which is fulcrumed at 3002b, 3009b.

If certain parts of the friction clutch 3001 (particularly the friction linings 3007) have undergone a given amount of wear as a result of previous engagement of the friction clutch, there results an axial movement of the pressure plate 3003 through the distance L1 (FIG. 63) plus a distance 3043 (shown in FIG. 66), i.e., the friction surface of the pressure plate 3003 moves nearer to the friction surface of the counterpressure plate than in response to engagement of the friction clutch when the friction linings are new. Thus, the distance 3043 indicates that extent of wear upon the friction linings 3007. As mentioned above, the unit 3017 can also compensate for wear upon certain parts other than the friction linings 3007, such as the plates 3003, 3006 and the diaphragm spring 3004. However, and since the wear upon the parts 3003, 3004 and 3006 is normally less than the wear upon the friction linings 3007, the following part of the description of the mode of operation of the wear compensating unit will refer only to the wear upon the friction linings.

As the pressure plate 3003 moves through the distance L1 plus the distance 3043, the conicity of the diaphragm spring 3004 changes (together with the conicity of the sensor 3009) from that shown in FIG. 62 to that which is shown in FIG. 65, i.e., reengagement of the friction clutch 3001 entails a different conicity of the diaphragm spring 3004 and of the sensor 3009 as a result of wear upon the friction linings 3007. The change of conicity of diaphragm spring 3004 results in a rightward movement of the tips 3010 beyond the positions of FIG. 62, namely through a distance ΔY which is shown in FIG. 65. At the same time, the change of conicity of the sensor 3009 entails a leftward movement of the abutment or abutments 3041 of the wear detector 3037 in a direction to the left through a distance 3044 (also shown in FIG. 65). Thus, the abutment or abutments 3041 cease to bear upon the ring 3020 which is thus free to turn under the bias of the coil spring 3029 (see FIG. 65a). Consequently, the arm 3035 moves away from the arm 3034 through a distance 3045 which is shown in FIG. 65a. Such a distance 3045 indicates the width of the space between the confronting surfaces of the arms 3034 and 3035, i.e., the extent of dissipation of energy by the spring 3029. As the ring 3020 turns under the bias of the spring 3029, its ramps 3023 slide along the adjacent complementary ramps 3022 of the end wall of the housing 3002 so that the ring 3020 moves axially away from such end wall until arrested by the abutment or abutments 3041 of the wear detector 3037. In other words, the ring 3020 cannot turn any further when the bias of the spring 3029 no longer suffices to turn the ramps 3023 along the respective ramps 3022 against the opposition of the abutment or abutments 3041 forming part of the wear detector 3037. The distance or width 3045 is related to the aforementioned distance 3044, i.e., the distance 3044 is reduced to zero when the spring 3029 is no longer capable of moving the ramps 3023 of the ring 3020 along the adjacent complementary ramps 3022 of the end wall 3002a. More specifically, the distance or width 3045 equals the distance 3044 (the extent of axial movement of the ring 3020) to compensate for wear (see 3043) upon the friction lining 3007 divided by the tangent of the angle 3027 denoting the slope of the ramps 3022 and 3023.

The just described compensation for wear (3043) upon the friction linings 3007 necessitates a larger movement of the tips 3010 of the prongs forming part of the diaphragm spring 3004 toward the positions in which the friction clutch 3001 is again engaged. Thus, when compared with the movement (X+ΔX) of the tips 3010 in a direction to disengage the friction clutch 3001, the movement of such tips 3010 to positions in which the friction clutch 3001 is again engaged must be increased by ΔY and equals Y+ΔY (see FIG. 65).

When the renewed engagement of the friction clutch 3001, in a manner as described with reference to FIG. 65, is followed by a disengagement (FIG. 66), the bias of the diaphragm spring 3004 upon the seat 3005 (and hence upon the ring 3018) is relaxed in a manner as described with reference to FIG. 64 so that the ring 18 is free to turn relative to the end wall of the housing 3002 and relative to the ring 3020 due to the presence of the space 3045 (FIG. 65a), i.e., the spring 3028 is free to dissipate energy until the arm 3034 of the ring 3018 returns into abutment with the arm 3035 of the ring 3020 (see FIG. 66A) whereby the ramps 3019 slide along the complementary ramps 3021 of the end wall 3002a and cause the seat 3005 to move axially toward the pressure plate 3003. As already mentioned above, the bias of the spring 3028 is greater than the bias of the spring 3029, even in the fully compressed condition of the spring 3029 (in which the arms 3034 and 3035 abut each other), so that the spring 3028 reduces the width of the space 3045 to zero to thus ensure that axial shifting of the seat 3005 toward the counterpressure plate suffices to compensate for wear upon the friction lining 3007. When the axial adjustment of the seat 3005 in a direction toward the counterpressure plate (to compensate for wear upon the friction linings 3007) is completed, the axial position of the seat 3005 is such that the conicity of the diaphragm spring 3004 against corresponds (at least substantially) to that shown in FIG. 62, i.e., the conicity is the same as if the friction linings 3007 were still intact. However, the conicity of the sensor 3009 is changed. The rings 30018 and 20 then assume different angular positions (compare FIGS. 62a and 66a) because these rings were turned in the aforedescribed manner in order to compensate for wear upon the friction linings 3007.

In actual practice, the adjustments of the rings 3018 and 3020 in the direction of the axis X—X (in order to compensate for wear upon the friction linings 3007) are small or extremely small. As a rule, the axial position of the seat 3005 is adjusted many times; in fact, the adjustments can be practically continuous in response to each disengagement and reengagement of the friction clutch 3001 or upon completion of relatively small numbers of successive engagements and disengagements, depending upon the sensitivity of the wear compensating unit 3017 and upon the extent of wear upon the friction linings. The extent of axial adjustment of the seat 3005 (i.e., the width of the space 3045 shown in FIG. 65a) is normally very small but such adjustment takes place many times. The width of the space 3045 has been exaggerated in FIG. 65a for the sake of clarity.

The diaphragm spring 3004 acts not unlike a two-armed lever during tilting of its tips 3010 through the distance X (FIGS. 63 and 64) as long as it is fulcrumed at 3005. However, once the radially outermost part of the washer-like portion of the diaphragm spring 3004 reaches and is fulcrumed at the surface 3020a of the ring 3020, the diaphragm spring 3004 acts as a one-armed lever. Thus, the diaphragm spring 3004 acts as a two-armed lever as long as its washer-like portion contacts and is tilted relative to the seat 3005, but the diaphragm spring 3004 begins to act as a one-armed lever when its washer-like portion comes into contact with and is tilted relative to the surface 3020a of the ring 3020. This results in a change of the transmission ratio of the diaphragm spring 3004 in the friction clutch 3001 from i to i+1 wherein i denotes the ratio of the distance of the seat 3005 from the locus (tips 3010) where the disengaging lever(s) or bearing applies force to the diaphragm spring 3004 in order to tilt it in the housing 3002 to the distance of the seat 3005 from the locus of contact (at projections 3013) between the diaphragm spring and the pressure plate 3003. It is assumed that the region of contact between the diaphragm spring 3004 and the surface 3020a of the ring 3020 is located (at least substantially) at the same radial distance from the axis X—X as the region of contact (projections 3013) between the diaphragm spring and the pressure plate 3003. Due to the fact that the transmission ratio is increased from i to i+1, the force-to-distance characteristic of the diaphragm spring 3004 can be extended. Otherwise stated, if the transmission ratio is increased, the magnitude of the force (or the extent of change of such force) can be reduced, i.e., the aforementioned force-to-distance ratio is flatter or smoother. This renders it possible to reduce the magnitude of the disengaging force during the respective stage of disengagement of the friction clutch 3001.

As already mentioned hereinbefore, it is advisable to provide the friction clutch 3001 with means for ensuring a gradual reduction of torque which can be transmitted during disengagement of the friction clutch. This renders it possible to reduce or minimize the progress of the disengaging force, namely the maximum force which is necessary to disengage the friction clutch. Such means for ensuring a gradual reduction of torque which is transmitted during disengagement of the friction clutch 3001 includes or is constituted by the resilient segments 3016 which carry the two sets of friction linings 3007 and form part of the clutch disc 3008. Suitable resilient segments are described and shown, for example, in published German patent application Serial No. 36 31 863 to which reference may be had, if necessary.

Another mode of ensuring a progressive reduction of torque as well as a progressive increase of torque during disengagement and engagement of a friction clutch is disclosed in published German patent application Serial No. 2164 297. This publication proposes to employ a composite flywheel including two discrete flywheels. That discrete flywheel which constitutes the counterpressure plate is axially movably connected to the other discrete flywheel, which latter is driven by the output element of a combustion engine or another prime mover. The component which constitutes the counterpressure plate is biased in the axial direction away from the other discrete flywheel.

It is further possible to replace the resilient segments 3016 for the friction linings 3007 with means for effecting a gradual reduction of torque in the power flow between the diaphragm spring 3004 and the pressure plate 3003. Reference may be had, for example, to published German patent application serial Nos. 37 42 354 and 1 450 201. Still further, it is possible to replace the resilient segments 3016 with means for effecting a gradual reduction of torque in the power flow between the diaphragm spring 3004 and the locations where the housing or cover 3002 is secured to the counterpressure plate 3006.

Irrespective of the exact nature of the means for effecting a gradual reduction of torque during engagement or disengagement of the improved friction clutch, it is necessary to connect such means (for example, the resilient segments 3016) in series with the diaphragm spring 3004. In other words, the just discussed means (hereinafter referred to as the resilient segments 3016 with the understanding, however, that these segments can be replaced by or used jointly with the aforementioned alternative embodiments of such means) must be capable of undergoing resilient deformation in response to the application of force by the diaphragm spring 3004.

Figure 76:
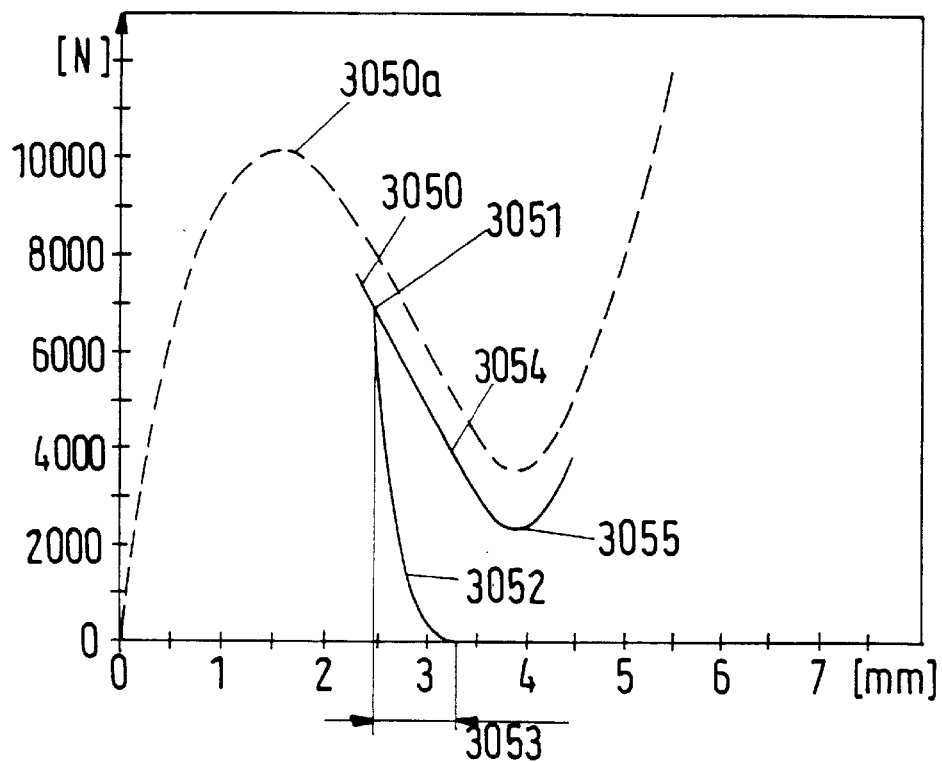
Figure 77:
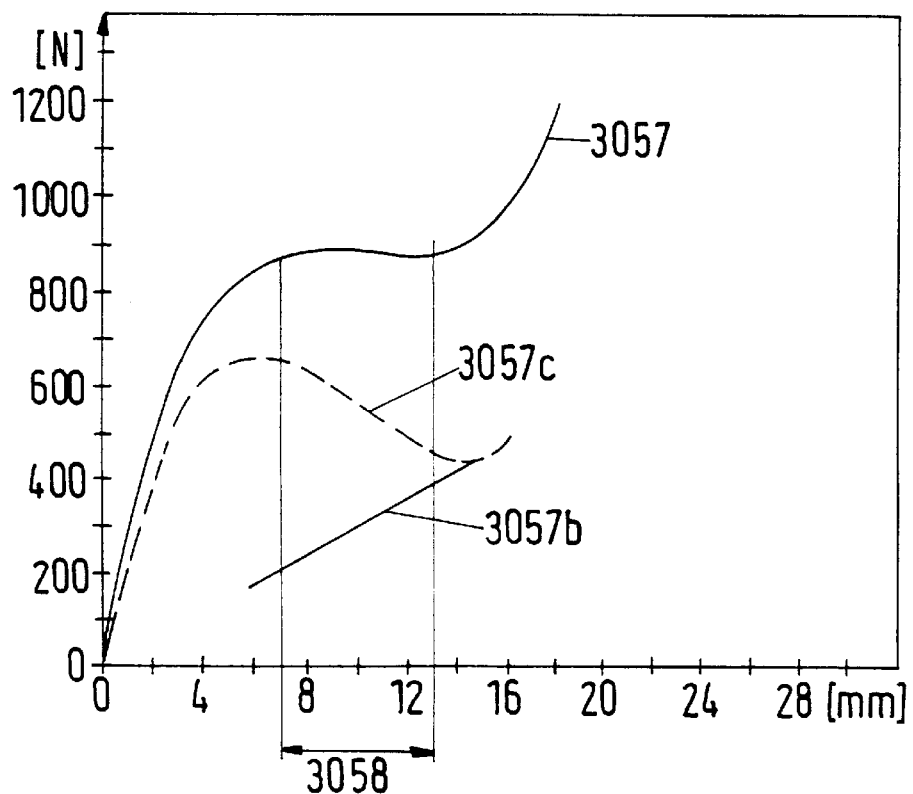

The purpose and mode of operation of the resilient segments 3016 (as a means for effecting a gradual reduction of torque which is being transmitted during engagement or disengagement of the friction clutch) will be more readily appreciated upon perusal of the following detailed description of the diagrams which are shown in FIGS. 76 and 77. The distances (in millimeters) are measured along the abscissa, and the magnitude of the force (N) is measured along the ordinate.

The curve 3050 in the diagram of FIG. 76 is a characteristic curve denoting the progress of axial forces which are being applied by the diaphragm spring 3004 to the pressure plate 3003 during a certain stage of operation of the friction clutch 3001 and vary due to changes of conicity of the diaphragm spring. The aforementioned stage includes axial deformation of the washer-like circumferentially complete portion 3012 of the diaphragm spring 3004 between the seat 3005 and the loci of contact between the projections 3013 of the pressure plate 3003 and the diaphragm spring radially outwardly of the seat 3005. The curve 3050 is plotted by taking into consideration the influence of the force exerted upon the diaphragm spring by the sensor 3009 and possibly other parts (such as the leaf springs 3015), namely the force or forces which assist or oppose (i.e., influence) the bias of the diaphragm spring upon the pressure plate. The actual relationship between the force of the diaphragm spring 3004 and the distance which is covered by the washer-like portion 3012 is indicated in FIG. 76 by a broken-line curve 3050a. In other words, the force-distance relationship pertaining to the diaphragm spring 3004 is actually higher than that indicated by the solid-line curve 3050 of FIG. 76.

The point 3051 on the curve 3050 denotes the position of the diaphragm spring 3004 upon installation in a new friction clutch 3001 (i.e., the wear upon the friction linings 3007, upon the friction surfaces of the plates 3003, 3006 and upon the diaphragm spring is assumed to be zero). At such time, the diaphragm spring 3004 applies to the pressure plate 3003 a force of maximum magnitude. The point 3051 can be shifted along the curve 3050, either toward or away from the abscissa, by an appropriate change of conicity during installation of the diaphragm spring 3004 between the end wall 3002a of the housing 3002 and the pressure plate 3003.

The curve 3052 denotes in FIG. 76 the progress of the spreading force which is being applied by the resilient segments 3016 to move the two sets of friction linings 307 axially of the plates 3003, 3006 and away from each other. Such a force is applied to the pressure plate 3003 by way of the right-hand set of friction linings 3007, as viewed in FIG. 59. It will be seen that the force which is being applied by the resilient segments 3016 (as indicated by the curve 3052) opposes the bias of the diaphragm spring 3004 upon the pressure plate 3003 in a direction to move the pressure plate toward the counterpressure plate 3006, i.e., to deform (flatten) the segments 3016 and to thus move the two sets of friction linings 3007 axially of the two plates and toward each other.

It is normally desirable that the maximum force which is being applied by the segments 3016 and is denoted by the curve 3052 of FIG. 76 at least match the maximum force which the diaphragm spring 3004 can apply to the pressure plate 3003. Thus, when the friction clutch 3001 is fully engaged, deformation of the segments 3016 is not completed, i.e., these segments are capable of some additional deformation or flattening so that they exhibit a certain spare resiliency or additional surplus resiliency due to the fact that the maximum bias of the segments 3016 at least matches, but preferably at least slightly exceeds, the maximum bias of the diaphragm spring 3004 upon the pressure plate 3003. The segments 3016 dissipate energy during disengagement of the friction clutch, and the extent of expansion of the segments 3016 during such disengagement (i.e., the extent of movement of the two sets of friction linings 3007 axially of the plates 3, 3006 and away from each other) is shown in FIG. 76, as at 3053. The segments 3016 thus assist the leaf springs 3015 in effecting a disengagement of the friction clutch 3001 when the diaphragm spring 3004 is titled from the position of FIG. 62 to the position of FIG. 63. It will be noted that the segments 3016 ensure that disengagement of the friction clutch 3001 necessitates the application of a lesser force than that which would be required in the absence of such segments and when the position of the diaphragm spring 3004 corresponds to that indicated by the point 3051 on the curve 3050 of FIG. 76.

The point 3054 on the curve 3050 in the diagram of FIG. 76 denotes the condition or shape of the diaphragm spring 3004 just before the friction surfaces of the plates 3003, 3006 release the adjacent sets of friction linings 3007, i.e., just before the friction clutch 3001 becomes disengaged.

Otherwise stated, the position of the diaphragm spring 3004 must be changed beyond that denoted by the point 3054 (in a direction away from the ordinate in the diagram of FIG. 76) in order to ensure a disengagement of the friction surfaces forming part of the plates 3003, 3006 from the adjacent sets of friction linings 3007. In view of the degressive characteristic of the curve 3050 denoting the position of the diaphragm spring 3004, the magnitude of the disengaging force is considerably less than that corresponding to the point 3051 on the curve 3050. The disengaging force for the friction clutch 3001 decreases all the way to the lowest point 3055 of the curve 3050. If the deformation of the diaphragm spring 3004 is continued beyond the point 3055, the required disengaging force begins to rise but the extent of movement of the tips 3010 of prongs 3011 forming part of the diaphragm spring 3004 is preferably selected in such a way that the magnitude of the disengaging force is not greater than the bias of the sensor 3009, even if the disengagement proceeds beyond the lowermost point 3055 of the curve 3050. This is desirable and necessary because, otherwise, the wear detector 3037 would no longer contact the ring 3020 during disengagement of the friction clutch 3001 and the wear compensating unit would effect an unnecessary angular adjustment of the ring 3018 at a time when the extent of wear upon the friction linings 3007 does not warrant such adjustment. The just discussed adjustment of the ring 3018 due to disengagement of the wear detector 3037 from the ring 3020 would prevent full disengagement of the friction clutch 3001. In fact, under extreme circumstances, the friction clutch 3001 would no longer be capable of disengagement, i.e., the friction clutch would no longer permit an interruption of power flow between the plates 3003, 3006 and the clutch disc 3008 (namely between the output element of the engine which drives the counterpressure plate 3006 and the input element of the transmission which receives torque from the hub of the clutch disc 3008.

The distance-to-force ratio of the sensor 3009 is denoted by the curve 3057 in the diagram of FIG. 77. The curve 3057 represents the progress of the aforementioned ratio when the unstressed sensor 3009 (the sensor 3009 in the friction clutch 3001 is a diaphragm spring) is caused to store energy and thus changes its conicity between two abutments which are separated from each other by a distance (as measured radially of the axis X—X) corresponding to that between the abutment on the housing 3002 and the abutment on the diaphragm spring 3004. The curve 3057 includes a portion 3058 which is the range of travel or excursion of the sensor 3009. It will be noted that the axial force of the sensor 3009 within the range 3058 is nearly constant. The force within the range 3058 can be selected in such a way that it always exceeds the maximum disengaging force at the tips 3010 of the diaphragm spring 3004 during the entire useful life of the friction clutch. The force which is to be applied by the sensor 3009 depends upon the transmission ratio (lever arm) of the diaphragm spring 3004. In most instances, such transmission ratio is normally within the range of 3001 to 3003 and 1 to 5 but, under certain circumstances, can be higher or lower. Such transmission ratio corresponds to the ratio of the radial distances of the seat 5 and the location of contact between the spring 3004 and sensor 3009 to the radial distance of the seat 3005 from the locations of contact between the disengaging means (e.g., a bearing) and the tips 3010 of prongs 3011 forming part of the diaphragm spring 3004.

The mounting of the sensor 3009 in the friction clutch 3001 is selected in such a way that the sensor can resile during disengagement and also moves axially in a direction toward the friction linings 3007 through a distance at least approximating the distance which is covered by the pressure plate 3003 in a direction toward the counterpressure plate 6 in order to compensate for wear upon the friction linings 7 (and preferably also upon the friction surfaces of the plates 3003 and 3006). It is desirable that, during movement of the sensor 3009 through such distance, the magnitude of axial force which is being applied by the sensor 9 to the diaphragm spring 3004 exceed the force which must be applied to disengage the friction clutch 3001. It is often advantageous and desirable to select the portion 3058 of the curve 3057 in the diagram of FIG. 77 in such a way that it corresponds to, but preferably exceeds, the maximum distance which is covered as a result of wear. This ensures that one can compensate, at least in part, for tolerances during assembly of the friction clutch 3001.

If the friction clutch 3001 is equipped with one or more prestressed sensors 3009 which urge the pressure plate 3003 axially and away from the counterpressure plate 3006, the sensor or sensors 3009 urge the pressure plate toward the diaphragm spring 3004 so that (and as already mentioned hereinbefore) the sensor or sensors can assist in disengagement of the friction clutch. The axially oriented force which is applied by the sensor or sensors 3009 is superimposed upon the axially oriented force which is applied by the diaphragm spring 3004. Thus, the sensor or sensors 3009 can be installed between the end wall 3002a of the housing 3002 and the pressure plate 3003 in such a way that, as the wear upon the friction linings 3007 increases, the bias of the sensor or sensors 3009 upon the diaphragm spring 3004 also increases.

The curve 3057b indicates in the diagram of FIG. 77 the axially oriented force which is applied by the leaf springs 3015 while the force-to-distance ratio of the sensor or sensors 3009 varies as indicated by the portion 3058 of the curve 3057, i.e., within the entire range of wear compensating adjustments by the unit 3017. As the wear upon the friction linings 3007 increases, the restoring force of the leaf springs 3015 (to urge the pressure plate 3003 away from the counterpressure plate 3006 and to thus oppose the bias of the diaphragm spring 3004) also increases. If it is desired that the distance-to-force ratio of the sensor or sensors 3009 correspond to that denoted by the curve 3057 in the diagram of FIG. 77, the sensor or sensors 3009 must be designed in such a way that the actual ratio is the one denoted by the broken-line curve 3057c.

It is also within the purview of the invention to design the means (such as the sensor or sensors 3009) which bias the diaphragm spring 3004 against the seat 3005 in such a way that the characteristic curve of such biasing means departs from those shown in FIG. 77. For example, the portion 3058 of the curve 3057 can exhibit a progressive or degressive characteristic (rather than being at a substantially constant distance from the abscissa). All that counts is to ensure that the resultant force which is being applied by the sensor or sensors 3009 (and under certain circumstances by one or more additional force applying means such as, for example, the leaf springs 3015) to the diaphragm spring 3004 is greater than the required disengaging force for the friction clutch 3001 (such disengaging force acts counter to the aforementioned resultant forces).

To summarize the function and the mode of operation of the wear detector 3037: This component part of the compensating unit 3017 can be deactivated, or its effect upon the ring 3020 at least reduced, in dependency on a change of conicity of the diaphragm spring 3004 (due to wear upon the friction linings 3007) and/or in dependency on the positions and/or dimensions and/or other characteristics of the clutch engaging and disengaging means (normally including or acting upon the tips 3010 of the prongs 3011 forming part of the diaphragm spring 3004) and/or in dependency on changes of the axial position of the pressure plate 3003 in response to wear upon the friction linings 3007. The wear detector 3037 can be characterized as a brake whose braking or blocking action increases in dependency on the extent of disengagement of the friction clutch 3001. The wear detector 3037 permits an angular adjustment of the ring 3020 in the direction of the axis X—X in the engaged condition of the friction clutch 3001 (i.e., the ring 3020 is free to turn about the axis X—X when the clutch is engaged) to an extent which is determined by the change of conicity of the diaphragm spring 3004 (and/or of the position of its tips 3010) due to wear upon the friction linings 3007 or by the change of axial position of the pressure plate 3003 (again as a result of wear upon the friction linings). The wear detector 3037 can comprise a single resilient portion or section 3038 or two or more discrete resilient sections—this will be described with reference to FIGS. 74 and 75—which can yield in the direction of the axis X—X. The section or sections 3038 of the wear detector 3037 react against the cover or housing 3002, against the pressure plate 3003 or against the diaphragm spring 3004 to bear against the ring 3020 with a force which is sufficient to prevent an angular displacement (and hence an axial movement toward the diaphragm spring) under the action of the coil spring 3028 and/or 3029 except when the conicity of the diaphragm spring 3004 has been changed and/or the axial position of the pressure plate 3003 has been changed as a result of wear upon the friction lining 3007. Thus, the wear detector 3037 prevents the ring 3020 from turning when the engaged friction clutch 3001 is new (i.e., when the friction linings 3007 are still devoid of wear) and/or when the axial position of the ring 3020 has already been changed due to wear upon the friction linings and no additional wear (or no appreciable additional wear) upon the friction linings has taken place. The situation is entirely different when the friction clutch 3001 requires adjustment to compensate for wear; the braking action of the wear detector 3037 is then reduced or interrupted (i.e., reduced to zero) due to a change of the axial position of the pressure plate 3003 while the clutch is engaged so that the coil spring 3028 and/or 3029 is free to change the angular (and hence the axial) position of the ring 3020 preparatory to a commensurate change of angular and axial positions of the ring 3018.

As can be seen, for example, in FIG. 63, the ring 3020 is blocked against angular movement in response to disengagement of the friction clutch 3001 because this ring is then urged against the end wall 3002a of the housing 3002 by the radially outermost part of the diaphragm spring 3004 as well as by the abutment or abutments 3041 of the wear detector 3037.

The ramps 3019 and 3023 of the rings 3018 and 3020 resemble portions of the roof and slope toward the pressure plate 3003 in order to permit angular and axial movements of these rings (downwardly as shown for the ring 3020 in FIG. 61) when the rings are to compensate for wear upon the friction linings 3007. The passages 3025 are provided in the end wall 3002a adjacent those portions of the ramps 3023 shown in FIG. 61 which are nearest to such end wall, i.e., remotest from the pressure plate 3003.

Figure 67:
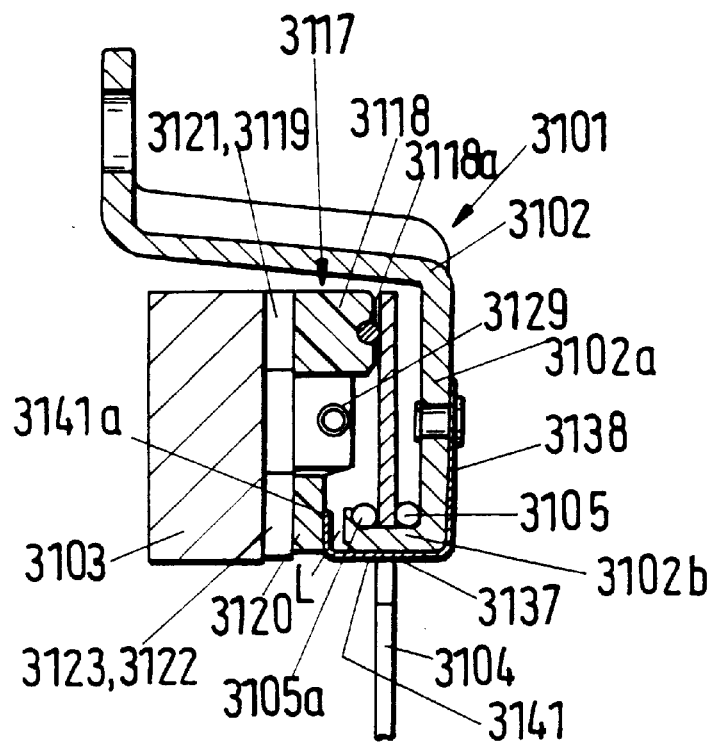
FIG. 67 is a fragmentary axial sectional view of a push-type friction clutch which embodies a modified wear compensating unit.

FIG. 67 illustrates a portion of a modified friction clutch 3101 which is also a push-type clutch, the same as the friction clutch 3001 of FIGS. 59 to 66a.

In other words, the tips of the radially inwardly extending prongs of the diaphragm spring 3104 must be pressed in a direction to the left (compare the positions of the tip 3010 in FIGS. 62 and 63). The diaphragm spring 3104 of the friction clutch 3101 of FIG. 67 is tiltable between two circular wire-like seats 3105 and 3105*a* which are held against axial movement relative to the bottom wall or end wall 3102*a* of the housing or cover 3102. The means for holding the seats 3105, 3105*a* (and the diaphragm spring portion between them) against axial movement relative to the end wall 3102*a* comprises a plurality of substantially U-shaped lungs 3102*b* which are of one piece with or are welded or otherwise affixed to the radially innermost portion of the end wall 3102*a* and extend in substantial parallelism with the axis of the pressure plate 3103 through the slots between the prongs of the diaphragm spring 3104. The left-hand leg of the lug 3102*b* which is shown in FIG. 67 partially overlies the seat 3105*a* so that the latter cannot move away from the end wall 3102*a* and thus holds the seat 3105 as well as the adjacent portion of the diaphragm spring 3104 against axial displacement toward the pressure plate 3103.

The compensating unit 3117 of the friction clutch 3101 also comprises a resilient wear detector 3137 in the form of a membrane having an elastically deformable section or portion 3138 riveted to the housing 3102 and overlying the outer side of the end wall 3102*a*, i.e., that side which faces away from the diaphragm spring 3104. The fasteners in the form of rivets (one shown in FIG. 67) can be replaced by any other suitable means for reliably affixing the section 3138 of the membrane 3137 to the housing 3102. The membrane 3137 further comprises substantially axially parallel portions 3141 which extend through the slots between the neighboring prongs of the diaphragm spring 3104 and have radially outwardly extending end portions or abutments 3141*a* for the right-hand side of the ring 3120 forming part of the wear compensating unit 3117. The clearance or distance L between the abutments 3141*a* of the axially extending portions 3141 of the membrane 3137 and the U-shaped lugs 3102*b* of the end wall 3102*a* is necessary in order to permit disengagement of the friction clutch 3101, i.e., to permit axial movements of the pressure plate 3103 in a direction away from the counterpressure plate (not shown) and toward the end wall 3102*a*.

The washer-like radially outer portion of the diaphragm spring 3104 abuts a circular wire-like seat 3118*a* carried by the ring 3118 of the wear compensating unit 3117. In this embodiment of the improved friction clutch, the ring 3118 is concentric with and is disposed radially outwardly of the ring 3120 (compare the positions of the rings 3018, 3020 in FIG. 59). The ring 3120 has a set of arcuate circumferentially extending ramps 3123 which cooperate with complementary ramps 3122 at the adjacent side of the pressure plate 3103. Analogously, the ring 3118 has a set of arcuate circumferentially extending ramps 3119 which cooperate with complementary ramps 3121 at the adjacent side of the pressure plate 3103. The manner in which the ramps 3119, 3123 of the rings 3118, 3120 cooperate with the complementary ramps 3121, 3122 of the pressure plate 3103 is analogous to that already described with reference to the ramps 3019, 3021 and 3022, 3023 on the rings 3018, 3020 and end wall 3002*a* in the friction clutch 3001 of the FIGS. 59 to 66*a*. The inclination and the finish of the abutting ramps 3119, 3121 and 3122, 123 are preferably such that the rings 3118, 120 and the pressure plate 103 normally establish a self-locking action to prevent accidental axial shifting of the pressure plate toward the counterpressure plate. In contrast to the construction of the wear compensating unit 3017 in the friction clutch 3001 of the FIGS. 59 to 66*a*, the pressure plate 3103 of the friction clutch 3101 in FIG. 67 is movable axially relative to the end wall 3102*a* of the housing 3102 as well as relative to the diaphragm spring 3104 for the purpose of compensating for wear upon the friction linings of the clutch disc (not shown in FIG. 67).

Figure 79:
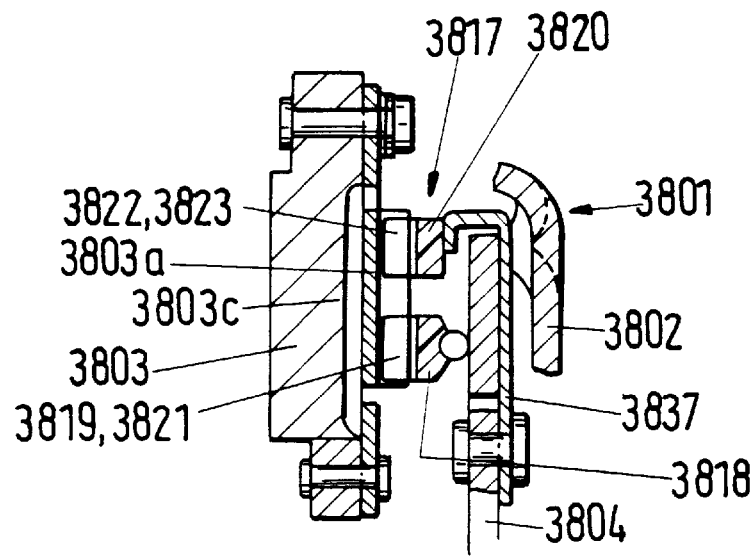
FIG. 79 is a fragmentary axial sectional view of a friction clutch which embodies still another wear compensating unit.
Figure 80:
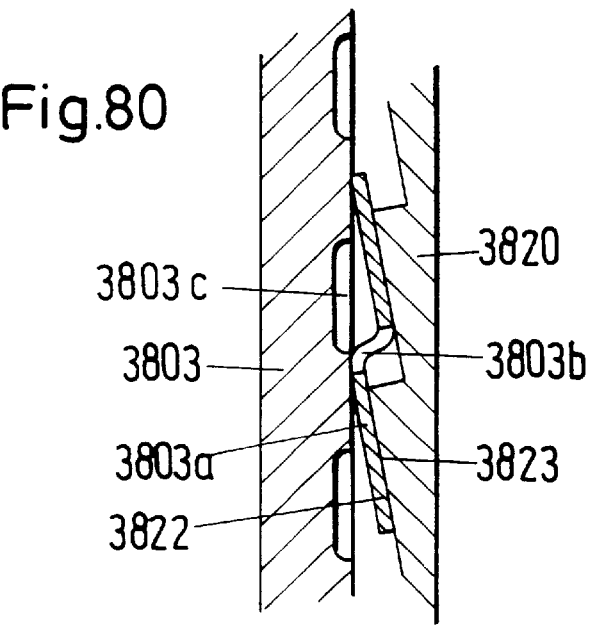
FIG. 80 is an enlarged sectional view of the pressure plate and of one ring in the wear compensating unit of FIG. 79 in a view similar to that of FIG. 61.

Instead of being formed directly on the pressure plate 3103, the complementary ramps 3121, 3122 can be formed on a separately produced part (e.g., a washer-like part 3803*a* shown in FIGS. 79 and 80 which is affixed to the pressure plate to confront the diaphragm spring 3104. Such separately produced part which is to serve as a carrier of complementary ramps 3121, 3122 can be welded or otherwise bonded to the pressure plate, i.e., the illustrated plate 3103 can be replaced with one including a left-hand portion which is provided with a friction surface to apply a requisite force against the adjacent set of friction linings when the friction clutch 3101 is engaged, and a right-hand portion which serves as a carrier of the complementary ramps 3121, 3122. Still further, it is possible to non-rotatably, but axially movably, secure the ring 3118 and/or 3120 to the pressure plate 3103 and to provide the complementary ramps 3121 and/or 3122 on a separately produced part which is installed between the pressure plate 3103 and the washer-like portion of the diaphragm spring 3104 and is turnable relative to the pressure plate. All of the just enumerated modifications will be readily comprehended without additional illustrations upon perusal of the description of FIGS. 67 and 79–80.

The ring 3120 cooperates with the wear detector 3137, and more particularly with the aforementioned deformable (axially yieldable) section 3138 and its prong 3141 with abutments 3141*a*. The illustrated wear detector 3137 is made of one piece; however, it is equally possible to assemble such wear detector of two or more parts, for example, of an annulus of components each of which has at least one prong 3141 extending through a slot between two neighboring prongs of the diaphragm spring 3104 and provided with one or more abutments (3141*a*) for the ring 3120. Irrespective of its construction, the wear detector 3137 must be designed and mounted to offer a predetermined minimal resistance to deformation which suffices to ensure that the ring 3120 cannot be moved axially in the absence of any wear (or in the absence of any non-compensated additional wear) upon the friction linings of the clutch disc forming part of the friction clutch 3101. The ring 3118 is also held against rotation (e.g., in a manner as described in connection with the ring 3018 of the wear compensating unit 3017 in the friction clutch 3001 of FIGS. 59 to 66*a*) when the friction linings are still intact or subsequent to one or more adjustments but in the absence of any additional wear upon the friction lining.

The diaphragm spring 3104 is stressed relative to the housing 3102 in such a way that it continues to bear axially against the pressure plate 3103, also when the friction clutch 3101 is disengaged. In other words, the seat 3118*a* at the right-hand side of the ring 3118 is in continuous contact with and is biased by the washer-like radially outer portion of the diaphragm spring 3104. The means for biasing the diaphragm spring 3104 against the seat 3118*a* can include springs, e.g., leaf springs corresponding to the leaf springs 3015 in the friction clutch 3001 of FIGS. 59 to 66*a*. The bias of such leaf springs should suffice to ensure that the diaphragm spring 3104 will bear against the seat 3118*a* (i.e., against the ring 3118). If the pressure plate 3103 is biased toward the diaphragm spring 3104 by leaf springs (such as the springs 3015 in the friction clutch 3001 of FIG. 59) and/or by analogous resilient elements, the bias of the leaf springs must be such that the force between the pressure plate 3103 and the diaphragm spring 3104 (this force opposes the bias of the diaphragm spring 3104 upon the seat 3118*a*) must be taken into consideration. Furthermore, the means for biasing the pressure plate 3103 and the housing 3102 axially relative to each other must be designed to take into consideration the forces which develop due to inertia of axially moving parts, especially the inertia of the pressure plate 3103 as well as accelerations which develop as a result of oscillation of such axially movable parts.

When the diaphragm spring 3104 is tilted (in a clockwise direction, as viewed in FIG. 67) between the seats 3105, 3105*a* in order to effect a disengagement of the friction clutch 3101, the extent of axial movement (distance L) of the pressure plate 3103 away from the counterpressure plate is determined by the prongs 3141 of the wear detector 3137. The axial movement of the pressure plate 3103 away from the counterpressure plate is terminated when the section 3138 of the wear detector 3137 is deformed by the pressure plate (which is shifted axially toward the housing 3102 by the aforediscussed leaf springs and/or 20 by other suitable biasing means) so that the abutments 3141*a* engage the adjacent prongs 3102*b* of the housing 3102.

The mode of operation of the wear compensating unit 3117 in the friction clutch 3101 of FIG. 67 is analogous to that of the aforediscussed wear compensating unit 3017. FIG. 67 illustrates the pressure plate 3103 in an axial position corresponding to that when the wear upon the friction linings of the clutch disc is nil. When the extent of wear upon the friction linings suffices to warrant an adjustment of the axial position of the pressure plate 3103, i.e., when the pressure plate 3103 is located to the left of the position which is shown in FIG. 67 while the friction clutch 101 is engaged, the ring 3120 is free to change its angular position in order to compensate for wear upon the friction linings. This entails the development of a space (see the space 3045 in FIG. 66*a*) between the cooperating arms (not specifically shown) of the rings 3118, 3120. When the friction clutch 3101 is thereupon disengaged, the ring 3118 and the pressure plate 3103 move axially toward the end wall 3102*a* of the hosing 3102. Joint axial displacement of the ring 3120 and pressure plate 3103 toward the end wall 3102*a* results in stressing (elastic deformation) of the section 3138 of the wear detector 3137. When the distance L is reduced to zero, the axial movements of the pressure plate 3103 and ring 3120 are terminated. The extent of axial movement of the pressure plate 3103 to disengage the friction clutch 3101 is selected in such a way that, at least when the friction linings have undergone a certain amount of wear, the conicity of the diaphragm spring 3104 continues to change to a certain extent after the distance L is already reduced to zero. This results in a reduction of axial stress upon the ring 3118 and enables one or more springs (corresponding to the coil spring 3028 in the wear compensating unit 3017) to turn the ring 3118 in the same direction as the ring 3120 (which was already turned by the spring 3129 so as to establish a space corresponding to that shown at 3045 in FIG. 65*a*). The turning of the ring 3118 is completed when the width of the just mentioned space between the cooperating arms of the rings 3118, 3120 is reduced to zero (see the mutual positions of the arms 3034, 3035 in FIG. 66*a*). The ring 3118 need no longer be biased by the diaphragm spring 3104 because this ring cannot turn in a direction to move the pressure plate 3103 toward the counterpressure plate since the ring 3120 is held against rotation and prevents any further turning of the ring 3118 in a direction to compensate for wear upon the friction linings of the clutch disc in the friction clutch 3101 of FIG. 67.

Figure 68:
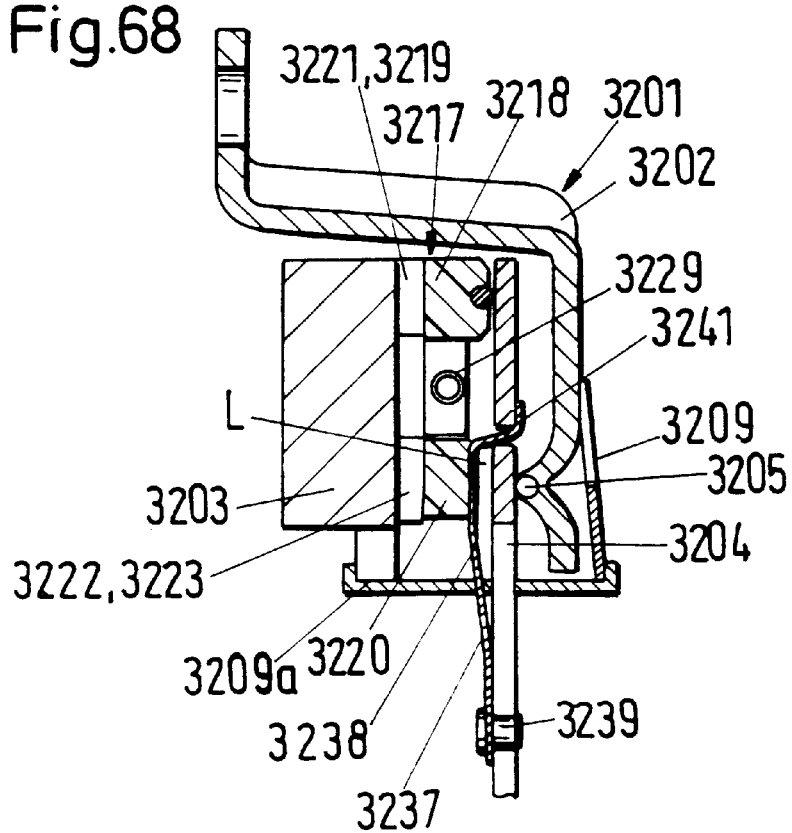
FIG. 68 is a fragmentary axial sectional view similar to FIG. 67 of a push-type friction clutch embodying a different wear compensating unit.

Referring to FIG. 68, there is shown a portion of a third push-type friction clutch 3201 wherein the diaphragm spring 3204 is biased (pulled) against the seat 3205 at the inner side of the end wall of the housing or cover 3202. The biasing means comprises an energy storing element or sensor 3209 in the form of a diaphragm spring at the outer side of the end wall of the housing 3202. The sensor 3209 operates between the end wall of the housing 3202 and the pressure plate 3203 in a direction to pull the pressure plate toward the diaphragm spring 3204. The means for connecting the sensor 3209 with the pressure plate 3203 comprises a set of U-shaped clamps 3209*a* each having a first leg engaging the radially inner portion of the sensor 3209, a second leg engaging a radially inwardly extending protuberance of the pressure plate 3203 and an axially parallel web extending through a slot between the radially inwardly extending prongs of the diaphragm spring 3204.

The illustrated sensor 3209 can be replaced by a sensor which is installed directly between the housing 3202 and the pressure plate 3203 to urge the pressure plate toward the bottom wall or end wall of the housing 3202.

The bias of the sensor 3209 in the axial direction of the pressure plate 3203 is selected in such a way that it exceeds the maximum force which is necessary to disengage the friction clutch 3201, i.e., the maximum force which is necessary to tilt the diaphragm spring 3204 about the fulcrum defined by the seat 3205. It has been found that the friction clutch 3201 operates quite satisfactorily if the bias of the sensor 3209 upon the pressure plate 3203 at least equals or approximates 1.1 times the maximum disengaging force during the entire useful life of the friction clutch 3201. However, it is also possible to employ a sensor whose bias greatly or at least considerably exceeds 1.1 times the maximum disengaging force. It is advisable to select the characteristics and the mounting of the sensor 3209 in such a way that, during the entire useful life of the friction clutch 3201, the bias of the sensor upon the pressure plate 3203 exhibits a substantially constant distance-to-force progress. This ensures that the bias of the diaphragm spring 3204 upon the pressure plate 3203 remains at least substantially constant. However, it is equally within the purview of the invention to select a sensor 3209 whose force-to-distance characteristic varies in accordance with a predetermined pattern during successive stages of adjustment by the wear compensating unit 3217, for example, to compensate for increasing bias of the resilient means (such as the leaf springs 3015 in the friction clutch 3001 of FIGS. 59 to 66*a*) in response to progressing wear upon the friction linings. These springs prevent rotation of the housing 3202 and pressure plate 3203 relative to each other while permitting the pressure plate to move axially of the housing toward and away from the counterpressure plate.

The wear compensating unit 3217 of the friction clutch 3201 shown in FIG. 68 is installed between the diaphragm spring 3204 and the pressure plate 3203 and also comprises two concentric rings 3218, 3220 with ring 3218 located radially outwardly of and spacedly surrounding the ring 3220, i.e., the same as shown in FIG. 67. The rings 3218, 3220 respectively comprise circumferentially extending arcuate sloping ramps 3219, 3223 which cooperate with complementary ramps 3221, 3222 at the adjacent side of the pressure plate 3203. The wear detector 3237 in the compensating unit 3217 is or includes a membrane or a diaphragm spring (hereinafter called membrane) having a radially inner portion which is secured to the diaphragm spring 3204 by rivets 3239 and/or in any other suitable way. The washer-like circumferentially complete radially outer portion 3238 of the membrane 3237 is spaced apart from the left-hand side of the washer-like portion of the diaphragm spring 3204 by a distance L which determines the extent of movement of the pressure plate 3203 during disengagement of the friction clutch 3201. The resilient membrane 3237 is installed in stressed condition and, to this end, the section 3238 includes axially parallel portions or lugs 3241 extending through windows in the washer-like portion of the diaphragm spring 3204 to bear against that side of the washer-like portion which confronts the end wall of the housing 3202. The purpose of the membrane 3237 is to prevent unintentional (i.e., undesirable) angular movements of the ring 3220. The rings 3218, 3220 are constructed and mounted to cooperate in a manner as described for the rings 3018, 3020 with reference to FIGS. 62 to 66a, i.e., such rings comprise arms (corresponding to the arms 3034, 3035) and are biased by springs (corresponding to the springs 3028, 3029 and one shown at 3229). 5 FIG. 68 shows the friction clutch 3201 in engaged condition. In order to disengage this clutch, the diaphragm spring 3204 is tilted in a clockwise direction, as viewed in FIG. 68, to reduce the bias upon the pressure plate 3203. The ring 3220 moves axially toward the end wall of the housing 3202, i.e., toward the washer-like radially outer portion of the diaphragm spring 3204. This causes the wear detector or membrane 3237 to store additional energy until its section 3238 reaches and comes into abutment with the diaphragm spring 3204 which, for all practical purposes, terminates the axial movement of the pressure plate 3203 away from the counterpressure plate (not shown). Thus, if the diaphragm spring 3204 continues to pivot in a clockwise direction, the bias upon the ring 3218 is relaxed but the latter does not change its angular position relative to the pressure plate 3203 if the wear upon the friction linings (not shown) is nil or subsequent to compensation for such wear and prior to development of additional wear. The reason is that the arms (corresponding to the arms 3034, 3035 shown in FIGS. 62a to 66a) abut each other so that the ring 3218 is held by the ring 3220. The latter 20 cannot turn because it is biased by the membrane 3237 against the pressure plate 3203.

If the friction linings have undergone a certain amount of wear which should be compensated for by the unit 3217, the pressure plate 3203 moves to the left with attendant change of the conicity of the diaphragm spring 3204. This results in a reduction of bias upon the ring 3220 so that this ring is free to turn to an extent which is necessary to compensate for detected wear upon the friction linings (as indicated by the extent of movement of the pressure plate 3203 beyond the axial position of FIG. 68 in a direction away from the end wall of the housing 3202). The extent of axial adjustment of the ring 3220 is limited by the membrane 3237. When the friction clutch 3201 is disengaged subsequent to such angular displacement of the ring 3220, this results in a reduction of bias upon the ring 218 (in a manner as described above with reference to the wear compensating unit 3117 in the friction clutch 3101 of FIG. 67) so that the angular position of the ring 3218 is changed by the spring or springs (such as 3229) of the turning means until the trailing arm (see the arm 3034 in FIGS. 62a to 66a) abuts the leading arm (see the arm 3035 in FIGS. 62a to 66a) of the associated ring 3220. This ensures that the axial adjustment of the pressure plate 3203 is sufficient to compensate for detected wear upon the friction linings.

The exact mode of operation of the wear compensating units 3117 and 3217 is analogous to that of the wear compensating unit 3017 (as described with reference to FIGS. 62 to 66a).

In the embodiments of FIGS. 67 and 68, wherein at least the major part of the wear compensating unit is installed between the diaphragm spring and the pressure plate, the braking action of the wear detector 3137 or 3237 increases in response to disengagement of the friction clutch, i.e., in response to axial movement of the pressure plate 3103 or 3203 toward the bottom wall or end wall of the housing 3102 or 3202.

The ring 3120 or 3220 cannot turn relative to the housing, diaphragm spring and/or pressure plate in the disengaged condition of the respective friction clutch 3101 or 3201 because such ring is then biased against the pressure plate 3103 or 3203 by the wear detector 3137 or 3237 which stores more energy than in the engaged condition of the respective clutch. In fact, the ring 3220 of FIG. 68 is forced (by the pressure plate 3203) not only against the adjacent portion or portions of the wear detector 3237, but also (indirectly) against the washer-like portion of the diaphragm spring 3204.

FIGS. 69 to 71 illustrate a portion of a so-called pull-type friction clutch 3301 wherein the radially innermost portions or tips 3210 of radially inwardly extending prongs forming part of the diaphragm spring 3304 must be pulled in a direction to the right (as viewed in FIG. 69) in order to disengage the clutch, i.e., to move the pressure plate 3303 axially and away from the counterpressure plate (not shown). The radially outer or outermost part of the washer-like radially outer portion of the diaphragm spring 3304 is tiltable relative to a circular wire-like seat 3305 which is partially recessed into the adjacent side of a ring 3338 forming part of the wear compensating unit 3317 in the friction clutch 3301. The ring 3318 is installed between the diaphragm spring 3304 and the radially extending end wall or bottom wall 3302a of the housing or cover 3302. A radially inner part of the washer-like portion of the diaphragm spring 3304 engages the projections 3313 of the pressure plate 3303, and this diaphragm spring is coupled with a wear detector 3337 having a median or main section 3338 disposed at that side of the diaphragm spring 3304 which confronts the end wall 3302. The connection between the diaphragm spring 3304 and the wear detector 3337 can include a bayonet mount. The illustrated wear detector 3337 is a diaphragm spring and the radially outer part of its section 3338 is provided with axially parallel hook-shaped portions 3341 extending through openings or windows 3304a of the diaphragm spring 3304. The surfaces surrounding the windows 3304a cooperate with the hook-shaped portions 3341 to ensure that the parts 3304, 3337 cannot be separated from each other in the direction of their common axis but the connection 3304a, 3341 permits some angular movements of the parts 3304, 3337 relative to one another so as to permit engagement or disengagement of the bayonet mount. In order to prevent any uncontrolled movements of the parts 3304, 3337 relative to one another, the washer-like portion of the diaphragm spring 3304 is further provided with openings or windows 3304b which are located radially inwardly of the windows 3304a and receive lug-shaped portions 3341a of the wear detector 3337. The ports 3341a extend in parallel with the axis of the pressure plate 3303. The arrangement is such that, when the hook-shaped portions 3341 have been caused to enter the adjacent windows 3304a and the parts 3304, 3337 are turned relative to each other to activate the bayonet mount, the lug-shaped portions 3341a penetrate into the adjacent windows 3304b to thus prevent accidental separation of the parts 3304 and 3337 from one another. The wear detector 3337 is mounted with its section 3338 in an axially stressed condition. The purpose of the wear detector 3337 is to prevent any changes in the angular position of the ring 3320 in the absence of wear upon the friction linings 3307 on the resilient segments 3316 of the clutch disc in the friction clutch 3301. The ring 3320 is concentric with, is disposed radially inwardly of and is spaced apart from the ring 3318.

The rings 3318, 3320 are respectively provided with circumferentially extending arcuate ramps 3319, 3323 which cooperate with adjacent complementary rams 3321, 3322 of the end wall 3302*a* in a manner analogous to that described with reference to the friction clutch 3001 of FIGS. 59 to 66*a*. FIG. 70 shows that the rings 3318, 3320 are further provided with arms 3334, 3335 and are biased by coil springs 3328, 3329 corresponding to the parts 3034, 3035, 3028, 3029 in the wear compensating unit 3017 of the friction clutch 3001. The coil spring 3329 extends into sockets which are provided in the confronting surfaces of the arms 3334, 3335, the same as shown in FIGS. 62*a* to 66*a*. The ring 3318 is biased by the coil spring 3328 in a direction to turn clockwise, as viewed in FIG. 70, in order to eliminate the space or gap 3345 (if any) between the arms 3344 and 3345. The coil spring 3328 surrounds a retainer 3330 of the end wall 3302*a* of the housing 3302 and bears against a radially inwardly extending portion 3331 of the ring 3318. The portion 3331 includes a U-shaped or forked portion or part 3332 which has prongs engaged by the adjacent end convolution of the coil spring 3328. It will be seen that the spring 3328, the ring 3318, the spring 3329 and the ring 3320 operate in series, the same as in the wear compensating unit 3017 of the friction clutch 3001.

The wear detector 3337 is effective to prevent any changes in the angular position of the ring 3320 until and unless the friction linings 3307 have undergone at least some wear which warrants compensation by changing the angular position of the ring 3318. The latter is held against undesired rotation by the ring 3320 and is permitted to turn only when the wear upon the friction linings 3307 warrants an adjustment.

The friction linings 3307 which are shown in FIG. 69 are assumed to be new, i.e., the wear upon such friction linings is nil. The housing 3302 is mounted on the counterpressure plate (not shown), and the friction linings 3307 and the resilient segments 3316 of the clutch disc are clamped between the friction surfaces of the pressure plate 3303 and the counterpressure plate so that the clutch disc is compelled to rotate (e.g., to drive the input shaft of a variable-speed transmission) in response to starting of the engine which drives the counterpressure plate. If the friction clutch 3301 is to be disengaged, the tips 3310 of prongs forming part of the diaphragm spring 3304 are caused to move in a direction to the right (as viewed in FIG. 69) so that the diaphragm spring is tilted on the seat 3305 and cooperates with the ring 3320 to further stress the wear detector 3337 axially until the distance or clearance L (shown in FIG. 69) is reduced to zero. Such distance determines the extent of moveability of the pressure plate 3303 in a direction toward the end wall 3302*a* in orderto disengage the friction clutch 3301. The section 3338 of the wear detector 3337 then lies flat against the adjacent side of the diaphragm spring 3304 as well as against the adjacent side or surface 3302*a* of the ring 3320.

If the pivoting or tilting of the diaphragm spring 3304 (in a direction to move the tips 3310 to the right, as viewed in FIG. 69) continues, the diaphragm spring begins to move away from the seat 3305 because it is then tilted relative to the surface 3320*a* of the ring 3320. Thus, the bias of the diaphragm spring 3304 upon the seat 3305 is relaxed so that, in the presence of wear (or additional wear) upon the friction linings 3307, the ring 3318 can be turned to compensate for such wear. It will be seen that, in a pull-type clutch 3304 of the character shown in FIGS. 69 to 71, the diaphragm spring 3304 first acts not unlike a one-armed lever (by pivoting along the seat 3305) and thereupon as a two-armed lever because it pivots along the surface 3320*a* of the ring 3320. The transition from operation as a one-armed lever to operation as a two-armed lever takes place when the distance L is reduced to zero and the diaphragm spring 3304 continues to turn in a counterclockwise direction, as viewed in FIG. 69.

The transmission ratio or lever arm of the diaphragm spring 3304 changes as a result of the transfer of pivot point or fulcrum from the seat 3305 radially inwardly toward the surface 3320*a* of the ring 3320. Such transmission ratio determines the magnitude of the force which is required to pivot the diaphragm spring 3304 during disengagement of the friction clutch 3301. If the initial transmission ratio was i, it is reduced to i−1, i.e., an increase of the clutch disengaging force can take place when the washer-like portion of the diaphragm spring 3304 moves away from contact with the seat 3305 to move into contact with the surface 3320*a* of the ring 3320. As used herein, the term "transmission ratio" or "lever arm" i is intended to denote the ratio of the distance between the locus of application of the disengaging force to the tips 3310 of the prongs forming part of the diaphragm spring 3304 and the locus of contact between the diaphragm spring and the seat 3305 to the distance between the locus of contact with the seat 3305 and the loci of contact between the diaphragm spring and the projection 3313 of the pressure plate 3303. The aforementioned change of the transmission ratio from i to i−1 is based on the assumption that the loci of contact between the diaphragm spring 3304 and the projections 3313 of the pressure plate 3303 are disposed at the same (or nearly the same) radial distance from the axis of the pressure plate as the locus or loci of contact between the diaphragm spring and the surface 3320*a* of the ring 3320. If the locus or loci of contact between the diaphragm spring 3304 and the surface 3320*a* of the ring 3320 are shifted radially outwardly toward the seat 3305, the extent to which the magnitude of the disengaging force must be increased when the diaphragm spring 3304 begins to pivot relative to the surface 3320*a* of the ring 3320 is reduced accordingly.

If the wear upon the friction linings 3307 is sufficient to warrant compensation by the ring 3318, engagement of the friction clutch 3301 results in a change of conicity of the diaphragm spring 3304, namely the tips 3310 of prongs forming part of the diaphragm spring 3304 moves further to the left, as viewed in FIG. 69. This results in a relaxation of the bias upon the ring 3320 so that the latter can be turned by the spring 3329 through an angle which is commensurate with the extent of wear. Thus, a change in the angular position of the ring 3320 precedes that of the ring 3318. Such turning of the ring 3320 relative to the ring 3318 results in the development of the space 3345 (also shown in FIG. 70) between the arms 3334 and 3335 of the respective rings 3318, 3320, and the width of this space is proportional to the required extent of angular movement of the ring 3318 in order to compensate for wear upon the friction linings 3307. When the just discussed engagement of the friction clutch 3301 is followed by the next disengagement, the bias of the diaphragm spring 3304 upon the ring 3318 is reduced (in a manner as already described hereinbefore in connection with the embodiments of FIGS. 59–66*a*, 67 and 68) and the spring 3328 is free to turn the ring 3318 (in the direction of the arrow PP in FIG. 70) so that the width of the space 3345 is reduced to zero and the unit 3317 has compensated for wear upon the friction linings 3307. The conicity of the diaphragm spring 3304 is thereby restored to that when the wear upon the friction linings 3307 is nil. As the wear upon the friction linings 3307 progresses and the ring 3318 is caused to repeatedly turn in a direction to compensate for such wear, the diaphragm spring 3304 is gradually shifted axially and away from the end wall 3302a of the housing 3302, always to the extent as determined by the ring 3320 which is turned by the coil spring 3329 prior to turning of the ring 3318 by the coil spring 3328. Each angular adjustment of the ring 3318 entails a corresponding change of conicity of the diaphragm spring 3304.

Figure 72:
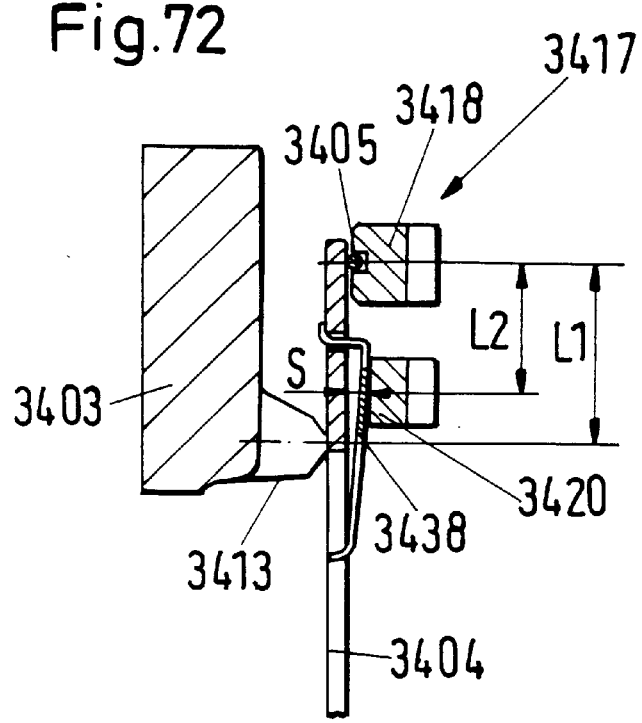
FIG. 72 is a fragmentary axial sectional view of a friction clutch and of a wear compensating unit constituting a modification of the unit shown in FIGS. 69 to 71.

The friction clutch embodying the structure of FIG. 72 has a wear compensating unit 3417 which is similar to the unit 3317 of FIGS. 69 to 71. The main difference is that the ring 3420 of the wear compensating unit 3417 is disposed between the seat 3405 for the washer-like radially outer portion of the diaphragm spring 3404 and the locations of abutment between the projections 3413 of the pressure plate 3403 and the diaphragm spring (as seen radially outwardly from the axis of the projections 3413). Thus, the diameter of the ring 3420 is relatively large (even though smaller than that of the concentric ring 3418) which ensures that, during disengagement of the friction clutch with the structure of FIG. 72, the locus of tilting of the diaphragm spring 3404 relative to the ring 3420 is closer to the ring 3418. Consequently, the increase of disengaging force during tilting of the diaphragm spring 3404 relative to the ring 3420 (rather than relative to the seat 3405) is less pronounced than in the friction clutch 3301 of FIGS. 69 to 71. The section 3438 of the wear detector is connected to the diaphragm spring 3404 by a bayonet mount in a manner analogous to that described in connection with the attachment of wear detector 3337 and diaphragm spring 3304 to each other.

In the friction clutch which embodies the structure of FIG. 72, L1 is the radial distance between the seat 3405 and the annulus of projections 3413 on the pressure plate 3403, and L2 is the radial distance between the seat 3405 and the center of the ring 3420. In this structure, the distance S covered by the section 3338 of the wear detector at the radial level of circular contact between the diaphragm spring 3404 and the ring 3420 must be selected in such a way that it at least approximates the extent of possible axial shifting of the pressure plate 3403 during disengagement of the friction clutch multiplied by L2/L1. Thus, the distance S which can be covered by the section 3438 at the radial level of the loci of contract between the ring 3420 and the diaphragm spring 3404 must be related to the maximum distance V which can be covered by the pressure plate 3403 during disengagement of the friction clutch in such a way that it at least substantially satisfies the equation $V = S \times L1/L2$.

FIG. 15 illustrates a portion of a pull-type friction clutch 3501 which comprises a wear compensating unit 3517 installed between the diaphragm spring 3504 and the pressure plate 3503 (as seen in the axial direction of the pressure plate). The radially outermost part of the washer-like radially outer portion of the diaphragm spring 3504 abuts a seat 3505 which is provided therefor at the inner side of the end wall of the housing or cover 3502, and a radially inner part of such washer-like portion of the diaphragm spring 3504 engages a circular wire-like seat at the right-hand side of the ring 3518. The arcuate ramps 3519 of the ring 3518 cooperate with complementary ramps 3521 at the adjacent side of the pressure plate 3503. The ring 3520 is located radially outwardly of, is concentric with and is spaced apart from the ring 3518. The ramps 3523 of the ring 3520 engage the adjacent complementary ramps 3519 and 3522 of the pressure plate 3503.

A resilient wear detector 3537 which can include or constitute a membrane or a diaphragm spring has a radially inner portion riveted to the diaphragm spring 3504 and a radially outer portion which abuts the ring 3520; the dimensions and the manner of mounting the wear detector 3537 are such that the force which is required to stress the part 3537 exceeds the axial adjusting force acting upon the ring 3520. In order to ensure that, in the event of axial vibrations, the pressure plate 3503 and/or the ring 3518 cannot be lifted off the diaphragm spring 3504, the pressure plate 3503 is further biased by a resilient element or sensor here shown as a diaphragm spring 3509 which reacts against the outer side of the end wall of the housing 3502 and pulls the pressure plate 3503 toward the rings 3518, 3520 in a manner similar to that already described in connection with the pressure plate 3203, rings 3218, 3220 and housing 3202 in the friction clutch 3201 of FIG. 68. The sensor 3509 ensures that the ring 3520 cannot move away from contact with the wear detector 3537.

Figure 73:
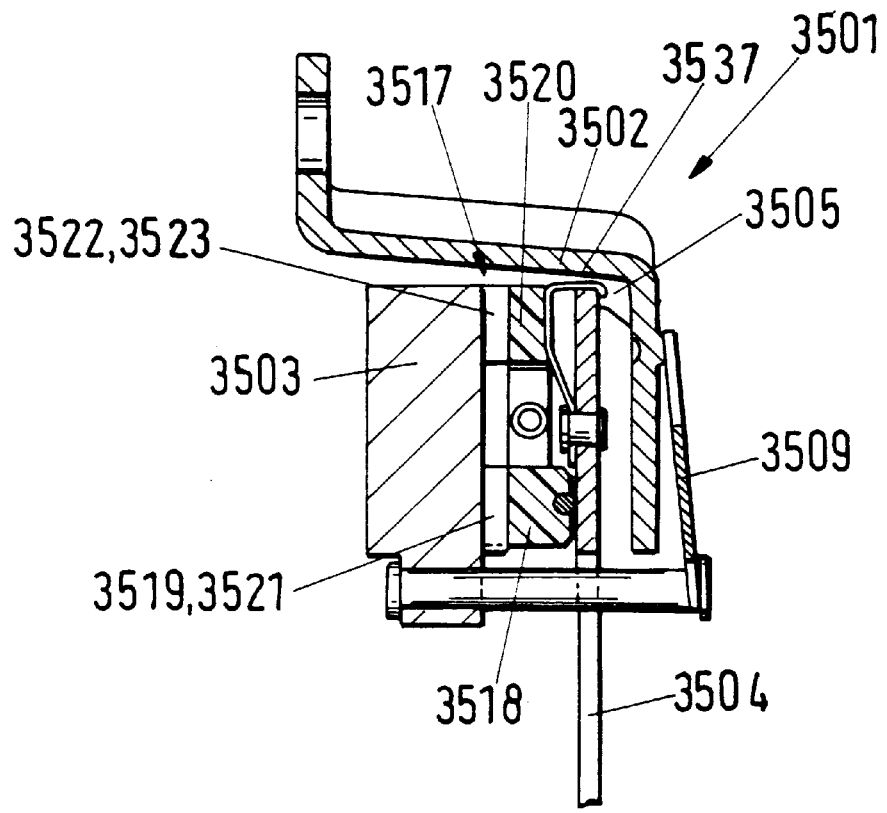
FIG. 73 is a fragmentary axial sectional view of a friction clutch and of a wear compensating unit constituting a modification of the unit which is shown in FIG. 68.

When the friction linings to the left of the pressure plate 3503 shown in FIG. 73 have undergone a certain amount of wear which warrants compensation by the unit 3517, the orientation (conicity) of the diaphragm spring 3504 is changed accordingly, namely in such a way that the radially inner portions of the diaphragm spring move in a direction to the left (as viewed in FIG. 73) to an extent corresponding to axial shifting of the pressure plate 3503 beyond its starting or zero position (i.e., toward the counterpressure plate, (not shown in FIG. 73). This results in relaxation of pressure upon the ring 3520 so that the latter can change its angular position to an extent which is necessary to compensate for wear upon the friction linings, namely to an extent which is determined by the wear detector 3537. During the next-following disengagement of the friction clutch 3501, the diaphragm spring 3504 relaxes the pressure upon the ring 3518 as soon as the pressure plate 3503 has completed the predetermined movement axially of and away from the counterpressure plate; this enables the ring 3518 to turn and to move the pressure plate toward the counterpressure plate through a distance which is commensurate with the detected extent of wear upon the friction linings.

The extent of axial movement of the pressure plate 3503 away from the counterpressure plate (i.e., toward the end wall of the housing 3502) during disengagement of the friction clutch 3501 can be determined by the diaphragm spring 3504 if the radially outermost part of the diaphragm spring is located in the path of movement of the pressure plate. However, it is equally possible to limit the extent of movement of the pressure plate away from the counterpressure plate in a different way, e.g., by providing one or more stops for a portion of the pressure plate. By way of example only, an abutment or stop for the pressure plate 3503 can be mounted or formed directly on the pressure plate 3503 so as to abut the housing 3502 and/or vice versa.

The force which is required to stress the wear detector 3537 is much smaller than the axial force which is applied to the pressure plate 3503 by the sensor 3509. Thus, the wear detector 3537 is caused to store energy by the sensor 3509 during disengagement of the friction clutch 3501.

It is of advantage, at least in many or in most instances, if the radial distance between the abutment and/or rolling-contact portions of the rings forming part of the wear compensating unit at least approximates the radial distance of the abutment for the diaphragm spring with the housing or cover from the location(s) of contact between the diaphragm spring and the pressure plate. This can ensure that, during an adjustment to compensate for wear upon the friction linings, the axial distance which is covered by the ring 3020, 3120, 3220, 3320, 3420 or 3520 at least approximates the extent of wear in the axial direction of the friction clutch.

Figure 74:
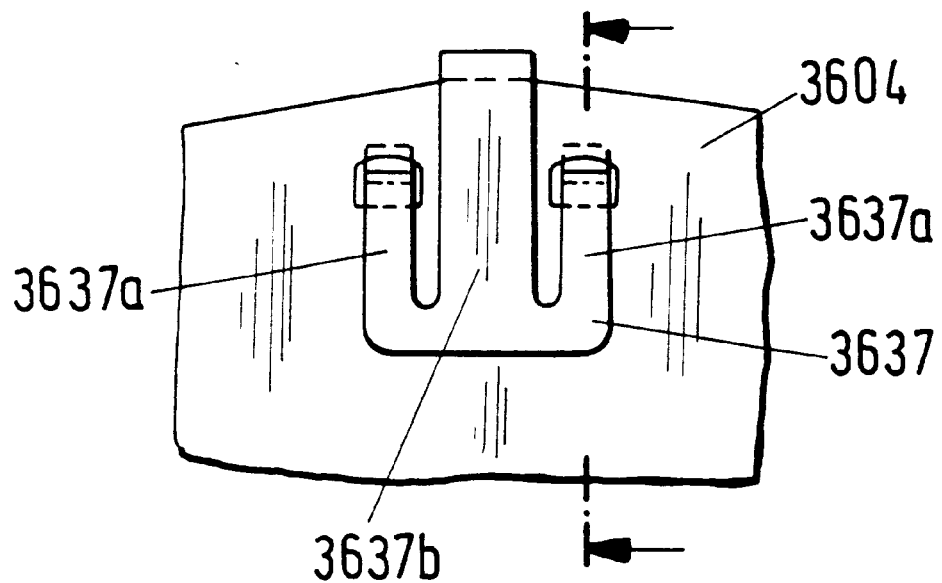
Figure 75:
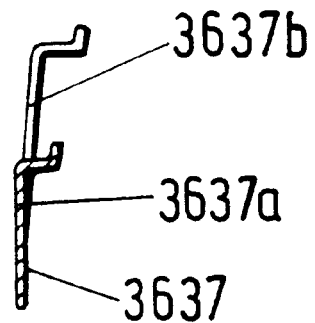
FIG. 75 is a fragmentary sectional view substantially as seen in the direction of arrows from the line LXXV—LXXV in FIG. 74.

FIGS. 74 and 75 illustrate the details of a modified resilient wear detector 3637 which is constituted by a clamp mounted on the diaphragm spring 3604. Such a wear detector is normally used with one or more additional wear detectors 3637 in preferably uniform distribution along the periphery of the diaphragm spring 3604. The illustrated wear detector 3637 is secured to the adjacent portion of the diaphragm spring 3604 by snap action. To this end, the wear detector comprises a centrally located leg or prong 3637b which engages one side of the marginal portion of the diaphragm spring 3604, and two additional legs or prongs 3637a which engage the other side of the diaphragm spring and flank the prong 3637b. The prong 3637b is substantially U-shaped and its web overlies the periphery of the adjacent portion of the diaphragm spring 3604 radially outwardly of the tips of the shorter prongs 3637a. Two or more wear detectors 3637 of the type shown in FIGS. 74 and 75 can be utilized, for example, in lieu of the wear detector 37 in the friction clutch 3001 of FIGS. 59 to 66.

Figure 78:
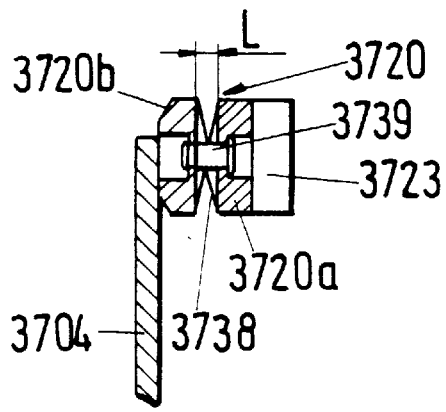
FIG. 78 is a fragmentary axial sectional view of a friction clutch and of a portion of still another wear compensating unit utilizing a composite ring with two coaxial resilient annular members.

FIG. 78 illustrates a composite ring 3720 which is assembled of a plurality of discrete sections or portions. As shown, the ring 3720 can be assembled of two sections 3720a and 3720b with at least one resilient member 3738 between them. The composite ring 3720 can be utilized, for example, in lieu of the ring 3020 in the wear compensating unit 3017 of the friction clutch 3001 shown in FIGS. 59 to 66a. This would necessitate certain modifications of the unit 3017.

The sections 3720a, 3720b of the composite ring 3720 are held against axial movement away from each other beyond the distance shown in FIG. 78 (and under the bias of the resilient member 3738) by a set of rivets 3739 (only one shown in FIG. 78). Each of the sections 3720a, 3720b is preferably a circumferentially complete annular body or member. The resilient member 3738 urges the sections 3720a, 3720b axially and away from each other so that, in the absence of the application of an opposing force, the distance between the two sections matches the maximum distance permitted by the heads of the rivets 3739 (or any other means employed to limit the extent of axial movability of the two sections away from each other).

The ramps 3723 are provided at that side or surface of the section 3720a which faces away from the section 3720b, and these ramps can cooperate with suitably configured and dimensioned complementary ramps, such as the ramps 3022 at the inner side of the end wall 3002a of the housing 3002 in the friction clutch 3001 of FIG. 59. The resilient members 3738 cooperate with the sections 3720a, 3720b of the ring 3720 to jointly constitute a wear detector corresponding to the part 3037 in the wear compensating unit 3017. The diaphragm spring 3704 biases the section 3720b of the ring 3720 at least during disengagement of the friction clutch which embodies the structure of FIG. 78 so that the resilient members 3738 then store energy or additional energy. This prevents undesirable (accidental) angular adjustment of the composite ring 3720, i.e., an unnecessary compensation for (non-existent) wear upon the friction linings.

When the section 3720b of the composite ring 3720 covers a predetermined axial distance (such as that shown at L), the distance between the sections 3720a and 3720b cannot be further reduced so that the composite ring 3720 then constitutes or defines a fulcrum for tilting of the diaphragm spring 3704 in a manner as fully described with reference to the wear compensating unit 3017 in the friction clutch 3001 of FIGS. 59 to 66a. Thus, if the composite ring 3720 is used jointly with the ring 3018 of the wear compensating unit 3017, and the diaphragm spring 3704 is tilted relative to the composite ring 3720 (i.e., subsequent to tilting along the seat 3005), the bias of the diaphragm spring 3704 upon the ring 3018 is reduced so that the ring 3018 can turn in order to compensate for wear (if any) upon the friction linings 3007. The extent of angular displacement of the ring 3018 is determined by the extent of preceding angular displacement of the composite ring 3720.

Referring now to FIGS. 79 and 80, there is shown a portion of a further friction clutch 3801 having a wear compensating unit 3817 which is similar to the unit 3517 in the friction clutch 3501 of FIG. 73. Thus, the compensating unit 3817 is installed between the diaphragm spring 3804 and the pressure plate 3803. However, the resilient wear detector 3837 of the compensating unit 3817 is affixed to and is located at that side of the diaphragm spring 3804 which confronts the end wall of the housing 3802. The rings 3818 and 3820 of the compensating unit 3817 are respectively provided with ramps 3819 and 923 which cooperate with complementary ramps 3821, 3822 on a sheet-metal attachment 3803a at the adjacent side of the pressure plate 3803. The attachment 3803a of FIGS. 79 and 80 is riveted to the main portion of the composite pressure plate 3803.

As can be seen in FIG. 80, the attachment 3803a is provided with passages 3803b (e.g., in the form of slots) which alternate with the ramps 3821 and/or 3822 to permit circulation of a coolant (such as atmospheric air) between the attachment 3803a and the main portion of the composite pressure plate 3803. The circulation of coolant can be promoted by providing the main portion of the composite pressure plate 3803 with one or more at least partially radially extending recesses or channels 3803c which communicate with the passages 3803b; this ensures even more satisfactory cooling of the composite pressure plate 3803 (including its main portion and the attachment 3803a) when the friction clutch 3801 is in use.

In order to simplify the assembly of the improved friction clutch (e.g., of the friction clutch 3001 shown in FIGS. 59 to 66a), it is advisable to provide the ring 3018 and/or 3020 of the wear compensating unit 3017 with portions or sections which are configured and/or finished and/or dimensioned in such a way that they can be readily engaged by suitable torque transmitting and/or retaining means. Such torque transmitting and/or retaining means (e.g., suitable tools or implements and hereinafter called tools for short) will be applied to maintain the compensating unit 3017 in the retracted position, namely in a position which the unit 3017 assumes when the wear upon the friction linings 3007 is nil. The tool which is necessary to maintain the compensating unit 3017 of the friction clutch 3001 in such a position is a relatively simple device which should be capable of maintaining the ring 3020 in the retracted position (in which its arm 3035 abuts the arm 3034 of the ring 3018) while the friction clutch 3001 is being assembled. The ring 3018 is automatically held in the proper staring position if the ring 3020 is properly engaged and held by the aforementioned tool. The tool is disengaged from the ring 3020 when the attachment of the housing 3002 to the counterpressure plate 3006 is completed; this results in activation of the wear compensating unit 3017, i.e., this unit is then ready to respond, when necessary, in order to turn the ring 3020 and thereupon the ring 3018 for the purpose of compensating for wear upon the friction linings 3007. Similar or analogous tools can be used to temporarily engage and hold in the starting position the rings (such as 3120, 3220, etc.) of other friction clutches which are shown in the drawings.

Another possibility of maintaining the wear compensating unit (such as 3017) of the improved friction clutch in the starting position during assembly of the friction clutch is to provide at least one suitable blocking or arresting device (not shown) which operates between the pressure plate (such as 3003) and the housing (such as 3002) and/or between the diaphragm spring (such as 3004) and the housing to hold the pressure plate and/or the diaphragm spring 3004 in a retracted or stressed position with reference to the housing. Such position of the diaphragm spring and/or pressure plate corresponds (at least) to that position of such part or parts which these parts assume when the housing is properly connected with the counterpressure plate during assembly of a new friction clutch. For example, the aforementioned arresting or blocking device or devices can include means for limiting the extent of movement of the pressure plate and/or diaphragm spring. Clamps and/or washers or the like can be used to limit the movements of these parts relative to the housing during assembly of a new friction clutch. All that is necessary is to ensure that the diaphragm spring stores sufficient energy when the assembly of the friction clutch is completed.

The improved friction clutch is susceptible of numerous additional modifications without departing from the spirit of the invention. For example, the features of the friction clutch 3001 can be combined with or replaced by certain features of the other illustrated and described friction clutches. The same holds true for the friction clutches 3101, 3201, 3301, the friction clutch embodying the structure of FIG. 71, the friction clutch 3501, the friction clutches embodying the structure of FIGS. 74 and 75 and/or FIG. 78, as well as the friction clutch 3801.

Moreover, the improved friction clutch can be modified by incorporating therein certain features of the aforediscussed prior publications and/or of the commonly owned copending patent applications. Still further, at least certain discrete elements and certain combinations of elements in the disclosed embodiments of the improved friction clutch are believed to warrant independent patent protection.

FIG. 81 illustrates a portion of a friction clutch 4001 which comprises a housing or casing 4002 and a pressure plate 4003. The pressure plate 4003 is non-rotatably coupled to the housing 4002 in such a way that it can perform limited axial movements in a direction toward the bottom wall or end wall 4002a of the housing and in a direction toward a counterpressure plate 4006, e.g., a flywheel which receives torque from the rotary output element of a combustion engine or another prime mover, not shown. A clutch spring 4004 in the form of a diaphragm spring is tiltably mounted in a composite seat 4005 at the inner side of the bottom wall 4002a and is installed in stressed condition so that it urges the pressure plate 4003 axially of the friction clutch 4001 and against the adjacent friction linings 4007 of a rotary clutch plate or clutch disc 4008. The latter is installed between the pressure plate 4003 and the counterpressure plate 4006. The counterpressure plate 4006 is non-rotatably secured to the housing 4002 by a set of bolts, screws or other suitable fasteners so that the distance between the housing and the counterpressure plate remains constant and that the housing, and hence the pressure plate 4003, is compelled to share all of the angular movements of the counterpressure plate. When the clutch 4001 is engaged, the friction surfaces of the plates 4003, 4006 bear against the adjacent friction linings 4007 of the clutch disc 4008. The latter can serve to transmit torque to a rotary input element (not shown) of a variable-speed transmission in the power train between the engine and the wheels of a motor vehicle.

The pressure plate 4003 is coupled to the housing 4002 by a set of leaf springs 4009 (only one shown in FIG. 81) which extend substantially tangentially of the pressure plate and each of which has a first end portion riveted or otherwise affixed to the pressure plate and a second end portion riveted or otherwise affixed to the radially outermost portion of the housing.

The clutch disc 4008 further comprises segment-shaped resilient carriers or back supports 4010 for the friction linings 4007. The purpose of the resilient carriers 4010 is to yield gradually in response to engagement of the clutch 4001 to thus ensure a gradual buildup of torque which is to be transmitted between the counterpressure plate 4006 (i.e., the prime mover) and the clutch disc 4008. Otherwise stated, the resilient carriers 4010 urge the two sets of friction linings 4007 axially of the friction clutch 4001 and away from each other, but can yield to ensure that the two sets of friction linings move toward each other in response to engagement of the friction clutch 4001, i.e., in response to movement of the pressure plate 4003 toward the counterpressure plate 4006 under the bias of the clutch spring 4004. This entails a progressive increase of frictional engagement between the friction surfaces of the plates 4003, 4006 and the respective sets of friction linings 4007. However, it is equally within the purview of the invention to employ a simpler clutch disc which merely includes a centrally located hub arranged to transmit torque to a shaft or to another torque receiving part, a disc-shaped non-resilient carrier which surrounds the hub, and a set of friction linings at each side of such carrier. In other words, the friction linings can be affixed to the adjacent portion of the clutch disc in such a way that they cannot move toward or away from each other in the axial direction of the friction clutch.

The clutch spring 4004 of the friction clutch 4001 comprises a washer-like main portion 4004a which can bear against the adjacent portion 4003a of the pressure plate 4003 to bias the latter against the corresponding friction linings 4007, and a set of prongs 4004b which extend from the main portion 4004a radially inwardly and have free end portions or tips 4004c engageable by a bearing or another implement (not shown) to tilt the clutch spring relative to the composite seat 4005 in a direction to move the tips 4004c toward the counterpressure plate 4006 and to thus disengage the friction clutch 4001. The clutch spring 4004 is installed adjacent the bottom end wall 4002a of the housing 4002 in such a way that a radially inner part of the main portion 4004a is tiltable at seat 4005 relative to the housing 4002 and that a radially outer part of the main portion 4004a engages the adjacent portion 4003a of the pressure plate 4003.

The composite seat 4005 comprises two seats 4011, 4012 each of which constitutes a simple wire ring. The main portion 4004a of the clutch spring 4004 is tiltable between the seats 4011, 4012, the seat 4012 is disposed between the main portion 4004a and the bottom end wall 4002a of the housing 4002, and the seat 4011 is adjacent that side of the main portion 4004a which confronts the pressure plate 4003. The seat 4011 is biased against the clutch spring 4004 by an energy storing member 4013 in the form of a diaphragm spring having a radially outer portion 4013a which reacts against the housing 4002. The radially outer portion 4013a of the energy storing member 4013 includes a plurality of arms which extend substantially radially outwardly from the main portion 4013b and each of which engages a discrete abutment 4014 of the housing 4002. The radially inner part of the main portion 4013b of the energy storing member 4013 also includes a plurality of prongs or tongues 4013c which bear against the seat 4011 and urge the latter against the respective side of the main portion 4004a of the clutch spring 4004. Thus, the main portion 4004a of the clutch spring 4004 is biased toward the bottom end wall 4002a of the housing 4002, i.e., toward the seat 4012 of the composite seat 4005. The illustrated abutments 4014 are of one piece with the housing 4002. The housing 4002 can be made of a metallic sheet material and the abutments 4014 can be stamped or otherwise formed during conversion of a sheet metal blank into the housing 4002.

It is presently preferred to connect the energy storing member 4013 to the housing 4002 by a suitable bayonet mount in such a way that the member 4013 is maintained in axially stressed condition. To this end, the arms of the radially outer portion 4013a of the member 4013 are stressed so that they can ride over the neighboring abutments 4014 during rotation of the member 4013 relative to the housing 4002 in a first direction, and the member 4013 is thereupon turned in the opposite direction until each of the arms forming part of its outer portion 4013a contacts the adjoining abutment 4014.

The clutch spring 4004 is held against rotation relative to the housing 4002 by a set of centering elements 4015 in the form of rivets having heads anchored in the bottom end wall 4002a of the housing and shanks 4015a received in slots between the neighboring radially inwardly extending prongs 4004b of the clutch spring 4004. The rivets 4015 are parallel to the axis of the friction clutch 4001; such axis is common to the housing 4002, the plates 4003, 4006, the spring 4004, the composite seat 4005, the clutch disc 4008 and the energy storing member 4013.

The energy storing member 4013 constitutes a sensor and is designed in such a way that it can bias the seat 4011 with an at least substantially constant force during a predetermined stage of tilting movement relative to the housing 4002. The leaf springs 4009 urge the pressure plate 4003 axially and away from the counterpressure plate 4006, i.e., the bias of the springs 4009 is superimposed upon the bias of the sensor 4013 as long as the springs 4009 are capable of urging the pressure plate toward the clutch spring 4004. Thus, the resultant of the axial forces generated by the leaf springs 4009 and the sensor 4013 is a so-called sensor force which is applied to the clutch spring 4004 and urges the latter against the seat 4012, i.e., toward the bottom end wall 4002a of the housing 4002. In other words, the bias of the sensor 4013 in the assembled condition of the friction clutch 4001 must be selected with a view to take into consideration the bias of the leaf springs 4009 upon the pressure plate 4003.

The bias of the leaf springs 4009 upon the pressure plate 4003 opposes the bias (axial force) of the clutch spring 4004 against the pressure plate. Thus, when the friction clutch 4001 is being assembled, the axial bias of the leaf springs 4009 upon the pressure plate 4003 (i.e., in a direction to move the pressure plate 4003 axially and away from the adjacent friction linings 4007 of the clutch disc 4008) must be smaller than the axial bias of the spring 4004 upon the portion 4003a of the pressure plate 4003 in a direction toward the counterpressure plate 4006 in the engaged condition of the friction clutch 4001. The aforementioned resultant or sensor force (namely the combined bias of the sensor 4013 and the leaf springs 4009) should balance or neutralize the disengaging force acting upon the tips 4004c of prongs 4004b forming part of the clutch spring 4004 when the clutch 4001 is disengaged, i.e., when the plates 4003, 4006 are free to rotate relative to the friction linings 4007 of the clutch disc 4008 and/or vice versa. The disengaging force is that force which is to be applied to the tips 4004c of the prongs 4004b in a direction toward the counterpressure plate 4006 in order to disengage the friction clutch 4001. The disengaging force can be applied by a bearing, by one or more levers or in any other suitable way. The disengaging force is apt to vary during disengagement of the friction clutch 4001, i.e., during movement of the tips 4004c axially of and toward the counterpressure plate 4006.

The friction clutch 4001 further comprises a compensating unit 4016 which operates between the seat 4012 of the composite seat 4005 and the housing 4002 and serves to compensate for wear upon the friction linings 4007 and, if necessary, upon additional parts (such as the pressure plate 4003, the counterpressure plate 4006, the sensor 4013 and/or the clutch spring 4004) of the friction clutch 4001. More specifically, the unit 4016 is to compensate for axial shifting of the seat 4011 and/or 4012 in a direction toward the counterpressure plate 4006. Stated otherwise, the compensating unit 4016 is to prevent the development of any undesired clearance or play between the seat 4012 and the bottom end wall 4002a of the housing 4002 and/or between the seat 4012 and the clutch spring 4004. The absence of such clearance or play between the seat 4012 on the one hand and the spring 4004 and bottom end wall 4002a on the other hand during actuation (engagement or disengagement) of the friction clutch 4001 ensures that the clutch can be operated with optimal efficiency and in a predictable manner. Axial shifting of the seats 4011, 4012 toward the counterpressure plate 4006 takes place in response to wear upon the friction surfaces of the plates 4003, 4006, upon the friction linings 4007 of the clutch disc 4008 and upon other parts (such as 4013, 4004 and/or 4009) of the improved friction clutch. The fully automatic mode of operation of the compensating unit 4016 so as to account for wear at least upon the friction linings 4007 of the clutch disc 4008 will be described in greater detail with reference to FIGS. 84, 85 and 86.

The illustrated compensating unit 4016 comprises a spring-biased adjusting member 4017 in the form of a ring having an annulus of circumferentially extending ramps 4018 which slope in the axial direction of the friction clutch 4001. The adjusting member 4017 is installed in the housing 4002 in such a way that its ramps 4018 confront and abut complementary ramps 4019 at the inner side of the bottom end wall 4002a of the housing. That side of the adjusting member 4017 which faces the clutch disc 4004 is provided with a groove serving to receive a portion of the ring-shaped seat 4012. This ensures that the seat 4012 is accurately centered relative to the housing 4002 and the clutch spring 4004. The one-piece seat 4011 and/or 4012 can be replaced with a set of arcuate sections.

The adjusting member 4017 can be made of a plastic material, preferably a heat-resistant thermoplastic substance which can be reinforced by fibers. A plastic adjusting member can be mass produced at a low cost in an injection molding or other suitable machine. The shanks 4015a of the rivets 4015 can serve as a means for centering the adjusting member 4017 of the compensating unit 4016 relative to the housing 4002. The rivets 4015 are preferably equidistant from each other as seen in the circumferential direction of the adjusting member 4017.

The ramps 4019 are complementary to the neighboring ramps 4018 on the adjusting member and can constitute integral parts of the bottom end wall 4002a of the housing 4002. For example, selected portions can be displaced from the general plane of the bottom end wall 4002a to constitute an annular array of complementary ramps 4019 each of which slopes in the axial direction of the friction clutch 4001 and abuts the neighboring ramp 4018 of the adjusting member 4017. The shaping of the complementary ramps 4019 is preferably such that they constitute bridges extending from the general plane of the bottom end wall 4002a and defining with the adjacent portions of the bottom end wall slots 4020a which permit the passage of cooling atmospheric air, at least when the housing 4002 is driven by the prime mover, e.g., when a combustion engine rotates the counterpressure plate 4006. This ensures a highly desirable and effective cooling of the friction clutch 4001. Adequate cooling of the adjusting member 4017 in the housing 4002 is particularly important when the member 4017 is made of a plastic material. The distribution of slots 4020a can be selected in such a way that a number of streams of cooling atmospheric air automatically enter the interior of the housing 4002 when the prime mover drives the counterpressure plate 4006 which, in turn, rotates the housing 4002, the pressure plate 4003, the clutch spring 4004, the sensor 4013 and the adjusting member 4017.

The slopes of the ramps 4018, 4019 of the compensating unit 4016 and their length, as measured in the circumferential direction of the adjusting member 4017, are selected in such a way that the unit 4016 can compensate for wear at least upon the friction linings 4007 during the entire useful life of the friction clutch 4001. In other words, the ramps 4018 and 4019 are dimensioned and oriented in such a way that the unit 4016 can compensate for maximum permissible wear upon the friction linings 4007 and preferably also for anticipated wear upon certain other parts (such as the plates 4003, 4006) during the useful life of the clutch 4001. Depending on the dimensions, configuration and slope of the ramps 4018, 4019, the maximum angular displacement of the adjusting member 4017 relative to the bottom end wall 4002a of the housing 4002 can be in the range of between 8° and 60°, preferably between 10° and 30°. The slope of the ramps 4018, 4019 in the axial direction of the friction clutch 4001 can be in the range of between 3° and 12°. Such slope is preferably selected with a view to ensure that, when the adjusting member 4017 is biased toward the bottom end wall 4002a of the housing 4002, the frictional engagement between the ramps 4018 and the complementary ramps 4019 suffices to prevent any slippage of the ramps 4018 relative to the complementary ramps 4019 and/or vice versa. In other words, the adjusting member 4017 should be free to turn relative to the housing 4002 only when it is necessary to compensate for wear upon the friction surfaces of the plates 4003, 4006 and/or upon the friction linings 4007 of the clutch disc 4008.

The adjusting member 4017 is biased in the circumferential direction (to slide its ramps 4018 relative to the respective complementary ramps 4019 and to thus move the seat 4012 axially of the clutch 4001 toward the counterpressure plate 4006) by coil springs 4020 (see also FIG. 82). The means for biasing the member 4017 can include a set of two, three or more preferably equidistant coil springs 4020 each of which reacts against the housing 4002 and bears upon the adjacent portion of the adjusting member. The coil springs 4020 are installed in stressed condition and the energy which is stored by such springs suffices to turn the member 4017 relative to the housing 4002 through an angle of preferably between 8° and 60°. It is presently preferred to employ three equidistant prestressed coil springs 4020 which are spaced apart from each other by 120°, as seen in the circumferential direction of the adjusting member 4017. Each of the illustrated coil springs 4020 surrounds a discrete arcuate lug 4021 forming part of he bottom end wall 4002a and being obtained by providing the wall 4002a with substantially U-shaped cutout 4022 (see particularly FIG. 82). The lugs 4021 and he U-shaped cutouts 4022 can be formed during conversion of a sheet metal blank into the housing 4002, e.g., simultaneously with the making of the complementary ramps 4019. The illustrated arcuate lugs 4021 can be replaced by lugs which extend substantially tangentially of the adjusting member 4017. The lugs 4021 may, but need not, be moved axially of the housing 4002 out of the general plane of the bottom end wall 4002a. An advantage of the illustrated lugs 4021 is that they ensure accurate guidance of the respective coil springs 4020 in the radial as well as in the axial and circumferential directions of the adjusting member 4017.

Each coil spring 4020 bears against an arm 4023 which is provided on the radially inner portion of the adjusting member 4017 and extends axially of the clutch 4001 toward the bottom end wall 4002a. The free end portion 4024 of each arm 4023 is preferably bifurcated (FIG. 82) and includes two prongs or tines 4025 which straddle the respective lugs 4021 and are engaged by the adjacent end convolutions of the respective coil springs 4020. The prongs or tines 4025 extend into the adjacent portions of the respective U-shaped cutouts 4022 of the end wall 4002a.

When the friction clutch 4001 is new, i.e., when the wear upon the friction linings 4007 and certain other parts is nil or negligible, the sloping surface of each ramp 4018 on the adjusting member 4017 overlies a maximum portion of the adjacent sloping surface on the respective complementary ramp 4019 of the bottom end wall 4002a. In other words, the adjusting member 4017, its ramps 4018 and the seat 4012 are located at a minimum axial distance from the general plane of the bottom end wall 4002a and at a maximum axial distance from the counterpressure plate 4006.

The friction clutch 4001 further comprises an additional spring 4026, here shown as a dished spring which is installed in the housing 4002 partly at one side and partly at the opposite side of the clutch spring 4004. The additional spring 4026 comprises a washer-like main portion 4027 between the clutch spring 4004 and the bottom end wall 4002a of the housing 4002. The main portion 4027 carries radially inwardly projecting tongues or prongs 4028 extending through the slots 4029 between the prongs 4004b and to the left-hand side of the spring 4004, as viewed in FIG. 81. The prongs 4004b cooperate with the tongues 4028 to accurately position the additional spring 4026 relative to the clutch spring 4004. Each of the illustrated tongues 4028 extends in part radially and in part axially of the clutch spring 4004. The free ends of tips 4030 of the tongues 4028 overlie the adjacent portions of the seat 4011 at that side of this seat which faces away from the clutch spring 4004, i.e., which confronts the pressure plate 4003. To this end, the tips 4030 are bent substantially radially inwardly toward the axis of the friction clutch 4001. The tips 4030 of the tongues 4028 are biased against the seat 4011 by leaf springs 4031 which have radially inner portions riveted to the clutch spring 4004 and radially outer portions bearing against the tongues 4028. Thus, the leaf springs 4031 cooperate with the clutch spring 4004 and with the additional spring 4026 to bias the seat 4011 axially of the friction clutch 4001 against the respective side of the clutch spring 4004. The tongues 4028 of the additional spring 4026 are staggered with reference to the tongues 4013c of the sensor 4013 in the circumferential direction of the pressure plate 4003.

Figure 83:
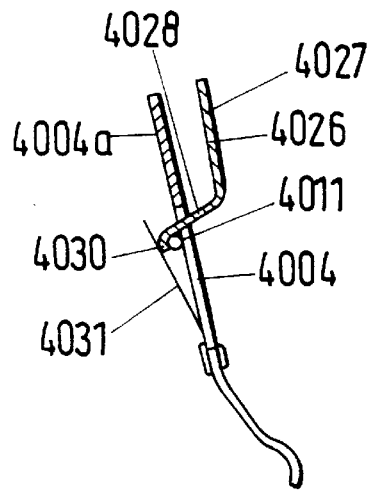
FIG. 83 is a fragmentary axial sectional view of a subassembly of parts which are utilized in the friction clutch of FIG. 81.

FIG. 83 shows that the aforedescribed parts 4004, 4026, 4011 and 4031 together constitute a module which can be conveniently installed in the housing 4002 of the friction clutch 4001. The clutch spring 4004 assumes (relative to the additional spring 4026) the position of FIG. 83 when it is unstressed or stores a minimum amount of energy.

Referring again to FIG. 81, the character 4032 denotes a clearance between the radially outer part of the main portion 4004a of the clutch spring 4004 and the adjacent radially outer part of the additional spring 4026. Such situation prevails when the friction clutch 4001 is engaged, i.e., when the clutch spring 4004 biases the pressure plate 4003 toward the counterpressure plate 4006 so that the friction linings 4007 are clamped between the friction surfaces of the plates 4003, 4006 and the clutch disc 4008 rotates with the housing 4002 when the prime mover drives the counterpressure plate 4006. The additional spring 4026 is not stressed when it cooperates with the clutch spring 4004 to define the clearance 4032. The width of the clearance 4032 is selected in such a way that the clutch spring 4004 can abut and bear against the additional spring 4026 in response to completion of a certain stage of disengagement of the friction clutch 4001, i.e., in response to completion of a certain stage of tilting of the main portion 4004a of the clutch spring 4004 relative to the composite seat 4005 including the ring-shaped seats 4011 and 4012. The just-mentioned stage of tilting of the clutch spring 4004 toward engagement with the additional spring 4026 (to thus reduce the width of the clearance 4032 to zero) is preferably completed when the friction surfaces of the plates 4003 and 4006 are at least substantially disengaged from the adjacent friction linings 4007, i.e., when the clutch disc 4008 is free to turn relative to the plates 4003, 4006 and/or vice versa. In other words, the presently preferred mode of operation of the friction clutch 4001 is such that the clutch spring 4004 contacts the additional spring 4026 (to thus reduce the width of the clearance 4032 to zero) when the counterpressure plate 4006 is no longer capable of transmitting torque to the clutch disc 4008. At the very least, the ability of the counterpressure plate 4006 to rotate the clutch disc 4008 is reduced at least close to zero when the clutch spring 4004 comes into actual contact with the additional spring 4026 as a result of elimination of the clearance 4032. For example, the width of the clearance 4032 can be selected with a view to ensure that such width equals zero (i.e., that the clutch spring 4004 contacts the additional spring 4026) shortly after the friction surfaces of the plates 4003, 4006 become disengaged from the respective friction linings 4007 of the clutch disc 4008.

The additional spring 4026 forms part of the compensating unit 4016 in that it conforms the progress of the clutch disengaging force upon disengagement of the plates 4003, 4006 from the friction linings 4007 so as to establish an optimum distance-to-force relationship. Otherwise stated, the additional spring 4026 can "linearize" the progress of the disengaging force during the last stage of disengagement of the friction clutch 4001, namely when a bearing or a system of levers or other disengaging means continues to push the tips 4004c of prongs 4004b forming part of the clutch spring 4004 toward the plates 4003, 4006 subsequent to disengagement of the plates 4003, 4006 from the respective friction linings 4007. Expressed in another way, the additional spring 4026 can be selected and mounted in such a way that the disengaging force can remain at least substantially constant during the last stage of disengagement of the friction clutch 4001, namely when the disengagement of the plates 4003, 4006 from the clutch disc 4008 is already completed. At the very least, the additional spring 4026 can ensure that the disengaging force acting upon the clutch spring 4004 subsequent to disengagement of the plates 4003, 4006 from the respective friction linings 4007 varies very little, i.e., much less than in the absence of the additional spring 4026.

The mode of operation of the friction clutch 4001 will be described below with reference to the diagrams of FIGS. 84, 85 and 86.

Figure 84:
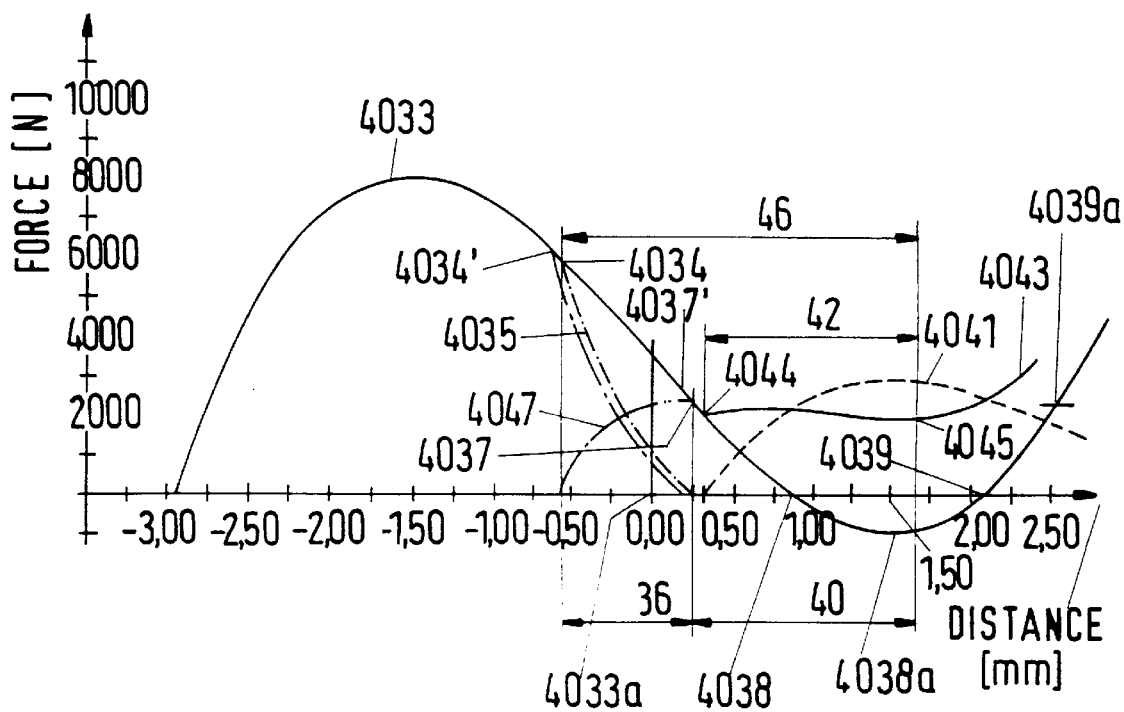
FIG. 84 is a diagram including a characteristic curve denoting the progress of a resultant axial force during deformation of the clutch spring in the friction clutch of FIG. 81.

The character 4033 denotes in FIG. 84 a characteristic curve representing the variations of the axial forces as a result of deformation of the clutch spring 4004 between two fulcra spaced apart from each other by a distance corresponding to the radial distance of the seats 4011, 4012 from the portion 4003a of the pressure plate 4003, namely the portion which is acted upon by the main portion 4004a of the clutch spring 4004. The axial forces are further influenced by the bias of the leaf springs 4009 which urge the pressure plate 4003 axially and away from the counterpressure plate 4006. The axial distance covered by the main portion 4004a of the clutch spring 4004 as a result of tilting relative to the two fulcra (at 4003a and at 4005) is measured along the abscissa and the resultant force generated by the clutch spring 4004 jointly with the leaf springs 4009 is measured along the ordinate of the coordinate system shown in FIG. 84.

The point 4034 of the curve 4033 denotes the magnitude of axial forces when the clutch 4001 is engaged, i.e., the magnitude of such forces when the clutch spring 4004 is properly installed between the pressure plate 4003 and the bottom end wall 4002a of the housing 4002 and the clutch 4001 is engaged. At such time, the clutch spring 4004 biases the pressure plate 4003 against the adjacent friction linings 4007 with a maximal force. The point 4034 can be shifted along the characteristic curve 4033 (in a direction to the left or to the right, as viewed in FIG. 84) by changing the conicity of the diaphragm spring 4004 in the engaged condition of the friction clutch 4001.

The curve 4035 of FIG. 84 denotes the force which is generated by the resilient segments 4010 of the clutch disc 4008 to bias the two sets of friction linings 4007 axially of the friction clutch 4001 and toward the friction surfaces of the respective plates 4003, 4006. Furthermore, the curve 4035 represents the bias of all other constituents which act in the same direction as the resilient segments 4010; such additional constituents include the (normally at least slightly resilient) housing 4002, the parts of the composite seat 4005, and (if used) resilient inserts between the main portion 4004a of the clutch spring 4004 and the adjacent portion 4003a of the pressure plate 4003. The spreading force or bias of the resilient segments 4010 of the clutch disc 4008 upon the friction linings 4007 opposes the bias of the clutch disc 4004 which (when the clutch 4001 is engaged) urges the pressure plate 4003 toward the counterpressure plate 4006 to thus urge the friction surfaces of such plates against the respective friction linings 4007. It is presently preferred to select the bias of the resilient segments 4010 upon the friction linings 4007 is such a way that it at least matches the bias of the clutch spring 4004 upon the adjacent pressure plate 4003 in the engaged condition of the friction clutch 4001. The resilient segments 4010 dissipate energy during disengagement of the friction clutch 4001; at such time, the segments 4010 cover the distance 4036 (as measured along the abscissa of the coordinate system shown in FIG. 84). The clutch spring 4004 also covers the distance 4036, i.e., the segments 4010 support or assist in disengagement of the friction clutch 4001. In other words, the magnitude of the disengaging force which is to be applied to disengage the friction surfaces of the plates 4003, 4006 from the respective friction linings 4007 can be reduced by a value corresponding to the bias of the resilient segments 4010 upon the respective friction linings 4007 of the clutch disc 4008. Thus, the disengaging force which is to be applied to disengage the friction clutch 4001 of FIGS. 81 to 83 can be reduced by a force corresponding to the bias of the resilient segments 4010 upon the friction linings 4007 in the engaged condition of the friction clutch 4001.

The friction linings 4007 are no longer biased by the friction surfaces of the plates 4003, 4006 at the point 4037 of the characteristic curve 4033. Due to the degressive characteristic of the respective portion of the curve 4033, the disengaging force which is to be applied to continue the disengagement of the friction clutch 4001 subsequent to disengagement of the plates 4003, 4006 from the respective friction linings 4007 is relatively small, namely much smaller than that which must be applied at the point 4034 of the curve 4033.

In the absence of the additional spring 4026, the force which is required to disengage the clutch 4001 would have to decrease until the point 4038 of the intersection of the characteristic curve 4033 with the abscissa of the coordinate system shown in FIG. 84. The axial force exerted by the clutch spring 4004 changes its direction beyond the point 4038 of the curve 4033, i.e., the spring 4004 snaps over automatically at the point 4038 and thereupon assists in further disengagement of the friction clutch 4001. The bias of the clutch spring 4004 in a direction to assist in disengagement of the clutch 4001 continues to the lowermost point 4038 of the substantially sinusoidal curve 4033. The point 4039 denotes the locus of renewed crossing of the curve 4033 with the abscissa of the coordinate system, and the magnitude of the resultant force denoted by the curve 4033 then increases toward the point 4039a. It will be seen that the force furnished by the clutch spring 4004 becomes a negative force beyond the point 4038 so that the friction clutch 4001 would automatically remain disengaged were it not for the bias of the additional spring 4026. When the resultant force denoted by the curve 4033 reaches the lowermost point 4038a, it begins to increase toward and beyond the point 4039 during further disengagement of the friction clutch 4001, i.e., the negative force of the spring 4004 decreases between the points 4038a and 4039. At the point 4039a, the positive bias of the clutch spring 4004 matches or approximates the bias at the point 4037.

The line 4033a crosses the curve 4033 at a point at which the clutch spring 4004 is at least substantially flat, namely when the main portion 4004a of the spring 4004 is located in a plane which is at least substantially normal to the axis of the clutch 4001.

As indicated by that portion of the curve 4033 which includes the points, 4037, 4038, 4038a, 4039 and 4039a, the magnitude of the disengaging force undergoes a pronounced change in the absence of the additional spring 4026, and such pronounced change takes place when the pressure plate 4003 becomes disengaged from the adjacent friction linings 4007. A pronounced change of the disengaging force is undesirable because it prevents, or renders more difficult, accurate and predictable regulation of engaging and disengaging forces during the respective stages of engagement and disengagement of the clutch 4001. This is due to the fact that, in the absence of the additional spring 4026, the bias of the clutch spring 4004 becomes negative at the point 4038 and becomes positive again at the point 4039. Such difficulties regarding accurate regulation of the engaging and disengaging forces are encountered (in the absence of the additional spring 4026) irrespective of whether the friction clutch 4001 is actuated by a foot-operated pedal or by a suitable servomotor.

The additional spring 4026 eliminates such problems in that it permits or renders possible predictable regulation of engaging and disengaging forces within the entire distance (4040 in FIG. 84) which is covered by the pressure plate 4003 during movement into and away from engagement with the adjacent friction linings 4007 of the clutch disc 4008. The characteristic curve of the force furnished by the additional spring 4026 is indicated in FIG. 84 by a broken line 4041. The curve 4041 is plotted by fully considering the distance between the locus or loci of engagement of the additional spring 4026 with the clutch spring 4004 and the locus or loci of engagement of the clutch spring 4004 with the portion or portions 4003a of the pressure plate 4003. FIG. 84,shows that the bias of the additional spring 4026 opposes the bias of the clutch spring 4004 at least while the plate 4003 covers the distance 4040 by moving axially after disengagement of the friction clutch 4001. In the illustrated friction clutch 4001, the additional spring 4026 is effective only within the portion 4042 of the distance 4040. The distance 4040 denotes that distance which is covered by the pressure plate 4003 in a direction away from the counter-pressure plate 4006 and the clutch disc subsequent to disengagement from the adjacent friction linings 4007 (at the point 4037 of the curve 4033). Thus, and as can be readily seen by looking at the curve 4041 of FIG. 84, the bias of the additional spring 4026 becomes effective only beyond the point 4037 of the curve 4033, i.e., when the pressure plate 4003 is already disengaged from the adjacent friction linings 4007. The curve 4043 is indicative of a force which is the resultant of forces denoted by the characteristic curves 4033 and 4041. The starting point of the characteristic curve 4043 is located at 4044.

The point 4044 of the curve 4033 is determined by the clearance 4032 between the radially outer part of the main portion 4004a of the clutch spring 4004 and the radially outer part of the main portion 4027 of the additional spring 4026. The distance 4040 is selected in such a way that, even when the friction clutch 4001 is completely disengaged, the disengaging force at the point 4045 of the curve 4043 (namely at the point of completed disengagement of the clutch 4001) is smaller than at the point 4037. As will be explained in greater detail hereinafter, this is desirable in order to avoid an undesired compensation for wear by the unit 4016.

The distance to be covered by the tips 4004c of the prongs 4004b forming part of the clutch spring 4004 during disengagement of the friction clutch 4001 exceeds the maximum possible distance 4046 to be covered by the pressure plate 4003 by a value corresponding to the lever arm of the clutch spring 4004. The diameter of the circle defined by the tips 4004c of the prongs 4004b of the clutch spring 4004 is shown at 4004d. The lever arm corresponds to the ratio of the radial distance between the composite seat 4005 and the tips 4004c of the prongs 4004b to the radial distance of the composite seat 4005 from the portion or portions 4003a of the pressure plate 4003. In most instances, the just-mentioned ratio is between 3:1 and 5:1; however, it is also possible to select a ratio greater or smaller than a ratio between such values. In the illustrated embodiment, the ratio is approximately 4.2:1.

The disengaging force which is applied while the pressure plate 4003 covers the distance 4040 (reference being had to the diameter 4004d of the circle defined by the tips 4004c of the prongs 4004b) is also reduced relative to that shown in FIG. 84 by a value corresponding to the aforediscussed ratio.

FIG. 84 further shows a curve 4047 denoting the variations of force which is required to disengage the friction clutch 4001 during that stage (distance 4036) when the resilient segments 4010 of the clutch disc 4008 dissipate energy by causing the two sets of friction linings 4007 to move axially of the plates 4003, 4006 and away from each other. Such force acts in the region of contact between the portion or portions 4003a of the pressure plate 4003 and the clutch spring 4004. The force denoted by the curve 4047 of FIG. 84 constitutes the difference between the force denoted by the curve 4033 intermediate the points 4034 and 4037 and the force denoted by the curve 4035, i.e., the force furnished by the resilient segments 4010. The magnitude of such force in the region of the circle having the diameter 4004*d* and defined by the tips 4004*c* of the prongs 4004*b* departs from (it is smaller than) that of the force denoted by the curve 4047 depending on the lever arm of the clutch spring 4004. However, the axial distance to be covered in the region of the circle having the diameter 4004*d* exceeds (as a function of the lever arm of the spring 4004) the distance 4036 (covered by the resilient segments 4010) during axial movement of the two sets of friction linings 4007 axially of the clutch 4001 and away from one another.

When the friction clutch 4001 is designed in a manner as explained with reference to FIGS. 81 to 84, only the clutch spring 4004 is tilted during a certain stage of disengagement of the clutch, and such stage is followed by a different stage when the clutch spring 4004 reduces the clearance 4032 to zero 20 by coming into actual contact with the additional spring 4026. During such (different) second stage of disengagement of the clutch 4001, the clutch spring 4004 changes its shape jointly with the additional spring 4026. This is denoted by the curve 4043 which is indicative of the resultant of forces denoted by the curves 4033 and 4041. The resultant force denoted by the curve 4043 is effective at least while the pressure plate 4003 covers the entire distance 4040 or at least a portion of such distance. FIG. 84 shows that the minimal force exerted by the clutch spring 4004 during disengagement of the friction clutch 4001 can be very small and can even be negative (with a lowermost value at 4038*a*), i.e., it can decrease to below the abscissa of the coordinate system shown in FIG. 84. In such instance, the clutch spring 4004 constitutes a so-called snap-over spring in that it is capable of assuming a stressed condition even when not acted upon by an external force. As a rule, the additional spring 4026 is effective at least during that stage of actuation of the friction clutch 4001 when the force denoted by the curve 4033 reaches or is close to the point 4038*a*.

The additional spring 4026 ensures that the magnitude of the force acting during disengagement of the friction clutch 4001 while the pressure plate 4003 continues to move away from the counterpressure plate 4006 through the distance 4040, i.e., subsequent to disengagement from the adjacent friction linings 4007, is at least substantially constant or, at the very least, fluctuates much less than in the absence of the spring 4026. Actually, the spring 4026 necessitates the application of a greater disengaging force while the pressure plate 4003 covers the distance 4040; however, this compensates for the rapid drop of the force which is being applied by the clutch spring 4004 with the result that the magnitude of the forces applied jointly by the springs 4004 and 4026 varies very little or not at all. This contributes to the convenience of the application of the friction clutch 4001 and renders it possible to actuate the clutch with a higher degree of accuracy.

Figure 85:
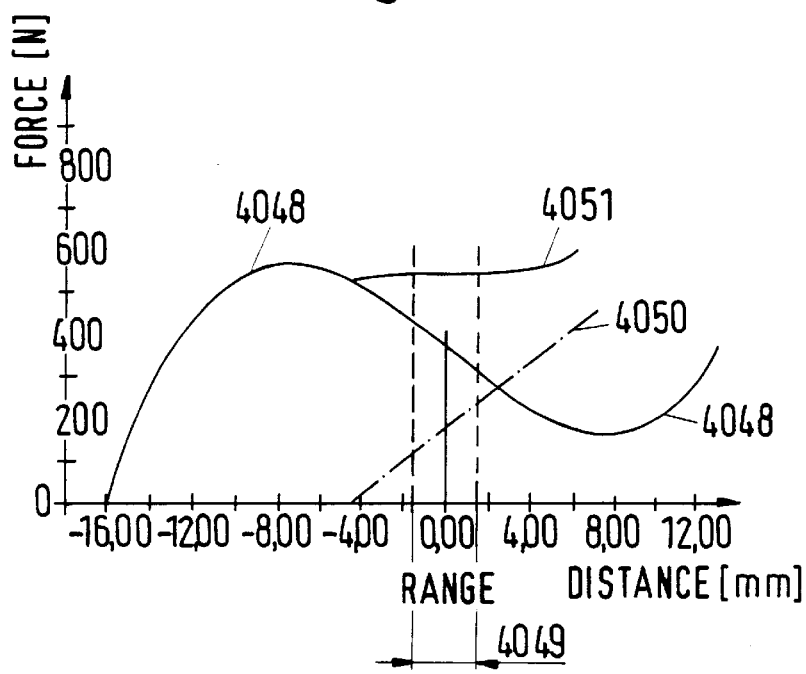
FIG. 85 is a similar diagram showing a characteristic curve of a resilient sensor in the friction clutch of FIG. 81.

The curve 4048 in the coordinate system of FIG. 85 denotes the variations of the magnitude of the force which is being applied by the sensor 4013 (which, in the embodiment of FIGS. 81 to 86, is a diaphragm spring) as a function of the distance covered by the sensor. The sensor 4013 starts to cover such distance when it is caused to change its conicity starting from an unstressed condition to a condition of stress as measured along the ordinate. The conicity of the sensor 4013 changes in that the sensor is tilted at 4014 because its tongues 4013*c* move in the axial direction of the clutch 4001. The sensor 4013 spans the radial distance between the circle defined by the abutments 4014 and the wire-like seat 4011 of the composite seat 4005 for the clutch spring 4004.

The overall force acting upon the clutch spring 4004 during disengagement of the friction clutch 4001 subsequent to disengagement of the pressure plate 4003 from the adjacent friction linings 4007 and urging the spring 4004 toward the end wall 4002*a* of the housing 4002, i.e., against the seat 4012 at the inner side of the bottom end wall 4002*a*, is a sum of forces generated primarily by the leaf springs 4009, by the sensor 4013, and by the disengaging force applied (by a bearing or by levers) to the tips 4004*c* of the prongs 4004*b*. The leaf springs can be designed and mounted (between the housing 4002 and the pressure plate 4003) in such a way that their bias (axial force) upon the clutch spring 4004 increases in response to increasing wear upon the friction linings 4007 while the spring 4004 covers the distance 4046 (FIG. 84) during engagement of the clutch. Such increasing bias during the stage 4049 of action upon the clutch spring 4004 is indicated in FIG. 85 by a phantom-line curve 4050. The bias of the leaf springs 4009 increases in a manner as indicated by the curve 4050 of FIG. 85 during compensation (by the unit 4016) for wear upon the friction linings 4007. FIG. 85 further shows that, as the bias of the sensor 4013 increases, the restoring or resetting bias of the leaf springs 4009 upon the pressure plate 4003 (and hence the bias of the springs 4009 upon the clutch spring 4004) increases. The curve 4051 denotes in FIG. 85 the sum of forces denoted by the curves 4048 and 4050 and hence the force which the springs 4009 and the sensor 4013 apply to the clutch spring 4004 in the axial direction of the clutch 4001. It will be seen that, by properly selecting the initial stressing of the leaf springs 4009, one can reduce the bias of the sensor 4013 at least within the distance 4049. In other words, and as denoted by the curve 4048, the progress of this curve within the distance 4049 is or can be negative or can at least decrease because the bias of the leaf springs increases in a manner as denoted by the curve 4050.

The initial bias and mounting of the leaf springs 4009 can be selected in such a way that, in addition to the aforedescribed advantages, the leaf springs also serve to obviate the need for the application of a more pronounced disengaging force due to aging (reduced bias) of the resilient segments 4010 and/or due to penetration of the segments 4010 into the material of the neighboring linings 4007. This is shown in FIG. 85 by the curve 4051 denoting that force which is the resultant of forces denoted by the curve 4048 (sensor 4013) and the curve 4050 (leaf springs 4009). The curve 4051 can be horizontal (parallel to the abscissa) or can slope slightly upwardly and away from the abscissa of the coordinate system shown in FIG. 85. The result of such selection and mounting of the leaf springs 4009 is that the operating point 4034 (FIG. 84) of the clutch spring 4004 remains at least substantially unchanged in response to repeated engagement and disengagement of the friction clutch 4001, i.e., that the distance (4046 in FIG. 84) to be covered during engagement of the clutch 4001 remains at least substantially unchanged. This, in turn, ensures that the clutch spring 4004 is capable of applying to the pressure plate 4003 an at least substantially constant force during repeated engagement and within the entire useful life of the improved friction clutch 4001.

It is further desirable to design the friction clutch 4001, and more specifically the characteristic curve of the sensor 4013 and/or the characteristic curve of the set of leaf springs 4009 with a view to take into consideration the adjusting force which is being applied to the adjusting member 4017 of the compensating unit 4016 by the coil springs 4020 for the purpose of compensating for wear at least upon the friction linings 4007 of the clutch disc 4008. The bias of the coil springs 4020 upon the adjusting member 4017 is counter to the bias of the sensor 4013 and the leaf springs 4009.

In designing and assembling the friction clutch 4001 in such a way that the leaf springs 4009 are installed in a prestressed condition, it is further desirable to take into consideration that the selected initial bias of the springs 4009 influences the force which the pressure plate 4003 applies to the adjacent friction linings 4007 and which acts in the axial direction of the clutch. This is necessary because the prestressed leaf springs 4009 urge the pressure plate 4003 axially and away from the counterpressure plate 4006, i.e., the effective bias of the clutch spring 4004 upon the pressure plate is reduced by the initial bias of the leaf springs 4009. Otherwise stated, the actual bias upon the pressure plate 4003 in a direction toward the clutch disc 4008 and counterpressure plate 4006 is the resultant of force applied by the clutch spring 4004 in a direction toward the counterpressure plate and force applied by the prestressed leaf springs 4009 in the opposite direction (namely, away from the counterpressure plate).

As already mentioned before, the curve 4033 denotes the bias of the clutch spring 4004 when the wear upon the friction linings 4007 is nil or negligible. The configuration of this curve within the range 4046 (distance covered by the pressure plate 4003 to reengage the clutch) is indicative of variations of the bias of the spring 4004 during engagement of the friction clutch 4001. The leaf springs 4009 of the clutch 4001 (when the wear upon the friction linings 4007 is nil) are assumed to have been installed in prestressed condition. If the pressure plate 4003 can move closer to the counterpressure plate 4006, for example as a result of a certain amount of wear upon the friction linings 4007, the resultant force necessary to disengage the friction clutch would be changed (reduced) because the bias of the prestressed leaf springs 4009 upon the pressure plate 4003 increases as the latter moves closer to the counterpressure plate 4006. The bias of the prestressed leaf springs 4009 in a direction to urge the pressure plate 4003 axially and away from the counterpressure plate 4006 is due to the tiltability of the spring 4004 at the composite seat 4005 while the radially outer part of the major portion 4004a of the spring 4004 engages the portion or portions 4003a of the pressure plate 4003.

It is desirable and important to design the friction clutch 4001 in such a way that the bias of the leaf springs 4009 upon the clutch spring 4004 (by way of the pressure plate 4003) in response to wear upon the friction linings 4007 increases at a rate less than (or at most equal to) the increase of the bias in the region of the tips 4004c of prongs 4004b (diameter 4004d) as a result of the same wear upon the friction linings. The bias in the region of the tips 4004c is increased for the purpose of tilting the sensor 4013 preparatory to a movement of the seats 4011, 4012 in a direction toward the counterpressure plate 4006 in order to compensate for wear upon the friction linings 4007. In the absence of such selection of the bias of the leaf springs 4009, the pressure of the plate 4003 upon the adjacent friction linings 4007 in the engaged condition of the clutch 4001 would decrease, the same as the bias of the spring 4004 upon the seat 4011 during disengagement of the plate 4003 from the adjacent friction linings. In other words, the clutch 4001 would be incapable of automatically compensating for wear upon the friction linings 4007 because the points 4034 and 4037 of the curve 4033 shown in FIG. 84 would have migrated toward the abscissa, i.e., in a direction toward a minimal bias.

The curve 4051 of FIG. 85 indicates that the progress of the resultant of the forces denoted by the curves 4048 (sensor 4013) and 4050 (leaf springs 4009) is at least substantially parallel to the abscissa or slopes upwardly and away from the abscissa, at least within the distance 4049. Thus, the magnitude of the resultant force denoted by the curve 4051 is such that it at least approximates the force at the point 4037 of the curve 4033 which is shown in FIG. 84, i.e., the corresponding value of the disengaging force to be applied to the friction clutch 4001. The resultant supporting force which is to be applied by the sensor 4013 and the leaf springs 4009 is less than the force denoted by the point 4037 of the curve 4033 and supplied by the clutch spring 4004 by a value denoting the lever arm of the spring 4004.

The sensor 4013 is installed in the friction clutch 4001 in such a way that the sensor can cover, in the region of the composite seat 4005, an axial distance toward the friction linings 4007 which at least matches that distance covered by the pressure plate 4003 in a direction toward the counterpressure plate 4006 which is necessary to compensate for at least some wear, particularly for the wear upon the friction linings and the wear upon the friction surfaces of the plates 4003 and 4006. The at least substantially linear progress of the curve 4051 within the distance 4049 can and preferably does take place at least while the pressure plate 4003 moves toward the counterpressure plate 4006 in order to compensate for wear upon the friction surfaces of the plates 4003, 4006 and/or upon the friction linings 4007. This ensures that the friction clutch 4001 can compensate for at least some tolerances developing during the assembly of its components into a structure corresponding to that shown in FIG. 81.

In order to arrive at the point 4037 on the curve 4033 of FIG. 84 during each of a series of successive disengagements of the friction clutch 4001, i.e., to ensure that the pressure plate 4003 is disengaged from the adjacent friction linings 4007 when the magnitude of the resultant force denoted by the curve 4033 is at the point 4037, one can resort to so-called twin resilient segments between the two sets of friction linings 4007. Such twin resilient segments comprise pairs of springs which are installed back-to-back between the two sets of friction linings 4007, and the springs of each pair are installed in prestressed condition so that they urge the adjacent friction linings 4007 of the two sets of such linings axially of the friction clutch 4001 and away from each other before the friction linings are clamped between the friction surfaces of the plates 4003 and 4006. Such prestressing of pairs of springs between the two sets of friction linings 4007 ensures that the pairs of springs can compensate for at least some penetration into the adjacent friction linings, e.g., to compensate for any and all penetration of the prestressed springs into the adjoining friction linings 4007. As a rule, the resilient segments 4010 or the pairs of springs which are used to replace such resilient segments will tend to penetrate into the adjacent relatively soft or yieldable friction linings 4007 at those sides of the two sets of friction linings which face away from the pressure plate 4003 and the counterpressure plate 4006, respectively.

For example, the initial stressing or prestressing of pairs of springs which replace the illustrated resilient segments 4010 can be within the range of between 0.2 mm and 0.6 mm. The extent of dissipation of energy by the aforementioned pairs of springs between the two sets of friction linings 4007 can be limited by suitable stops and the initial stressing of such pairs of springs can be selected with a view to ensure that the pressure plate 4003 is arrested at a preselected maximum distance from the counterpressure plate 4006 when it completes the distance 4036 shown in FIG. 84 under the bias of the resilient segments 4010 or suitable equivalents (e.g., pairs of springs which are disposed back-to-back) of such segments. In order to ensure that the segments 4010 or their equivalents can dissipate energy which suffices to move the pressure plate 4003 through the distance 4036 during each of a series of successive disengagements of the friction clutch 4001, it is advisable to provide abutments or stops (not specifically shown) which limit the maximum extent of movement of the pressure plate 4003 away from as well as toward the counterpressure plate 4006 under or against the bias of the segments 4010 or their equivalents. Suitable pairs of prestressed springs which can be utilized in lieu of the resilient segments 4010 shown in FIG. 81 are disclosed, for example, in published German patent application Serial No. P 42 06 880.0. The entire disclosure of this German application is incorporated herein by reference.

In order to ensure optimal operation of the friction clutch 4001, particularly automatic compensation for wear upon the friction surfaces of the plates 4003, 4006 and/or the friction linings 4007, it is advisable to select the progress of the curve 4052 (FIG. 86) denoting the resultant force furnished by the resilient segments 4010, the leaf springs 4009 and the sensor 4013 and acting upon the spring 4004 during movement of the pressure plate 4003 away from the counterpressure plate 4006, but still in contact with the adjacent friction linings 4007 and thereupon only by the sensor 4013, and the leaf springs 4009 (while the pressure plate moves away from engagement with the adjacent friction linings 4007) in such a way that it is at least slightly greater than or at least matches the force acting at the tips 4004c of the prongs 4004b to disengage the friction clutch 4001.

Figure 86:
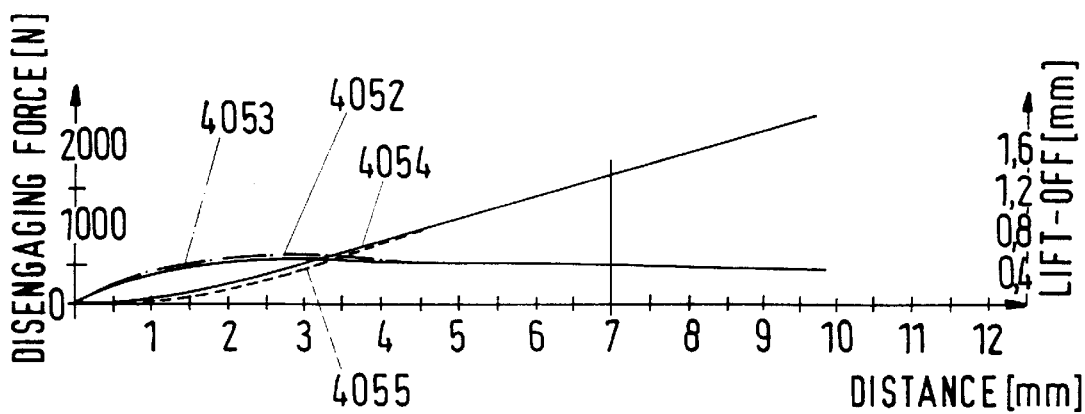
FIG. 86 is a diagram similar to FIG. 85 showing a characteristic curve denoting the progress of the disengaging force in the friction clutch of FIG. 81.

The preceding description of the construction and the mode of operation of the friction clutch 4001 of FIGS. 81 to 86 is based on a specific mode of installing the clutch spring 4004 and prior to any wear upon the friction surfaces of the plates 4003, 4006, upon the clutch spring 4004, upon the seats 4011, 4012, upon the sensor 4013 and/or upon the friction linings 4007. When the just enumerated parts (mainly the friction linings 4007 and possibly also the friction surfaces of the plates 4003, 4006) have undergone a certain amount of wear, the pressure plate 4003 moves toward the counterpressure plate 4006 with the result that the conicity and hence the bias of the clutch spring 4004 upon the pressure plate 4003 in the engaged condition of the friction clutch 4001 is changed accordingly. More specifically, the bias of the clutch spring 4004 upon the pressure plate 4003 increases. This causes the point 4034 of the curve 4033 (FIG. 84) to migrate toward the point 4033' and the point 4037 of the curve 4033 to migrate toward the point 4037'. This results in a departure from a state of equilibrium which existed during disengagement of the clutch 4001 between the bias of the clutch spring 4004 and the bias of the sensor 4013 in the region of the seat 4011. The increasing bias of the clutch spring 4004 which is attributable to wear primarily (but not necessarily exclusively) upon the friction linings 4007 causes a shifting of the progress of the disengaging force toward a higher value, i.e., toward a greater disengaging force. The thus achieved progress of the disengaging force is denoted by the phantom-line curve 4053 which is shown in FIG. 86. As the magnitude of the required disengaging force increases, each disengagement of the friction clutch 4001 takes place by overcoming the axial force which the sensor 4013 and the leaf springs 4009 apply to the clutch spring 4004 with the result that the sensor 4013 yields in the region of the composite seat 4005 by moving through an axial distance corresponding to or at least approximating the extent of wear primarily upon the friction linings 4007. During such deformation of the sensor 4013, the clutch spring 4004 is tilted at the portion or portions 4003a of the pressure plate 4003, i.e., the conicity of the clutch spring 4004 is changed together with the amount of energy which is stored therein which, in turn, results in a change of the bias of the spring 4004 upon the pressure plate 4003, seat 4011 and sensor 4013. This entails a reduction of the bias of the clutch spring 4004 (reference should be made to FIG. 84). Such reduction of the bias of the clutch spring 4004 takes place until the axial force of the spring 4004 upon the sensor 4013 at the seat 4011 matches (i.e., is in a state of equilibrium with) the combined bias of the sensor 4013 and the leaf springs 4009. With reference to FIG. 84, this means that the points 4034' and 4037' migrate back toward the points 4034 and 4037, respectively. Once the state of equilibrium is actually achieved, the pressure plate 4003 is again free to become disengaged from the adjacent friction linings 4007. During the just-outlined adjustment to account for the wear at least upon the friction linings 4007, the coil springs 4020 are free to change the angular position of the adjusting member 4017 of the compensating unit 4016 relative to the bottom end wall 4002a of the housing 4002 with the result that the ramps 4018 slide relative to the complementary ramps 4019 and the seat 4012 is moved away from the bottom end wall 4002a, i.e., in a direction toward the counterpressure plate 4006. The extent of axial movement corresponds to the extent of wear at least upon the friction linings 4007 of the clutch disc 4008. Thus, there is no play between the composite seat 4005 and the bottom end wall 4002a of the housing 4002 because the compensating unit 4016 has performed the function of compensating for the wear at least upon the friction linings 4007.

When the compensation for wear at least upon the friction linings 4007 is completed, the progress of the clutch disengaging force again corresponds to that denoted by the curve 4052 in the diagram of FIG. 86. The curves 4054 and 4055 in the diagram of FIG. 86 denote the axial distance covered by the pressure plate 4003 when the force-distance progress corresponds to those respectively denoted by the curves 4052 and 4053.

In actual use of the improved friction clutch 4001, the compensating unit 4016 is called upon to move the seat 4012 axially of and away from the bottom end wall 4002a of the housing 4002 at frequent intervals and by small or extremely small increments. Thus, the extent of shifting of various points of the curves shown in FIGS. 84, 85 and 86 is greatly exaggerated for the sake of clarity.

Certain operational parameters and/or operating points can change or shift their positions in actual use of the improved friction clutch 4001, especially during an extended period of use. For example, improper actuation of the friction clutch can result in overheating of the resilient segments 4010 between the friction linings 4007 of the clutch disc 4008, and this can result in a reduced bias of the segments 4010. Such reduction of bias or setting of the resilient segments 4010 can be counteracted by appropriate selection of the characteristic curve 4033 of the clutch spring 4004 and/or by appropriate selection of the characteristic curve 4050 of the leaf springs 4009 and/or by appropriate selection of the characteristic curve 4048 of the sensor 4013.

The means (such as the aforedescribed leaf springs 4009) for transmitting torque between the housing 4002 and the pressure plate 4003 can be designed with a view to ensure that such means can furnish the entire force which is necessary to adequately prop the clutch spring 4004 during disengagement of the friction clutch 4001. This means that the sensor 4013 constitutes an optional constituent of the friction clutch 4001 because it can be omitted if the means for transmitting torque between the housing 4002 and the pressure plate 4003 is designed in the just-outlined manner. Care should be taken to ensure that, if the sensor 4013 is omitted, the torque transmitting means (such as the leaf springs 4009) will be capable of ensuring proper operation of the compensating unit 4016 during the entire useful life of the friction clutch, i.e., that the progress of the curve corresponding to the curve 4050 in the diagram of FIG. 85 ensures reliable compensation for wear at least upon the friction linings 4007 during each and every stage of the anticipated or actual useful life of the friction clutch.

Figure 87:
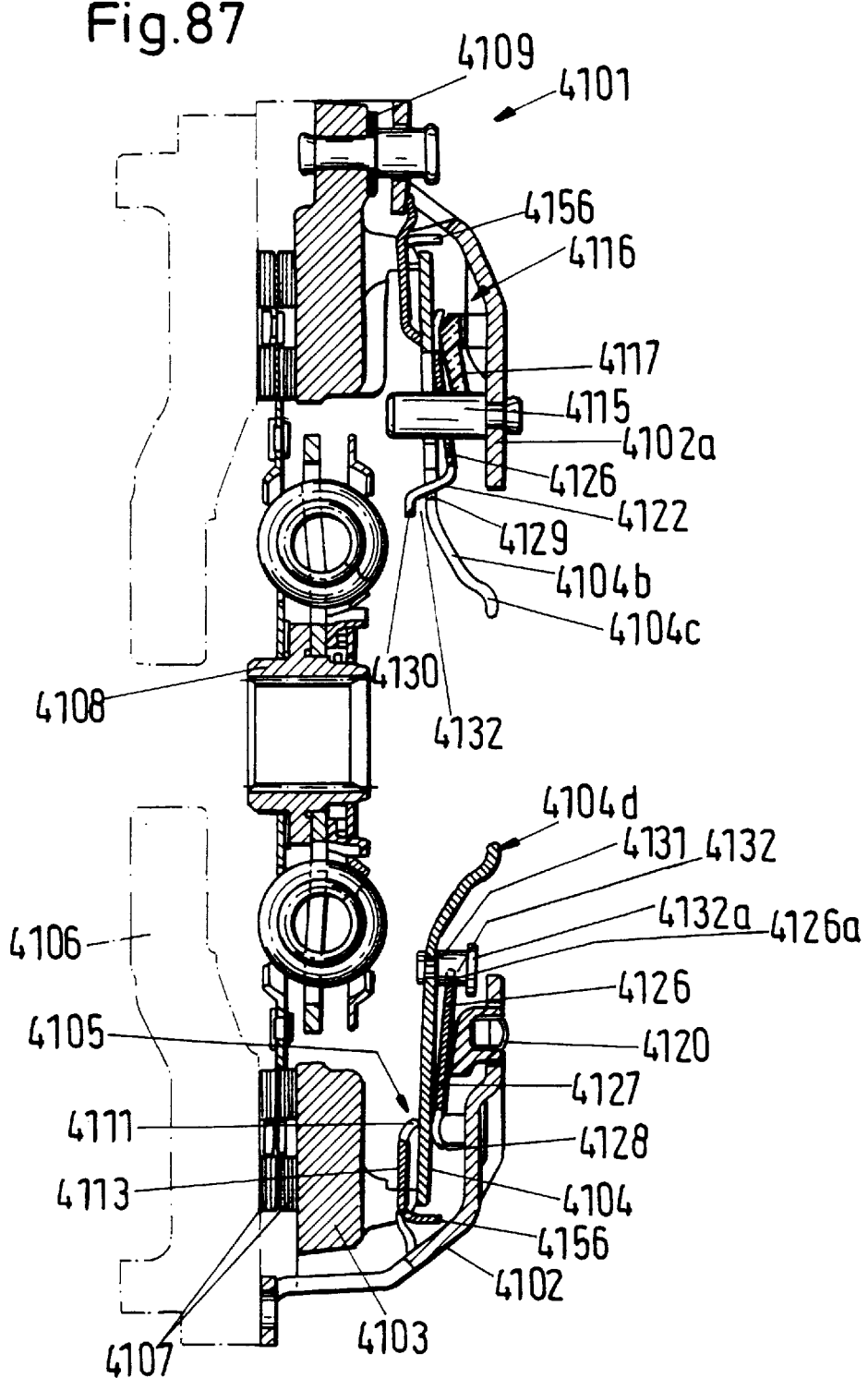
FIG. 87 is an axial sectional view of a torque transmitting apparatus employing a friction clutch which constitutes a modification of the friction clutch shown in FIG. 81.

FIG. 87 illustrates a portion of a torque transmitting apparatus including a friction clutch 4101 which constitutes a modification of the friction clutch 4001 of FIGS. 81 to 83. The friction linings 4107 of the clutch plate or clutch disc 4108 can be clamped between the friction surface of an axially movable pressure plate 4103 and the friction surface of a counterpressure plate 4106. The latter can constitute a flywheel or one flywheel of a composite flywheel receiving torque from the combustion engine of a motor vehicle or from another prime mover. A clutch spring 4104 (here shown as a diaphragm spring) is installed in the housing 4102 between the bottom end wall 4102*a* and the pressure plate 4103 and is tiltable between the seats of a composite seat 4105. The seat 4111 of the composite seat 4105 for the clutch spring 4104 is constituted by a diaphragm spring 4113 which performs the function of the sensor 4013 in the friction clutch 4001 of FIGS. 81 to 83 and which is designed to ensure that the clutch spring 4104 is tilted at 4111 during disengagement of the friction clutch 4101. The sensor 4113 is installed in and reacts against the housing 4102 and is disposed in the space between the major portion of the pressure plate 4103 and the clutch spring 4104. This sensor applies to the clutch spring 4104 an axially oriented force (at the seat 4111) which opposes the force being applied by the clutch disengaging means (e.g., a bearing or a set of levers) to the tips 4104*c* of prongs 4104*b* forming part of the spring 4104 in order to enable the leaf springs 4109 to move the pressure plate 4103 axially toward the bottom end wall 4102*a* so that the clutch disc 4108 can turn relative to the plates 4103, 4106 and/or vice versa. The diameter of the circle defined by the tips 4104*c* of the prongs 4104*b* is shown at 4104*d*.

The friction clutch 4101 of FIG. 87 further comprises a compensating unit 4116 which is installed between the bottom end wall 4102*a* of the housing 4102 and the clutch spring 4104 and includes a turnable ring-shaped adjusting member 4117. The latter can be turned by one or more springs 4120 (e.g., coil springs corresponding to the springs 4020 forming part of the compensating unit 4016) to an extent and at a frequency required to compensate for wear at least upon the friction linings 4107 of the clutch disc 4108. The mode of operation of the compensating unit 4116 is identical with or analogous to that of the compensating unit 4016 and will not be described again. Reference should be had to the description of the construction and mode of operation of the compensating unit 4016 in the friction clutch 4001 of FIGS. 81 to 83 and to the relevant passages of the description of diagrams shown in FIGS. 84, 85 and 86.

The additional spring 4126 of the friction clutch 4101 is installed radially inwardly of the seat 4105 for the clutch spring 4104 and becomes active when the pressure plate 4103 is disengaged from the adjacent friction linings 4107. The purpose of the additional spring 4126 is to ensure a predictable and optimal progress of the disengaging force during movement of the pressure plate 4103 axially of and away from the counterpressure plate 4106. An advantage of the feature that the additional spring 4126 is installed radially inwardly of the composite seat 4105 (as compared with the mounting of the additional spring 4026 radially outwardly of the seat 4005) is that the additional spring 4126 is smaller, i.e., the utilization of an additional spring radially inwardly of the seat for the clutch spring results in considerable savings in the material of the spring 4126.

As can be seen in FIG. 87, the additional spring 4126 is installed between the adjusting member 4117 of the compensating unit 4116 and the clutch spring 4104 (as seen in the axial direction of the friction clutch 4101). This additional spring comprises a main portion 4127 provided with radially outwardly extending arms 4128 which are or can be uniformly distributed in the circumferential direction of the spring 4126 and are clamped or otherwise retained between the adjusting member 4117 and the clutch spring 4104 in the region of the composite seat 4105. The arms 4128 have arcuate tips which engage the respective side of the clutch spring 4104.

The upper half of FIG. 87 shows that the additional spring 4126 can be provided with prongs or tongues 4122 which are of one piece with the main portion 4127 and include portions bent in the axial direction of the friction clutch 4101 in such a way that they extend through slots 4129 between the neighboring prongs 4104*b* of the clutch spring 4104. The tips 4130 of the tongues 4122 are bent radially inwardly toward the axis of the friction clutch 4101 and are spaced apart from the adjacent prongs 4104*b* to define therewith clearances 4132 when the clutch is engaged.

The lower half of FIG. 87 shows that the aforementioned clearances 4132 can be formed in a somewhat different manner. The clutch spring 4104 carries an annulus of preferably equidistant rivets 4131 having shanks which are parallel to the axis of the friction clutch 4101 and extend toward the bottom end wall 4102*a* of the housing 4102. The heads 4132*a* of the rivets constitute abutments or stops for the adjacent portions of the additional spring 4126. Such portions of the spring 4126 are bifurcated, as at 4126*a*, and the tines of the bifurcated portions straddle the adjacent portions of the shanks of rivets 4131 next to the corresponding heads 4132*a*. The clearances 4132 are disposed between the tines of the bifurcated portions 4126*a* and the respective heads 4132*a*.

An advantage of the friction clutch 4101 is that no additional parts are necessary to secure the additional spring 4126 in the illustrated position within the housing 4102. In the friction clutch 4001 of FIG. 81, the additional spring 4026 is held in the desired position by the leaf springs 4031 which must be riveted or otherwise affixed to the clutch spring 4004. The additional spring 4126 of the friction clutch 4101 is always maintained in a stressed condition. Thus, the spring 4126 is stressed between the clutch spring 4104 and the adjusting member 4117 when the clutch 4101 is engaged. When the clutch 4101 is being disengaged, the clearances 4132 are first reduced to zero and the spring 4126 is thereupon stressed by the prongs 4104*b* (see the upper half of FIG. 87) or by the heads 4132*a* of the rivets 4131 (see the lower half of FIG. 87). The radially outer parts of the additional spring 4126 are engaged by the clutch spring 4104 at the composite seat 4105, and the radially inner portions of the spring 4126 can be engaged by the prongs 4104b, either directly or by way of the heads 4132a of the rivets 4131 which are carried by the clutch spring 4104.

FIG. 87 shows that the illustrated embodiments of the additional spring 4126 can be conveniently installed in the housing 4102 and that the properly mounted spring 4126 is adequately stressed by the clutch spring 4104. The additional spring 4126 which is shown in the upper half of FIG. 87 can be coupled to the clutch spring 4104 by a suitable bayonet mount, i.e., the spring 4126 is first moved axially of the spring 4104 and is thereupon turned relative to the spring 4104. To this end, the slots between the prongs 4104b include suitably configured portions which permit axial movement of the springs 4104 and 4126 relative to each other, and such axial movement is followed by turning of the spring 4126 relative to the spring 4104 and/or vice versa until the tips 4130 overlie the adjacent prongs 4104b.

The clutch 4101 of FIG. 87 further comprises retaining means in the form of rivets or bolts 4115 which are anchored in the bottom end wall 4102a of the housing 4102 and serve to accurately position the springs 4104 and 4126 relative to each other as well as relative to the housing 4102.

The purpose of the additional spring 4126 is the same as that of the additional spring 4026 in the friction clutch 4001 of FIGS. 81 to 83. Therefore, a detailed description of the mode of operation of the spring 4126 is not necessary.

The friction clutch 4101 is further provided with means for assisting supporting forces which oppose the disengaging force at least within certain stages of the full range of speeds at which the plates 4103, 4106, the housing 4102 and the springs 4104 and 4126 are rotated in actual use of the clutch. Such means for assisting can serve to prevent unnecessary axial adjustments of the seat 4105 relative to the housing 4102 when the counterpressure plate 4106 is driven at an elevated speed so that the centrifugal force would, or would be likely to, initiate an axial adjustment of the seat 4105 by the compensating unit 4116 even though the wear upon the friction surfaces of the plates 4103, 4106 and/or upon the friction linings 4107 does not warrant or necessitate such adjustment. The illustrated assisting means includes a set of weights in the form of projections or tongues 4156 provided at the periphery of the sensor 4113. The weights 4156 extend from the sensor 4113 substantially axially of the friction clutch 4101 in a direction toward the bottom end wall 4102a of the housing 4102. When the counterpressure plate 4106 is driven by a prime mover to rotate the pressure plate 4103, the housing 4102, the sensor 4113, the compensating unit 4116 and the springs 4104, 4126, the weights 4156 are acted upon by centrifugal force to generate a force which is added to the force of the stressed sensor 4113 so that the movement of the clutch spring 4104 in the region of the seat 4111 is opposed with a greater force than when the counterpressure plate 4106 is not driven or is driven at a relatively low speed so that the centrifugal force acting upon the sensor 4113 does not suffice to move the weights 4156 radially outwardly and to thus increase the bias of the sensor 4113 upon the clutch spring 4104. The force with which the sensor 4113 opposes axial movements of the clutch spring 4104 in a direction away from the bottom end wall 4102a of the housing 4102 increases with increasing rotational speed of the counterpressure plate 4106. When the counterpressure plate 4106 is driven by a combustion engine, e.g., in a motor vehicle, the output shaft (e.g., a crankshaft) of the engine is likely to oscillate or to perform similar undesirable stray movements, especially when the engine drives the plate 4106 at an elevated speed.

Such stray movements entail axial oscillations of the pressure plate 4103 in the disengaged condition of the friction clutch 4101. These oscillatory axial movements of the pressure plate 4103 can entail repeated separation of the pressure plate from the clutch spring 4104. Thus, the bias of the leaf springs 4109 upon the clutch spring 4104 is interrupted whenever the pressure plate 4103 becomes temporarily disengaged from the clutch spring due to axially oriented oscillation of the pressure plate. In the absence of weights 4156, the aforediscussed relationship between the forces acting upon the clutch spring would no longer exist so that the compensating unit 4116 would be unable to carry out predetermined axial adjustments of the seat 4105 relative to the bottom end wall 4102a of the housing 4102. As a rule, axial oscillations of the pressure plate 4103 would entail premature axial adjustment of the seat 4105 by the adjusting member 4117 of the compensating unit 4116. This would cause the operating point of the clutch spring 4104 to migrate toward a lower value. Such undesirable premature adjustments of the seat 4105 relative to the bottom end wall 4102a of the housing 4102 are prevented by the weights 4156 in the aforedescribed manner, i.e., the weights enhance the ability of the sensor 4113 to prevent premature or unnecessary actuation of the compensating unit 4116, at least during certain stages of the full range of rotational speeds of the pressure plate 4103. The additional forces generated by the weights 4156 are applied in parallel with the forces exerted by the sensor 4113 and/or by the leaf springs 4109 and tend to urge the clutch spring 4104 toward the bottom end wall 4102a.

In contrast to the aforedescribed (push-type) friction clutches 4001 and 4101, the friction clutch 4201 of FIG. 88 is a so-called pull-type clutch, i.e, the tips 4204c of prongs 4204b forming part of the clutch spring 4204 must be pulled (in a direction to the right, as viewed in FIG. 88) in order to disengage the clutch. The radially outer part of the main portion of the clutch spring 4204 (here shown as a diaphragm spring) is supported by a wear compensating annular member 4218 which is installed between the bottom end wall 4202a of the housing 4202 and the radially outer part of the clutch spring 4204. The radially inner part of the main portion of the clutch spring 4204 abuts protuberances 4213 (e.g., in the form of lobes) provided at the respective side of the pressure plate 4203. The other side of the clutch spring 4204 is adjacent a resilient sensor 4237 which is carried by the spring 4204 and is preferably separably affixed to such spring by a standard bayonet mount or in any other suitable manner. As shown in FIG. 88, the sensor 4237 constitutes a diaphragm spring having a radially inner portion provided with substantially hook-shaped arms 4241 extending through windows or openings 4204a in the clutch spring 4204. The hook-shaped arms 4241 engage the adjacent portions of the clutch spring 4204 to thus secure the radially inner part of the sensor 4237 to the spring 4204. The sensor 4237 ensures that an adjusting member 4220 cannot initiate the operation of the compensating unit in the absence of sufficient wear, or sufficient additional wear, at least upon the friction linings 4207 of the clutch disc 4208. The adjusting member 4220 is a ring which is concentric with and is disposed radially inwardly of the wear compensating ring 4218.

The adjusting member 4220 is provided with a set of circumferentially extending axially sloping ramps 4223, and the wear compensating ring 4218 is provided with a set of ramps 4219. The ring 4218 and the member 4220 are installed in the housing 4202 of the friction clutch 4201 in such a way that their respective ramps 4219, 4223 confront the bottom end wall 4202a. This bottom end wall is provided with two annuli of complementary ramps 4221, 4222 which respectively cooperate with the ramps 4219, 4223. In the friction clutch 4201 of FIG. 88, the complementary ramps 4221, 4222 include raised portions of the bottom end wall 4202a, and such complementary ramps can be formed in a stamping or like machine during conversion of a sheet metal blank into the housing 4202.

The orientation and the inclination of the ramps 4219, 4223 and of the complementary ramps 4221, 4222 (as seen in the circumferential direction of the clutch spring 4204) are such that the wear compensating ring 4218 and the adjusting member 4220 can turn relative to the housing 4202 through angles which are necessary in order to compensate for wear upon at least some components of the friction clutch 4201, at least for wear upon the friction surfaces of the plates 4203 and 4206 and/or upon the friction linings 4207 of the clutch disc 4208. Such compensation should take place during the entire anticipated useful life of the friction clutch 4201. The slopes of the inclined surfaces of the ramps 4219 and the corresponding complementary ramps 4221 as well as of the ramps 4222 and the corresponding complementary ramps 4223 are selected in such a way that the friction between the two sets of cooperating ramps 4219, 4221 and 4223, 4222 suffices to prevent unintentional and undesirable angular displacement of the wear compensating ring 4218 and/or the adjusting member 4220 relative to the housing 4202. In other words, except when the axial position of the seat for the clutch spring 4204 is to be changed, the two sets of ramps perform a self-locking action by preventing the ring 4218 and/or the member 4220 from changing its angular position relative to the bottom end wall 4202a of the housing 4202.

It has been found that the ramps 4219, 4221 and 4223 4222 can perform a satisfactory self-locking action while still permitting angular displacements of the ring 4218 and member 4220 relative to the housing 4202 if the slope angle of their inclined surfaces is in the range of between 3° and 12°.

The ring 4218 is biased in the circumferential direction, namely in a direction to cause the ramps 4219 to slide along the adjacent complementary ramps 4221 in order to move the ring 4218 axially of the clutch 4201 and away from the bottom end wall 4202a, i.e., toward the pressure plate 4203. The means for biasing the ring 4218 in the circumferential direction comprises at least one coil spring 4228 which is disposed between the ring 4218 and the adjusting member 4220, as seen in the radial direction of the housing 4202.

The adjusting member 4220 is also rotatable relative to the respective ramps 4222 on the bottom end wall 4202a. The means for biasing the member 4220 in the circumferential direction comprises at least one coil spring 4229 which can be stressed between the member 4220 and the ring 4218. The member 4220 and the ring 4218 operate in series. The illustrated coil spring 4228 is disposed between an axially extending lug 4241a of a diaphragm spring 4237 and a radial lobe or cam 4234 on the radially inner portion of the ring 4218.

The adjusting member 4220 is provided with at least one peripheral lobe or cam 4235 which overlaps the radial lobe or cam 4234 of the ring 4218. The cams 4234 and 4235 are provided with means for retaining and guiding the at least slightly prestressed coil spring 4229 for the adjusting member 4220. When the cams 4234 and 4235 are caused to abut each other, the ring 4218 and the member 4220 cannot rotate relative to each other. The coil springs 4228 and 4229 operate in series.

As can be seen in FIG. 88b, a coil spring 4228 can be provided for each of the parts 4218 and 4220. The ring 4218 and the member 4220 are provided with abutments or stops 4234a, 4235a which are staggered in the circumferential direction, and the diaphragm spring 4237 includes discrete abutments or stops 4241a, 4241b which are staggered in the circumferential direction.

The diaphragm spring 4237 constitutes a sensor which detects the extent of wear upon the friction surfaces of the plates 4203, 4206 and/or upon the friction linings 4207 and which also serves to prevent unnecessary or untimely axial adjustments of the clutch spring 4204 toward the pressure plate 4203. The cams 4234 and 4235 abut each other when the wear, or additional wear, upon the friction linings 4207 does not suffice to warrant an adjustment of the axial position of the clutch spring 4204. In order to ensure that the cams 4234 and 4235 abut each other when there is no need to carry out an adjustment to compensate for wear upon the friction linings 4207, the bias of the spring 4228 upon the ring 4218 exceeds the bias of the spring 4229 upon the member 4220 during the entire useful life of the friction clutch 4201.

The sensor 4237 is mounted on the clutch spring 4204 in stressed condition so that it applies a predetermined axial force in a direction toward the adjusting member 4220. Such force opposes rotation of the member 4220 and is selected with a view to ensure that the annular member 4220 cannot turn when the clutch 4201 is engaged and the wear upon the friction linings 4207 is still zero or less than that which would warrant an initial compensation or a renewed compensation for wear. Furthermore, the bias of the sensor 4237 suffices to ensure that no compensation for wear can take place immediately following a preceding compensation, namely before the friction linings 4207 have undergone additional wear which is sufficient to warrant a renewed compensation for wear.

When the friction clutch 4201 is engaged, the sensor 4237 applies to the adjusting member 4220 an axial force which exceeds the bias of the coil spring or springs 4228, i.e., the spring or springs 4228 cannot turn the adjusting member 4220 in a direction to move the clutch spring 4204 axially and away from the bottom end wall 4202a. Furthermore, the bias of the sensor 4237 is preferably selected with a view to account for the development of certain undesirable forces acting upon the sensor in actual use of the friction clutch 4201. Such undesirable forces can include those which develop due to inertia of certain constituents of the friction clutch. Otherwise stated, it is necessary to ensure that the sensor 4237 cannot become disengaged from the adjusting member 4220 except when the wear upon the friction linings 4207 is sufficient to warrant the carrying out of a compensating step. Such a mode of cooperation between the sensor 4237 and the adjusting member 4220 ensures that no compensation takes place (in response to rotation of the member 4220 relative to the bottom end wall 4202a) when the compensation is not needed because the friction linings 4207 did not undergo sufficient initial wear or sufficient additional wear (following the last compensating step) to warrant an axial adjustment of the member 4220 away from the bottom end wall 4202a.

The additional spring 4226 is effective at least during a certain stage of disengagement of the friction clutch 4201 and is installed between the pressure plate 4203 and the clutch spring 4204, as seen in the axial direction of the clutch. The spring 4226 is a diaphragm spring having a conical shape and tapering toward the axis of the friction clutch 4201 in a direction toward the pressure plate 4203.

The radially outer portion of the additional spring 4226 is held against axial movement relative to the clutch spring 4204 in such a way that the spring 4226 is tiltable relative to the spring 4204. The purpose and the mode of operation of the additional spring 4216 are the same as those of the additional spring 4216 in the friction clutch 4101 of FIG. 87 or the additional spring 4026 in the clutch 4001 of FIG. 81.

The sensor 4237, the clutch spring 4204 and the additional spring 4226 (all diaphragm springs) are provided with at least one set of axially aligned openings, and each such set of openings receives an axially parallel aligning member 4203a which is anchored in, or of one piece with, the pressure plate 4203 and extends therefrom in a direction toward the bottom end wall 4202a of the housing 4202. The illustrated aligning member 4203a is a pin or stud which ensures that the sensor 4237, the clutch spring 4204 and the additional spring 4226 cannot turn relative to each other or relative to the pressure plate 4203 and vice versa.

The radially inwardly extending prongs 4204b of the clutch spring 4204 have radially inner portions which hold a dished or channeled annular pulling member 4260 which can be engaged by a bearing or the like to move axially and away from the pressure plate 4203 in order to disengage the friction clutch 4201. The pulling member 4260 includes portions 4260a which extend radially outwardly and can apply an axial force to the radially inwardly extending arms 4226a of the additional spring 4226. FIG. 88 shows an axial clearance 4232 between the radially outwardly extending portion 4260a of the pulling member 4260 and the adjacent radially inwardly extending arm 4226a of the additional spring 4226. The clearances 4232 (one between each portion 4260a and the respective arm 4226a) ensure that the additional spring 4226 can become effective only after the pressure plate 4203 has completed a certain amount of travel axially of and toward the bottom end wall 4202a so as to move its friction surface away from engagement with the adjacent friction linings 4207.

FIG. 88 shows the clutch disc 4208 of the friction clutch 4201 when the friction linings 4208 are still devoid of wear or subsequent to a compensation for wear upon such friction linings. The clutch 4201 is engaged, i.e., the friction linings 4207 are clamped between the friction surfaces of the plates 4203, 4206 so that the clutch disc 4208 must share all angular movements of the plates 4203, 4206, of the housing 4202 and of the clutch spring 4204. During disengagement of the clutch 4201, i.e., when the tips of the prongs 4204b are pulled by the member 4260 in a direction to the right, as viewed in FIG. 88, the clutch spring 4204 is tilted relative to the seat 4212 which is provided on the ring 4218. Axial movement of the prongs 4204b in a direction away from the pressure plate 4203 takes place while the sensor 4237 is clamped axially between the clutch spring 4204 and the adjusting member 4220 until the width of the space or clearance L between the clutch spring 4204 and the sensor 4237 is reduced to zero. The clutch spring 4204 is then free to bear axially against the adjusting member 4220.

As the axial movement of the pressure plate 4203 in a direction away from the counterpressure plate 4206 continues, the clutch spring 4204 is tilted relative to the fulcrum 4220a of the adjusting member 4220 whereby the bias of the spring 4204 upon the radially outer seat 4212 is relaxed. Thus, if a compensation for wear is necessary, the ring 4218 is free to turn and to thus move axially toward the counterpressure plate 4206 in order to compensate for the initial or additional wear upon the friction linings 4207. It will be seen that, during the initial phase of disengagement of the friction clutch 4201, the clutch spring 4204 operates not unlike a one armed lever and is caused to tilt relative to the fulcrum defined by the ring 4218. When the width of the clearances or spaces L is reduced to zero, the clutch spring 4204 begins to act not unlike a two-armed lever in that the radially inner arm of such lever pivots relative to the fulcrum 4220a of the adjusting member 4220. The spring 4204 is tilted first relative to a first fulcrum which is nearer to its radially outermost part and thereupon relative to a second fulcrum disposed radially inwardly of the first fulcrum. Such shifting of the locations of tilting of the spring 4204 during disengagement of the clutch 4201 entails a change of the transmission ratio or lever arm ratio which determines the magnitude of the force necessary to change the orientation of the spring 4204 relative to the bottom end wall 4202a. Thus the transmission ratio is changed so that magnitude of the force which is required to change the orientation of the spring 4204 decreases from I to I−1. Consequently, when the clutch spring 4204 is ready to be tilted relative to the fulcrum which is defined by the adjusting member 4220, the magnitude of the required disengaging force increases. The ratio I is intended to denote the ratio of the distance of locus of engagement of the pulling member 4260 with the prongs 4204b of the spring 4204 from the location of contact between the seat 4212 and the spring 4204 to the distance of the locus of engagement of the clutch spring 4204 from the seat 4212. The aforementioned change of the transmission ratio is based on the premise that the locus of engagement between the clutch spring 4204 and the pressure plate 4203 is disposed at least substantially at the same radial distance from the axis of the clutch 4201 as the locus of engagement of the spring 4204 with the adjusting member 4220. The magnitude of the required increase of disengaging force is reduced if the location of contact between the clutch spring 4204 and the adjusting member 4220 is moved further radially of and away from the axis of the clutch 4201, i.e., if such location is moved nearer to the seat 4212.

If the diameter of the location of engagement of the spring 4204 with the adjusting member 4220 is larger than the diameter of the location of contact between the spring 4204 and the pressure plate 4203, the transmission ratio during tilting of the spring 4204 relative to the member 4220 is larger than the aforementioned transmission ratio I−1. However, the transmission ratio which develops during disengagement of the friction clutch 4201 cannot exceed the transmission ratio I of the clutch spring 4204.

If the extent of wear at least upon the friction linings 4207 is sufficient to warrant a compensation, the clutch spring 4204 changes its conicity during engagement of the friction clutch 4201. Such change of conicity of the spring 4204 involves a movement of the tips 4204c of the prongs 4204b forming part of the clutch spring in a direction to the left, as viewed in FIG. 88, and such movement of the tips 4204c of the prongs 4204b is shared by the pulling member 4260. The change of conicity of the clutch spring 4204 entails a relaxation of the bias upon the adjusting member 4220 so that the latter can carry out a compensating movement to an extent which is necessary to compensate for wear at least upon the friction linings, either during the interval extending back to the preceding compensation or during the first interval following initial wear upon the friction linings 4207. The compensating operation involves an angular movement of the adjusting member 4220 relative to the ring 4218 (see FIG. 88a) so that the portions 4235 of the member 4220 are moved away from the respective portions 4234 of the ring 4218. This results in the development of a clearance or gap 4245 between each portion 4235 of the member 4220 and the respective portion 4234 of the ring 4218. During the next-following reengagement of the friction clutch 4201, the clutch spring 4204 relaxes its bias upon the ring 4218 in a manner as already described hereinbefore so that the ring 4218 can turn relative to the member 4220 until the width of each gap 4245 is reduced to zero. This ensures that the conicity of the clutch spring 4204 again matches that which existed prior to any wear upon the friction linings 4207. As the wear at least upon the friction linings 4207 progresses, the compensating unit repeatedly carries out the necessary compensatory operations so that the clutch spring 4204 advances stepwise away from the bottom end wall 4202*a* of the housing 4202. Each compensating step involves an adjustment of the conicity of the spring 4204 so that such conicity again matches that which existed prior to the initial compensating operation, i.e., when the wear upon the friction linings 4207 was nil. The extent of compensation is a function of the extent of wear upon the friction linings 4207, i.e., upon the extent of angular displacement of the member 4220 relative to the ring 4218 to establish one or more gaps 4245 each having a width (as measured between the portion or portions 4235 of the member 4220 and the portion or portions 4234 of the ring 4218) which is proportional to the extent of wear upon the friction linings 4207, namely that wear which is to be compensated for by appropriate angular displacement of the member 4220 relative to the ring 4218.

Figure 89:
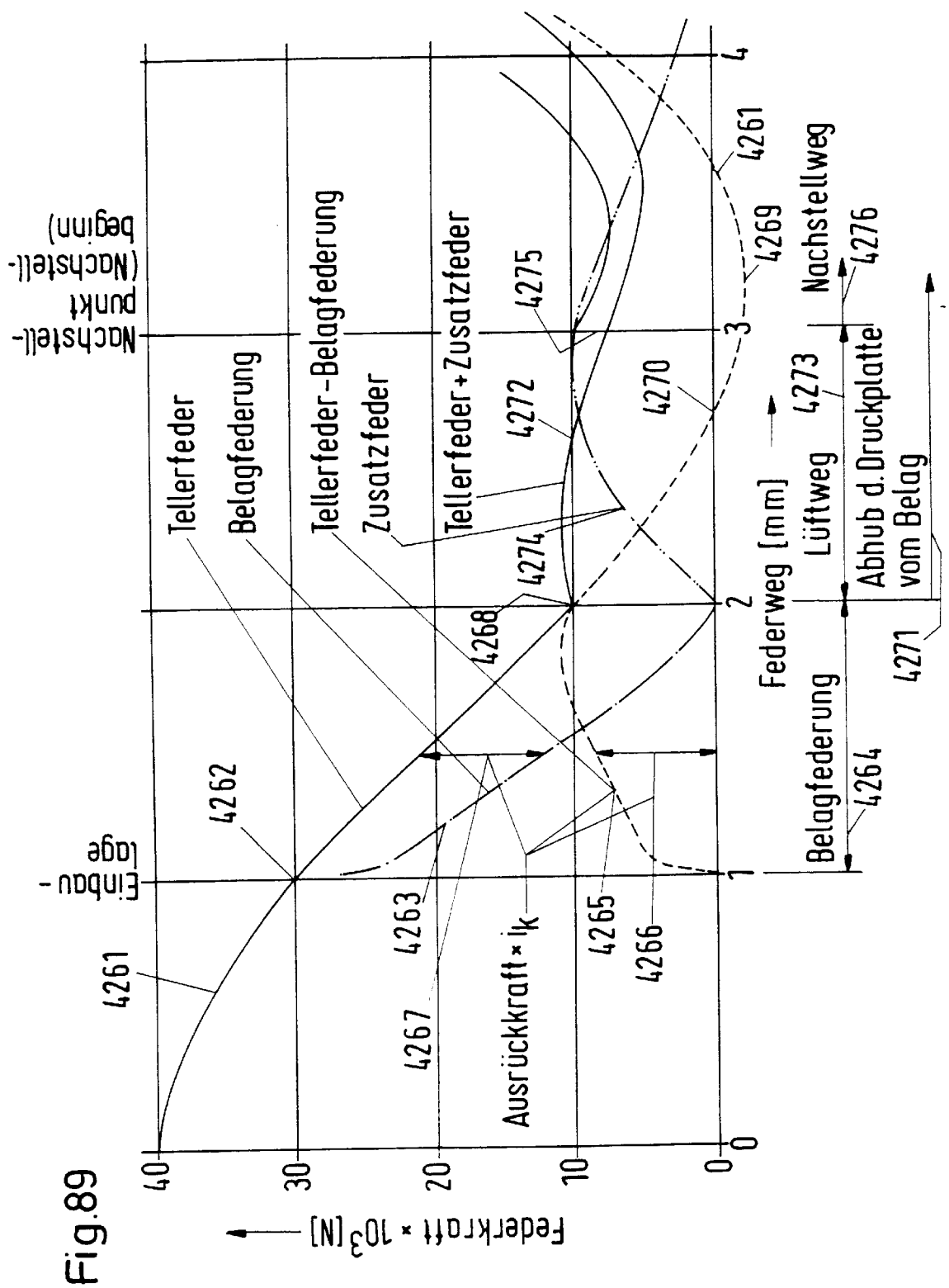
FIG. 89 is a diagram showing the characteristic curves of certain resilient components in the friction clutch of FIGS. 88, 88a and 88b.

The manner in which the clutch spring 4204 cooperates with the additional spring 4226 and the sensor 4237, and in which the spring 4226 cooperates with the sensor 4237 will be explained with reference to the diagram of FIG. 89. The curve 4261 denotes in FIG. 89 a portion of a resultant axial force which is a function of the changes of conicity of the clutch spring 4204 and which is plotted by taking into consideration the force which is furnished by leaf springs (not shown) or other suitable means for transmitting torque between the housing 4202 and the pressure plate 4203. The curve 4261 denotes that force which develops when the clutch spring 4204 undergoes deformation between the seat 4212 and the projections or portions 4213 of the pressure plate 4203. The entire curve 4261 has a sinusoidal outline and it slopes downwardly toward the abscissa of the coordinate system of FIG. 89 to the right of the ordinate. It can be said that the configuration of the entire characteristic curve 4261 which is shown in FIG. 89 is similar to that of the characteristic curve 4033 shown in FIG. 84. The relative axial distance between the seat 4212 and the fulcrum 4213 is measured along the abscissa, and the resultant force furnished by the clutch spring 4204 and the leaf springs or other suitable means for transmitting torque between the housing 4202 and the pressure plate 4203 is measured along the ordinate. The point 4262 denotes the magnitude of the resultant force at the time of installation of spring 4204 into the clutch 4201 and while the clutch 4201 is engaged. The curve 4263 denotes in FIG. 89 the axial spreading force applied by the resilient segments 4210 of the clutch disc 4208 against the adjacent friction linings 4207.

When the clutch 4201 is being disengaged, the resilient segments are free to dissipate energy and to move apart through a distance 4264. The segments 4210 can cover the distance 4264 as a result of axial movement of the pressure plate 4203 away from the counterpressure plate 4206. The disengagement of the friction clutch 4201 while the segments 4210 cover the distance 4263 is assisted by such segments because they tend to push the plate 4203 axially and away from the plate 4206.

The broken-line curve 4265 of FIG. 89 denotes the progress of the force which must be applied in the region of the projection or projections 4213 of the pressure plate 4203 in order to disengage the friction clutch 4201 by moving the pressure plate 4203 through the distance 4264. The forces which develop during covering of the distance 4264 are indicated at 4266, and each such force corresponds to the difference 4267 between the curve 4261 (clutch spring 4204) and the curve 4263 (resilient segments 4210 of the clutch disc 4208). The magnitude of the force which is actually applied in the regions of the tips 4204*c* of the prongs 4204*b* in order to disengage the friction clutch 4201 is less than the magnitude of forces denoted by the curve 4265 by a factor which corresponds to the transmission ratio I of the clutch spring 4204.

When the point 4268 of the curve 4261 is passed, i.e., when the pressure plate 4203 has already covered the distance 4264, the friction linings 4207 are released by the friction surfaces of the plates 4203 and 4206. In view of the degressive characteristic of the curve 4261 denoting the bias of the clutch spring 4204, the additional force which is required to complete the disengagement of the friction clutch 4201 is greatly reduced in comparison with the force denoted by the point 4262 on the curve 4261 in the diagram of FIG. 89. In the absence of the additional spring 4226, the disengaging force for the clutch 4201 would continue to decrease to a minimum value denoted by the lowermost point 4269 of the sinusoidal curve 4261.

In the friction clutch 4201, the clutch spring 4204 is designed in such a way that the lowermost point 4269 of the curve 4261 is located at a level below the abscissa of the coordinate system shown in FIG. 89. Thus, when the disengagement of the friction clutch 4201 reaches the stage which is denoted by the point 4270 of the curve 4261 (i.e., when the curve 4261 crosses the abscissa), the spring 4204 automatically tends to reduce it bias to a value denoted by the point 4269 of the curve 4261, i.e., the spring 4204 is a so-called snap-over spring which exhibits two steady conditions including an unstressed condition and a fully stressed condition.

As indicated by that portion of the curve 4261 which includes the points 4268, 4269 and 4270 and is shown by broken lines, the magnitude of the clutch disengaging force would undergo a very pronounced reduction after the disengagement of the friction surfaces of the plates 4203, 4206 from the respective sets of friction linings 4207 provided that the additional spring 4226 were omitted. Due to the provision of the additional spring 4226, the remaining (second) portion 4271 of the combined distance (4264+4271) covered by the pressure plate during disengagement of the friction clutch 4201 is quite different.

The actual progress (note the curve 4272) of the disengaging force upon separation of the pressure plate 4203 from the adjacent set of friction linings 4207 is such that the force is relatively small and at least substantially constant. The curve 4272 denotes the force or forces to be applied by the portion or portions 4213 of the pressure plate 4203 in order to tilt the clutch spring 4204 jointly with the additional spring 4226. The magnitude of the force which is being applied to the tips 4204*c* of the prongs 4204*b* during disengagement of the clutch 4201 is less than that of the force denoted by the curve 4272 by the aforementioned transmission ratio I of the clutch spring 4204 until the spring 4204 comes into actual contact with the sensor 4220. The distance which the pressure plate 4203 covers to move away from the adjacent set of friction linings 4207 is shown at 4273.

The characteristic curve of the additional spring 4226 is shown at 4274. The progress of the curve 4261 (clutch spring 4204) is counter to the progress of the curve 4274 (additional spring 4226) at least while the pressure plate 4203 covers the distance 4271. The curve 4272 indicates the resultant of the forces acting upon the spring 4204 during that stage of disengagement of the friction clutch 4201 which is denoted by the distance 4273. The curve 4272 begins at the point 4268, i.e., when the pressure plate 4203 begins to move away from the adjacent set of friction linings 4207 in order to cover the distance 4273. The point 4268 denotes in FIG. 89 the instant of engagement of the portion or portions 4260a of the pusher 4260 by the tongues 4226a of the additional spring 4226.

Upon completion of movement through the distance 4273, the clutch spring 4204 comes into contact with the member 4220. This results in a change of the transmission ratio of the spring 4204 from I to I–1. As already described above, this is the cause of a slight increase of the disengaging force as indicated in FIG. 89 at 4275. Such increase of the disengaging force persists during the remaining stage of disengagement of the friction clutch 4201.

The distance 4276 which is to be covered to compensate for the wear upon the friction linings 4207 is merely a small fraction of the overall distance to be covered during disengagement of the friction clutch 4201; the distance 4276 can be in the range of one or more tenths of one millimeter or even less.

In order to ensure the application of requisite disengaging force to the tips 4204c of prongs 4204b forming part of the clutch spring 4204, the forces whose characteristic curves are shown in the diagram of FIG. 89 should be divided into those which are applied while the transmission ratio of the spring 4204 equals I and those which develop when such transmission ratio is changed to I–1. The point 4275 denotes the boundary between the two sets of forces. The application of the desired disengaging force is achieved, i.e., the tips 4204c of the prongs 4204b are moved through corresponding distances, if the distances to the left of the point 4275 are multiplied by the ratio I and the distances to the right of the point 4275 are multiplied by the ratio I–1. In other words, the ratio I–1 is relevant only in connection with the distances beyond the point 4275.

The aforedescribed friction clutches 4001, 4101 and 4201 exhibit the common advantage that, when the clutches are disengaged, losses attributable to flexing of the prongs 4004b, 4104b and 4204b are reduced to a minimum. This is due to the fact that, when one of these clutches is disengaged, the forces acting upon the tips (4004c, 4104c, 4204c) are practically negligible. Furthermore, and as can be seen in the diagram of FIG. 89, such forces are or can be negative forces. This means that the clutch spring (such as 4204 whose characteristic curve is shown in FIG. 89, as at 4261) automatically tends to assume a state (denoted by that part of the curve 4261 which is located below the abscissa) corresponding to the fully disengaged condition of the respective clutch (4201). However, such tendency of the clutch spring (e.g., the spring 4204) is opposed and counteracted by the additional spring (such as 4226). The aforediscussed minimal stressing of the prongs of the clutch springs in the friction clutches of FIGS. 81–83, 87, and 88–89 when the respective clutches are disengaged does not exist in conventional friction clutches. The absence of pronounced deformation of the prongs 4004b, 4104b and 4204b in the fully disengaged condition of the respective friction clutches is desirable and advantageous because the distances to be covered by the means for tilting the clutch springs are greatly reduced due to the fact that it is no longer necessary to compensate for the elastic deformation of prongs in the disengaged condition of the respective clutches and/or for the elastic deformation of the housing 4002, 4102 or 4202.

At least the friction clutch 4201 of FIGS. 88, 88a, 88b and 89 exhibits the additional advantage that the distance to be covered by the pulling member 4260 during actuation of the clutch 4201 need not be appreciably increased (or need not be increased at all) for the purpose of compensating for elastic deformation of the clutch housing 4202. This can be accomplished by designing the friction clutch 4201 in such a way that elastic deformation of the housing 4202 in the axial direction of the friction clutch in the disengaged condition of the clutch and attributable to the bias of the clutch spring 4204 is caused to match the elastic deformation of the housing in the engaged condition of the clutch, i.e., when the clutch spring 4204 bears upon the adjusting member 4220. When the clutch 4201 is engaged, the magnitude of the axial force applied by the spring 4204 to the housing 4202 reaches a maximum value; at the same time, the existing or available tilting distance between the effective diameter of the seat 4212 and the fasteners (e.g., bolts) 4202b which secure the housing 4202 to the counterpressure plate 4206 is reduced to a minimum. When the clutch 4201 is disengaged, the combined bias of the clutch spring 4204 and the additional spring 4226 upon the housing 4202 is much smaller than the bias of the spring 4204 in the engaged condition of the clutch 4201. However, the available lever arm of the housing 4202 (between the diameter of the annulus of contact with the portion 4220a of the annular adjusting member 4220 and the diameter of the circle defined by the annulus of fasteners 4202b) is then much larger than the radial distance between the seat 4212 and the fasteners 4202b.

With the exception of the diaphragm spring (sensor) 4337, the construction of the friction clutch 4301 shown in FIG. 90 is or can be identical with the construction of the friction clutch 4201 shown in FIGS. 88, 88a, 88b and 89. The same holds true for the mode of operation of the friction clutch 4301, i.e., its mode of operation is practically or at least substantially identical with that of the friction clutch 4201. The clutch spring 4304 in the housing 4302 of the clutch 4301, the sensor 4337 and the additional spring 4326 shown in FIG. 90 perform the same functions as the springs 4204, 4226 and the resilient sensor 4237 of the clutch 4201 (reference can be had to the description of FIG. 89). The ring 4318 and the adjusting member 4320 also operate in the same way as described with reference to the parts 4218 and 4220 of the friction clutch 4201. Thus, the ring 4318 and the member 4320 have sets of ramps which cooperate with complementary ramps at the inner side of the bottom end wall of the housing 4302.

The additional spring 4326 is stressed by leaf springs 4344 or other suitable resilient elements which operate between the radially inner part of the spring 4326 and the pulling member 4360. This ensures that the additional spring 4326 is maintained in a predetermined axial position when the friction clutch 4301 is engaged.

When the sensor 4337 is stressed (this is shown in FIG. 90), its axial position departs from the position of the sensor 4237 in the friction clutch 4201 of FIGS. 88–89. A radially inner part of the sensor 4337 abuts the clutch spring 4304 and an annular radially outermost part of the sensor 4337 bears upon the annular member 4320 to urge the latter axially toward the bottom end wall of the housing 4302. The sensor 4337 is provided with radially inwardly extending arms 4342 which engage a portion 4343 of the ring 4318 to ensure that a clearance or play L is established in the engaged condition of the friction clutch 4301. The radially outer portion of the sensor 4337 is provided with tongues or arms 4341 a which extend toward the bottom end wall of the housing 4302 and act as retainers for the coil springs 4328 performing the same function as the springs 4228 shown in FIGS. 88, 88*a* and 88*b*.

Figure 91:
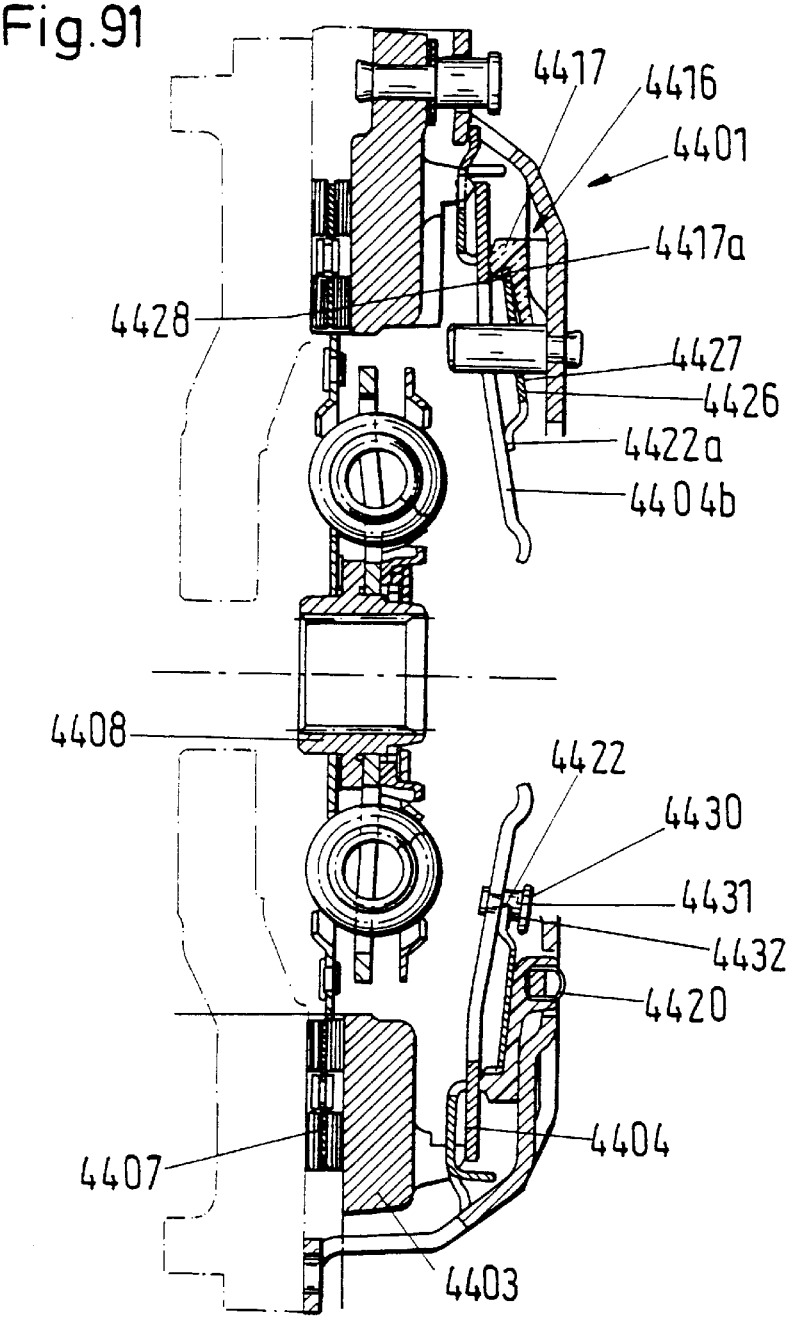
FIG. 91 is an axial sectional view of still another friction clutch which embodies the invention.

FIG. 91 illustrates a portion of a torque transmitting apparatus including a friction clutch 4401. Save for the mode of installing the additional spring 4426 and the mode of operation of such additional spring, the construction and mode of operation of the friction clutch 4401 are identical or at least analogous to the construction and mode of operation of the friction clutch 4101 shown in FIG. 87.

It is often difficult, or plain impossible, to employ a clutch spring (such as the clutch spring 4404 of the clutch 4401) which is optimally suited to bias a pressure plate (4403) toward a counterpressure plate (e.g., a flywheel or one of several flywheels forming part of a composite flywheel which is driven by a combustion engine or another prime mover). For example, one of the reasons why it is not possible to employ an optimally designed clutch spring is that the space which is available for the friction clutch does not permit the utilization of a clutch spring having an optimal characteristic curve, especially during disengagement of the clutch (note the distance 4046 in the diagram of FIG. 84). Thus, when the friction clutch is being disengaged, the point (4039*a* in FIG. 84) of the characteristic curve (4033) of the clutch spring (4004 in FIG. 81) where the disengaging force begins to increase beyond that (note the point 4047 on the curve 4033 of FIG. 84) where the pressure plate begins to move away from contact with the adjacent friction linings is caused to alter its position. The point 4039*a* of the curve 4033 then coincides with or is at least very close to the point 4045 of the curve 4043. In other words, the point 4039*a* is then indicative of a force which develops when the necessary distance for disengagement of the friction clutch is already covered or of a force which develops immediately thereafter. This would entail that the ring 4417 could not be adequately stressed by the clutch spring 4404 within an excessive stage of disengagement of the friction clutch 4401. In other words, the ring 4417 would cause an excessive compensation for wear or a compensation for non-existing wear upon the friction linings 4407 of the clutch disc 4408. Unnecessary or excessive compensation for non-existing or for actual wear upon the friction linings 4407 would cause a change of the operating point (i.e., a change of the position of the clutch spring 4404) in the engaged condition of the friction clutch 4401, namely in a sense to reduce the bias of the clutch spring. Referring again to FIG. 84, this would cause the operating point 4037 on the curve 4033 to migrate toward the point 4038*a* which is the lowermost point of the curve 4033. Consequently, the friction clutch would be affected in a sense that it would only be capable of transmitting a relatively small torque. This, in turn, could prevent the friction clutch from carrying out its intended function, namely the transmission of a torque having a predetermined maximum value.

In order to avoid the just discussed drawbacks, i.e., to prevent unnecessary or excessive compensation for wear, the compensating unit 4416 in the friction clutch 4401 of FIG. 91, the additional spring 4426 between the adjusting member 4417 of the compensating unit 4416 and the clutch spring 4404 are mounted in such a way that the spring 4426 acts as a blocking device or brake as soon as the travel through the permissible distance during disengagement of the friction clutch 4401 is completed. The additional spring 4426 blocks or brakes the compensating unit 4416 so that it is immaterial that the distance which is covered during disengagement of the friction clutch 4401 exceeds a desired or predetermined distance, even if the difference between the desired distance and the actual distance is substantial. The additional spring 4426 also acts as a brake or as a blocking means for the compensating unit 4416 if an undesirable axial oscillation of certain parts of the friction clutch 4401 (e.g., axial reciprocation of the pressure plate 4403) would be likely to initiate an unnecessary compensation for non-existing wear or for wear which is insufficient to warrant a compensation by moving the clutch spring 4404 toward the pressure plate 4403.

The additional spring 4426 in the friction clutch 4401 of FIG. 91 is a diaphragm spring and is installed between the adjusting member 4417 and the clutch spring 4404 in such a way that it becomes stressed between the parts 4404 and 4417 when the pressure plate 4403 has already covered the required distance during disengagement of the friction clutch 4401. The thus stressed additional spring 4426 then urges the adjusting member 4417 against the clutch spring 4404. In other words, the adjusting member 4417 is reliably blocked or clamped between the parts 4404 and 4426 so that it cannot turn about the axis of the friction clutch 4401, i.e., the compensating unit 4416 is blocked or braked and cannot carry out a compensating action. Thus, the unit 4416 is prevented from performing a compensating action as soon as the pressure plate 4403 has covered the required or desired maximum distance during disengagement of the friction clutch 4401.

The additional spring 4426 of the friction clutch 4401 comprises an annular main portion 4427 and arms 4428 extending radially outwardly from the radially outer part of the main portion 4427. The arms 4428 are or can be uniformly distributed in the circumferential direction of the main portion 4427 and extend into a radial groove 4417*a* of the ring-shaped adjusting member 4417. The groove 4417*a* can be seen in FIGS. 92 and 93. The additional spring 4426 further comprises prongs or arms 4422 which extend radially inwardly from the main portion 4427 and cooperate with complementary arms or abutments 4430 of the clutch spring 4404. The abutments 4430 constitute the heads of rivets 4431 which are disposed in the region of the prongs 4404*b* forming part of the clutch spring 4404. The rivets 4431 can be replaced with tongues or analogous protuberances which are of one piece with the additional spring 4426 and cooperate with the spring 4404 in the same way or in a similar way as the tongues or arms 4422 cooperate with the clutch spring 4104 of the friction clutch 4401 shown in FIG. 87.

The distance or clearance 4432 between the arms 4422 and the abutments 4430 in the engaged condition of the friction clutch 4401 is selected in such a way that the arms 4422 do not come into contact with the abutments 4430 at least during a stage of disengagement of the clutch. It is presently preferred to select the clearance 4432 in such a way that the arms 4422 engage the abutments 4430 only when the pressure plate 4403 reaches (during disengagement of the clutch 4401) a position beyond that corresponding to the point 4037 of the characteristic curve 4033 shown in FIG. 84, i.e., when the expansion of the resilient segments for the friction linings 4407 is already completed and the pressure plate 4403 begins to move axially and away from the adjacent friction linings. When the arms 4422 engage the respective abutments 4430, the adjusting member 4417 is clamped against the clutch spring 4404 and is held against angular movement about the axis of the clutch 4401 so that the compensating device 4416 cannot carry out a compensation because the coil spring or springs 4420 cannot change the angular-position of the member 4417.

The groove 4417*a* is provided substantially midway between the two side faces of the adjusting member 4417, as seen in the axial direction of the friction clutch 4401. As already mentioned above, the groove 4417*a* receives the arms 4428 of the additional spring 4426. Such a mode of assembling the spring 4426 with the adjusting member 4417 ensures that the spring 4426 can be tilted relative to the member 4417.

Figure 92:
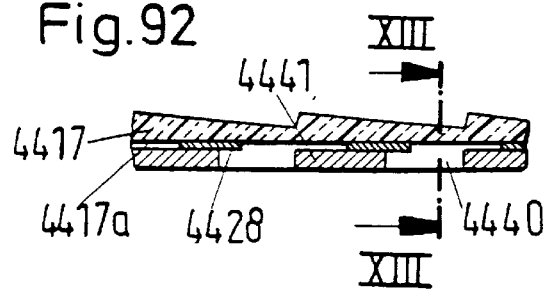
FIG. 92 is an enlarged sectional view of a detail in the friction clutch of FIG. 91.
Figure 93:
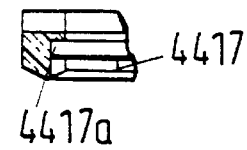
FIG. 93 is an enlarged fragmentary perspective view of a component which is shown in FIGS. 91 and 92.

FIGS. 92 and 93 show that the adjusting member 4417 is provided with axially parallel channels or passages 4440 which communicate with the groove 4417*a* and extend from such groove to one side face of the member 4417. The channels 4440 alternate with protuberances or ledges 4441 which extend radially of the member 4417. The number of channels 4440 corresponds to the number of arms 4428 on the main portion 4427 of the additional spring 4426, and the same holds true for the distribution of channels 4440 and arms 4428 as seen in the circumferential direction of the spring 4426 and member 4417. The width of each channel 4440 (as seen in the circumferential direction of the member 4417) at least equals the width of an arm 4428. This ensures that the member 4417 can be assembled with the additional spring 4426 by inserting each arm 4428 into one of the channels 4440 in the axial direction of the member 4417 so that each arm 4428 enters the corresponding portion of the groove 4417*a*, and by thereupon turning at least one of the parts 4426, 4417 relative to the other so that each arm 4428 overlies one of the ledges 4441. In other words, the connection between the parts 4417 and 4426 can be said to constitute a bayonet mount. The arrangement can be such that each arm 4428 overlies a portion of or an entire ledge 4441, i.e., that each ledge 4441 overlies a portion of or an entire arm 4428. This is shown in FIG. 92. The arms 4428 bear against the adjacent ledges 4441 when the width of the clearances 4432 is reduced to zero, i.e., when the arms 4422 contact the respective abutments 4430.

The additional spring 4426 is designed and mounted in the friction clutch 4401 in such a way that, at least during that stage of disengagement of the clutch when the arms 4422 engage the respective abutments 4430, the adjusting member 4417 cannot turn relative to the spring 4426. It is presently preferred to construct the friction clutch 4401 in such a way that the arms 4422 and the respective abutments 4430 can engage each other only when the disengagement of the friction clutch 4401 reaches a stage denoted by the point 4037 on the characteristic curve 4033 in the diagram of FIG. 84. This ensures that the adjusting member 4417 is free to change its angular position for the purpose of compensating for wear at least upon the friction linings 4407. It is further preferred to ensure that the member 4417 can turn relative to the additional spring 4426 only when the spring 4426 has already dissipated the stored energy or has dissipated the major part of such energy. As can be seen in FIG. 92, the ledges 4441 of the adjusting member 4417 migrate in a direction to the right as the wear upon the friction linings 4407 progresses, i.e., the ledges 4441 change their positions relative to the respective arms 4428. The widths of the arms 4428 and ledges 4441 (as seen in the circumferential direction of the member 4417) are selected in such a way that each arm 4428 overlies the corresponding ledge 4441 during the entire useful life of the friction clutch 4401, i.e., in spite of repeated and frequent turning of the member 4417 for the purpose of compensating for wear upon the friction linings 4407.

The additional spring 4426 can remain in at least slightly stressed condition when the friction clutch 4401 is fully engaged. This can be achieved in that, during engagement of the friction clutch 4401, the prongs 4404*b* of the clutch spring 4404 engage the neighboring arms 4422*a* of the additional spring 4426 shortly or immediately prior to completion of the engaging operation. This causes the additional spring 4426 to flex in a direction to the right (as viewed in FIG. 91) toward the bottom end wall of the housing 4402 and to thus store at least some energy while the clutch remains in fully engaged condition. Thus, the additional spring 4426 is then in a position to limit the maximum bias upon the friction linings 4407 in the fully engaged condition of the friction clutch 4401. The extent to which the additional spring 4426 can limit the maximum bias depends on the selected characteristic curves of the springs 4404 and 4426.

In addition to acting as a brake or a blocking means for the adjusting member 4417, the additional spring 4426 can carry out all functions of the additional spring 4126 in the friction clutch 4101 of FIG. 87. Thus, the additional spring 4426 can also ensure an increase of the disengaging force at least when the characteristic curve of the clutch spring 4401 is below the abscissa of a coordinate system analogous to that shown in FIG. 84. In other words, the additional spring 4426 can also ensure that the disengaging force remains constant or practically or substantially constant, at least during one or more stages of disengagement of the friction clutch 4401. Reference may be had again to the corresponding passages of the description of the construction and mode of operation of the friction clutches 4001, 4101, 4201 and 4301.

Figure 94:
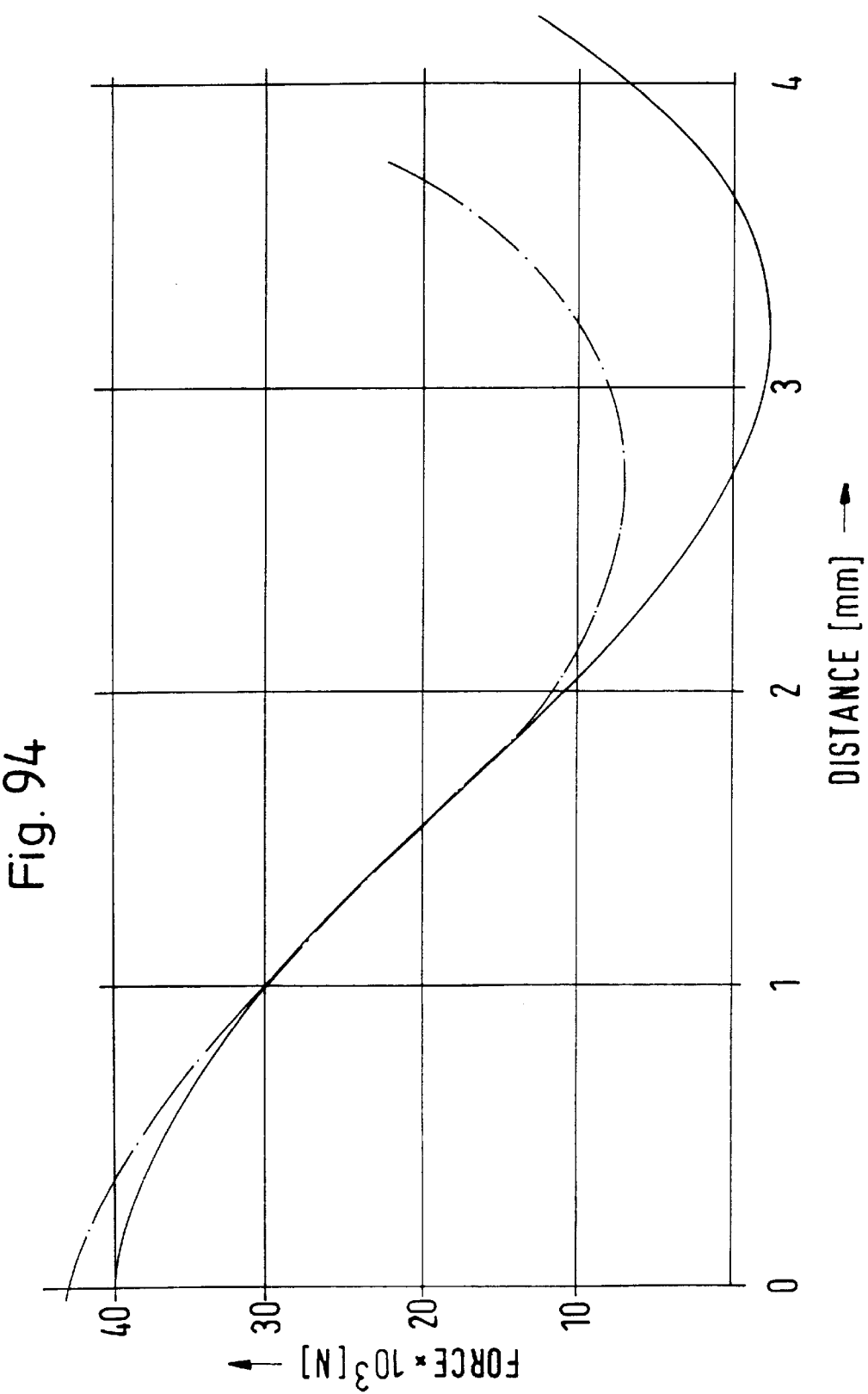
FIG. 94 is a diagram wherein the curves denote the progress of the disengaging force in a conventional clutch and in a clutch embodying the features of the clutches shown in FIGS. 81 to 93.

Referring again to FIG. 94, the phantom-line curve denotes the variations of the bias of springs during disengagement of a friction clutch embodying the present invention, e.g., of clutches of the type described with reference to FIGS. 81 to 93. It will be seen that the progress of the phantom-line curve between the points denoting the distances of 1 mm and 2 mm on the abscissa is similar to that of the characteristic curve of springs utilized in the clutch of the aforediscussed German patent application Serial No. P 43 39 291.8. However, between the 2 mm and 4 mm positions on the abscissa the corresponding portion of the solid-line curve indicates that the spring bias is a negative bias. On the other hand, the corresponding portion of the phantom-line curve is well above the abscissa and in part even above the horizontal line denoting a force of 10,000 nm. All in all, only that portion of the phantom-line curve which extends between the 2 mm and 3 mm positions on the abscissa is below the line denoting the force of 10,000 nm. Otherwise stated, the mode of operation of a conventional clutch wherein the spring bias during disengagement of the clutch varies in accordance with the solid-line curve of FIG. 94 is such that the bias first decreases to zero, thereupon decreases and remains below zero, and thereafter abruptly rises above zero. A person actuating the clutch pedal in a motor vehicle embodying the conventional clutch would be highly unlikely to properly control the disengagement of the clutch if the magnitude of forces during disengagement would fluctuate in a manner as denoted by the solid-line curve of FIG. 94. In fact, even if the minimum value of forces during disengagement of a conventional clutch were to remain at a positive value (i.e., if the solid-line curve shown in FIG. 94 were to be disposed entirely above the abscissa but would include a lowermost point close to the abscissa), the fluctuations of the disengaging force would still exceed a value which can be readily controlled during disengagement of such conventional clutch.

The improved friction clutch can be disengaged in a highly predictable manner because (and referring again to the phantom-line curve of FIG. 94) the disengaging force is always well above the zero value. Thus, each disengagement of the novel friction clutch involves a desirable rapid decrease of the force but only to a value not appreciably less than 10000 nm to thereupon rise rather abruptly between the 3 mm and 4 mm positions on the abscissa.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the contribution to the art and, therefore, such adaptations should and are intended to be comprehended within the meaning and range of equivalence of the appended claims.

We claim:

1. A repeatedly engageable and disengageable friction clutch for use in a motor vehicle, comprising:
    a housing rotatable about a predetermined axis; a driven counterpressure plate coaxial with and connected to said housing;
    a pressure plate coaxial with, disposed between and rotatable by said housing and said counterpressure plate with limited freedom of axial movement;
    a rotary clutch disc having friction linings disposed between said plates and being subject to wear as a result of repeated engagement and disengagement of the clutch;
    a stressed clutch spring disposed between said housing and said pressure plate to bias said pressure plate toward said counterpressure plate and to thus maintain said plates in frictional engagement with said friction linings in the engaged condition of the clutch;
    a seat carried by said housing and tiltably mounting said clutch spring;
    means for compensating at least for wear upon said friction linings, including means for automatically adjusting at least a portion of said seat in a direction from said housing toward said pressure plate as a function of the extent of wear at least upon said friction linings; and
    means for biasing said clutch spring against said seat.

2. The clutch of claim 1, wherein said clutch spring undergoes deformation at least during a predetermined stage of disengagement of the clutch and has a characteristic curve which is degressive at least within said predetermined stage.

3. The clutch of claim 1, further comprising means for disengaging the clutch including means for deforming said clutch spring, and a force-locking connection between said biasing means and said clutch spring.

4. The clutch of claim 1, wherein the bias of said clutch spring and the bias of said biasing means are related to each other so that, in the absence of wear at least upon said friction linings, the bias of said biasing means exceeds the bias of said clutch spring during disengagement of the clutch, said clutch spring including a conical diaphragm spring the conicity of which changes in response to wear at least upon said friction linings and the bias of said clutch spring at least during certain stages of disengagement of the clutch exceed the bias of said biasing means in response to a change of the conicity of said clutch spring as a result of wear at least upon said friction linings.

5. The clutch of claim 1, wherein said biasing means comprises at least one energy storing element which undergoes a change of shape in response to wear at least upon said friction linings.

6. The clutch of claim 5, wherein said at least one energy storing element includes at least one biasing spring.

7. The clutch of claim 1, wherein said compensating means is disposed between said housing and said clutch spring as seen in the direction of said axis.

8. The clutch of claim 1, wherein said compensating means comprises surfaces which are inclined relative to said axis.

9. The clutch of claim 8, wherein said compensating means comprises at least one first ramp and at least one second ramp complementary to and movable relative to and abutting said at least one first ramp, said inclined surfaces being provided on said ramps.

10. The clutch of claim 1, wherein said biasing means comprises at least one biasing diaphragm spring.

11. The clutch of claim 1, wherein said seat is disposed at a predetermined radial distance from said axis and is adjusted in the direction of said axis in response to wear at least upon said friction linings, said biasing means including a biasing diaphragm spring bearing upon said clutch spring at least close to said predetermined radial distance from said axis.

12. The clutch of claim 1, wherein said clutch spring has a first side facing said housing and a second side facing said pressure plate, said seat being a composite seat having first and second seats respectively abutting the first and second sides of said clutch spring, said biasing means including at least one biasing spring which biases said second seat against the second side of said clutch spring and said clutch spring being tiltable between said first and second seats.

13. The clutch of claim 12, wherein said portion of said composite seat includes said second seat and said second seat is movable in the direction of said axis.

14. The clutch of claim 13, wherein said clutch spring includes a diaphragm spring and the bias of said diaphragm spring upon said pressure plate decreases in response to axial movement of said second seat away from said housing.

15. The clutch of claim 13, wherein said second seat is movable axially of and away from said housing in response to wear at least upon said friction linings to a position in which the bias of said clutch spring is balanced by the bias of said biasing means.

16. The clutch of claim 13, wherein said at least one biasing spring of said biasing means bears upon said second seat with a substantially constant force, in each position of adjustment of said second seat, as a function of the extent of wear at least upon said friction linings.

17. The clutch of claim 1, wherein said biasing means includes a resilient sensor arranged to monitor the extent of wear at least upon said friction linings.

18. The clutch of claim 1, wherein said seat is movable in the direction of said axis and away from said housing in response to wear at least upon said friction linings, and further comprising means for preventing movements of said seat in the direction of said axis toward said housing.

19. The clutch of claim 1, wherein said compensating means includes at least one adjusting member for said seat and at least one resilient element which biases said at least one adjusting member against said seat.

20. The clutch of claim 1, wherein said compensating means comprises at least one annular adjusting member which is biased by said clutch spring in the direction of said axis in the engaged condition of the clutch.

21. The clutch of claim 20, wherein said at least one adjusting member is a circumferentially complete annular member.

22. The clutch of claim 1, wherein said compensating means includes ramps having sloping surfaces inclined relative to said axis.

23. The clutch of claim 22, wherein said ramps include a set of ramps on an annular adjusting member of said adjusting means.

24. The clutch of claim 1, wherein said seat is a composite seat including a first seat between said housing and said clutch spring, and a second seat between said clutch spring and said pressure plate, said adjusting means including an annular adjusting member between said first seat and said housing.

25. The clutch of claim 1, wherein said adjusting means includes at least one first ramp on at least one adjusting member of said adjusting means and at least one second ramp complementary to and abutting said at least one first ramp and being carried by one of said housing and said pressure plate.

26. The clutch of claim 25, wherein said adjusting means further comprises an annular second adjusting member connected with said at least one second ramp and disposed between said housing and said at least one adjusting member.

27. The clutch of claim 25, wherein said at least one second ramp is of one piece with said housing.

28. The clutch of claim 1, wherein said adjusting means includes a freewheel which is rotatable about said axis in a first direction during disengagement of the clutch and is self-locking in a second direction counter to said first direction.

29. The clutch of claim 1, wherein said adjusting means includes at least one set of ramps having surfaces sloping relative to said axis at an angle of between approximately 4° and approximately 20°.

30. The clutch of claim 29, wherein said angle is between approximately 5° and approximately 12°.

31. The clutch of claim 1, wherein said adjusting means includes at least one first ramp rotatable relative to said housing to move said seat toward said pressure plate and at least one second ramp complementary to and self-lockingly engaging said at least one first ramp.

32. The clutch of claim 1, wherein said adjusting means comprises at least one first ramp provided on a first adjusting member, at least one second ramp complementary to and abutting said at least one first ramp and provided on a second member of said adjusting means, and resilient means for urging at least one of said members of said adjusting means in a direction to move said seat in the direction of said axis and away from said housing.

33. The clutch of claim 1, wherein said adjusting means comprises a plurality of adjusting members movable in the direction of said axis.

34. The clutch of claim 1, wherein said adjusting means includes a first adjusting member and a second adjusting member, said members being movable relative to said housing and respectively having first ramps and second ramps complementary to and abutting said first ramps, said adjusting means further comprising means for urging at least one of said adjusting members in a sense to move said at least one adjusting member relative to said housing.

35. The clutch of claim 34, wherein said means for urging comprises at least one resilient element tending to rotate said at least one adjusting member relative to said housing.

36. The clutch of claim 1, wherein said biasing means includes at least one resilient sensor including a radially outer portion reacting against said housing and a radially inner portion bearing upon said clutch spring.

37. The clutch of claim 1, wherein said biasing means includes a resilient sensor bearing against said clutch spring and reacting against at least one abutment of said housing.

38. The clutch of claim 1, wherein said clutch disc comprises first and second friction linings respectively adjacent said pressure plate and said counterpressure plate, and resilient means operating between said first and second linings.

39. The clutch of claim 38, wherein said clutch spring has a first force-to-distance characteristic curve and said resilient means has a second force-to-distance characteristic curve approximating the first curve during disengagement of the clutch and the resulting movement of said first and second friction linings away from each other under the bias of said resilient means.

40. The clutch of claim 1, further comprising means for disengaging the clutch with a force within a range of between approximately minus 150 nm and approximately plus 150 nm in the disengaged condition of the clutch.

41. The clutch of claim 1, wherein said clutch spring has a characteristic curve including a positive portion during a first stage and a negative portion during a next-following second stage of disengagement of the clutch.

42. An engageable and disengageable friction clutch for use in motor vehicles, comprising: a housing rotatable about a predetermined axis; a pressure plate; means for non-rotatably connecting said pressure plate to said housing with limited freedom of movement in the direction of said axis; a rotary counterpressure plate adjacent said pressure plate; a torque transmitting clutch disc disposed between said plates and having friction linings engageable by and disengageable from at least one of said plates and being subject to wear as a result of repeated engagement with and disengagement from said at least one plate; at least one actuating device; a resilient device disposed between said housing and said pressure plate to bias said pressure plate toward said counterpressure plate and to thereby clamp said friction linings between said plates and to rotate said clutch disc about said axis; means for compensating for wear at least upon said friction linings, said compensating means being disposed between said pressure plate and one of said actuating and resilient devices and being movable in the direction of said axis to a position depending upon the extent of wear at least upon said friction linings; and means for arresting said compensating means in said position, said arresting means being provided on said pressure plate.

43. The friction clutch of claim 42, wherein said resilient device comprises an axially stressed diaphragm spring and said housing comprises a substantially ring-shaped seat tiltably mounting said diaphragm spring, said diaphragm spring including an annular portion engaging said seat and prongs extending substantially radially inwardly of said annular portion and forming part of said actuating device.

44. The friction clutch of claim 42, wherein said arresting means comprises at least one sensor having means for monitoring the extent of wear upon said friction linings, said monitoring means comprising a sensor element which is movable relative to said pressure plate into abutment with at least one axially fixed part of the clutch to thereby limit the extent of movability of said pressure plate away from said counterpressure plate.

45. The friction clutch of claim 44, wherein said sensor element is movable relative to said pressure plate in the direction of said axis and said arresting means further comprises means for automatically coupling said sensor element to an axially movable part of the clutch, said sensor element coming to a halt upon abutment against said at least one axially fixed part of the clutch.

46. The friction clutch of claim 45, wherein said at least one axially fixed part is one of said housing and said counterpressure plate, and said at least one axially movable part is said pressure plate.

47. The friction clutch of claim 42, wherein said compensating means includes a freewheel which is operative during disengagement but is self-locking during engagement of the clutch.

48. The friction clutch of claim 42, wherein said compensating means comprises a substantially ring-shaped locating element.

49. The friction clutch of claim 48, wherein said compensating means further comprises ramps between said locating element and said pressure plate.

50. The friction clutch of claim 49, wherein said compensating means further comprises wedges, one for each of said ramps and each carrying the respective ramp, at least some of said wedges containing a heat-resistant and heat-insulating material.

51. The friction clutch of claim 49, wherein said compensating means further comprises wedges, one for each of at least some of said ramps and each carrying the respective ramp, at least some of said wedges containing a heat-resistant material.

52. The friction clutch of claim 51, wherein said material is selected from the group consisting of thermoplastic and pressure setting plastic materials.

53. The friction clutch of claim 49, wherein said compensating means further comprises a wedge for each of said ramps and each carrying the respective ramp, said wedges including a first set movable axially and a second set movable circumferentially of said locating element, the wedges of said first set comprising a material having a first coefficient of friction and the wedges of said second set comprising a material having a different second coefficient of friction.

54. The friction clutch of claim 42, wherein said arresting means includes means for limiting the extent of axial movability of said pressure plate away from said counterpressure plate and toward said housing during disengagement of the clutch, said resilient device including a portion which bears upon said compensating means in the engaged condition of the clutch and is movable axially of said pressure plate to a greater second extent in response to disengagement of the clutch.

55. The friction clutch of claim 54, wherein said compensating means is biased by said resilient device only in an engaged condition of the clutch.

56. The friction clutch of claim 42, wherein said compensating means comprises a locating element which is biased by said resilient device in an engaged condition of the clutch, a first set of wedges, a second set of wedges, one for each wedge of the first set and each engaging the respective wedge of the first set, and means for non-rotatably mounting the wedges of one of said sets on said pressure plate, said locating element and the wedges of the other of said sets being rotatable relative to said pressure plate.

57. An engageable and disengageable torque transmitting friction clutch, comprising:

a housing rotatable about a predetermined axis;

a pressure plate;

means for non-rotatably connecting said pressure plate to said housing with limited freedom of movement in the direction of said axis;

a rotary counterpressure plate adjacent said pressure plate;

a torque transmitting clutch disc between said plates;

at least one resilient device reacting against said housing to bias said pressure plate toward said counterpressure plate to thereby clamp said clutch disc against said counterpressure plate and to rotate said clutch disc about said axis, said clutch disc having friction linings engageable by and disengageable from at least one of said plates and being subject to wear as a result of repeated engagement with and disengagement from said at least one plate;

an adjusting unit including means for compensating for wear upon said friction linings to thereby maintain the bias of said device upon said pressure plate at a substantially constant value;

means for engaging and disengaging the clutch, including mobile actuating means arranged to engage and disengage the clutch; and means for varying the torque transmitted by at least one of the friction clutch and the clutch disc, including means for gradually reducing the transmitted torque at least during a portion of movement of said actuating means along said path in a direction to disengage the clutch.

58. The friction clutch of claim 57, wherein said pressure plate includes a portion which is biased by said at least one resilient device and the disengagement of the clutch includes axial movement of said pressure plate away from said counterpressure plate against the bias of said at least one resilient device, and further comprising means for gradually reducing the torque which is transmittable by the friction clutch at least during a portion of axial movement of said pressure plate.

59. The friction clutch of claim 57, further comprising means for securing said housing to said counterpressure plate to thus establish a power train between said actuating means and said securing means, said torque varying means being disposed in said power train.

60. The friction clutch of claim 57, wherein said pressure plate has a friction surface engageable with said friction linings to establish a power train between said actuating means and said clutch disc, said torque varying means being disposed in said power train.

61. The friction clutch of claim 57, wherein said friction linings include a first and a second set of friction linings and said torque varying means is disposed axially between said sets of friction linings.

62. The friction clutch of claim 57, wherein said torque varying means includes means for axially yieldably locating at least one of said plates and said friction linings relative to the others of said plates and said friction linings, said torque varying means being acted upon by a variable force which decreases to a minimal value in response to disengagement of the friction clutch and gradually increases to a maximum value at least during a portion of movement of said actuating means along said path to engage the clutch.

63. The friction clutch of claim 57, wherein said means for varying the torque which is transmittable by the friction clutch includes means for reducing the transmitted torque during approximately 40–70 percent of movement of said actuating means along said path in a direction to disengage the clutch and for gradually increasing the torque which is transmittable by the friction clutch during approximately 40–70 percent of movement of said actuating means along said path in a direction to engage the clutch.

64. The friction clutch of claim 57, wherein said at least one resilient device has a degressive force-to-displacement ratio at least during a portion of movement of said actuating means along said path in a direction to disengage the clutch.

65. The friction clutch of claim 57, wherein said at least one resilient device comprises a diaphragm spring which bears against said pressure plate, and further comprising a seat tiltably mounting said diaphragm spring in said housing.

66. The friction clutch of claim 65, wherein said diaphragm spring comprises an annular portion and said actuating means comprises prongs extending radially inwardly from said annular portion.

67. The friction clutch of claim 65, wherein said seat comprises two portions disposed at opposite sides of said diaphragm spring.

68. The friction clutch of claim 65, wherein said diaphragm spring has a substantially sinusoidal force-to-displacement characteristic curve including a maximum, a minimum, a degressive portion between said minimum and said maximum, an operating point at said degressive portion in the engaged condition of the friction clutch, and a force ratio of approximately 1:0.4 to 1:0.7 between said maximum and said minimum.

69. A preassembled engageable and disengageable clutch aggregate comprising:
   a housing;
   a pressure plate;
   a counterpressure plate rotatable about a predetermined axis;
   means for non-rotatably connecting said pressure plate to said counterpressure plate with limited freedom of movement in the direction of said axis;
   a torque transmitting clutch disc between said plates;
   at least one resilient device reacting against said housing to bias said pressure plate toward said counterpressure plate and to thereby clamp said clutch disc between said plates, said clutch disc having friction linings engageable by and disengageable from at least one of said plates and being subject to wear as a result of repeated engagement with and disengagement from said at least one plate;
   an adjusting unit including means for compensating at least for wear upon said friction linings to thereby maintain the bias of said at least one resilient device upon said pressure plate at a substantially constant value;
   means for engaging and disengaging the clutch aggregate including mobile actuating means arranged to disengage the clutch aggregate; and
   means for gradually reducing the torque which is transmitted by said clutch disc during a portion of movement of said actuating means in a direction to disengage the clutch aggregate, said torque reducing means including at least one further resilient element in series with said at least one resilient device.

70. An engageable and disengageable friction clutch for use in a driving unit, said unit comprising an at least partly automatic transmission and a prime mover; said friction clutch being disposed between said prime mover and said transmission and controlled at least in dependency on the operation of said transmission, said friction clutch comprising:
   a pressure plate,
   a counterpressure plate rotatable about a predetermined axis and connectable with an output shaft of the prime mover,
   means for non-rotatably connecting said pressure plate to said counterpressure plate with limited freedom of movement in the direction of said axis,
   a torque transmitting clutch disc between said plates,
   at least one resilient device acting upon said pressure plate to bias said clutch disc against said counterpressure plate, said clutch disc having friction linings engageable with and disengageable from at least one of said plates and being subject to wear as a result of repeated engagement with and disengagement from said at least one plate,
   an adjusting unit including means for compensating at least for wear upon said linings to thereby maintain the bias of said at least one resilient device upon said pressure plate at a substantially constant value,
   means for engaging and disengaging the friction clutch including mobile actuating means arranged to engage and disengage the friction clutch, and
   torque varying means including means for gradually reducing the torque which is transmittable by the friction clutch and/or by the clutch disc during a portion of movement of said actuating means in a direction to disengage the friction clutch.

71. The friction clutch of claim 70, wherein said at least one resilient device has a degressive force-to-displacement ratio, at least during a portion of movement of said actuating means along said path in a direction to disengage the friction clutch.

72. The friction clutch of claim 70, wherein said means for varying the torque which is transmittable by the friction clutch includes means for reducing the transmittable torque during approximately 40–70 percent of movement of said actuating means along said path in a direction to disengage the friction clutch and for gradually increasing the torque which is transmittable by said friction clutch during approximately 40–70 percent of movement of said actuating means along said path in a direction to engage the friction clutch.

73. A clutch assembly comprising:
   a pressure plate adapted to be non-rotatably connected to a counterpressure plate with limited freedom of axial movement,
   at least one biasing spring being provided to act upon the pressure plate in a direction toward a clutch disc which can be clamped between the pressure plate and the counterpressure plate,
   an adjusting device adapted to compensate at least for the wear upon the friction linings of the clutch disc and to effect a substantially unchanged application of force from the biasing spring to the pressure plate, the friction clutch comprising actuating means arranged to disengage and engage the friction clutch and being actuatable by a disengaging member which is movable axially by disengaging means, the actuating means being shifted axially in the direction of disengaging movement in dependency at least upon the wear upon the friction linings, and
   a device which is arranged to at least substantially compensate for axial displacement of the actuating means, said device being provided in a power flow between the disengaging means and the actuating means.

74. The clutch assembly according to claim 73, wherein the compensating device is disposed between the disengaging member and the actuating means.

75. The clutch assembly according to claim 73, wherein the friction clutch comprises a housing adapted to be affixed to the counterpressure plate and comprising an end wall confronting the disengaging member, the compensating device being adapted to be stressed axially between the actuating means and the end wall.

76. The clutch assembly according to claim 73, wherein the biasing spring includes a diaphragm spring which can be stressed in the axial direction between the clutch housing and the pressure plate and comprises a resilient ring-shaped main body and prongs extending radially inwardly from the main body and constituting the actuating means.

77. The clutch assembly according to claim 73, wherein the compensating device comprises adjusting ramps which slope in the axial direction.

78. The clutch assembly according to claim 77, wherein the adjusting ramps constitute climbing ramps provided on at least one ring-shaped member.

79. The clutch assembly according to claim 78, wherein the adjusting ramps comprise complementary ramps which cooperate with the climbing ramps.

80. The clutch assembly according to claim 79, wherein the complementary ramps are also carried by a ring-shaped member.

81. The clutch assembly according to claim 80, wherein the members which are provided with adjusting ramps are movable in the axial direction.

82. The clutch assembly according to claim 79, wherein the members which carry the climbing ramps and the complementary ramps are rotatable relative to each other.

83. The clutch assembly according to claim 79, wherein one of the members which carry the climbing ramps or the complementary ramps cannot rotate relative to the friction clutch.

84. The clutch assembly according to claim 77, wherein the adjusting ramps have a slope angle which effects a self-locking action as a result of frictional engagement between the adjusting ramps.

85. The clutch assembly according to claim 77, wherein the adjusting ramps have an angle of slope which is between 5° and 20°, preferably in the range of between 7° and 11°.

86. The clutch assembly according to claim 79, wherein at least one of the members which carry the climbing ramps and/or the complementary ramps is spring biased in the direction of adjustment.

87. The clutch assembly according to claim 79, wherein the member which carries the climbing ramps and/or the member which carries the complementary ramps is stressed in the direction of adjustment by at least one energy storing element which is disposed between such members.

88. The clutch assembly according to claim 73, further comprising means for effecting during disengagement of the clutch a gradual reduction of torque which can be transmitted by the friction clutch or by the clutch disc while the actuating means are in the process of completing a portion of disengaging movement.

89. The clutch assembly according to claim 73, wherein the biasing spring includes a diaphragm spring and is tiltably mounted in the clutch housing between two stops, one of which confronts the clutch plate and is spring biased toward the biasing spring, the force which is transmitted by the biasing spring to the spring-biased stop during disengagement of the friction clutch increasing in response to wear upon the friction linings and such force being greater than the force acting upon the spring-biased stop.

90. The clutch assembly according to claim 89, wherein the spring-biased stop is movable in the axial direction.

91. The clutch assembly according to claim 89, wherein the spring-biased stop is moved in a direction toward the pressure plate in response to increasing disengaging force which is furnished by the biasing spring.

92. The clutch assembly according to claim 89, wherein the disengaging force for the biasing spring decreases in response to movement of the spring-biased stop.

93. The clutch assembly according to claim 89, wherein the spring-biased stop is arranged to move until the establishment of an equilibrium between the maximum disengaging force acting upon the stop and the opposing force acting upon such stop.

94. The clutch assembly according to claim 89, wherein the characteristic curve of the biasing diaphragm spring slopes downwardly at least within a portion of the range of disengagement.

95. The clutch assembly according to claim 89, wherein the opposing force acting upon the spring-biased stop is furnished by an energy storing element which applies a substantially constant force within the selected adjustment range.

96. The clutch assembly according to claim 89, wherein the axially yieldable stop is biased by a diaphragm spring which acts as a sensor of forces.

97. An engageable and disengageable friction clutch, for motor vehicles, comprising:

an axially fixed component rotatable about a predetermined axis;

a pressure plate;

means for non-rotatably connecting said pressure plate to said component with freedom of movement in the direction of said axis;

a rotary counterpressure plate adjacent said pressure plate;

a torque transmitting clutch disc disposed between said plates and having friction linings which are subject to wear in response to repeated engagement and disengagement of the friction clutch;

a diaphragm spring disposed between said component and said pressure plate to normally bias said pressure plate toward said clutch disc so that said friction linings are clamped between said plates; and means for automatically compensating for wear at least upon said friction linings, said compensating means being disposed between said diaphragm spring and said component.

* * * * *